(12) United States Patent
Martin

(10) Patent No.: US 6,198,808 B1
(45) Date of Patent: Mar. 6, 2001

(54) CONTROLLER FOR USE WITH COMMUNICATIONS SYSTEMS FOR CONVERTING A VOICE MESSAGE TO A TEXT MESSAGE

(75) Inventor: Larry J. Martin, Dallas, TX (US)

(73) Assignee: WebLink Wireless, Inc., Dallas, TX (US)

( * ) Notice: Subject to any disclaimer, the term of this patent is extended or adjusted under 35 U.S.C. 154(b) by 0 days.

(21) Appl. No.: 09/001,717

(22) Filed: Dec. 31, 1997

(51) Int. Cl.[7] ................................................ H04M 1/64
(52) U.S. Cl. ................................. 379/88.14; 379/88.11; 379/88.15; 455/412
(58) Field of Search ............................ 379/88.01, 88.05, 379/88.11, 88.12, 88.13, 88.14, 88.15, 88.16, 88.22; 704/275; 455/412, 413, 414, 416

(56) References Cited

U.S. PATENT DOCUMENTS

| | | | |
|---|---|---|---|
| 5,381,466 | * | 1/1995 | Shibayama et al. ................. 379/88 |
| 5,406,557 | * | 4/1995 | Baudoin ............................... 370/61 |
| 5,475,738 | * | 12/1995 | Penzias ................................ 379/67 |
| 5,479,411 | * | 12/1995 | Klein .................................... 379/88 |
| 5,524,137 | * | 6/1996 | Rhee .................................... 379/67 |
| 5,712,901 | * | 1/1998 | Meermans ........................... 379/88 |
| 5,724,410 | * | 3/1998 | Parvulescu et al. ................ 379/88 |
| 5,781,614 | * | 7/1998 | Brunson ............................... 379/88 |
| 5,828,736 | * | 10/1998 | Chevion .......................... 379/88.14 |
| 5,870,454 | * | 2/1999 | Dahlen ............................. 379/88.14 |
| 5,987,100 | * | 11/1999 | Fortman et al. ................. 379/88.14 |
| 5,999,594 | * | 12/1999 | Mizoguchi et al. ............. 379/88.14 |
| 6,061,718 | * | 5/2000 | Nelson ......................... 379/88.14 X |

OTHER PUBLICATIONS

"SpeechMania Developer's Kit", Philips Speech Processing, pp. 1–15.

"Speech Processing: Let's Make Things Better," Philips Speech Processing Slide Show.

Web Page—http://www.englishwizard.com/voice.htm, "English Wizard/Voice", Linguistic Technology Corporation, Aug. 1, 1997, pp. 1–2.

Janet M. Baker, "Speech Recognition Design Traps and Tips" pp. 1–11, Dragon Systems, Inc.

Thomas B. Schalk, "Speech Recognition Design Traps: ASR Prime Time Tips", pp. 1–7, Voice Control Systems, Inc.

"Conversation Transactions through Speech Recognition", pp. 1–10, Nuance Communications, Inc.

Mike Phillips, "Avoiding Speech Recognition Application Design Pitfalls", pp. 1–8, Applied Language Technologies.

Samuel M. Feldman and Rongrong Wu, "Intelligent Network Speech Recognition", 1997 Annual

* cited by examiner

*Primary Examiner*—Scott L. Weaver

(57) ABSTRACT

The principles of the present invention introduce non-realtime messaging systems (and controllers for use therewith) that are capable of converting received oral messages from callers into at least substantially equivalent text messages for transmission to subscribers thereof. This may be accomplished by processing the received oral messages using data patterns representing oral phrases specific to non-realtime messaging systems. An exemplary messaging system includes each of a messaging controller, a data repository and a translating controller. The messaging controller is capable of receiving oral messages from callers and transmitting text messages to communications devices associated with subscribers of the non-realtime messaging system. The data repository is capable of storing data patterns that represent oral phrases specific to the non-realtime messaging system. The translating controller, which is associated with the messaging controller and data repository, is operable to process the received oral messages using the stored data patterns and to generate at least substantially equivalent text messages in response thereto.

21 Claims, 9 Drawing Sheets

US 6,198,808 B1

CONTROLLER FOR USE WITH COMMUNICATIONS SYSTEMS FOR CONVERTING A VOICE MESSAGE TO A TEXT MESSAGE

TECHNICAL FIELD OF THE INVENTION

The present invention is directed, in general, to wireless communication systems and methods of operating the same, and, in particular, to non-realtime communication systems for converting voice messages to text messages and subsequent transmission of the same.

BACKGROUND OF THE INVENTION

The ever increasing availability and popularity of wireless communication can be linked to technological gains that have provided more efficient, reliable and cost-effective mobile devices, such as message pagers, wireless telephones and personal communication services ("PCS") devices, as examples. Due to their mobility and low power requirements, conventional mobile devices impose significant design constraints upon the wireless communication networks and base stations that support them. Nevertheless, the demand for better and cheaper mobile devices and wireless communication services continues to grow at a rapid pace.

The selection of one mobile device over another is usually the result of a simple cost benefit analysis—the cost of a particular mobile device, the anticipated life span for that device, the usefulness of the various services that can be subscribed to using the device, etc. Message paging subscribers, for instance, demand powerful and sophisticated features (e.g., voice mail, e-mail, wide area paging, out of area roaming, voice messaging, voice response, etc.) that often conflict with the physical restrictions of minimized size and increased battery life—the size of conventional pagers makes it difficult to incorporate advanced features requiring interaction with the subscriber (e.g., integration of control switches/keypads into message pager).

The trend to enhance services has been to incorporate automated call processing techniques into communication systems and system services. Many contemporary message paging systems, for instance, include automated interfaces for interacting with callers. Commonly, these systems enable a caller to the system to leave a message for a subscriber of the system by leaving a call-back number using the telephone keypad.

More advanced systems enable callers to interact with the system by responding to system queries using their telephone keypads. At some point during this interaction, the caller is asked whether he wishes to leave a "text" (alphanumeric) or voice (e.g., voice mail, voice message page, etc.) message. A positive response concerning the "text" message will cause the system to transfer the caller to a system operator to whom the caller dictates a message. After the dictation is complete, the system operator often verifies the text message by reading the same back to the caller. Following the caller's approval, the text message is then transmitted to the subscriber.

There is desire and need in the art to increase the utility of such call processing systems by having them recognize speech. A suitable speech recognition system will automate, at least in part, the foregoing dictation process, that not only will translate voice to text for delivery of voice messages to text pagers, but allow file based automated processing of messages.

Speech recognition, by definition, is the ability of a system to understand human speech. A speech recognition system usually is made up of an input device, a voice board that provides analog-to-digital conversion of a speech signal, and a signal processing module that uses patterns to recognize the speech signal. To be acceptable, the speech recognition system must rapidly and accurately recognize a wide range of words and phrases (a vocabulary), such as the thousands words and phrase used by callers into message paging systems. In current speech recognition systems, as the vocabulary that can be recognized increases, the speed and accuracy are reduced, as the speech recognition system must search through more possibilities, and the number of similar-sounding words and phrases increases. These problems have limited the practical uses of speech recognition systems.

SUMMARY OF THE INVENTION

To address the above-discussed deficiencies of the prior art, it is a primary object of the present invention to provide, in a non-realtime messaging system, a means for processing oral messages received from a variety of callers and, in response thereto, for generating substantially equivalent text messages. The processing means uses data patterns representing oral phrases specific to the non-realtime messaging system. The phrase "specific to," as it is used herein, means to be peculiar to or characteristic of the particular messaging system (discussed in detail hereafter); analogous phrases include particular to, distinct to, unique to, common to, native to, and the like. It should be noted that the "oral phrases" may be specific to a general type of non-realtime messaging system (e.g., a message paging system), to a particular non-realtime messaging system implementation (e.g., an intra-network e-mail system specific to a freight delivery company), or to both.

An illustrative embodiment of a non-realtime messaging system in accord with the principles of the present invention is a suitably arranged message paging system. The message paging system includes each of a messaging controller, a data repository and a translating controller. Collectively, these controllers are capable of converting oral messages received from callers into substantially equivalent text messages. The messaging controller is capable of receiving oral messages from callers into the message paging system and transmitting text messages to message pagers used by subscribers of the system. The data repository is capable of storing data patterns that represent oral phrases specific to the message paging system. The translating controller, which is associated with the messaging controller and the data repository, is operable to process the received oral messages using the stored data patterns and to generate at least substantially equivalent text messages in response thereto. The generated text messages are then transmitted by the messaging controller to the subscribers for whom the received oral messages where intended.

For instance, assume that a freight delivery company subscribes to a suitably arranged message paging system and each of its drivers carries a conventional alphanumeric message pager. A dispatcher for the freight delivery company calls the message paging system and records the following oral message for a particular driver—a subscriber—"Call home, its not an emergency. Remember to meet Joe at the restaurant for lunch." The message paging system, using data patterns representing oral phrases specific to it, processes the received oral message and generates a text message in response thereto. As is described in detail hereafter, the subject data patterns collectively provide a context sensitive vocabulary. The message paging system parses the stored oral message and compares the same with the vocabulary to generate the text message.

The assignee of the invention disclosed in this patent document is, inter alia, an international provider of message paging systems and services. Attached APPENDIX A, which is discussed in detail hereafter, includes a partial list of acronyms, words, names, terms, tags and the like (collectively, hereafter referred to as "phrases") commonly used by callers into the assignee's message paging system; in short, this list represents a "snapshot" of phrases common to the assignee's system. Each phrase on this exemplary list is associated with a numeric value indicating the number of times, or frequency, with which the particular phrase was used on a particular day by callers leaving oral messages with system operators (described hereabove). The phrases are sorted as a function of this value. According to an advantageous embodiment, a list of phrases, such as the exemplary list of APPENDIX A, may contribute to a vocabulary specific to a general message paging system.

According to one advantageous embodiment, the system proposes, or "plays," the generated text message to the caller. This may be accomplished either by maintaining the communication channel with the caller during oral message processing or, alternatively, by calling the caller back to verify the message. The caller may accept or reject the text message. If the caller accepts the text message, the message is sent to the subscriber; if the caller rejects the text message, then an appropriate response must be undertaken. For instance, the caller may be transferred to a traditional "live" system operator that will manually take the oral message from the caller and transcribe the same into a text message.

In a related embodiment, before, or while, transferring the caller to the operator, the system plays the previously stored oral message for the operator and displays the proposed text message to the operator, in short, front-loading, or "prefetching," information that the operator may need to efficiently interact with the caller.

Alternatively, the caller and the system may interact in a manner that enables the caller to identify that portion of the text message that is incorrect and, hopefully, correct the same. According to one embodiment, the caller parses the proposed text message with the system, identifying the incorrect portion or portions. The system then prompts, or asks, the caller to spell the phrase, to select or pick a phrase from a group or list of phrases, or the like, thereby correcting the same.

The foregoing SUMMARY OF THE INVENTION outlines, rather broadly, some advantageous features of various embodiments of the present invention so that those of ordinary skill in the art may better understand the DETAILED DESCRIPTION that follows. Additional features of the invention will be described hereafter that form the subject matter of the CLAIMS OF THE INVENTION. Those of ordinary skill in the art should appreciate that they can readily use the disclosed conception and specific embodiments as a basis for designing or modifying other structures for carrying out the same purposes of the present invention. Those of ordinary skill in the art should also realize that such equivalent constructions do not depart from the spirit and scope of the present invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, be a property of, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings wherein like numbers represent like, or analogous, objects and, in which.

DETAILED DESCRIPTION

Figure 1:
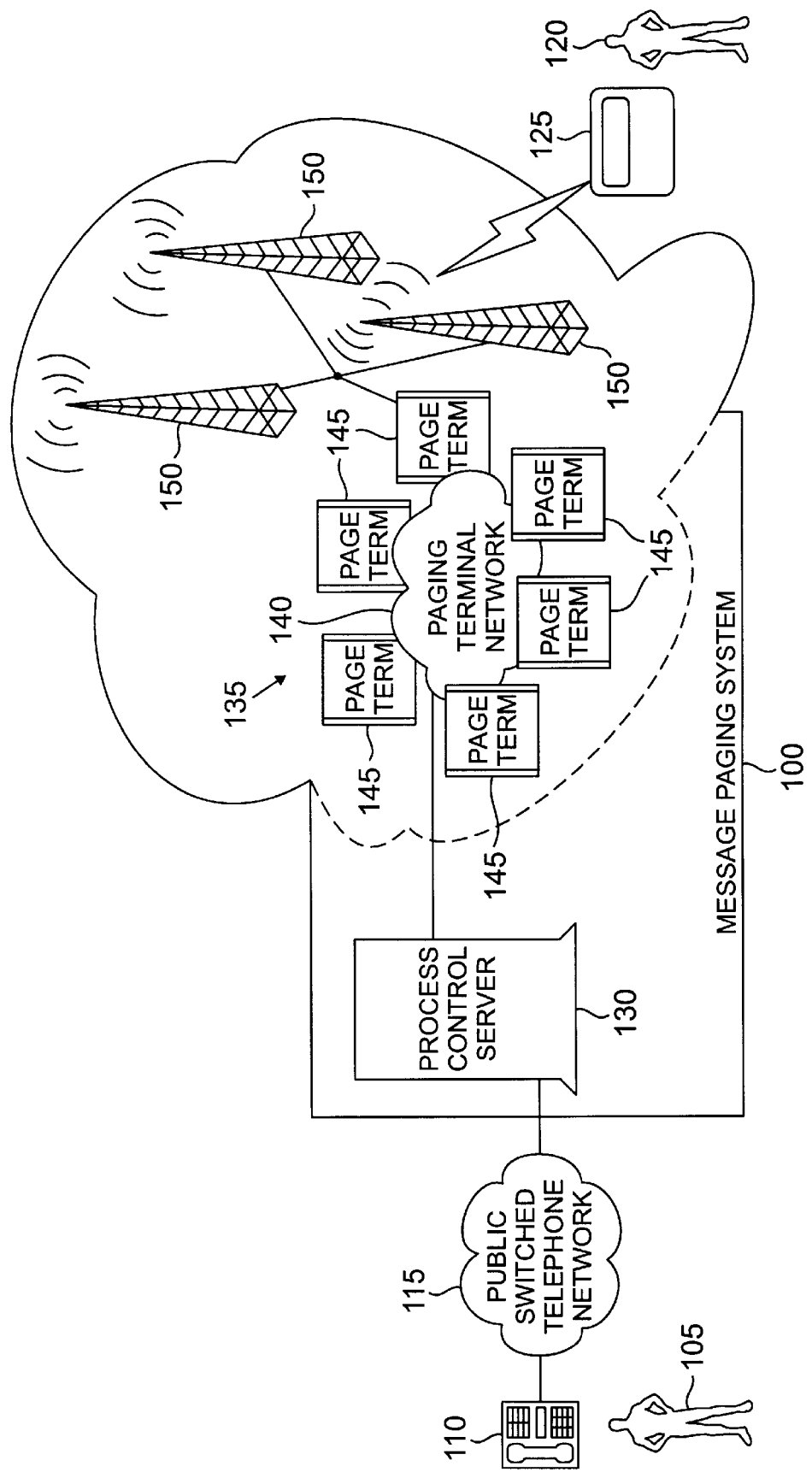
FIG. 1 illustrates a representative portion of an exemplary non-realtime messaging system according to the principles of the present invention.

Turning initially to FIG. 1, illustrated is a representative portion of an exemplary non-realtime messaging system 100, namely, a message paging system, that employs the principles of the present invention.

Message paging system 100 is illustratively associated with a caller 105 via a conventional telephone 110 and a public switched telephone network ("PSTN") 115, and with a subscriber 120 via an exemplary wireless communications device 125, namely, a message pager. Message paging system 100 includes each of a process control server 130 and a messaging network (generally designated 135), namely, a message paging network. Exemplary message paging network 135 includes a paging terminal network 140, a plurality of paging terminals 145 and a plurality of message paging transmitter towers 150. Exemplary paging terminal network 140 is suitably associated with paging terminals 145. One of such paging terminals 145 is illustratively associated with message paging transmitter towers 150. One of such message paging transmitter towers 150 is illustratively in wireless communication with message pager 125.

As is described in detail hereafter, exemplary message paging system 100 is operable to process an oral message received from caller 105 and, in response thereto, to generate a related text message. At least a portion of this text message is transmitted to subscriber 120 via message pager 125.

Figure 2:
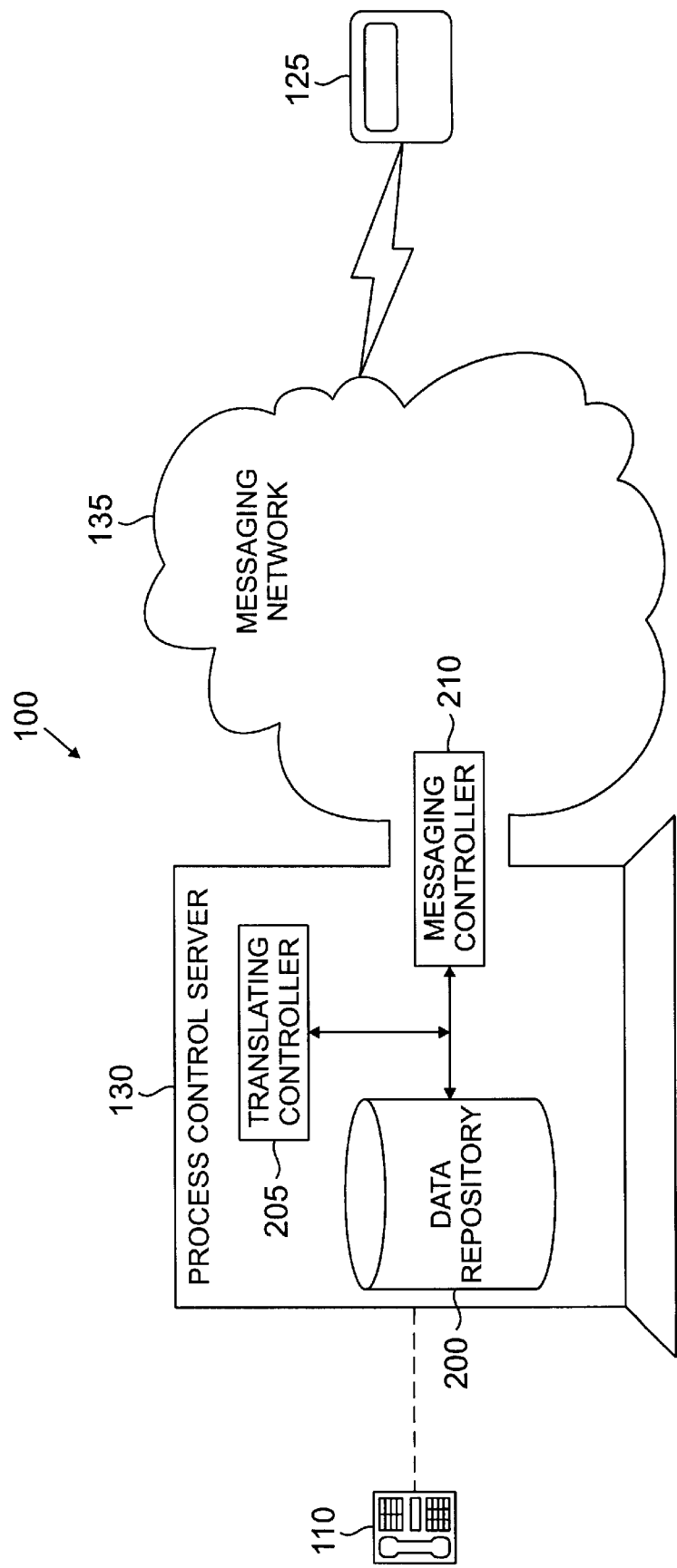
FIG. 2 illustrates a conceptual block diagram illustrating an exemplary association of a process control server and a conventional messaging network introduced with reference to the exemplary non-realtime messaging system of FIG. 1.

Turning next to FIG. 2, illustrated is a conceptual block diagram of message paging system 100 (generally designated) that illustrates an exemplary association of process control server 130 and messaging network 135. Message paging system 100 is again associated with each of telephone 110 and message pager 125. According to this embodiment, process control server 130 includes each of a data repository 200 and a translating controller 205, and process control server 130 and messaging network 135 collectively include a messaging controller 210.

Exemplary messaging controller 210 is capable of receiving oral messages from callers and transmitting text messages to message pagers and other communication devices used by subscribers of message paging system 100. Exemplary data repository 200 is capable of storing data patterns that represent oral phrases specific to message paging system 100. Exemplary translating controller 205, which is associated with data repository 200 and messaging controller 210, is operable to process received oral messages, such as from caller 105, using selected ones of the data patterns stored in data repository 200 and to generate text messages that are at least substantially equivalent to the received oral messages.

The phrase "data repository," as it is used herein, is defined broadly as any collection of data, objects, routines or the like. For instance, data repository 200 may include any number of databases, suitable file structures, or combination of the same; data repository 200 may be centralized within a single computer or local area network, or distributed across a wide area network. Further, such suitable objects and routines may include executable code, such as code that (i) directs the steps that a computer is to take (as in procedural languages), (ii) sets forth rules that the computer is to follow (as in declarative languages) or (iii) defines objects and their relationships (as in object-oriented programming languages), as examples.

As introduced hereabove, the assignee of the invention disclosed in this patent document provides message paging systems and services. Attached APPENDIX A, which is incorporated herein by reference for all purposes, includes a list of phrases that were used on a single day by callers into the assignee's message paging system. Such a list would generally be common to any message paging system where a caller spoke with a "live" system operator. This list represents phrases common to the assignee's messaging system, on this day, the system operators transcribed 9,131 different phrases. The numeric value to the right of each phrase indicates the number of times, or frequency, with which the particular phrase was used that day by callers leaving oral messages with system operators. The list is sorted as a function of this value. According to the illustrated embodiment, a portion of this list is used to define a vocabulary specific to message paging system 100. For instance, a limited vocabulary may be defined as the "top 100" phrases used, or any phrase used more than an average of 1000 times a day, or 500 times a day, as examples. There may also be additional or sub-vocabularies, such as subscriber specific, company specific, weather specific, geographic, time specific (e.g., time of day, day of week, season, holiday, etc.). The data patterns, once defined, may remain static or may be dynamic (changing over time).

Exemplary translating controller 205 may include a signal processing module that converts the stored oral message into a series of speech patterns having measurable characteristics. These speech patterns are compared with the data patterns. One advantageous feature that may be implemented in this recognition process may be "key spotting," which makes it possible to pick out "key" phrases from among a sentence of extraneous phrases. Some or all of these "keys" are specific to non-realtime messaging system 100, for instance, a context sensitive grammar defined, at least in part, by APPENDIX A. Another advantageous feature that may be implemented in this recognition process may be adaptive (improves with use) or fully speaker independent, and may include automatic updates, either modifying data patterns that already represent relevant phrases or that add new phrases meeting some criteria (e.g., a phrase is used, on average, more than 500 times a day). In addition, features such as "barge-in" capability, which allow the user to speak at anytime, may be incorporated herein.

Figure 3:
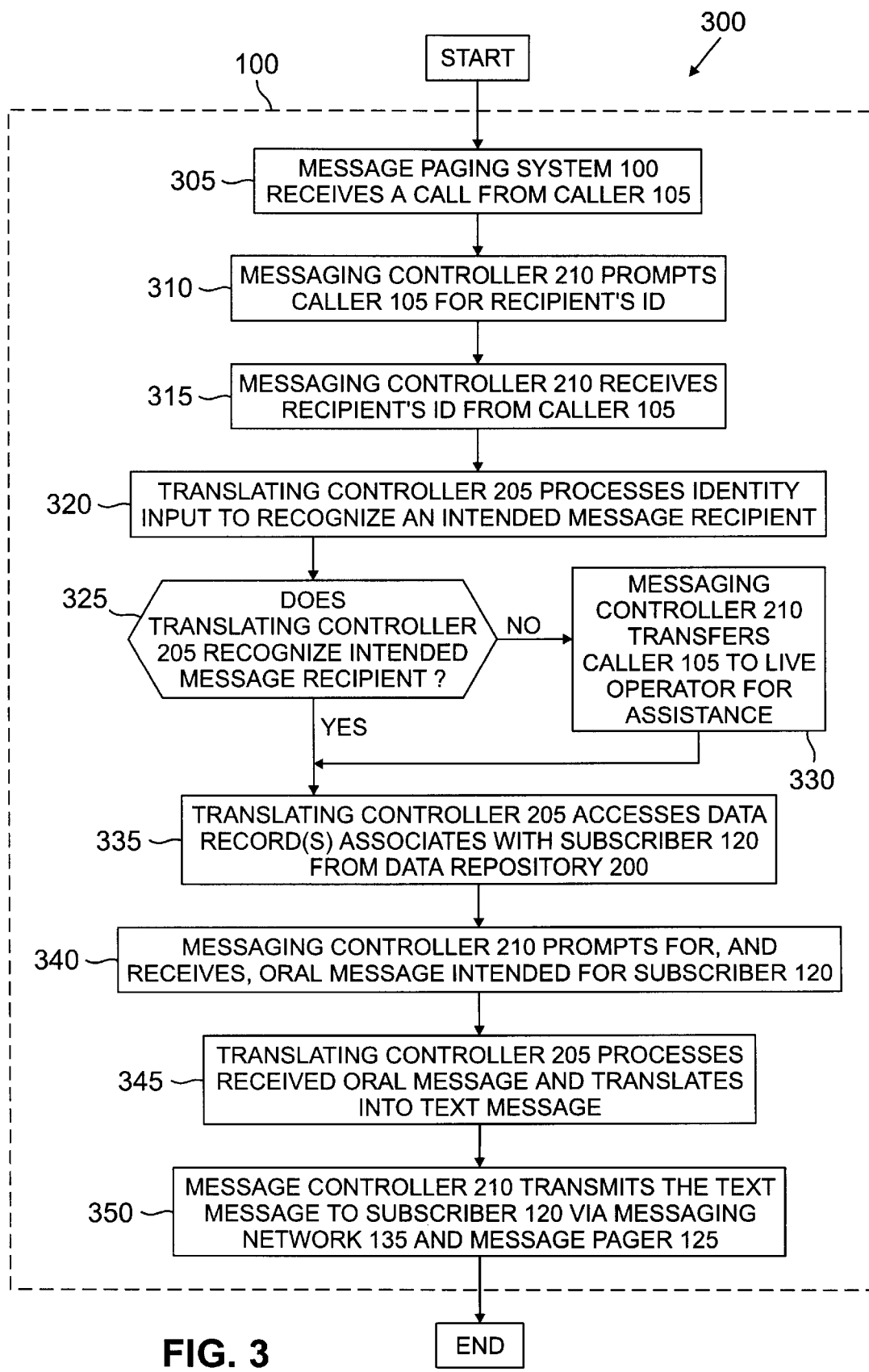
FIG. 3 illustrates a flow diagram of an exemplary method for operating the non-realtime messaging system of FIGS. 1 and 2.

Turning next to FIG. 3, illustrated is a flow diagram of an exemplary method (generally designated 300) for operating message paging system 100. For the purposes of illustration, concurrent reference is made to FIGS. 1 and 2.

To begin, message paging system 100 (particularly, messaging controller 210) receives a call from caller 105 (input step 305). Caller 105, via telephone 110 and PSTN 115, intends to leave a message for subscriber 120. In response, translating controller 205 prompts caller 105, via messaging controller 210, for the identity of an intended message recipient(s), namely, subscriber 120 (output step 310). In response, messaging controller 210 receives an oral, or voice, input from caller 105 that represents the identity of subscriber 120 (input step 315).

Generally speaking, the content of this received input is implementation dependant; for instance, it may represent the name or a personal identification number ("PIN") of the intended message recipient(s). In point of fact, any conventional means may be employed by system 100 for caller 105 to identify subscriber 120, whether such means involves speech recognition, use of a dual tone multi-frequency ("DTMF") keypad, or the like. According to one advantageous embodiment, subscriber 120 is assigned a "personal," or unique, telephone number and when caller 105 uses the same to contact system 100, the identity of subscriber 120 is immediately known.

Returning to FIG. 3, translating controller 205 accesses data repository 200 and attempts to recognize the received input by using ones of the stored data patterns representing subscriber identities, names or the like (process step 320). Translating controller 205 compares the received input and the subscriber data patterns; for instance, translating controller 205 may separate, or "break down," the identity input into sub-parts having one or more measurable characteristics and then compare such measurable characteristics and the "subscriber" data patterns (such recognition techniques are known).

If translating controller 205 fails to identify subscriber 120 (NO branch of decisional step 325), then translating controller 205, via messaging controller 210, transfers caller 105 to a "live" operator (not shown) for assistance (process step 330). After caller 105 identifies subscriber 120 to the operator, control is transferred back to translating controller 205.

Figure 4:
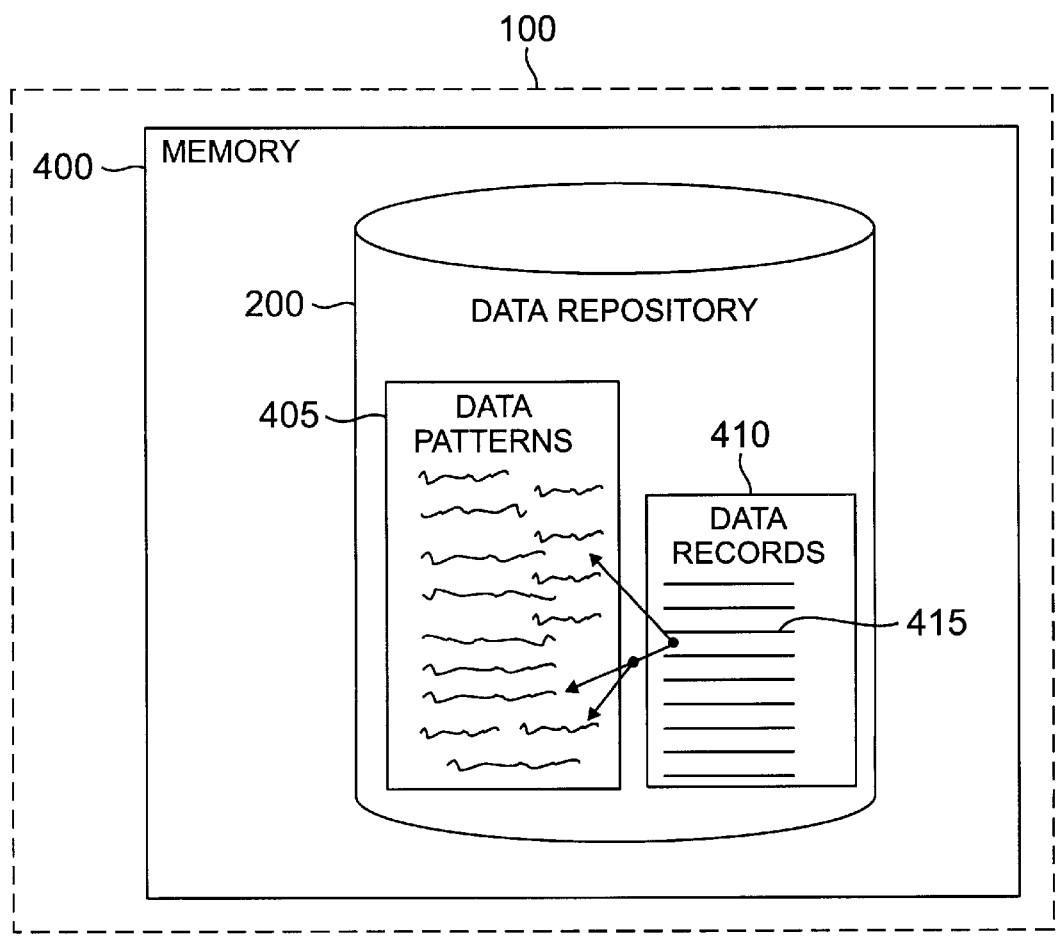
FIG. 4 illustrates a conceptual configuration of a conventional memory that includes a data repository introduced with reference to FIG. 2.

Translating controller 205 accesses, or "looks up," one or more data records in data repository 200 that are associated with subscriber 120 (process step 335; discussed hereafter with reference to FIG. 4). The exemplary data record(s) provides particulars for delivering messages to associated recipients, presently, subscriber 120. For instance, assume subscriber 120 wants all received oral messages to be stored in voice mail and translated into text messages, that such text messages be sent to an e-mailbox, and that summaries of such text messages be sent to message pager 125.

Translating controller 205, via messaging controller 210, prompts caller 105 for, and receives, an oral message input representing the body of a message for subscriber 120 (input/output step 340). Translating controller 205 processes the oral message and translates the same into a proposed text message (process step 345; discussed further with reference to FIG. 5).

According to the present embodiment, translating controller 205 accesses data repository 200 to store the received message input therein and to access the stored data patterns. Controller 205 separates the message input into sub-parts, at least some of which have one or more measurable characteristics (e.g., phonemes). Translating controller 205 compares such measurable characteristics and the stored data patterns, and generates at least a substantially equivalent text message in response thereto. The generated text message is a concatenation of data patterns that represent those sub-parts, or groups of sub-parts, separately, or collectively, that compare most favorably. In alternate embodiments, any conventional speech recognition system, or engine, that can suitably use a vocabulary specific to message paging system 100, such as a vocabulary defined using APPENDIX A, may be used.

Messaging controller 210 transmits, via messaging network 135, at least part of the generated text message to subscriber 120 having message pager 125 (output step 350). According to the present embodiment, translating controller 205, in response to the one or more data record(s) associated with subscriber 120, controls messaging controller 210.

Turning next to FIG. 4, illustrated is a conceptual configuration of a conventional memory 400 that includes data repository 200. Data repository 200 includes a plurality of data patterns 405 (i.e., speech models constructed using knowledge of acoustics, language, dictionaries, grammars or the like) and a plurality of subscriber records 410.

According to this embodiment, a particular subscriber record 415 is associated with subscriber 120 and, among its other attributes, includes pointers to particular ones of the plurality of data patterns 405. These particular data patterns are a "subset" of data patterns that represent oral phrases common to subscriber 120. Thus, while data patterns 405 are collectively specific to a general type of non-realtime messaging system, namely, message paging system 100, this subset of data patterns is particularly related to subscriber 120.

Referring back to the above-given example, assume again that a freight delivery company subscribes to a suitably arranged message paging system and each of its drivers carries a conventional alphanumeric message pager. Assume further that one of its drivers is subscriber 120 and that subscriber 120 works directly for "Joe," is married to "Jane," delivers a lot of "widgets," and his primary delivery stops are at "ABC Company," "XYZ Inc.," and "OPQ Limited." Data record 415 may suitably define a data pattern subset of {joe jane widgets abc co. company xyz inc. incorporated opq ltd. limited}. Data patterns 405, used in combination with a suitable subset thereof, may cooperatively provide a context sensitive vocabulary that can increase the likelihood that translating controller 205 will successfully translate (recognize, at least in part) a received oral message, but can also decrease the time required to translate the same.

As above-discussed with reference to APPENDIX A, data patterns 405 may be static or dynamic. Similarly, the subset of data patterns may also be static or dynamic. The subset may be defined once, periodically, etc., or it may be defined and redefined in response to the frequency with which various ones of data patterns 405 are used. For instance, system 100 may determine that subscriber 120 is regularly stopping at "DEF Co." and modify the above-identified subset associated with subscriber 120 accordingly. Alternatively, assume subscriber 120 is injured and placed on disability leave. Assume further that the regular stops assigned to subscriber 120 are reassigned to another driver. Under this scenario, system 100 may associate the data pattern subset associated with subscriber 120 with that of this second driver.

Figure 5:
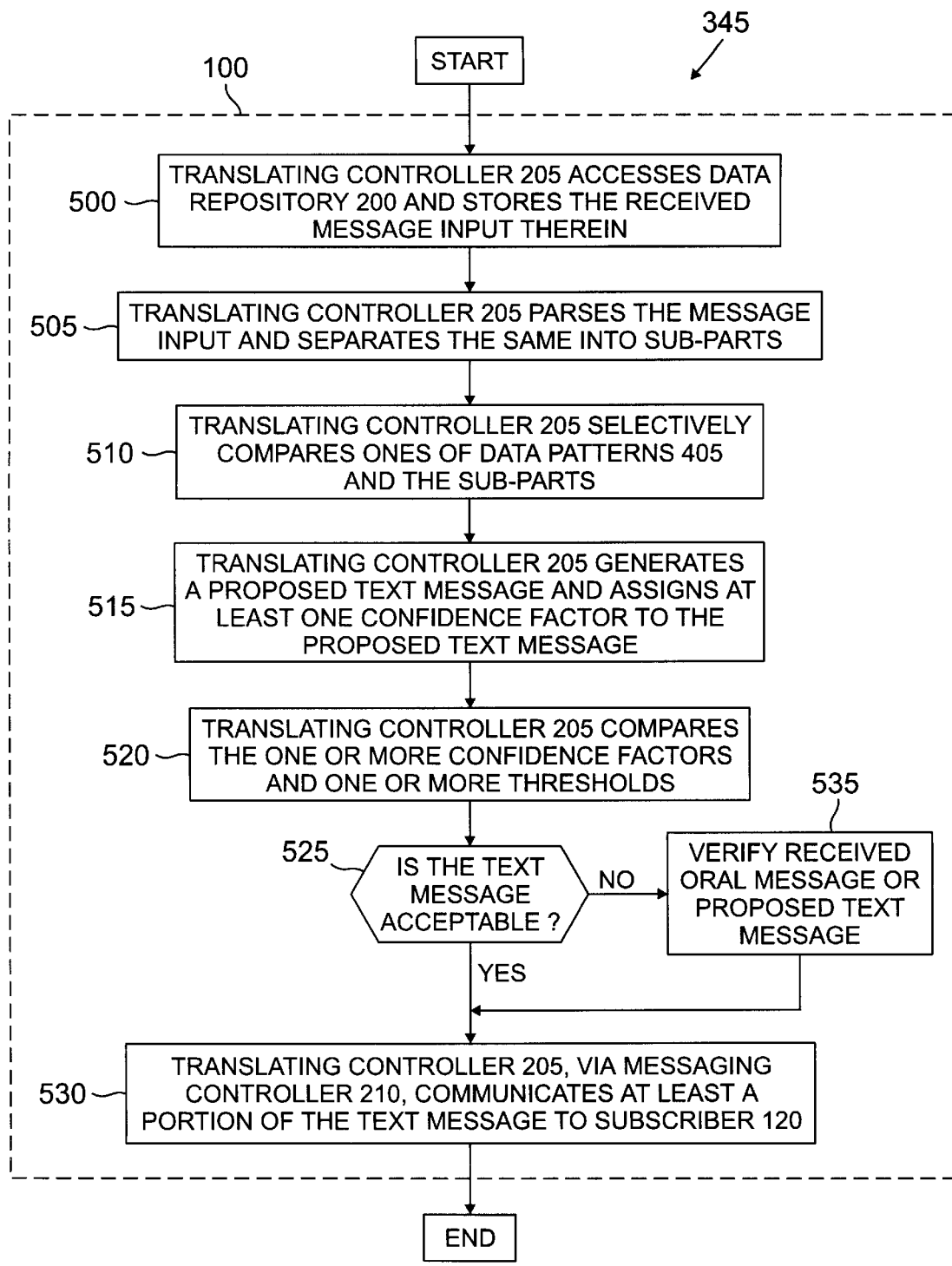
FIG. 5 illustrates a flow diagram of an exemplary method for processing received oral messages and translating the same into at least substantially equivalent text messages in accordance with the principles of the present invention.

Turning next to FIG. 5, illustrated is a flow diagram of an exemplary method (generally designated 345) for processing received oral messages and translating the same into at least substantially equivalent text messages in accordance with the principles of the present invention. For purposes of illustration, concurrent reference is made to FIGS. 1 through 4. Although the present discussion is directed largely to process step 345 of FIG. 3, the principles hereof may suitably be adapted for process step 320 as well.

To begin, translating controller 205 accesses data repository 200 (particularly, data patterns 405 stored therein) and stores the received message input therein (process step 500). Translating controller 205 may store the message input directly or indirectly by controlling messaging controller 210. Translating controller 205 parses the message input, separating the same into sub-parts (process step 505). At least some of these sub-parts have one or more measurable characteristics associated therewith.

Translating controller 205 attempts to recognize the message input by selectively comparing data patterns 405 and the sub-parts (process step 510). More particularly, according to the present embodiment, particular data patterns are emphasized during the comparison process in response to the content of data record 415, the emphasized data patterns and the measurable characteristics are suitably compared.

As introduced hereabove, SIVR (speaker independent voice recognition) technologies attempt to convert speech into accurate/meaningful textual information. An important aspect of the present embodiment is that the limited vocabulary defined by data patterns 405 (specific to message paging system 100) and the select (emphasized) data patterns identified by data record 415 (specific to subscriber 120) reduces the processing demands inherent to contemporary SIVR products.

Depending upon the implementation, exemplary translating controller 205 employs at least one of the following SIVR techniques in connection with data patterns 405 or the emphasized data patterns, namely:

1. isolated phrase recognition in which translating controller 205 is capable of recognizing a discrete set of phrases;
2. connected word recognition in which translating controller 205 is capable of recognizing a discrete set of phrases (as above), but is also capable of recognizing fluent sequences of these phrases (e.g., successive digits in a particular subscriber's PIN); or
3. continuous speech recognition in which a system is trained on a discrete set of sub-word vocabulary units (e.g., phonemes), but is required to recognize fluent speech.

Returning to FIG. 5, translating controller 205, in response to selectively comparing data patterns 405 and the measurable characteristics, generates a proposed text message and assigns a confidence factor either to a proposed text message as a whole or to one or more of the sub-parts thereof (process step 515). The generated text message is a concatenation of data patterns 405 representing those sub-parts or group(s) of sub-parts that, separately or collectively, compare most favorably with the same.

Translating controller 205 compares the one or more confidence factors and at least one threshold (process step 520). The term "threshold," as it is used herein, is defined broadly as any indicator that renders the recognition accuracy of a sub-part, group of sub-parts, multiple groups of sub-parts, or the proposed text message as a whole, one of acceptable or unacceptable, such as a "ceiling" or "floor" value, as examples.

In response thereto, translating controller 205 determines whether a particular sub-part, group of sub-parts, multiple groups of sub-parts, or the proposed text message as a whole, is suitably acceptable (decisional step 525). If the proposed text message is acceptable (YES branch of decisional step 525), then the text message, or an appropriate portion thereof, is communicated to subscriber 120 (process step 530). If the proposed text message is unacceptable (NO branch of decisional step 525), then translating controller 205 enters a message verification sub-controller (process step 535, discussed with reference to FIG. 6).

According to the illustrated embodiment, acceptance of the proposed text message may be determined, in part, in response to the content of the data record associated with the intended message recipient(s). To continue with the above-given example, assume that data record 415 associated with subscriber 120 (i) defines a data pattern subset of {joe jane widgets abc co. company xyz inc. incorporated opq ltd. limited} and (ii) directs system 100 to send (a) translated text messages to subscriber 120's e-mailbox (not shown), (b) summaries of such text messages to message pager 125, and (c) store the oral message input in subscriber 120's voice-mailbox (not shown). Assume further, that the received oral message was "CALL JANE AT MIMI'S OFFICE AT 2145559999" and that the prosed translated text message was "CALL JANE AT ME MEEZ OFFICE AT (214) 555-9999". Assume lastly, that translating controller 205 assigned the following confidence factors:

TABLE

| PROPOSED PHRASE | CONFIDENCE FACTOR | THRESHOLD |
|---|---|---|
| CALL | .98 | .81 |
| JANE | .96 | .86 |
| AT | .98 | .82 |
| ME | .94 | .83 |
| MEEZ | .43 | .92 |
| OFFICE | .85 | .89 |
| AT | .97 | .82 |
| (214) 555-9999 | .99 | .80 |
| CALL JANE | .96 | .85 |
| AT ME MEEZ OFFICE | .54 | .92 |
| AT (214) 555-9999 | .99 | .81 |
| CALL JANE AT ME MEEZ OFFICE AT (214) 555-9999 | .63 | .92 |
| CALL JANE AT (214) 555-9999 | .98 | .89 |

Translating controller 205, in response the foregoing values and data record 415, generally accepts the translated text message. Translating controller 205, via messaging controller 200, communicates the following translated text message to subscriber 120's e-mailbox, namely, "CALL JANE AT ME MEEZ OFFICE AT (214) 555-9999", communicates a text message summary of "CALL JANE AT (214) 555-9999" to message pager 125, and communicates the oral message input to subscriber 120's voice-mailbox.

Figure 6A:
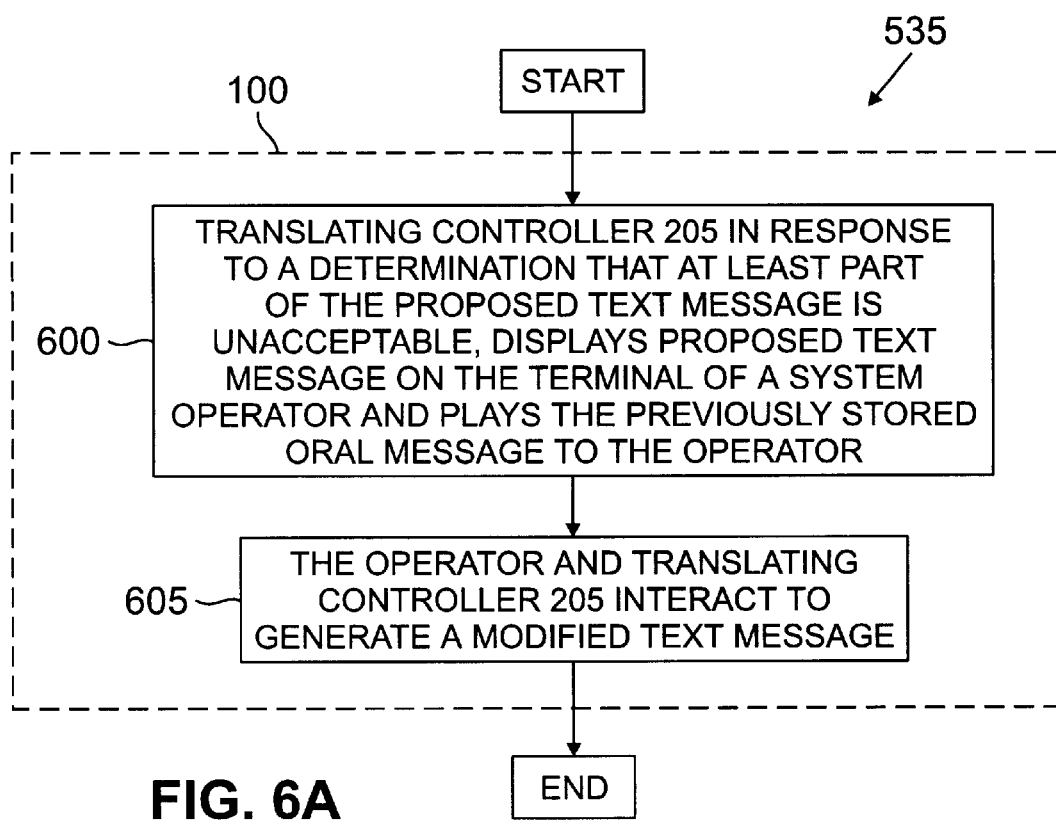
FIGS. 6A to 6C illustrate flow diagrams of exemplary methods for verifying a proposed text message in accordance with the principles of the present invention.
Figure 6B:
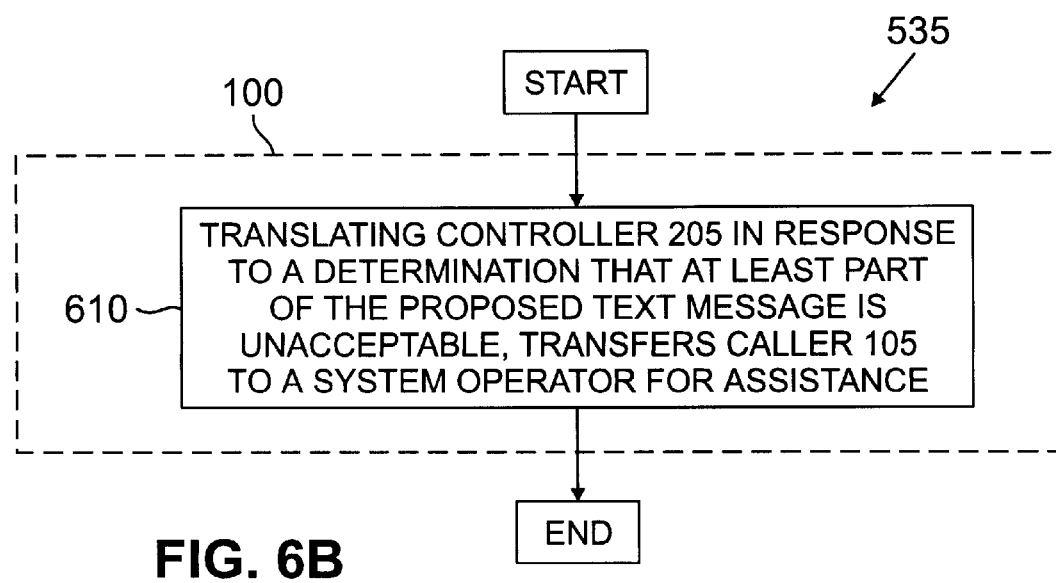
Figure 6C:
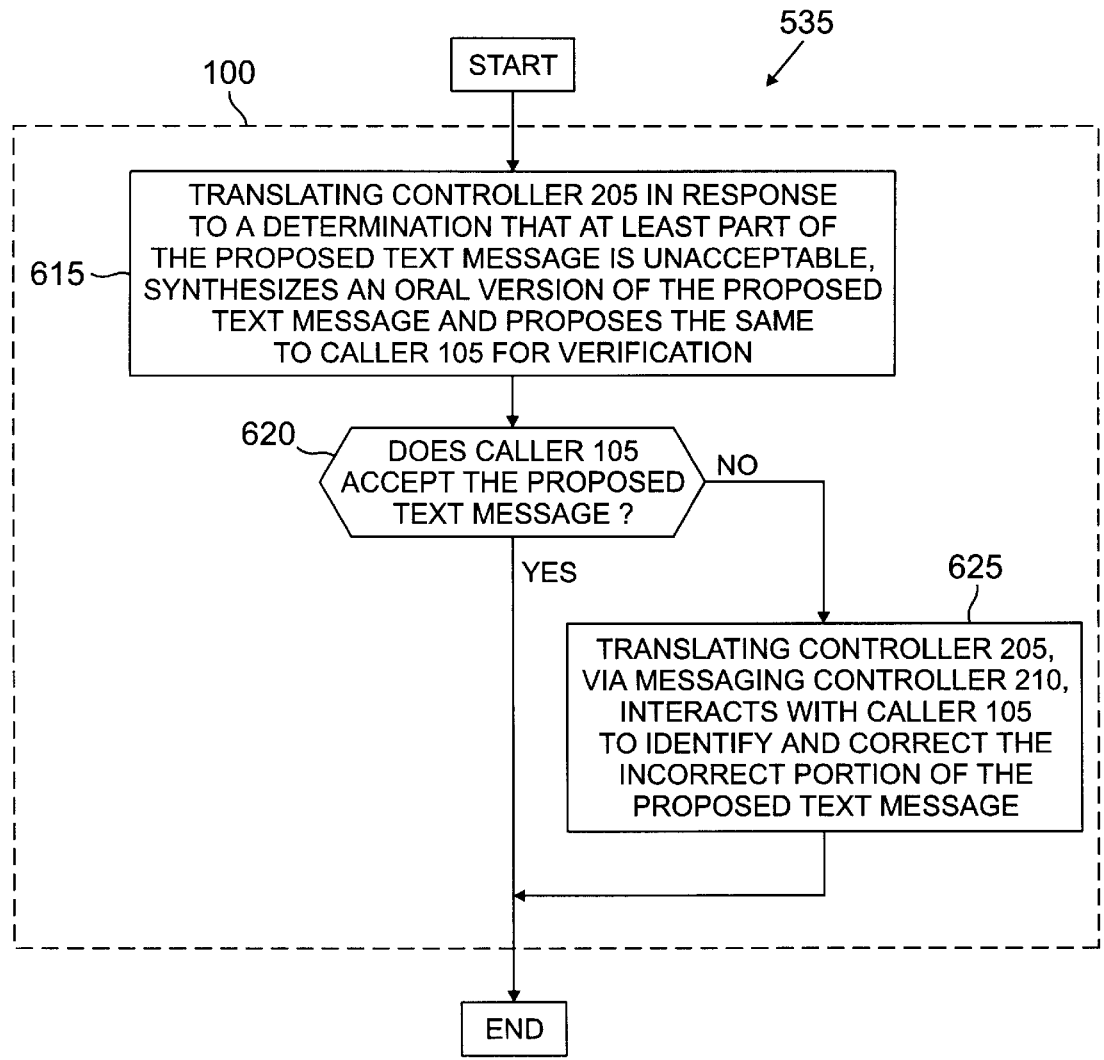

Turning next to FIGS. 6A to 6C, illustrated are flow diagrams of exemplary methods (generally designated 535) for verifying a proposed text message in accordance with the principles of the present invention. For purposes of illustration, concurrent reference is made to FIGS. 1 through 5. Although the present discussion is directed largely to process step 535 of FIG. 5, the principles hereof may suitably be adapted for process step 320 of FIG. 3 as well.

Concerning FIG. 6A, translating controller 205, in response to a determination that at least a portion of the proposed text message is unacceptable, displays the proposed text message on the terminal/work station of a system operator (not shown) and plays the previously stored oral message to the operator (process step 600). The operator, via the terminal/work station, interacts with translating controller 205 to generate a modified text message (process step 605).

Concerning FIG. 6B, translating controller 205, in response to a determination that at least a portion of the proposed text message is unacceptable, transfers caller 105 to a system operator for assistance (process step 610). According to an advantageous embodiment, translating controller 205 plays the previously stored oral message for the operator and displays the proposed text message to the operator before, or while, transferring caller 105 thereto, in short, the system front-loads, or pre-fetches, information that the operator may need to efficiently interact with caller 105.

Concerning FIG. 6C, translating controller 205, in response to a determination that at least a portion of the proposed text message is unacceptable, synthesizes an oral version of the generated text message and proposes, or plays, the same to caller 105 (process step 615). This may be accomplished either by maintaining the communication channel with caller 105 during oral message processing or, alternatively, by calling caller 105 back to verify the message. The caller may accept or reject the text message.

In the event that caller 105 accepts the text message (YES branch of decisional step 620), the text message is sent to subscriber 120 (process step 530); if caller 105 rejects the proposed text message (NO branch of decisional step 620), then translation controller 205, via messaging controller 210, interacts with caller 105, enabling caller 105 to identify that portion of the proposed text message that is incorrect and correct the same (process step 625). For instance, caller 105 may parse (e.g., orally, DTMF keypad, etc.) the proposed text message with system 100, identifying the incorrect portion or portions. System 100 then prompts, or asks, caller 105 to spell the phrase, to select or pick a phrase from a group or list of phrases, or the like, thereby correcting the same.

Figure 7:
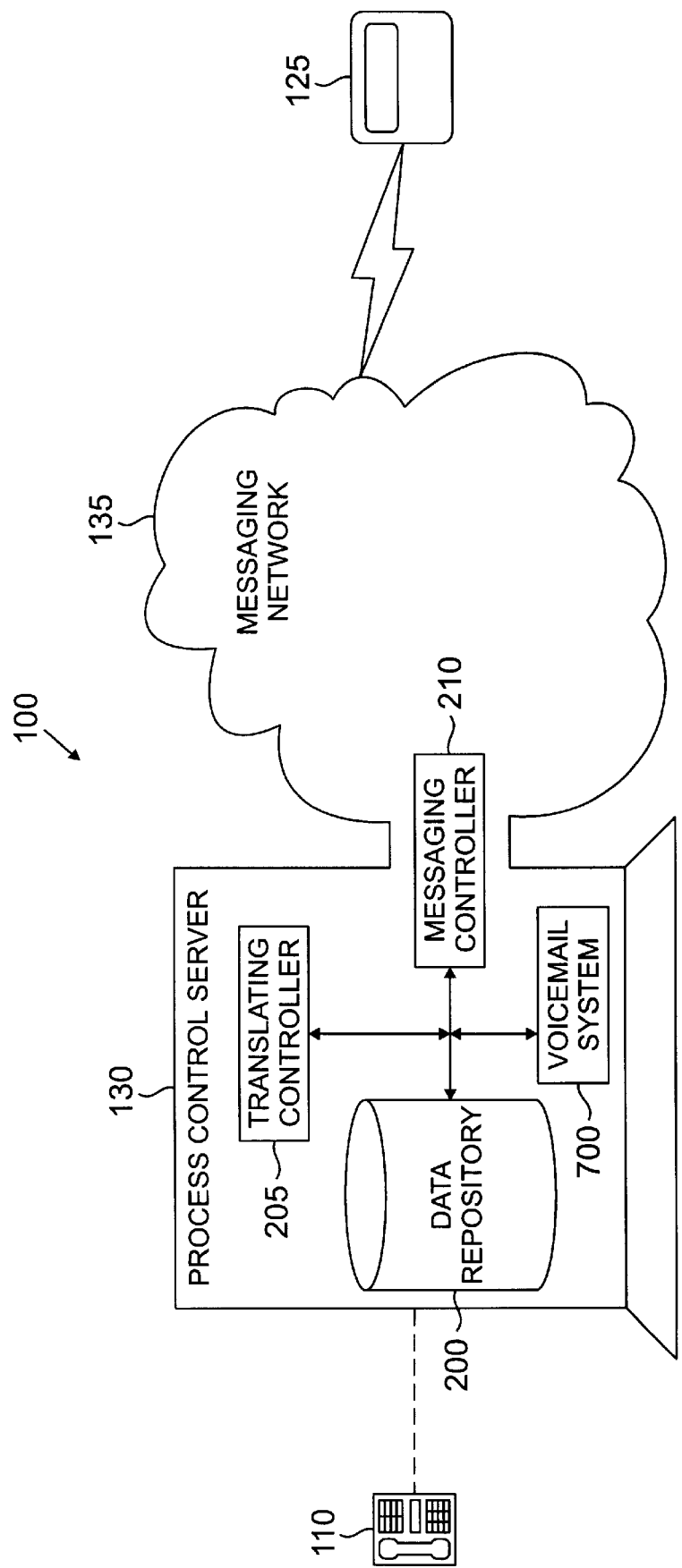
FIG. 7 illustrates a conceptual block diagram of an alternate embodiment of the non-realtime messaging system of FIGS. 1 and 2 having a message paging system that includes a suitably arranged voice mail system according to the principles of the present invention.

Turning next to FIG. 7, illustrated is a conceptual block diagram of an alternate embodiment of exemplary non-realtime messaging system 100 (generally designated) according to the principles of the present invention. Messaging system 100 illustrates a cooperative association between a message paging system and a suitably arranged voice mail system. Messaging system 100 is again associated with telephone 110 and message pager 125, and includes process control server 130 and messaging network 135.

Figure 8:
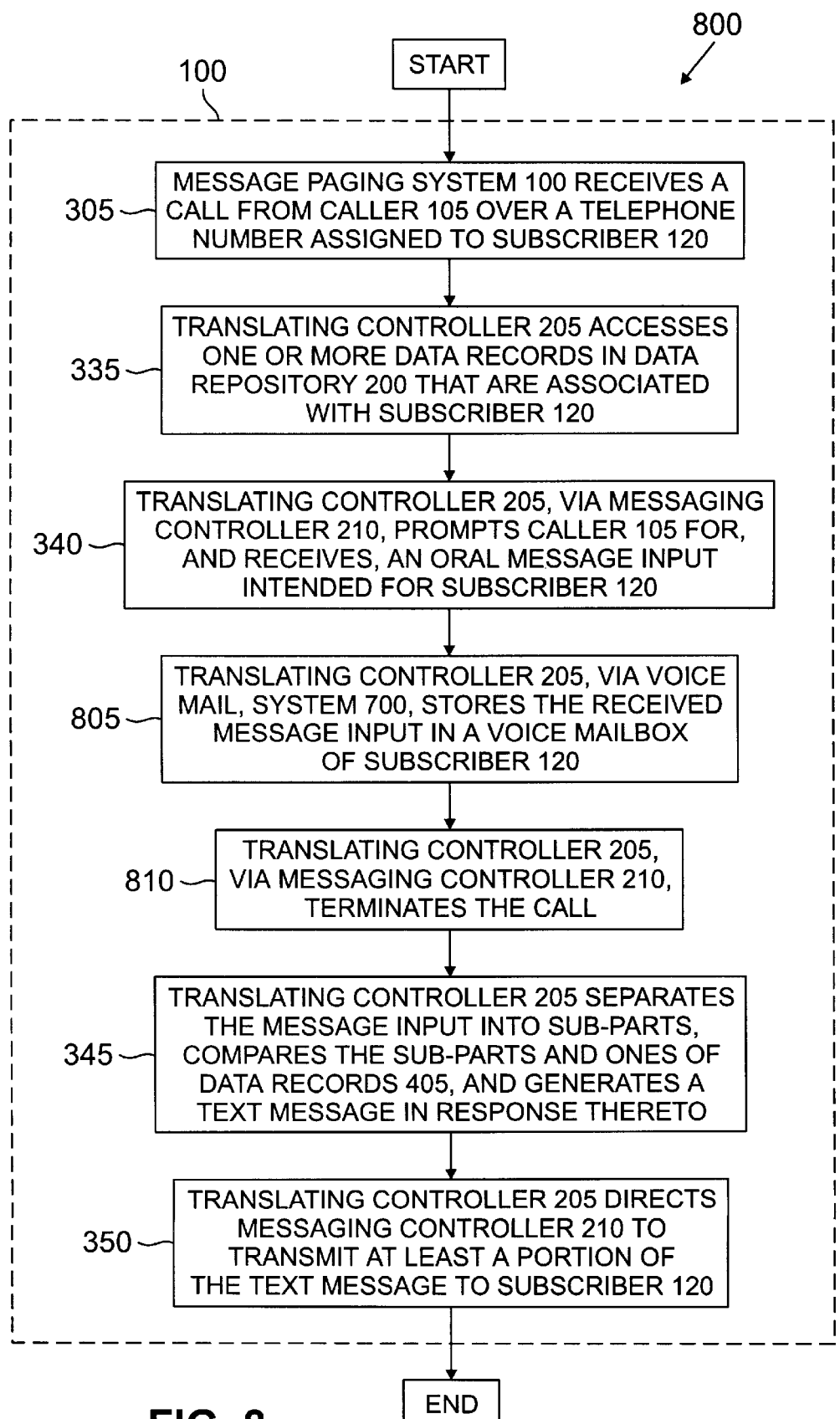
FIG. 8 illustrates a flow diagram of an exemplary method for operating the non-realtime messaging system of FIG. 7.

According to this embodiment, process control server 130 includes data repository 200, translating controller 205 and a voice mail system 700. Again, process control server 130 and messaging network 135 collectively include a messaging controller 210. Exemplary voice mail system 700 is capable of recording, storing and retrieving voice messages, and interacting with translating controller 205 and messaging controller 210. For the purposes of discussion, turn to FIG. 8, illustrated is a flow diagram of an exemplary method (generally designated 800) for operating messaging system 100 of FIG. 7.

To begin, messaging system 100 (particularly, messaging controller 210) receives a call from caller 105 (input step 305). This calls is received through a personal telephone number assigned to subscriber 120. Translating controller 205 accesses one or more data records in data repository 200 that are associated with subscriber 120 (process step 335). Again, the data record(s) provide particulars for delivering messages to subscriber 120.

Translating controller 205, via messaging controller 210, prompts caller 105 for, and receives, an oral message input representing a message for subscriber 120 (input/output step 340). Translating controller 205, via voice mail system 700, stores the received message input in a voice mailbox (not shown) assigned to subscriber 120 (process step 805). The voice mailbox may be stored in memory 400. The call is terminated (input/output step 810).

Translating controller 205 (i) separates the stored message input into sub-parts, at least some of which have one or more measurable characteristics; (ii) compares such measurable characteristics and data patterns 405 of data repository 200; and (iii) generates a substantially equivalent text message in response thereto (process step 345). The generated text message is a concatenation of data patterns that represent those sub-parts, or groups of sub-parts, separately, or collectively, that compare most favorably therewith.

An important aspect of this embodiment is that caller 105 is not required to interact with, or even be aware of, translating controller 205. Since the speech recognition process may be accomplished after the oral message is stored or recorded (i.e., the call is terminated), voice messages can be queued and the recognition process performed in non real-time. Because time is less of an issue, as the call is terminated, translating controller 205 may suitably use several specialized vocabularies to translate the oral message into the text message. Such selective use of small specialized vocabularies tends to improve SIVR performance. Vocabularies unique to subscriber 120 and even some callers, such as caller 105, may be defined and used to augment a standard message paging vocabulary.

Messaging controller 210 transmits, via messaging network 135, at least part of the generated text message to subscriber 120 via message pager 125 (output step 350). Again, exemplary translating controller 205, in response to the one or more data record(s) associated with subscriber 120, controls messaging controller 210. It should be noted that the functionality discussed with reference to FIGS. 5 and 6A to 6C may suitably be adapted and associated with the illustrated voice mail/message paging system of FIGS. 7 and 8.

In addition, it should also be noted that use of restricted vocabularies may also be used to extract a "summary" voice message. In point of fact, the functionality discussed with respect to FIG. 5 may be used. For instance, subscriber 120 may subscribe to messaging services associated with messaging system 100 that include an option for "voice mail summary notification." This service may use speech recognition to identify "key phrases," such as, those above-identified or words like "urgent," "important," or "emergency." The summary notification is sent to message pager 125 and includes a list of key phrases identified. Such functionality would assist subscriber 120 when deciding when to call to listen to voice mail messages.

As a further example, certain subscribers of message paging system 100 receive large volumes of voice messages daily. Notifying these subscribers for every voice message may be bothersome. A voice mail notification system that includes a restricted vocabulary that may be used to detect "trigger" phrases, such as "urgent," "emergency," or the like, filter received voice messages, and report the delivery of those messages meeting certain characteristics, namely, those defined by the "trigger-phrase" vocabulary—received oral messages having a higher probability of significance.

Those skilled in the art should understand that although message pager 125 has been used to illustrate the principles of the present invention, alternate communication devices may suitably be used with a messaging system in accordance with the principles of the present invention. For instance, PCS devices (both narrowband and broadband) as well as any suitably arranged network computer (whether its associated computer network is wired, wireless or both) may be used. Exemplary network computers include sophisticated calculators; palmtop, laptop, notebook, personal or other computers; web-televisions; as well as other like processing systems, including PDAs (i.e., devices, or "gadgets," that perform particular tasks, such as a diary, database, PCS, message paging, multimedia player, memo-taker, calculator, alarm clock, etc.). In point of fact, any non-realtime messaging system, regardless of whether the same is associated with a messaging system that includes real-time communications features, that includes the above-described cooperative functionality of data repository 200, translating controller 205 and messaging controller 210, or their equivalents, is within the spirit and scope of the present invention.

Consider, for instance, a sophisticated PCS system that includes a non-realtime messaging sub-system in accordance with the present invention. The exemplary PCS system includes means for enabling subscribers to specify a current availability level and for enabling callers to specify a priority level for a call to a subscriber(s). The PCS system operates to process each incoming call and to determine, in response to the respective availability and priority levels, whether to enable realtime communication among particular subscribers and callers.

Assume that a particular subscriber, such as subscriber 120, is in a meeting and his current availability level is for "urgent" calls or higher. Assume that a particular caller, such as caller 105, is calling regarding tickets to a concert in two months and has specified a priority level for this call as "social." Because the call is of lower priority than the meeting, the PCS system offers to transfer caller 105 to a voice mailbox assigned to subscriber 120. Caller 105 is prompted for and records an oral message in the mailbox.

The non-realtime messaging sub-system of the present invention, either automatically or in response to a request from caller 105, processes the stored message, comparing the same with data patterns that represent oral phrases specific to the sub-system, to subscriber 120 and, possibly, caller 105. The sub-system, as described hereabove, generates a substantially equivalent text message in response. According to data records associated with subscriber 120, the text message is communicated to his e-mail box and a summary of the same is communicated as a message page to his communications device (e.g., a PCS device, a PDA having wireless communication capability, etc.). Such message paging services may, for example, be provided over cellular or PCS frequencies to advantageously maximize hardware reuse.

As is apparent from the foregoing, the principles of the present invention are particularly beneficial when applied to wired and wireless telephony, computer or like processing systems and networks, including Internet-based applications. The present invention is directed, broadly, to non-realtime messaging systems that include a plurality of controllers, such as messaging and translating controllers, and at least a data repository capable of storing data patterns that represent oral phrases specific to the non-realtime messaging system. The messaging controller is capable of receiving oral messages from callers into the non-realtime messaging system and transmitting text messages to communications devices associated with subscribers to the services associated with the non-realtime messaging system. The translating controller is operable to process the received oral messages using the stored data patterns and to generate the text messages in response thereto.

Although the principles of the present invention have been described in detail with reference to message paging system and infrastructure embodiments, those of ordinary skill in the art should understand that they can make various changes, substitutions and alterations herein without departing from the spirit and scope of the invention in its broadest form.

DOCKET NO.: PAGE01-00116 　　　　　　　　　　　　　　　　　　　　　　　PATENT

APPENDIX A

| NO. | PHRASE | FREQUENCY |
|---|---|---|
| 1. | CALL | 5774 |
| 2. | TO | 5679 |
| 3. | THE | 3676 |
| 4. | YOU | 3571 |
| 5. | A | 3396 |
| 6. | IS | 3317 |
| 7. | AT | 3131 |
| 8. | ON | 2713 |
| 9. | PLEASE | 2486 |
| 10. | IN | 2229 |
| 11. | FROM | 2223 |
| 12. | FOR | 2204 |
| 13. | I | 1922 |
| 14. | ME | 1708 |
| 15. | AND | 1640 |
| 16. | OF | 1555 |
| 17. | NOT | 1551 |
| 18. | YOUR | 1253 |
| 19. | UP | 1202 |
| 20. | CAN | 1188 |
| 21. | PLS | 999 |
| 22. | HAVE | 936 |
| 23. | RE | 917 |
| 24. | C | 916 |
| 25. | THIS | 913 |
| 26. | MON | 899 |
| 27. | ROOT | 896 |
| 28. | MAIL | 886 |
| 29. | D | 856 |
| 30. | HAS | 841 |
| 31. | OUT | 836 |

-37-

DOCKET NO.: PAGE01-00116                                              PATENT

| NO. | PHRASE | FREQUENCY |
|-----|--------|-----------|
| 32. | AM | 825 |
| 33. | NO | 822 |
| 34. | Z | 815 |
| 35. | ARE | 802 |
| 36. | CHECK | 802 |
| 37. | BE | 795 |
| 38. | PM | 775 |
| 39. | WITH | 774 |
| 40. | ASAP | 767 |
| 41. | P | 754 |
| 42. | U | 739 |
| 43. | IF | 735 |
| 44. | S | 732 |
| 45. | TEST | 732 |
| 46. | W | 728 |
| 47. | WILL | 720 |
| 48. | DOWN | 708 |
| 49. | T | 705 |
| 50. | IT | 686 |
| 51. | NEED | 663 |
| 52. | SYSTEM | 659 |
| 53. | THANKS | 647 |
| 54. | ALL | 638 |
| 55. | OFFICE | 632 |
| 56. | SERVER | 617 |
| 57. | R | 583 |
| 58. | NEW | 578 |
| 59. | GET | 577 |
| 60. | RCOP | 570 |
| 61. | X | 562 |
| 62. | PING | 543 |
| 63. | THAT | 540 |
| 64. | EOS | 529 |

-38-

DOCKET NO.: PAGE01-00116　　　　　　　　　　　　　　　　　　　　　PATENT

| NO. | PHRASE | FREQUENCY |
|---|---|---|
| 65. | BACK | 519 |
| 66. | HOME | 510 |
| 67. | KNOW | 504 |
| 68. | AURORA | 502 |
| 69. | TODAY | 502 |
| 70. | FULL | 492 |
| 71. | OR | 473 |
| 72. | DO | 466 |
| 73. | B | 460 |
| 74. | PAGE | 457 |
| 75. | CONNECT | 455 |
| 76. | M | 444 |
| 77. | F | 440 |
| 78. | G | 419 |
| 79. | CALLED | 435 |
| 80. | DISK | 432 |
| 81. | ST | 430 |
| 82. | NEEDS | 429 |
| 83. | MESSAGE | 427 |
| 84. | ESC | 425 |
| 85. | WE | 424 |
| 86. | CRT | 420 |
| 87. | EOM | 420 |
| 88. | WHEN | 414 |
| 89. | HELP | 409 |
| 90. | WAS | 405 |
| 91. | AJAX | 404 |
| 92. | ABOUT | 393 |
| 93. | CS | 384 |
| 94. | DR | 384 |
| 95. | FILE | 379 |
| 96. | TIME | 378 |
| 97. | E | 365 |

-39-

DOCKET NO.: PAGE01-00116                                              PATENT

| NO.  | PHRASE   | FREQUENCY |
|------|----------|-----------|
| 98.  | AS       | 364       |
| 99.  | NOW      | 355       |
| 100. | TT       | 354       |
| 101. | BY       | 353       |
| 102. | HE       | 353       |
| 103. | GO       | 338       |
| 104. | SEP      | 338       |
| 105. | GOOD     | 333       |
| 106. | JUST     | 332       |
| 107. | MORNING  | 331       |
| 108. | IR       | 318       |
| 109. | MY       | 318       |
| 110. | NET      | 318       |
| 111. | CELL     | 310       |
| 112. | OCT      | 297       |
| 113. | J        | 285       |
| 114. | COM      | 283       |
| 115. | N        | 282       |
| 116. | THERE    | 280       |
| 117. | SPACE    | 279       |
| 118. | HI       | 276       |
| 119. | RESPONSE | 274       |
| 120. | WARN     | 273       |
| 121. | RD       | 272       |
| 122. | MIKE     | 271       |
| 123. | WAITING  | 271       |
| 124. | SO       | 266       |
| 125. | ERROR    | 264       |
| 126. | CALLS    | 263       |
| 127. | TH       | 261       |
| 128. | SWX      | 260       |
| 129. | HERE     | 257       |
| 130. | JOHN     | 256       |

-40-

DOCKET NO.: PAGE01-00116                                          PATENT

| NO. | PHRASE | FREQUENCY |
|---|---|---|
| 131. | DEV | 255 |
| 132. | GOING | 255 |
| 133. | LOGON | 250 |
| 134. | MARK | 250 |
| 135. | SLOW | 250 |
| 136. | SEE | 249 |
| 137. | I'M | 245 |
| 138. | PROBLEM | 244 |
| 139. | CP | 243 |
| 140. | LOVE | 243 |
| 141. | HIM | 242 |
| 142. | K | 242 |
| 143. | WORK | 241 |
| 144. | COME | 239 |
| 145. | LOW | 239 |
| 146. | O | 239 |
| 147. | LAST | 237 |
| 148. | END | 235 |
| 149. | PICK | 235 |
| 150. | MAX | 234 |
| 151. | CC | 232 |
| 152. | TOMORROW | 232 |
| 153. | DN | 229 |
| 154. | L | 226 |
| 155. | ALLOWED | 224 |
| 156. | PAGER | 222 |
| 157. | AFTER | 221 |
| 158. | DISPATCH | 220 |
| 159. | HIS | 220 |
| 160. | ONE | 220 |
| 161. | HER | 215 |
| 162. | THANK | 215 |
| 163. | WANT | 214 |

DOCKET NO.: PAGE01-00116                                    PATENT

| NO.  | PHRASE    | FREQUENCY |
|------|-----------|-----------|
| 164. | SERVICE   | 212       |
| 165. | MEETING   | 210       |
| 166. | OFF       | 209       |
| 167. | SHE       | 209       |
| 168. | UPDATE    | 209       |
| 169. | GIVE      | 208       |
| 170. | SP        | 208       |
| 171. | LET       | 206       |
| 172. | FILESYSTEM| 203       |
| 173. | NUMBER    | 203       |
| 174. | H         | 200       |
| 175. | QR        | 200       |
| 176. | BUT       | 199       |
| 177. | WHAT      | 199       |
| 178. | AN        | 198       |
| 179. | CAN'T     | 198       |
| 180. | NEXT      | 198       |
| 181. | QRMAIL    | 198       |
| 182. | BOB       | 197       |
| 183. | PHONE     | 197       |
| 184. | BEEN      | 196       |
| 185. | DID       | 195       |
| 186. | REILLY    | 195       |
| 187. | WARNING   | 195       |
| 188. | QUICKAND  | 194       |
| 189. | WANTS     | 192       |
| 190. | MSG       | 189       |
| 191. | RESOLVED  | 188       |
| 192. | WAY       | 188       |
| 193. | WEST      | 187       |
| 194. | PIC       | 184       |
| 195. | MINUTE    | 183       |
| 196. | SITE      | 182       |

-42-

DOCKET NO.: PAGE01-00116                                    PATENT

| NO. | PHRASE | FREQUENCY |
|---|---|---|
| 197. | CHANGED | 181 |
| 198. | FAILURE | 179 |
| 199. | SUB | 178 |
| 200. | JDB | 177 |
| 201. | ACCESS | 176 |
| 202. | BLOCK | 175 |
| 203. | WOULD | 175 |
| 204. | THEY | 174 |
| 205. | ANY | 173 |
| 206. | AVE | 172 |
| 207. | HOST | 170 |
| 208. | DROPPED | 169 |
| 209. | EACH | 167 |
| 210. | CK | 165 |
| 211. | JOB | 165 |
| 212. | DAVID | 164 |
| 213. | USAGE | 164 |
| 214. | INFO | 163 |
| 215. | LINE | 163 |
| 216. | MAKE | 162 |
| 217. | SAID | 162 |
| 218. | STILL | 162 |
| 219. | TIMEOUT | 162 |
| 220. | QUOTE | 161 |
| 221. | ATLAS | 160 |
| 222. | FREE | 160 |
| 223. | PROBLEMS | 159 |
| 224. | CENTER | 158 |
| 225. | DSK | 158 |
| 226. | LIKE | 158 |
| 227. | LAN | 156 |
| 228. | COMPOPS | 155 |
| 229. | CONT | 155 |

-43-

DOCKET NO.: PAGE01-00116												PATENT

| NO. | PHRASE | FREQUENCY |
|---|---|---|
| 230. | JIM | 155 |
| 231. | VRASPIR | 155 |
| 232. | WERE | 154 |
| 233. | ID | 153 |
| 234. | ARTS | 151 |
| 235. | DAY | 151 |
| 236. | MULTI | 151 |
| 237. | VENTURE | 151 |
| 238. | ALSO | 150 |
| 239. | COMING | 149 |
| 240. | STATUS | 149 |
| 241. | SANNAS | 148 |
| 242. | DON'T | 147 |
| 243. | TICKET | 147 |
| 244. | UNDISP'D | 147 |
| 245. | STEVE | 145 |
| 246. | EXT | 144 |
| 247. | INTERRUPTED | 144 |
| 248. | THEM | 144 |
| 249. | BILL | 142 |
| 250. | FILL | 142 |
| 251. | MARSHALL | 142 |
| 252. | GOT | 141 |
| 253. | ONLY | 138 |
| 254. | SAS | 138 |
| 255. | VERY | 138 |
| 256. | WHERE | 138 |
| 257. | JAMMING | 137 |
| 258. | AL | 136 |
| 259. | INC | 136 |
| 260. | REPS | 136 |
| 261. | SURE | 136 |
| 262. | AGAIN | 135 |

-44-

DOCKET NO.: PAGE01-00116                                           PATENT

| NO.  | PHRASE  | FREQUENCY |
|------|---------|-----------|
| 263. | TWO     | 135       |
| 264. | TOM     | 134       |
| 265. | KERN    | 133       |
| 266. | NW      | 133       |
| 267. | BELL    | 132       |
| 268. | CHANCE  | 132       |
| 269. | HEY     | 132       |
| 270. | HOW     | 132       |
| 271. | CT      | 131       |
| 272. | NORTH   | 131       |
| 273. | OK      | 131       |
| 274. | BHD     | 130       |
| 275. | BLOCKS  | 130       |
| 276. | DUE     | 130       |
| 277. | REPORTS | 130       |
| 278. | SEEN    | 130       |
| 279. | BAD     | 128       |
| 280. | TALK    | 128       |
| 281. | PER     | 127       |
| 282. | THX     | 127       |
| 283. | FAX     | 126       |
| 284. | NR      | 126       |
| 285. | PC      | 126       |
| 286. | LEFT    | 123       |
| 287. | ADDRESS | 122       |
| 288. | DE      | 122       |
| 289. | PRIME   | 122       |
| 290. | TST     | 122       |
| 291. | NDS     | 121       |
| 292. | RFO     | 121       |
| 293. | GAGE    | 120       |
| 294. | TAKE    | 120       |
| 295. | US      | 120       |

-45-

DOCKET NO.: PAGE01-00116                                                    PATENT

| NO. | PHRASE | FREQUENCY |
|---|---|---|
| 296. | CANNOT | 119 |
| 297. | FS | 119 |
| 298. | FYI | 119 |
| 299. | Q | 119 |
| 300. | RECEIVED | 119 |
| 301. | MR | 118 |
| 302. | FD | 117 |
| 303. | LATER | 117 |
| 304. | SUPPORT | 117 |
| 305. | SCHEDULE | 116 |
| 306. | CONTACT | 115 |
| 307. | OVER | 115 |
| 308. | BEFORE | 114 |
| 309. | CDT | 114 |
| 310. | MIN | 114 |
| 311. | WORKING | 114 |
| 312. | CON | 113 |
| 313. | CQ | 113 |
| 314. | ORACLE | 113 |
| 315. | PLZ | 113 |
| 316. | SOON | 113 |
| 317. | BETWEEN | 112 |
| 318. | CL | 112 |
| 319. | YESTERDAY | 112 |
| 320. | DAYS | 111 |
| 321. | HIALEAH | 111 |
| 322. | MORE | 111 |
| 323. | TECH | 110 |
| 324. | HPB | 109 |
| 325. | PILOT | 108 |
| 326. | LEAVE | 107 |
| 327. | LUNCH | 107 |
| 328. | MONDAY | 107 |

-46-

DOCKET NO.: PAGE01-00116                                    PATENT

| NO. | PHRASE | FREQUENCY |
|---|---|---|
| 329. | TONIGHT | 107 |
| 330. | SHOULD | 106 |
| 331. | SPEAK | 106 |
| 332. | V | 106 |
| 333. | AVAILABLE | 104 |
| 334. | DFW | 104 |
| 335. | HAD | 104 |
| 336. | I'LL | 104 |
| 337. | MEET | 104 |
| 338. | NEWS | 104 |
| 339. | QUOTES | 104 |
| 340. | RC | 104 |
| 341. | DAILY | 103 |
| 342. | RESTAURANT | 103 |
| 343. | CANCEL | 102 |
| 344. | JERRY | 102 |
| 345. | MI | 101 |
| 346. | DOES | 100 |
| 347. | SCOTT | 100 |
| 348. | WALKER | 100 |
| 349. | LS | 99 |
| 350. | CHUCK | 98 |
| 351. | CRDB | 98 |
| 352. | PRICE | 98 |
| 353. | ALARM | 97 |
| 354. | DONE | 97 |
| 355. | FIRST | 97 |
| 356. | PU | 97 |
| 357. | ROBERT | 97 |
| 358. | CPU | 96 |
| 359. | INTO | 96 |
| 360. | JOE | 95 |
| 361. | MARKET | 95 |

DOCKET NO.: PAGE01-00116                                              PATENT

| NO.  | PHRASE      | FREQUENCY |
|------|-------------|-----------|
| 362. | PO          | 95        |
| 363. | RUNNING     | 94        |
| 364. | VOICE       | 94        |
| 365. | CHRIS       | 93        |
| 366. | HOPE        | 93        |
| 367. | MS          | 93        |
| 368. | TOTAL       | 93        |
| 369. | LA          | 92        |
| 370. | OUTAGE      | 92        |
| 371. | CO          | 91        |
| 372. | EAST        | 91        |
| 373. | FRIDAY      | 91        |
| 374. | INSTALL     | 91        |
| 375. | IT'S        | 91        |
| 376. | LINDA       | 91        |
| 377. | THREE       | 91        |
| 378. | TOO         | 91        |
| 379. | DAVE        | 90        |
| 380. | JEFF        | 90        |
| 381. | MAJ         | 90        |
| 382. | READY       | 90        |
| 383. | STOP        | 90        |
| 384. | CODE        | 89        |
| 385. | DON         | 89        |
| 386. | MINNEAPOLIS | 89        |
| 387. | MPCLD       | 89        |
| 388. | PH          | 89        |
| 389. | SCHOOL      | 89        |
| 390. | VIDEO       | 89        |
| 391. | YA          | 89        |
| 392. | UNKNOWN     | 88        |
| 393. | DATE        | 87        |
| 394. | LOG         | 87        |

-48-

DOCKET NO.: PAGE01-00116                                                            PATENT

| NO. | PHRASE | FREQUENCY |
|---|---|---|
| 395. | MARY | 87 |
| 396. | BEG | 86 |
| 397. | CLEVELAND | 86 |
| 398. | EXPERIENCING | 86 |
| 399. | FTWCCC | 86 |
| 400. | IL | 86 |
| 401. | MGE | 86 |
| 402. | MINUTES | 86 |
| 403. | RETURNED | 86 |
| 404. | RING | 86 |
| 405. | SOE | 86 |
| 406. | STATE | 86 |
| 407. | AV | 85 |
| 408. | BLS | 85 |
| 409. | CLOSED | 85 |
| 410. | PAT | 85 |
| 411. | PAUL | 85 |
| 412. | PREV | 85 |
| 413. | TABLE | 85 |
| 414. | ADMINISTRATOR | 84 |
| 415. | BEACH | 84 |
| 416. | MAJORDOMO | 84 |
| 417. | OPERATIONS | 84 |
| 418. | ORDER | 84 |
| 419. | SACECHT | 84 |
| 420. | APPT | 83 |
| 421. | DRIVE | 83 |
| 422. | LUCY | 83 |
| 423. | MUST | 83 |
| 424. | NODE | 83 |
| 425. | RAY | 83 |
| 426. | ROAD | 83 |
| 427. | UNABLE | 83 |

DOCKET NO.: PAGE01-00116                                              PATENT

| NO.  | PHRASE     | FREQUENCY |
|------|------------|-----------|
| 428. | AMY        | 82        |
| 429. | BROOKL     | 82        |
| 430. | CAR        | 82        |
| 431. | ONES       | 82        |
| 432. | POSSIBLE   | 82        |
| 433. | RIGHT      | 82        |
| 434. | ASK        | 81        |
| 435. | DARRELL    | 81        |
| 436. | TONY       | 81        |
| 437. | BRINK      | 80        |
| 438. | FOOD       | 80        |
| 439. | JJJD       | 80        |
| 440. | DIAL       | 79        |
| 441. | HOUSE      | 79        |
| 442. | LT         | 79        |
| 443. | MPH        | 79        |
| 444. | MSGS       | 79        |
| 445. | ROOM       | 79        |
| 446. | COULD      | 78        |
| 447. | DATA       | 78        |
| 448. | LISA       | 78        |
| 449. | NY         | 78        |
| 450. | URGENT     | 78        |
| 451. | VOL        | 78        |
| 452. | HTTPD      | 77        |
| 453. | LOOKING    | 77        |
| 454. | MWINPKWD   | 77        |
| 455. | RESPONDING | 77        |
| 456. | CNHDB      | 76        |
| 457. | FILLING    | 76        |
| 458. | GREG       | 76        |
| 459. | MISSING    | 76        |
| 460. | SEND       | 76        |

-50-

| NO. | PHRASE | FREQUENCY |
|---|---|---|
| 461. | SERVICES | 76 |
| 462. | YOU'RE | 76 |
| 463. | BANK | 75 |
| 464. | BULK | 75 |
| 465. | EXPORT | 75 |
| 466. | HACEBOS | 75 |
| 467. | OTHER | 75 |
| 468. | REGARDING | 75 |
| 469. | RICK | 75 |
| 470. | SL | 75 |
| 471. | SORRY | 75 |
| 472. | STORE | 75 |
| 473. | TELL | 75 |
| 474. | TESTING | 75 |
| 475. | WEEK | 75 |
| 476. | FORGET | 74 |
| 477. | OOS | 74 |
| 478. | OUR | 74 |
| 479. | PT | 74 |
| 480. | SAYS | 74 |
| 481. | TRY | 74 |
| 482. | XL | 74 |
| 483. | AREA | 73 |
| 484. | CORP | 73 |
| 485. | FR | 73 |
| 486. | HIT | 73 |
| 487. | LEESBURG | 73 |
| 488. | NS | 73 |
| 489. | SYSTEMS | 73 |
| 490. | THEN | 73 |
| 491. | TUESDAY | 73 |
| 492. | WARRENTON | 73 |
| 493. | WORKBENCH | 73 |

DOCKET NO.:  PAGE01-00116                                                       PATENT

| NO.  | PHRASE    | FREQUENCY |
|------|-----------|-----------|
| 494. | ACD       | 72        |
| 495. | CHCFS     | 72        |
| 496. | DEBBIE    | 72        |
| 497. | LARRY     | 72        |
| 498. | LGL       | 72        |
| 499. | MC        | 72        |
| 500. | SHOP      | 72        |
| 501. | WIFE      | 72        |
| 502. | CLCLN     | 71        |
| 503. | MRS       | 71        |
| 504. | NETWORK   | 71        |
| 505. | SE        | 71        |
| 506. | YO        | 71        |
| 507. | DATABASE  | 70        |
| 508. | DOUG      | 70        |
| 509. | FAILED    | 70        |
| 510. | GARY      | 70        |
| 511. | REMAINING | 70        |
| 512. | SIDE      | 70        |
| 513. | START     | 70        |
| 514. | CHANGE    | 69        |
| 515. | HR        | 69        |
| 516. | JAMES     | 69        |
| 517. | KEN       | 69        |
| 518. | REQUEST   | 69        |
| 519. | SD        | 69        |
| 520. | TLR       | 69        |
| 521. | USED      | 69        |
| 522. | ALERT     | 68        |
| 523. | FEED      | 68        |
| 524. | SMITH     | 68        |
| 525. | STREET    | 68        |
| 526. | VERIFY    | 68        |

-52-

DOCKET NO.: PAGE01-00116                                      PATENT

| NO. | PHRASE | FREQUENCY |
|---|---|---|
| 527. | WELL | 68 |
| 528. | Y | 68 |
| 529. | YET | 68 |
| 530. | AFTERNOON | 67 |
| 531. | ANOTHER | 67 |
| 532. | BUSY | 67 |
| 533. | MICHELLE | 67 |
| 534. | NIGHT | 67 |
| 535. | TRUCK | 67 |
| 536. | UNTIL | 67 |
| 537. | DIANE | 66 |
| 538. | IMPORTANT | 66 |
| 539. | PLACE | 66 |
| 540. | TEAM | 66 |
| 541. | AUTOPAGER | 65 |
| 542. | ED | 65 |
| 543. | ETA | 65 |
| 544. | ITS | 65 |
| 545. | KAREN | 65 |
| 546. | PLUS | 65 |
| 547. | SANDY | 65 |
| 548. | SINCE | 65 |
| 549. | THAN | 65 |
| 550. | UNIT | 65 |
| 551. | USER | 65 |
| 552. | WANTED | 65 |
| 553. | COMP | 64 |
| 554. | DESK | 64 |
| 555. | HELLO | 64 |
| 556. | IVY | 64 |
| 557. | LITTLE | 64 |
| 558. | LONG | 64 |
| 559. | OFC | 64 |

-53-

DOCKET NO.: PAGE01-00116                                          PATENT

| NO. | PHRASE | FREQUENCY |
|---|---|---|
| 560. | PARK | 64 |
| 561. | POINT | 64 |
| 562. | SUSAN | 64 |
| 563. | DWN | 63 |
| 564. | GETTING | 63 |
| 565. | GTE | 63 |
| 566. | HAVING | 63 |
| 567. | III | 63 |
| 568. | IVRU | 63 |
| 569. | TICKETS | 63 |
| 570. | UDPINGER | 63 |
| 571. | UNITED | 63 |
| 572. | AROUND | 62 |
| 573. | CHANGES | 62 |
| 574. | CITY | 62 |
| 575. | CLOSE | 62 |
| 576. | FILES | 62 |
| 577. | FOUR | 62 |
| 578. | HOURS | 62 |
| 579. | PAPER | 62 |
| 580. | SF | 62 |
| 581. | CALLING | 61 |
| 582. | CUST | 61 |
| 583. | ISOLATE | 61 |
| 584. | JAMMED | 61 |
| 585. | KATHY | 61 |
| 586. | LAYTONSVBILLE | 61 |
| 587. | LAYTONSVILLE | 61 |
| 588. | LEE | 61 |
| 589. | ND | 61 |
| 590. | PAGING | 61 |
| 591. | POWER | 61 |
| 592. | RESTORED | 61 |

-54-

DOCKET NO.: PAGE01-00116                                              PATENT

| NO.  | PHRASE      | FREQUENCY |
|------|-------------|-----------|
| 593. | STATS       | 61        |
| 594. | AB          | 60        |
| 595. | ANSWER      | 60        |
| 596. | BARBARA     | 60        |
| 597. | CHAN        | 60        |
| 598. | CHCLN       | 60        |
| 599. | EL          | 60        |
| 600. | HACECHT     | 60        |
| 601. | LIGHT       | 60        |
| 602. | PRI         | 60        |
| 603. | RTS         | 60        |
| 604. | SWITCH      | 60        |
| 605. | WCPADF      | 60        |
| 606. | WHO         | 60        |
| 607. | LATE        | 59        |
| 608. | LOT         | 59        |
| 609. | OCTOBER     | 59        |
| 610. | REPORT      | 59        |
| 611. | RUN         | 59        |
| 612. | SUE         | 59        |
| 613. | TYPE        | 59        |
| 614. | UTILIZATION | 59        |
| 615. | EST         | 58        |
| 616. | IBML        | 58        |
| 617. | JOBS        | 58        |
| 618. | NANCY       | 58        |
| 619. | POST        | 58        |
| 620. | PRINTER     | 58        |
| 621. | ROUTER      | 58        |
| 622. | SUBJECT     | 58        |
| 623. | BRIAN       | 57        |
| 624. | COMTRAK     | 57        |
| 625. | DAD         | 57        |

DOCKET NO.: PAGE01-00116                                                    PATENT

| NO. | PHRASE | FREQUENCY |
|---|---|---|
| 626. | DANIELLE | 57 |
| 627. | EVERY | 57 |
| 628. | GROUP | 57 |
| 629. | MARIA | 57 |
| 630. | MID | 57 |
| 631. | BOX | 56 |
| 632. | CONFIRM | 56 |
| 633. | FL | 56 |
| 634. | MACHINE | 56 |
| 635. | PEOPLE | 56 |
| 636. | TEXT | 56 |
| 637. | CHICAGO | 55 |
| 638. | CUSTOMER | 55 |
| 639. | EMAIL | 55 |
| 640. | FAVOR | 55 |
| 641. | KIM | 55 |
| 642. | PROTECTION | 55 |
| 643. | TRN | 55 |
| 644. | USR | 55 |
| 645. | CHARTS | 54 |
| 646. | CLS | 54 |
| 647. | COMUNICARSE | 54 |
| 648. | COURTESY | 54 |
| 649. | DS | 54 |
| 650. | LIST | 54 |
| 651. | MAY | 54 |
| 652. | MG | 54 |
| 653. | RON | 54 |
| 654. | SALVI | 54 |
| 655. | SAX | 54 |
| 656. | TASK | 54 |
| 657. | TURN | 54 |
| 658. | COMPUTER | 53 |

-56-

DOCKET NO.: PAGE01-00116                                    PATENT

| NO. | PHRASE | FREQUENCY |
|---|---|---|
| 659. | DALLAS | 53 |
| 660. | DAN | 53 |
| 661. | DT | 53 |
| 662. | MICHAEL | 53 |
| 663. | PHIL | 53 |
| 664. | RM | 53 |
| 665. | SAME | 53 |
| 666. | SHARON | 53 |
| 667. | SKID | 53 |
| 668. | ADJUSTMENT | 52 |
| 669. | ALREADY | 52 |
| 670. | BEN | 52 |
| 671. | BULL | 52 |
| 672. | DEL | 52 |
| 673. | HOUR | 52 |
| 674. | POSTS | 52 |
| 675. | PUT | 52 |
| 676. | REMINDER | 52 |
| 677. | RICHMOND | 52 |
| 678. | SENT | 52 |
| 679. | SET | 52 |
| 680. | USE | 52 |
| 681. | USING | 52 |
| 682. | WAGE | 52 |
| 683. | ACCURACY | 51 |
| 684. | AIR | 51 |
| 685. | BIG | 51 |
| 686. | DEVICE | 51 |
| 687. | DOING | 51 |
| 688. | HIGH | 51 |
| 689. | LO | 51 |
| 690. | MED | 51 |
| 691. | PERSONALLY | 51 |

DOCKET NO.: PAGE01-00116                                              PATENT

| NO. | PHRASE | FREQUENCY |
|---|---|---|
| 692. | PRIMARY | 51 |
| 693. | RESTAURANTS | 51 |
| 694. | SALES | 51 |
| 695. | SEPT | 51 |
| 696. | SOMEONE | 51 |
| 697. | TIM | 51 |
| 698. | APP | 50 |
| 699. | AWAY | 50 |
| 700. | BABY | 50 |
| 701. | BASE | 50 |
| 702. | HA | 50 |
| 703. | JACK | 50 |
| 704. | LINES | 50 |
| 705. | MENU | 50 |
| 706. | OH | 50 |
| 707. | RR | 50 |
| 708. | RT | 50 |
| 709. | STAT | 50 |
| 710. | STE | 50 |
| 711. | TUES | 50 |
| 712. | WEBPROBE | 50 |
| 713. | ADVANTAGE | 49 |
| 714. | ANN | 49 |
| 715. | CHEMICAL | 49 |
| 716. | CLEAR | 49 |
| 717. | DEPT | 49 |
| 718. | FA | 49 |
| 719. | HONEY | 49 |
| 720. | HP | 49 |
| 721. | MAN | 49 |
| 722. | NETCOMI | 49 |
| 723. | NORTHWEST | 49 |
| 724. | PLAN | 49 |

DOCKET NO.: PAGE01-00116                                          PATENT

| NO.  | PHRASE     | FREQUENCY |
|------|------------|-----------|
| 725. | PR         | 49        |
| 726. | RECEIVE    | 49        |
| 727. | TOP        | 49        |
| 728. | WP         | 49        |
| 729. | CARD       | 48        |
| 730. | CONNECTION | 48        |
| 731. | PERSON     | 48        |
| 732. | ROBBIE     | 48        |
| 733. | TUE        | 48        |
| 734. | WIND       | 48        |
| 735. | ZONE       | 48        |
| 736. | CSC        | 47        |
| 737. | DONNA      | 47        |
| 738. | FRANK      | 47        |
| 739. | HARDWARE   | 47        |
| 740. | LAURA      | 47        |
| 741. | MONTH      | 47        |
| 742. | OBTAIN     | 47        |
| 743. | RESPOND    | 47        |
| 744. | SNAP       | 47        |
| 745. | SOL        | 47        |
| 746. | WED        | 47        |
| 747. | BONNIE     | 46        |
| 748. | BRUCE      | 46        |
| 749. | DONT       | 46        |
| 750. | FORMS      | 46        |
| 751. | GUYS       | 46        |
| 752. | MAIN       | 46        |
| 753. | NAME       | 46        |
| 754. | PALM       | 46        |
| 755. | TASKS      | 46        |
| 756. | TOLD       | 46        |
| 757. | VAR        | 46        |

DOCKET NO.: PAGE01-00116                                    PATENT

| NO. | PHRASE | FREQUENCY |
|---|---|---|
| 758. | WATER | 46 |
| 759. | WON'T | 46 |
| 760. | WWW | 46 |
| 761. | ADMIN | 45 |
| 762. | COMPANY | 45 |
| 763. | COPIES | 45 |
| 764. | DJI | 45 |
| 765. | EDU | 45 |
| 766. | EXTENDED | 45 |
| 767. | RO | 45 |
| 768. | SVC | 45 |
| 769. | TERRY | 45 |
| 770. | BOTH | 44 |
| 771. | BROADWAY | 44 |
| 772. | CLEARED | 44 |
| 773. | CONFERENCE | 44 |
| 774. | FLOOR | 44 |
| 775. | INFORMATION | 44 |
| 776. | JOYCE | 44 |
| 777. | KEITH | 44 |
| 778. | KEY | 44 |
| 779. | MSFT | 44 |
| 780. | PAGERS | 44 |
| 781. | PAGES | 44 |
| 782. | QUESTION | 44 |
| 783. | RESTART | 44 |
| 784. | ROB | 44 |
| 785. | SAY | 44 |
| 786. | THEIR | 44 |
| 787. | THINK | 44 |
| 788. | TRANSFER | 44 |
| 789. | YES | 44 |
| 790. | CONFLICTS | 43 |

-60-

DOCKET NO.: PAGE01-00116                                              PATENT

| NO.  | PHRASE    | FREQUENCY |
|------|-----------|-----------|
| 791. | DENNIS    | 43        |
| 792. | FOUND     | 43        |
| 793. | GEORGE    | 43        |
| 794. | GT        | 43        |
| 795. | HERNC     | 43        |
| 796. | NCA       | 43        |
| 797. | NCH       | 43        |
| 798. | POSS      | 43        |
| 799. | R'S       | 43        |
| 800. | RCH       | 43        |
| 801. | REPAIR    | 43        |
| 802. | SNMP      | 43        |
| 803. | SOUTH     | 43        |
| 804. | STATION   | 43        |
| 805. | TOWER     | 43        |
| 806. | TRAINING  | 43        |
| 807. | WEDNESDAY | 43        |
| 808. | ZINC      | 43        |
| 809. | BETTER    | 42        |
| 810. | BLACK     | 42        |
| 811. | BVT       | 42        |
| 812. | CRIT      | 42        |
| 813. | EN        | 42        |
| 814. | ERIC      | 42        |
| 815. | EVE       | 42        |
| 816. | EVERYONE  | 42        |
| 817. | FREED     | 42        |
| 818. | GREAT     | 42        |
| 819. | JASON     | 42        |
| 820. | MSO       | 42        |
| 821. | MSOS      | 42        |
| 822. | NUMBERS   | 42        |
| 823. | OLD       | 42        |

DOCKET NO.: PAGE01-00116                                                        PATENT

| NO.  | PHRASE    | FREQUENCY |
|------|-----------|-----------|
| 824. | RETURN    | 42        |
| 825. | SOR       | 42        |
| 826. | SUBSVCS   | 42        |
| 827. | WENCCC    | 42        |
| 828. | BLDG      | 41        |
| 829. | BLVD      | 41        |
| 830. | BRANCH    | 41        |
| 831. | COMPLETES | 41        |
| 832. | DIANA     | 41        |
| 833. | FRONT     | 41        |
| 834. | GAS       | 41        |
| 835. | KEVIN     | 41        |
| 836. | MAJOR     | 41        |
| 837. | MATERIAL  | 41        |
| 838. | MODE      | 41        |
| 839. | REALLY    | 41        |
| 840. | WI        | 41        |
| 841. | AGENT     | 40        |
| 842. | ALICIA    | 40        |
| 843. | CHARLES   | 40        |
| 844. | CONFLICT  | 40        |
| 845. | DESTROYER | 40        |
| 846. | ER        | 40        |
| 847. | JOHNSON   | 40        |
| 848. | RACING    | 40        |
| 849. | REAC      | 40        |
| 850. | STEPHENIE | 40        |
| 851. | UNIX      | 40        |
| 852. | WAYNE     | 40        |
| 853. | WINDS     | 40        |
| 854. | WZ        | 40        |
| 855. | ADVISE    | 39        |
| 856. | AVENUE    | 39        |

-62-

DOCKET NO.: PAGE01-00116                                     PATENT

| NO. | PHRASE | FREQUENCY |
|---|---|---|
| 857. | CA | 39 |
| 858. | CAME | 39 |
| 859. | CAROL | 39 |
| 860. | DIDN'T | 39 |
| 861. | EMERGENCY | 39 |
| 862. | HAVEN'T | 39 |
| 863. | MEM | 39 |
| 864. | MOM | 39 |
| 865. | MT | 39 |
| 866. | NEVER | 39 |
| 867. | PROGRAM | 39 |
| 868. | SAMCJEZ | 39 |
| 869. | SYS | 39 |
| 870. | TNT | 39 |
| 871. | TSOLN | 39 |
| 872. | VIDEOS | 39 |
| 873. | WAIT | 39 |
| 874. | AFTHRS | 38 |
| 875. | APT | 38 |
| 876. | BEING | 38 |
| 877. | BREAKS | 38 |
| 878. | ENTER | 38 |
| 879. | FUN | 38 |
| 880. | INTERFACE | 38 |
| 881. | INTERPAGE | 38 |
| 882. | LEAVING | 38 |
| 883. | MISS | 38 |
| 884. | MPCLM | 38 |
| 885. | NEEDED | 38 |
| 886. | QUESTIONS | 38 |
| 887. | REACH | 38 |
| 888. | SU | 38 |
| 889. | TEL | 38 |

DOCKET NO.: PAGE01-00116                                              PATENT

| NO.  | PHRASE      | FREQUENCY |
|------|-------------|-----------|
| 890. | TINA        | 38        |
| 891. | TRANSACTION | 38        |
| 892. | ASCOT       | 37        |
| 893. | BILLING     | 37        |
| 894. | CALLTHE     | 37        |
| 895. | CASE        | 37        |
| 896. | CAT         | 37        |
| 897. | CCACTCOM    | 37        |
| 898. | DEAD        | 37        |
| 899. | JH          | 37        |
| 900. | LOCATED     | 37        |
| 901. | MUCH        | 37        |
| 902. | NOCC        | 37        |
| 903. | OT          | 37        |
| 904. | PORT        | 37        |
| 905. | PRINT       | 37        |
| 906. | REP         | 37        |
| 907. | ROSS        | 37        |
| 908. | SFM         | 37        |
| 909. | SOUTHWEST   | 37        |
| 910. | SUNNY       | 37        |
| 911. | TRIED       | 37        |
| 912. | UNITS       | 37        |
| 913. | ADD         | 36        |
| 914. | ATMP        | 36        |
| 915. | BILINGUAL   | 36        |
| 916. | BOY         | 36        |
| 917. | BRIDGE      | 36        |
| 918. | CASA        | 36        |
| 919. | COMPAQ      | 36        |
| 920. | COMPLETED   | 36        |
| 921. | CRESTAR     | 36        |
| 922. | CSEPAGER    | 36        |

-64-

DOCKET NO.: PAGE01-00116                                    PATENT

| NO. | PHRASE | FREQUENCY |
|---|---|---|
| 923. | FOLLOW | 36 |
| 924. | HARRY | 36 |
| 925. | HDLC | 36 |
| 926. | IDNFWD | 36 |
| 927. | INODES | 36 |
| 928. | KELLY | 36 |
| 929. | MACH | 36 |
| 930. | MART | 36 |
| 931. | MEK | 36 |
| 932. | MOSTLY | 36 |
| 933. | NUPD | 36 |
| 934. | ONLINE | 36 |
| 935. | PATIENT | 36 |
| 936. | PINGER | 36 |
| 937. | SICK | 36 |
| 938. | SOFTWARE | 36 |
| 939. | SOMETHING | 36 |
| 940. | SPIDERMAN | 36 |
| 941. | THING | 36 |
| 942. | TR | 36 |
| 943. | TRACY | 36 |
| 944. | UNLOADED | 36 |
| 945. | ATLANTA | 35 |
| 946. | CD | 35 |
| 947. | CHEM | 35 |
| 948. | COACH | 35 |
| 949. | COMPLETE | 35 |
| 950. | COPY | 35 |
| 951. | CREATED | 35 |
| 952. | ELSE | 35 |
| 953. | EVEN | 35 |

DOCKET NO.: PAGE01-00116                                           PATENT

| NO.  | PHRASE     | FREQUENCY |
|------|------------|-----------|
| 954. | FIND       | 35        |
| 955. | FINISHED   | 35        |
| 956. | HEAD       | 35        |
| 957. | HOSPITAL   | 35        |
| 958. | LET'S      | 35        |
| 959. | MILLER     | 35        |
| 960. | NEWSERSTAT | 35        |
| 961. | NOON       | 35        |
| 962. | PAY        | 35        |
| 963. | RADIO      | 35        |
| 964. | RESULTS    | 35        |
| 965. | SERV       | 35        |
| 966. | SKIDS      | 35        |
| 967. | SUBSVCSIN  | 35        |
| 968. | TECHSVC    | 35        |
| 969. | URGENTE    | 35        |
| 970. | VEHICLE    | 35        |
| 971. | WITHIN     | 35        |
| 972. | ACCOUNTS   | 34        |
| 973. | ALLEN      | 34        |
| 974. | ALM        | 34        |
| 975. | ANYONE     | 34        |
| 976. | BACKUP     | 34        |
| 977. | BOSS       | 34        |
| 978. | CAMPAIGN   | 34        |
| 979. | DENISE     | 34        |
| 980. | DISCUSS    | 34        |
| 981. | HILL       | 34        |
| 982. | IXIC       | 34        |
| 983. | JAY        | 34        |
| 984. | JULIE      | 34        |
| 985. | KB         | 34        |
| 986. | LAKE       | 34        |

-66-

DOCKET NO.: PAGE01-00116							PATENT

| NO.   | PHRASE        | FREQUENCY |
|-------|---------------|-----------|
| 987.  | MARTINEZ      | 34        |
| 988.  | MELISSA       | 34        |
| 989.  | MESSAGES      | 34        |
| 990.  | MOVE          | 34        |
| 991.  | MTG           | 34        |
| 992.  | PAGEMART      | 34        |
| 993.  | PARTS         | 34        |
| 994.  | PROPERTY      | 34        |
| 995.  | QUEUE         | 34        |
| 996.  | RESEARCHING   | 34        |
| 997.  | RTRSY         | 34        |
| 998.  | SB            | 34        |
| 999.  | SIGN          | 34        |
| 1000. | TG            | 34        |
| 1001. | TGPOLLER      | 34        |
| 1002. | THINGS        | 34        |
| 1003. | TIL           | 34        |
| 1004. | UPPER         | 34        |
| 1005. | BRONX         | 33        |
| 1006. | I'VE          | 33        |
| 1007. | INSUFF        | 33        |
| 1008. | INTERNETSERVER| 33        |
| 1009. | KEYS          | 33        |
| 1010. | LAUREL        | 33        |
| 1011. | LOOK          | 33        |
| 1012. | MANY          | 33        |
| 1013. | PMI           | 33        |
| 1014. | QS            | 33        |
| 1015. | QUE           | 33        |
| 1016. | RICHARD       | 33        |
| 1017. | WHY           | 33        |
| 1018. | ABC           | 32        |
| 1019. | ANNA          | 32        |

-67-

DOCKET NO.: PAGE01-00116                                                           PATENT

| NO.   | PHRASE        | FREQUENCY |
|-------|---------------|-----------|
| 1020. | BECAUSE       | 32        |
| 1021. | BRAD          | 32        |
| 1022. | CODES         | 32        |
| 1023. | COMMUNICATION | 32        |
| 1024. | DARK          | 32        |
| 1025. | DIXIE         | 32        |
| 1026. | DRIVING       | 32        |
| 1027. | DURATION      | 32        |
| 1028. | GUESS         | 32        |
| 1029. | HOT           | 32        |
| 1030. | IDLE          | 32        |
| 1031. | JENNIFER      | 32        |
| 1032. | LINK          | 32        |
| 1033. | ORDERS        | 32        |
| 1034. | OZ            | 32        |
| 1035. | PK            | 32        |
| 1036. | SAN           | 32        |
| 1037. | SCHEDULED     | 32        |
| 1038. | SH            | 32        |
| 1039. | SPOTS         | 32        |
| 1040. | STX           | 32        |
| 1041. | SW            | 32        |
| 1042. | TABLET        | 32        |
| 1043. | TE            | 32        |
| 1044. | THANX         | 32        |
| 1045. | VAN           | 32        |
| 1046. | ATTEND        | 31        |
| 1047. | BERNIE        | 31        |
| 1048. | CROSS         | 31        |
| 1049. | DIEHL         | 31        |
| 1050. | EQUITY        | 31        |
| 1051. | FINE          | 31        |
| 1052. | FIRE          | 31        |

DOCKET NO.: PAGE01-00116                                    PATENT

| NO.   | PHRASE        | FREQUENCY |
|-------|---------------|-----------|
| 1053. | HAPPY         | 31        |
| 1054. | HELIUM        | 31        |
| 1055. | KAY           | 31        |
| 1056. | LB            | 31        |
| 1057. | PHOENIX       | 31        |
| 1058. | POR           | 31        |
| 1059. | PROCARENT     | 31        |
| 1060. | SUN           | 31        |
| 1061. | ABLE          | 30        |
| 1062. | BC            | 30        |
| 1063. | BEEP          | 30        |
| 1064. | BURTUCCI      | 30        |
| 1065. | BUTTER        | 30        |
| 1066. | CHECKED       | 30        |
| 1067. | CONGRATS      | 30        |
| 1068. | CONSTELLATION | 30        |
| 1069. | CRAIG         | 30        |
| 1070. | CUP           | 30        |
| 1071. | ELAINE        | 30        |
| 1072. | GATEWAY       | 30        |
| 1073. | GENERAL       | 30        |
| 1074. | IBM           | 30        |
| 1075. | KEEP          | 30        |
| 1076. | MAC           | 30        |
| 1077. | MALL          | 30        |
| 1078. | MARCH         | 30        |
| 1079. | MATT          | 30        |
| 1080. | MCI           | 30        |
| 1081. | MEKA          | 30        |
| 1082. | PART          | 30        |
| 1083. | PGM           | 30        |
| 1084. | ROBOT         | 30        |
| 1085. | ROUTE         | 30        |

-69-

DOCKET NO.: PAGE01-00116                                                   PATENT

| NO.   | PHRASE     | FREQUENCY |
|-------|------------|-----------|
| 1086. | SECONDS    | 30        |
| 1087. | SITES      | 30        |
| 1088. | SR         | 30        |
| 1089. | TAMMY      | 30        |
| 1090. | TED        | 30        |
| 1091. | TRYING     | 30        |
| 1092. | VIOLATION  | 30        |
| 1093. | WHICH      | 30        |
| 1094. | WHILE      | 30        |
| 1095. | WNZ        | 30        |
| 1096. | ZIPS       | 30        |
| 1097. | BOOKER     | 29        |
| 1098. | BUSINESS   | 29        |
| 1099. | CIRCUIT    | 29        |
| 1100. | CONTROLLER | 29        |
| 1101. | CORPORATION| 2         |
| 1102. | CURRENTLY  | 9         |
| 1103. | DEBRA      | 2         |
| 1104. | DOG        | 29        |
| 1105. | FTLI       | 29        |
| 1106. | GUEST      | 29        |
| 1107. | JUDY       | 29        |
| 1108. | LAB        | 29        |
| 1109. | LOGINS     | 2         |
| 1110. | MANHATTAN  | 9         |
| 1111. | PLSE       | 29        |
| 1112. | POSITION   | 29        |
| 1113. | PS         | 29        |
| 1114. | REBOOTED   | 29        |
| 1115. | REF        | 29        |
| 1116. | THKS       | 2         |
| 1117. | TURNED     | 9         |
| 1118. | TXIRVHQW   | 29        |

-70-

DOCKET NO.: PAGE01-00116                              PATENT

| NO. | PHRASE | FREQUENCY |
|---|---|---|
| 1119. | UNCH | 29 |
| 1120. | WILLIAMS | 29 |
| 1121. | BILILIGHT | 28 |
| 1122. | BRENDA | 28 |
| 1123. | CH | 28 |
| 1124. | CHARS | 28 |
| 1125. | CHECKSUM | 28 |
| 1126. | CLL | 28 |
| 1127. | DELIVERY | 28 |
| 1128. | DP | 28 |
| 1129. | EM | 28 |
| 1130. | FEW | 28 |
| 1131. | FOLLOWING | 28 |
| 1132. | FOREST | 28 |
| 1133. | FRED | 28 |
| 1134. | FT | 28 |
| 1135. | GHOST | 28 |
| 1136. | GN | 28 |
| 1137. | GREEN | 28 |
| 1138. | JR | 28 |
| 1139. | LEAKING | 28 |
| 1140. | LOCAL | 28 |
| 1141. | LORI | 28 |
| 1142. | MARRIAGE | 28 |
| 1143. | NEAR | 28 |
| 1144. | NOTE | 28 |
| 1145. | NOTHING | 28 |
| 1146. | PLAZA | 28 |
| 1147. | PROCEDURE | 28 |
| 1148. | PROGRAMMING | 28 |
| 1149. | RANDY | 28 |
| 1150. | ROBIN | 28 |
| 1151. | SELECTED | 28 |

-71-

DOCKET NO.: PAGE01-00116                                    PATENT

| NO.   | PHRASE       | FREQUENCY |
|-------|--------------|-----------|
| 1152. | SON          | 28        |
| 1153. | SVCS         | 28        |
| 1154. | TDD          | 28        |
| 1155. | TONITE       | 28        |
| 1156. | WHITE        | 28        |
| 1157. | WRONG        | 28        |
| 1158. | WW           | 28        |
| 1159. | ACCOUNT      | 27        |
| 1160. | ACCT         | 27        |
| 1161. | ANSWERING    | 27        |
| 1162. | ANYTHING     | 27        |
| 1163. | ATTENTION    | 27        |
| 1164. | BOOK         | 27        |
| 1165. | CHERYL       | 27        |
| 1166. | CORRECT      | 27        |
| 1167. | CR           | 27        |
| 1168. | CUCUMBER     | 27        |
| 1169. | DB           | 27        |
| 1170. | DRUG         | 27        |
| 1171. | FELL         | 27        |
| 1172. | FOOTBALL     | 27        |
| 1173. | FORGOT       | 27        |
| 1174. | HEAR         | 27        |
| 1175. | INCORPORATED | 27        |
| 1176. | JEAN         | 27        |
| 1177. | LE           | 27        |
| 1178. | LOGIN        | 27        |
| 1179. | LOGS         | 27        |
| 1180. | MEMORY       | 27        |
| 1181. | NOISE        | 27        |
| 1182. | PAM          | 27        |
| 1183. | PAULINE      | 27        |
| 1184. | PERRINE      | 27        |

DOCKET NO.: PAGE01-00116                                                PATENT

| NO.   | PHRASE        | FREQUENCY |
|-------|---------------|-----------|
| 1185. | REG           | 27        |
| 1186. | RETURNING     | 27        |
| 1187. | SAM           | 27        |
| 1188. | SECS          | 27        |
| 1189. | STREAKS       | 27        |
| 1190. | TC            | 27        |
| 1191. | THOSE         | 27        |
| 1192. | TRANSFERRED   | 27        |
| 1193. | VOX           | 27        |
| 1194. | WEATHER       | 27        |
| 1195. | WEB           | 27        |
| 1196. | WHAT'S        | 27        |
| 1197. | AC            | 26        |
| 1198. | ALPHA         | 26        |
| 1199. | BATTERY       | 26        |
| 1200. | BROKEN        | 26        |
| 1201. | CARE          | 26        |
| 1202. | CHECKING      | 26        |
| 1203. | CONFIRMATION  | 26        |
| 1204. | CONGRATULATION| 26        |
| 1205. | DADDY         | 26        |
| 1206. | EXIST         | 26        |
| 1207. | EXP           | 26        |
| 1208. | FINAL         | 26        |
| 1209. | FTWBSC        | 26        |
| 1210. | GAVE          | 26        |
| 1211. | HTTP          | 26        |
| 1212. | INTERNET      | 26        |
| 1213. | JONES         | 26        |
| 1214. | LEX           | 26        |
| 1215. | LUCKY         | 26        |
| 1216. | MADE          | 26        |
| 1217. | MONITOR       | 26        |

DOCKET NO.: PAGE01-00116                                                        PATENT

| NO.   | PHRASE     | FREQUENCY |
|-------|------------|-----------|
| 1218. | OP         | 26        |
| 1219. | PA         | 26        |
| 1220. | PATRICK    | 26        |
| 1221. | PL         | 26        |
| 1222. | RAIN       | 26        |
| 1223. | ROUT       | 26        |
| 1224. | SUBJ       | 26        |
| 1225. | THOMAS     | 26        |
| 1226. | TILL       | 26        |
| 1227. | TODD       | 26        |
| 1228. | WZZ        | 26        |
| 1229. | ACKNOWLEDGE| 25        |
| 1230. | BARB       | 25        |
| 1231. | BUILDING   | 25        |
| 1232. | CHANCELLED | 25        |
| 1233. | CHARLESTON | 25        |
| 1234. | CHG        | 25        |
| 1235. | CPUYC      | 25        |
| 1236. | CUSTOMERS  | 25        |
| 1237. | DEF        | 25        |
| 1238. | EVTCAR     | 25        |
| 1239. | FIXED      | 25        |
| 1240. | GIGI       | 25        |
| 1241. | GLENN      | 25        |
| 1242. | HOLD       | 25        |
| 1243. | IMMEDIATELY| 25        |
| 1244. | IMS        | 25        |
| 1245. | IOMG       | 25        |
| 1246. | JAN        | 25        |
| 1247. | JHNB       | 25        |
| 1248. | LL         | 25        |
| 1249. | NORCROSS   | 25        |
| 1250. | PAGED      | 25        |

-74-

DOCKET NO.: PAGE01-00116                                                              PATENT

| NO.   | PHRASE      | FREQUENCY |
|-------|-------------|-----------|
| 1251. | PERMITTED   | 25        |
| 1252. | PRINCETON   | 25        |
| 1253. | PROCESS     | 25        |
| 1254. | PROJECT     | 25        |
| 1255. | PURE        | 25        |
| 1256. | PW          | 25        |
| 1257. | QRM         | 25        |
| 1258. | QUICK       | 25        |
| 1259. | RECV'G      | 25        |
| 1260. | RESP        | 25        |
| 1261. | THESE       | 25        |
| 1262. | THOUGHT     | 25        |
| 1263. | UNAVAILABLE | 25        |
| 1264. | WEEKEND     | 25        |
| 1265. | AMERITECH   | 24        |
| 1266. | CANIS       | 24        |
| 1267. | CANT        | 24        |
| 1268. | CAROLINE    | 24        |
| 1269. | CASPER      | 24        |
| 1270. | CLASSIN     | 24        |
| 1271. | DOESN'T     | 24        |
| 1272. | DOOR        | 24        |
| 1273. | DRIVER      | 24        |
| 1274. | DROP        | 24        |
| 1275. | ENSCSP      | 24        |
| 1276. | FN          | 24        |
| 1277. | HALL        | 24        |
| 1278. | HDSCRON     | 24        |
| 1279. | HEARD       | 24        |
| 1280. | INCIDENT    | 24        |
| 1281. | JUAN        | 24        |
| 1282. | LAS         | 24        |
| 1283. | LBS         | 24        |

-75-

DOCKET NO.: PAGE01-00116                                              PATENT

| NO.   | PHRASE     | FREQUENCY |
|-------|------------|-----------|
| 1284. | LETTER     | 24        |
| 1285. | LN         | 24        |
| 1286. | LOCATION   | 24        |
| 1287. | MAILORDER  | 24        |
| 1288. | MOBILE     | 24        |
| 1289. | NAP        | 24        |
| 1290. | NAPERVILLE | 24        |
| 1291. | OKAY       | 24        |
| 1292. | PARA       | 24        |
| 1293. | PAYMENT    | 24        |
| 1294. | PCFN       | 24        |
| 1295. | ROGER      | 24        |
| 1296. | TKS        | 24        |
| 1297. | XX         | 24        |
| 1298. | ACCESSIBLE | 23        |
| 1299. | ARTHUR     | 23        |
| 1300. | ATTN       | 23        |
| 1301. | BYE        | 23        |
| 1302. | CATHY      | 23        |
| 1303. | CIRCLE     | 23        |
| 1304. | COMM       | 23        |
| 1305. | CORPORATE  | 23        |
| 1306. | CPI        | 23        |
| 1307. | DECALERT   | 23        |
| 1308. | DISABLED   | 23        |
| 1309. | EDNA       | 23        |
| 1310. | EE         | 23        |
| 1311. | FAIR       | 23        |
| 1312. | GA         | 23        |
| 1313. | GRIZ       | 23        |
| 1314. | GUY        | 23        |
| 1315. | HARD       | 23        |
| 1316. | HOLDING    | 23        |

DOCKET NO.: PAGE01-00116                                                                    PATENT

| NO.   | PHRASE       | FREQUENCY |
|-------|--------------|-----------|
| 1317. | HOSP         | 23        |
| 1318. | ILL          | 23        |
| 1319. | IM           | 23        |
| 1320. | JAMS         | 23        |
| 1321. | JOHNNY       | 23        |
| 1322. | KEEP         | 23        |
| 1323. | KKP          | 23        |
| 1324. | LAVONNE      | 23        |
| 1325. | LEAST        | 23        |
| 1326. | LOS          | 23        |
| 1327. | MARTIN       | 23        |
| 1328. | NICK         | 23        |
| 1329. | NOTES        | 23        |
| 1330. | PAPERWORK    | 23        |
| 1331. | PHILADELPHIA | 23        |
| 1332. | PIN          | 23        |
| 1333. | REGISTERED   | 23        |
| 1334. | RESTART      | 23        |
| 1335. | SAMPLE       | 23        |
| 1336. | SDCI         | 23        |
| 1337. | STAR         | 23        |
| 1338. | TOUCH        | 23        |
| 1339. | TX           | 23        |
| 1340. | USERS        | 23        |
| 1341. | WIS          | 2.        |
| 1342. | ABSENCE      | 22        |
| 1343. | ANTHONY      | 22        |
| 1344. | ART          | 22        |
| 1345. | BORN         | 22        |
| 1346. | BOS          | 22        |
| 1347. | BUCKENHAM    | 22        |
| 1348. | CF           | 22        |
| 1349. | CHEESE       | 22        |

-77-

DOCKET NO.: PAGE01-00116                                      PATENT

| NO.   | PHRASE       | FREQUENCY |
|-------|--------------|-----------|
| 1350. | CICSPDB      | 22        |
| 1351. | CINDY        | 22        |
| 1352. | DAVIS        | 22        |
| 1353. | DECSS        | 22        |
| 1354. | EA           | 22        |
| 1355. | EQUIPMENT    | 22        |
| 1356. | EVERYTHING   | 22        |
| 1357. | FLE          | 22        |
| 1358. | GLEN         | 22        |
| 1359. | HEALTH       | 22        |
| 1360. | INDIANA      | 22        |
| 1361. | INSTRUCTIONS | 22        |
| 1362. | JOSEPH       | 22        |
| 1363. | LANE         | 22        |
| 1364. | LEWIS        | 22        |
| 1365. | MARKED       | 22        |
| 1366. | NFI          | 22        |
| 1367. | NICOLAS      | 22        |
| 1368. | NJ           | 22        |
| 1369. | ORCL         | 22        |
| 1370. | OVERTIME     | 22        |
| 1371. | OXBO         | 22        |
| 1372. | PRUDENTIAL   | 22        |
| 1373. | READ         | 22        |
| 1374. | REAL         | 22        |
| 1375. | REBOOTING    | 22        |
| 1376. | RECYCLE      | 22        |
| 1377. | EPORTED      | 22        |
| 1378. | REVENUE      | 22        |
| 1379. | REVIEW       | 22        |
| 1380. | ROOF         | 22        |
| 1381. | SANDRA       | 22        |
| 1382. | SAR          | 22        |

-78-

DOCKET NO.: PAGE01-00116                                        PATENT

| NO.   | PHRASE     | FREQUENCY |
|-------|------------|-----------|
| 1383. | SHEET      | 22        |
| 1384. | SHEETS     | 22        |
| 1385. | SHORT      | 22        |
| 1386. | STAY       | 22        |
| 1387. | TCA        | 22        |
| 1388. | TRCINC     | 22        |
| 1389. | VISIT      | 22        |
| 1390. | WALTER     | 22        |
| 1391. | WCPDCF     | 22        |
| 1392. | WILLIAM    | 22        |
| 1393. | AFFECTING  | 21        |
| 1394. | ALICE      | 21        |
| 1395. | ATLANTA'S  | 21        |
| 1396. | BED        | 21        |
| 1397. | BREAK      | 21        |
| 1398. | BRG        | 21        |
| 1399. | COLOR      | 21        |
| 1400. | COMEDY     | 21        |
| 1401. | COUNTY     | 21        |
| 1402. | DAUGHTER   | 21        |
| 1403. | DEB        | 21        |
| 1404. | DEFAULTING | 21        |
| 1405. | DXCS       | 21        |
| 1406. | EPT        | 21        |
| 1407. | ESTIMATE   | 21        |
| 1408. | EVER       | 21        |
| 1409. | FAIL       | 21        |
| 1410. | FI         | 21        |
| 1411. | FRM        | 21        |
| 1412. | GENE       | 21        |
| 1413. | GRIMES     | 21        |
| 1414. | HILLSIDE   | 21        |
| 1415. | ILLINOIS   | 21        |

-79-

DOCKET NO.: PAGE01-00116                                      PATENT

| NO.   | PHRASE    | FREQUENCY |
|-------|-----------|-----------|
| 1416. | INSIDE    | 21        |
| 1417. | JACKSON   | 21        |
| 1418. | JANET     | 21        |
| 1419. | JIMMY     | 21        |
| 1420. | JJJG      | 21        |
| 1421. | JOAN      | 21        |
| 1422. | LARSON    | 21        |
| 1423. | LUMPLANO  | 21        |
| 1424. | MA        | 21        |
| 1425. | MARCCC    | 21        |
| 1426. | MARCSO    | 21        |
| 1427. | MELANIE   | 21        |
| 1428. | NE        | 21        |
| 1429. | NETSCAPE  | 21        |
| 1430. | NF        | 21        |
| 1431. | NRMC      | 21        |
| 1432. | PATTI     | 21        |
| 1433. | PROBL     | 21        |
| 1434. | QSYSOPR   | 21        |
| 1435. | QUALITY   | 21        |
| 1436. | REC       | 21        |
| 1437. | REMEMBER  | 21        |
| 1438. | ROBT      | 21        |
| 1439. | ROSWELL   | 21        |
| 1440. | SAFETY    | 21        |
| 1441. | SARCHK    | 21        |
| 1442. | SIGNED    | 21        |
| 1443. | STAFF     | 21        |
| 1444. | STARTED   | 21        |
| 1445. | STS       | 21        |
| 1446. | STUCK     | 21        |
| 1447. | TELEPHONE | 21        |
| 1448. | THURSDAY  | 21        |

DOCKET NO.: PAGE01-00116                                    PATENT

| NO.   | PHRASE     | FREQUENCY |
|-------|------------|-----------|
| 1449. | UNDEFINED  | 21        |
| 1450. | VICCCC     | 21        |
| 1451. | VICTOR     | 21        |
| 1452. | VINES      | 21        |
| 1453. | WENT       | 21        |
| 1454. | WK         | 21        |
| 1455. | ABSOLUTE   | 20        |
| 1456. | ACC        | 20        |
| 1457. | ANGELEE    | 20        |
| 1458. | AP         | 20        |
| 1459. | ARRIVED    | 20        |
| 1460. | ASSOC      | 20        |
| 1461. | BIRTHDAY   | 20        |
| 1462. | BOBBY      | 20        |
| 1463. | CELLULAR   | 20        |
| 1464. | CENTRAL    | 20        |
| 1465. | CLASS      | 20        |
| 1466. | COLUMBIA   | 20        |
| 1467. | COMUNIQUESE| 20        |
| 1468. | CONTROL    | 20        |
| 1469. | COOL       | 20        |
| 1470. | COSTCO     | 20        |
| 1471. | COUPLE     | 20        |
| 1472. | CREDIT     | 20        |
| 1473. | CUT        | 20        |
| 1474. | DAWN       | 20        |
| 1475. | DOC        | 20        |
| 1476. | DOROTHY    | 20        |
| 1477. | DUDE       | 20        |
| 1478. | ENTRY      | 20        |
| 1479. | EVENING    | 20        |
| 1480. | FLIP       | 20        |
| 1481. | FRI        | 20        |

DOCKET NO.: PAGE01-00116                                       PATENT

| NO.   | PHRASE      | FREQUENCY |
|-------|-------------|-----------|
| 1482. | FURNACE     | 20        |
| 1483. | HM          | 20        |
| 1484. | IND         | 20        |
| 1485. | INODE       | 20        |
| 1486. | LEAKAGE     | 20        |
| 1487. | LIQUOR      | 20        |
| 1488. | LOTTERY     | 20        |
| 1489. | LOTTO       | 20        |
| 1490. | MACIK       | 20        |
| 1491. | MIGHT       | 20        |
| 1492. | MONEY       | 20        |
| 1493. | MONTHS      | 20        |
| 1494. | MOVED       | 20        |
| 1495. | ORDERED     | 20        |
| 1496. | ORLANDO     | 20        |
| 1497. | PDT         | 20        |
| 1498. | PGR         | 20        |
| 1499. | RELOCATION  | 20        |
| 1500. | RICH        | 20        |
| 1501. | SC          | 20        |
| 1502. | SECOND      | 20        |
| 1503. | SENSE       | 20        |
| 1504. | SI          | 20        |
| 1505. | SPORTS      | 20        |
| 1506. | SPRING      | 20        |
| 1507. | TAKING      | 20        |
| 1508. | TIMERS      | 20        |
| 1509. | TIMES       | 20        |
| 1510. | TRACKS      | 20        |
| 1511. | TSC         | 20        |
| 1512. | UNREACHABLE | 20        |
| 1513. | VER         | 20        |
| 1514. | WENDY       | 20        |

DOCKET NO.: PAGE01-00116                                              PATENT

| NO.   | PHRASE   | FREQUENCY |
|-------|----------|-----------|
| 1515. | WISNSE   | 20        |
| 1516. | WISTNF   | 20        |
| 1517. | AH       | 19        |
| 1518. | ALEX     | 19        |
| 1519. | ANDY     | 19        |
| 1520. | ASKED    | 19        |
| 1521. | BECKY    | 19        |
| 1522. | BID      | 19        |
| 1523. | BLAKE    | 19        |
| 1524. | CHARLIE  | 19        |
| 1525. | CONTRACT | 19        |
| 1526. | CPS      | 19        |
| 1527. | DALE     | 19        |
| 1528. | DC       | 19        |
| 1529. | DELPHI   | 19        |
| 1530. | DELTA    | 19        |
| 1531. | EDCO     | 9         |
| 1532. | ETC      | 1         |
| 1533. | EWS      | 19        |
| 1534. | EX       | 19        |
| 1535. | FOODS    | 19        |
| 1536. | FORM     | 19        |
| 1537. | GARCIA   | 19        |
| 1538. | GTPS     | 19        |
| 1539. | HALF     | 19        |
| 1540. | HELEN    | 19        |
| 1541. | HW       | 19        |
| 1542. | ICK      | 19        |
| 1543. | ISK      | 19        |
| 1544. | JACKIE   | 19        |
| 1545. | JD       | 19        |
| 1546. | JO       | 19        |
| 1547. | KING     | 19        |

-83-

DOCKET NO.: PAGE01-00116                                                PATENT

| NO.    | PHRASE     | FREQUENCY |
|--------|------------|-----------|
| 1548.  | LEA        | 19        |
| 1549.  | LIFE       | 19        |
| 1550.  | LOOKS      | 19        |
| 1551.  | LYNN       | 19        |
| 1552.  | MAP        | 19        |
| 1553.  | MEL        | 19        |
| 1554.  | MFG        | 19        |
| 1555.  | MIND       | 19        |
| 1556.  | PACKET     | 19        |
| 1557.  | PARKED     | 19        |
| 1558.  | PJ         | 19        |
| 1559.  | PKO        | 19        |
| 1560.  | PUFFS      | 19        |
| 1561.  | REASSIGNED | 19        |
| 1562.  | REC'D      | 19        |
| 1563.  | REPAGE     | 19        |
| 1564.  | RESCHEDULE | 19        |
| 1565.  | REST       | 19        |
| 1566.  | REV        | 19        |
| 1567.  | RIVER      | 19        |
| 1568.  | SEVERAL    | 19        |
| 1569.  | SHANNON    | 19        |
| 1570.  | SHELLY     | 19        |
| 1571.  | SKIES      | 19        |
| 1572.  | SLADE      | 19        |
| 1573.  | STAND      | 19        |
| 1574.  | STEP       | 19        |
| 1575.  | STUFF      | 19        |
| 1576.  | SUPPLY     | 19        |
| 1577.  | TERRI      | 19        |
| 1578.  | THAT'S     | 19        |
| 1579.  | UNDER      | 19        |
| 1580.  | UNION      | 19        |

DOCKET NO.: PAGE01-00116                                    PATENT

| NO.   | PHRASE      | FREQUENCY |
|-------|-------------|-----------|
| 1581. | WIRELESS    | 19        |
| 1582. | ACHIEVED    | 18        |
| 1583. | ALAN        | 18        |
| 1584. | APPOINTMENT | 18        |
| 1585. | AUTO        | 18        |
| 1586. | BEST        | 18        |
| 1587. | CABLE       | 18        |
| 1588. | CARLOS      | 18        |
| 1589. | CAROLYN     | 18        |
| 1590. | CIRC        | 18        |
| 1591. | CLIENT      | 18        |
| 1592. | COD         | 18        |
| 1593. | CRESTCHK    | 18        |
| 1594. | CRYSTAL     | 18        |
| 1595. | CTR         | 18        |
| 1596. | CURRENT     | 18        |
| 1597. | DICK        | 18        |
| 1598. | DINNER      | 18        |
| 1599. | DME         | 18        |
| 1600. | DSCFS       | 18        |
| 1601. | ENDED       | 18        |
| 1602. | FIX         | 18        |
| 1603. | FLIPPER     | 18        |
| 1604. | FOLLOWS     | 18        |
| 1605. | FRAN        | 18        |
| 1606. | HLD         | 18        |
| 1607. | HOUSTON     | 18        |
| 1608. | IDN         | 18        |
| 1609. | INSTALLED   | 18        |
| 1610. | INSUF       | 18        |
| 1611. | IP          | 18        |
| 1612. | JOSE        | 18        |
| 1613. | LEO         | 18        |

-85-

DOCKET NO.: PAGE01-00116                                              PATENT

| NO.   | PHRASE       | FREQUENCY |
|-------|--------------|-----------|
| 1614. | LESLIE       | 18        |
| 1615. | LITE         | 18        |
| 1616. | LMOS         | 18        |
| 1617. | LOAD         | 18        |
| 1618. | LOWER        | 18        |
| 1619. | LVDD         | 18        |
| 1620. | MAGELLAN     | 18        |
| 1621. | MAINTENANCE  | 18        |
| 1622. | MARIE        | 18        |
| 1623. | MIDDLE       | 18        |
| 1624. | MONITORING   | 18        |
| 1625. | NICE         | 18        |
| 1626. | NOX          | 18        |
| 1627. | NTDPF        | 18        |
| 1628. | PATTY        | 18        |
| 1629. | PERSONAL     | 18        |
| 1630. | PETE         | 18        |
| 1631. | PETER        | 18        |
| 1632. | POET         | 18        |
| 1633. | PROBABLY     | 18        |
| 1634. | PROCAREMAIN  | 18        |
| 1635. | RAIL         | 18        |
| 1636. | RED          | 18        |
| 1637. | REQUESTED    | 18        |
| 1638. | RONDA        | 18        |
| 1639. | ROSE         | 18        |
| 1640. | SAVE         | 18        |
| 1641. | SENDING      | 18        |
| 1642. | SHAWN        | 18        |
| 1643. | STOCK        | 18        |
| 1644. | SVL          | 18        |
| 1645. | SYSERR       | 18        |
| 1646. | TALKED       | 18        |

-86-

DOCKET NO.: PAGE01-00116　　　　　　　　　　　　　　　　　　　　　　　PATENT

| NO. | PHRASE | FREQUENCY |
|---|---|---|
| 1647. | TERMINATEDWITH | 18 |
| 1648. | THROUGH | 18 |
| 1649. | TOMARROW | 18 |
| 1650. | TONER | 18 |
| 1651. | TRIP | 18 |
| 1652. | VA | 18 |
| 1653. | VICKIE | 18 |
| 1654. | WEDDING | 18 |
| 1655. | WIC | 18 |
| 1656. | WINGCOM | 18 |
| 1657. | WORD | 18 |
| 1658. | WORLD | 18 |
| 1659. | YANKEES | 18 |
| 1660. | ACHIEVING | 17 |
| 1661. | ANDREA | 17 |
| 1662. | ASON | 17 |
| 1663. | BRINGING | 17 |
| 1664. | CASH | 17 |
| 1665. | CASS | 17 |
| 1666. | CDB | 17 |
| 1667. | CLEANED | 17 |
| 1668. | CNI | 17 |
| 1669. | CONF | 17 |
| 1670. | COOPER | 17 |
| 1671. | CSL | 17 |
| 1672. | CYNTHIA | 17 |
| 1673. | DANA | 17 |
| 1674. | DANNY | 17 |
| 1675. | DOUGLAS | 17 |
| 1676. | EXC | 17 |
| 1677. | FAR | 17 |
| 1678. | FORD | 17 |
| 1679. | FTW | 17 |

DOCKET NO.: PAGE01-00116                                              PATENT

| NO.   | PHRASE     | FREQUENCY |
|-------|------------|-----------|
| 1680. | GARDEN     | 17        |
| 1681. | GRAND      | 17        |
| 1682. | HARRIS     | 17        |
| 1683. | HEADED     | 17        |
| 1684. | HOTEL      | 17        |
| 1685. | HQ         | 17        |
| 1686. | HWY        | 17        |
| 1687. | INS        | 17        |
| 1688. | INSURANCE  | 17        |
| 1689. | ISLAND     | 17        |
| 1690. | KARLA      | 17        |
| 1691. | LOCKED     | 17        |
| 1692. | LUCKTOM    | 17        |
| 1693. | MAKING     | 17        |
| 1694. | MEDICAL    | 17        |
| 1695. | MGR        | 17        |
| 1696. | MORGAN     | 17        |
| 1697. | NOEL       | 17        |
| 1698. | OSCAR      | 17        |
| 1699. | PASSWORD   | 17        |
| 1700. | PLAYER     | 17        |
| 1701. | PRODUCTION | 17        |
| 1702. | QUARTERLY  | 17        |
| 1703. | RAUL       | 17        |
| 1704. | RECORD     | 17        |
| 1705. | RENTAL     | 17        |
| 1706. | RES        | 17        |
| 1707. | SPECIAL    | 17        |
| 1708. | SUPER      | 17        |
| 1709. | SVR        | 17        |
| 1710. | TAYLOR     | 17        |
| 1711. | TERMINAL   | 17        |
| 1712. | TONI       | 17        |

-88-

DOCKET NO.: PAGE01-00116                                    PATENT

| NO.   | PHRASE       | FREQUENCY |
|-------|--------------|-----------|
| 1713. | UNEXPECTEDLY | 17        |
| 1714. | VICKI        | 17        |
| 1715. | WARD         | 17        |
| 1716. | WASHINGTON   | 17        |
| 1717. | WCP          | 17        |
| 1718. | WIRE         | 17        |
| 1719. | WORKS        | 17        |
| 1720. | YAHHNUSE     | 17        |
| 1721. | AA           | 16        |
| 1722. | ACI          | 16        |
| 1723. | AD           | 16        |
| 1724. | ALLALL       | 16        |
| 1725. | AMOUNT       | 16        |
| 1726. | ANGIE        | 16        |
| 1727. | BB           | 16        |
| 1728. | BOARD        | 16        |
| 1729. | BRUSH        | 16        |
| 1730. | BRYAN        | 16        |
| 1731. | BUY          | 16        |
| 1732. | CARL         | 16        |
| 1733. | CARPET       | 16        |
| 1734. | CHKD         | 16        |
| 1735. | CLOUDY       | 16        |
| 1736. | CLUB         | 16        |
| 1737. | COFFEE       | 16        |
| 1738. | COMPUVISION  | 16        |
| 1739. | CROWN        | 16        |
| 1740. | CSCO         | 16        |
| 1741. | DAS          | 16        |
| 1742. | DBU          | 16        |
| 1743. | DETECTED     | 16        |
| 1744. | DIRTY        | 16        |
| 1745. | DJ           | 16        |

-89-

DOCKET NO.: PAGE01-00116                                                PATENT

| NO.   | PHRASE     | FREQUENCY |
|-------|------------|-----------|
| 1746. | EARLIER    | 16        |
| 1747. | ELECTRIC   | 16        |
| 1748. | ENGAGEMENT | 16        |
| 1749. | FAMILY     | 16        |
| 1750. | GTSW       | 16        |
| 1751. | HEIDI      | 16        |
| 1752. | HPE        | 16        |
| 1753. | IV         | 16        |
| 1754. | JEANS      | 16        |
| 1755. | KEYBOARD   | 16        |
| 1756. | LENGTH     | 16        |
| 1757. | LETS       | 16        |
| 1758. | LU         | 16        |
| 1759. | MASFTP     | 16        |
| 1760. | MAXALLOWED | 16        |
| 1761. | MEDIA      | 16        |
| 1762. | METAL      | 16        |
| 1763. | MOTHER     | 16        |
| 1764. | MRD        | 16        |
| 1765. | NSCP       | 16        |
| 1766. | OPS        | 16        |
| 1767. | PARTY      | 16        |
| 1768. | POINTS     | 16        |
| 1769. | POSSESSION | 16        |
| 1770. | PROB       | 16        |
| 1771. | RELEASE    | 16        |
| 1772. | SECURITY   | 16        |
| 1773. | SHOWING    | 16        |
| 1774. | SLS        | 16        |
| 1775. | SM         | 16        |
| 1776. | SOMEBODY   | 16        |
| 1777. | STEPHANIE  | 16        |
| 1778. | SUPPLIES   | 16        |

DOCKET NO.: PAGE01-00116 PATENT

| NO. | PHRASE | FREQUENCY |
|---|---|---|
| 1779. | SUPPOSE | 16 |
| 1780. | SUZY | 16 |
| 1781. | SYNDA | 16 |
| 1782. | TELNET | 16 |
| 1783. | TEMP | 16 |
| 1784. | THUR | 16 |
| 1785. | TOMMORROW | 16 |
| 1786. | TRUNKS | 16 |
| 1787. | TUEOCT | 16 |
| 1788. | TURNER | 16 |
| 1789. | USZMCHI | 16 |
| 1790. | VERIFIED | 16 |
| 1791. | WELCOME | 16 |
| 1792. | WHATS | 16 |
| 1793. | WISNSF | 16 |
| 1794. | WISNSM | 16 |
| 1795. | WL | 16 |
| 1796. | WMC | 16 |
| 1797. | WONT | 16 |
| 1798. | WRZ | 16 |
| 1799. | ABENDED | 15 |
| 1800. | AF | 15 |
| 1801. | AMERICAN | 15 |
| 1802. | BCONTINUED | 15 |
| 1803. | BELONGING | 15 |
| 1804. | BROTHER | 15 |
| 1805. | CAROLINA | 15 |
| 1806. | CATASTROPHIC | 15 |
| 1807. | CCS | 15 |
| 1808. | CHANNEL | 15 |
| 1809. | COURT | 15 |
| 1810. | CREEK | 15 |
| 1811. | DAL | 15 |

DOCKET NO.: PAGE01-00116                                                PATENT

| NO.   | PHRASE    | FREQUENCY |
|-------|-----------|-----------|
| 1812. | DISP      | 15        |
| 1813. | DOWNLOAD  | 15        |
| 1814. | DUMP      | 15        |
| 1815. | DX        | 15        |
| 1816. | EARLY     | 15        |
| 1817. | ESCRIPTION| 15        |
| 1818. | ESTA      | 15        |
| 1819. | ESTOY     | 15        |
| 1820. | FAILUR    | 15        |
| 1821. | FLICK     | 15        |
| 1822. | GETS      | 15        |
| 1823. | GRANTED   | 15        |
| 1824. | HAPPENED  | 15        |
| 1825. | HAUL      | 15        |
| 1826. | HEARTBEAT | 15        |
| 1827. | HENRY     | 15        |
| 1828. | HOW'S     | 15        |
| 1829. | ISSUE     | 15        |
| 1830. | KIRK      | 15        |
| 1831. | LJ        | 15        |
| 1832. | LOCKING   | 15        |
| 1833. | LOOP      | 15        |
| 1834. | LOOSE     | 15        |
| 1835. | LOTS      | 15        |
| 1836. | LUANN     | 15        |
| 1837. | MAGNAVOX  | 15        |
| 1838. | MAYBE     | 15        |
| 1839. | MWINTMPL  | 15        |
| 1840. | NARRA     | 15        |
| 1841. | NATIONAL  | 15        |
| 1842. | NEIL      | 15        |
| 1843. | OC        | 15        |
| 1844. | OCCURED   | 15        |

DOCKET NO.: PAGE01-00116                                              PATENT

| NO.   | PHRASE   | FREQUENCY |
|-------|----------|-----------|
| 1845. | OOPS     | 15        |
| 1846. | OWNER    | 15        |
| 1847. | PACIFIC  | 15        |
| 1848. | PAMELA   | 15        |
| 1849. | PERLMAN  | 15        |
| 1850. | PG       | 15        |
| 1851. | PLAYBOY  | 15        |
| 1852. | PRODUCTS | 15        |
| 1853. | PUMP     | 15        |
| 1854. | REMAINS  | 15        |
| 1855. | RESET    | 15        |
| 1856. | RUSH     | 15        |
| 1857. | SACEBOS  | 15        |
| 1858. | SCREEN   | 15        |
| 1859. | SHOW     | 15        |
| 1860. | SISTER   | 15        |
| 1861. | SMTP     | 15        |
| 1862. | STEEL    | 15        |
| 1863. | STOPPED  | 15        |
| 1864. | STUART   | 15        |
| 1865. | TARGET   | 15        |
| 1866. | TERESA   | 15        |
| 1867. | THOUGH   | 15        |
| 1868. | UPS      | 15        |
| 1869. | VALERIE  | 15        |
| 1870. | VALLEY   | 15        |
| 1871. | WC       | 15        |
| 1872. | WHENEVER | 15        |
| 1873. | WIZARD   | 15        |
| 1874. | WORTH    | 15        |
| 1875. | YEAR     | 15        |

-93-

DOCKET NO.: PAGE01-00116                                    PATENT

| NO.   | PHRASE       | FREQUENCY |
|-------|--------------|-----------|
| 1876. | YOU'LL       | 15        |
| 1877. | AGO          | 14        |
| 1878. | ANNOUNCEMENT | 14        |
| 1879. | AREAS        | 14        |
| 1880. | BD           | 14        |
| 1881. | BEEPER       | 14        |
| 1882. | BELT         | 14        |
| 1883. | BESSEL       | 14        |
| 1884. | BETTY        | 14        |
| 1885. | BR           | 14        |
| 1886. | BREAKFAST    | 14        |
| 1887. | CALLER       | 14        |
| 1888. | CHARGE       | 14        |
| 1889. | CHK          | 14        |
| 1890. | CHRISTINE    | 14        |
| 1891. | CHRONIC      | 14        |
| 1892. | CJRH         | 14        |
| 1893. | CKD          | 14        |
| 1894. | CLIFF        | 14        |
| 1895. | CLOSING      | 14        |
| 1896. | CRASH        | 14        |
| 1897. | DA           | 14        |
| 1898. | DIGITAL      | 14        |
| 1899. | DTFILE       | 14        |
| 1900. | EITHER       | 14        |
| 1901. | ENFWSP       | 14        |
| 1902. | EVELETH      | 14        |
| 1903. | FAN          | 14        |
| 1904. | FEELING      | 14        |
| 1905. | GREATER      | 14        |
| 1906. | GROVE        | 14        |
| 1907. | HE'S         | 14        |
| 1908. | HURRY        | 14        |

DOCKET NO.: PAGE01-00116                                          PATENT

| NO.   | PHRASE     | FREQUENCY |
|-------|------------|-----------|
| 1909. | ING        | 14        |
| 1910. | INTERESTED | 14        |
| 1911. | JANE       | 14        |
| 1912. | JEN        | 14        |
| 1913. | JW         | 14        |
| 1914. | LIC        | 14        |
| 1915. | LMS        | 14        |
| 1916. | LOST       | 14        |
| 1917. | LUIS       | 14        |
| 1918. | MAR        | 14        |
| 1919. | MARILYN    | 14        |
| 1920. | MASTER     | 14        |
| 1921. | MAXIMUM    | 14        |
| 1922. | MELVIN     | 14        |
| 1923. | MEMO       | 14        |
| 1924. | NETWARE    | 14        |
| 1925. | NICOLE     | 14        |
| 1926. | NP         | 14        |
| 1927. | O'S        | 14        |
| 1928. | ONCE       | 14        |
| 1929. | PACKAGE    | 14        |
| 1930. | PHARM      | 14        |
| 1931. | PHARMACY   | 14        |
| 1932. | RANGE      | 14        |
| 1933. | REPLACED   | 14        |
| 1934. | RESTARTING | 14        |
| 1935. | RYAN       | 14        |
| 1936. | SARA       | 14        |
| 1937. | SEAN       | 14        |
| 1938. | SHIP       | 14        |
| 1939. | SMALL      | 14        |
| 1940. | STEWART    | 14        |
| 1941. | TECH'S     | 14        |

DOCKET NO.: PAGE01-00116 PATENT

| NO. | PHRASE | FREQUENCY |
|---|---|---|
| 1942. | TELCO | 14 |
| 1943. | TEXAS | 14 |
| 1944. | THERAPY | 14 |
| 1945. | THINKING | 14 |
| 1946. | THOMPSON | 14 |
| 1947. | THUR | 14 |
| 1948. | THURS | 14 |
| 1949. | TIRE | 14 |
| 1950. | TTPD | 14 |
| 1951. | TUCKER | 14 |
| 1952. | UNIVERSITY | 14 |
| 1953. | VM | 14 |
| 1954. | WALLY | 14 |
| 1955. | WES | 14 |
| 1956. | ABSCAP | 13 |
| 1957. | ADDITIONAL | 13 |
| 1958. | AFFECT | 13 |
| 1959. | ANDREW | 13 |
| 1960. | ANGE | 13 |
| 1961. | APPROX | 13 |
| 1962. | APPTS | 13 |
| 1963. | BAGEL | 13 |
| 1964. | BAHAHAHAHAHA | 13 |
| 1965. | BI | 13 |
| 1966. | BKANK | 13 |
| 1967. | BOOKS | 13 |
| 1968. | BUTLER | 13 |
| 1969. | CHECKQUE | 13 |
| 1970. | CKHRS | 13 |
| 1971. | CLAY | 13 |
| 1972. | CNBC | 13 |
| 1973. | COLLECTIONS | 13 |
| 1974. | COND | 13 |

DOCKET NO.: PAGE01-00116					PATENT

| NO. | PHRASE | FREQUENCY |
|---|---|---|
| 1975. | CONTACTING | 13 |
| 1976. | COUNT | 13 |
| 1977. | COWBOYS | 13 |
| 1978. | DANIEL | 13 |
| 1979. | DEACTIVATED | 13 |
| 1980. | DM | 13 |
| 1981. | ENT | 13 |
| 1982. | ERR | 13 |
| 1983. | ERRORS | 13 |
| 1984. | EXPRESS | 13 |
| 1985. | FAXED | 13 |
| 1986. | FEEL | 13 |
| 1987. | FIGURES | 13 |
| 1988. | FILLHRS | 13 |
| 1989. | FILLQUE | 13 |
| 1990. | FURTHER | 13 |
| 1991. | FW | 13 |
| 1992. | GABRIEL | 13 |
| 1993. | GALLUP | 13 |
| 1994. | GINNY | 13 |
| 1995. | GIRL | 13 |
| 1996. | GOES | 13 |
| 1997. | HANDY | 13 |
| 1998. | HARBOR | 13 |
| 1999. | HOFFMAN | 13 |
| 2000. | HOWEVER | 13 |
| 2001. | IMMEDIATE | 13 |
| 2002. | JAIL | 13 |
| 2003. | JAM | 13 |
| 2004. | JANICE | 13 |
| 2005. | JRIVER | 13 |
| 2006. | LEVEL | 13 |
| 2007. | MAINT | 13 |

-97-

DOCKET NO.: PAGE01-00116                                    PATENT

| NO.   | PHRASE       | FREQUENCY |
|-------|--------------|-----------|
| 2008. | MANAGEMENT   | 13        |
| 2009. | MANAGER      | 13        |
| 2010. | MATPSP       | 13        |
| 2011. | MATTHEW      | 13        |
| 2012. | MINDY        | 13        |
| 2013. | MINI         | 13        |
| 2014. | MISSED       | 13        |
| 2015. | MODEM        | 13        |
| 2016. | MOORE        | 13        |
| 2017. | MOTOR        | 13        |
| 2018. | NOTICE       | 13        |
| 2019. | OEX          | 13        |
| 2020. | OUTSIDE      | 13        |
| 2021. | PAID         | 13        |
| 2022. | PARKING      | 13        |
| 2023. | PAST         | 13        |
| 2024. | PAYROLL      | 13        |
| 2025. | PERRY        | 13        |
| 2026. | PITTSB       | 13        |
| 2027. | POWERCALL    | 13        |
| 2028. | PRINTING     | 13        |
| 2029. | PRODUCT      | 13        |
| 2030. | PROFESSIONAL | 13        |
| 2031. | RESTON       | 13        |
| 2032. | ROCK         | 13        |
| 2033. | SAW          | 13        |
| 2034. | SENDMAIL     | 13        |
| 2035. | SETUP        | 13        |
| 2036. | SS           | 13        |
| 2037. | STATES       | 13        |
| 2038. | STEVEN       | 13        |
| 2039. | SUFFERING    | 13        |
| 2040. | TA           | 13        |

-98-

DOCKET NO.: PAGE01-00116                                                                 PATENT

| NO.   | PHRASE    | FREQUENCY |
|-------|-----------|-----------|
| 2041. | THNX      | 13        |
| 2042. | TU        | 13        |
| 2043. | UPSET     | 13        |
| 2044. | VIRGINIA  | 13        |
| 2045. | VJET      | 13        |
| 2046. | WAKE      | 13        |
| 2047. | WHERE'S   | 13        |
| 2048. | WIN       | 13        |
| 2049. | WORKED    | 13        |
| 2050. | YOUNG     | 13        |
| 2051. | ADDED     | 12        |
| 2052. | ANDERSON  | 12        |
| 2053. | ANITA     | 12        |
| 2054. | APPROVED  | 12        |
| 2055. | APPS      | 12        |
| 2056. | BAY       | 12        |
| 2057. | BET       | 12        |
| 2058. | BIT       | 12        |
| 2059. | CAL       | 12        |
| 2060. | CAP       | 12        |
| 2061. | CARLA     | 12        |
| 2062. | CESFS     | 12        |
| 2063. | CHANGING  | 12        |
| 2064. | CHECKS    | 12        |
| 2065. | CHERRY    | 12        |
| 2066. | CHTFS     | 12        |
| 2067. | CLEANING  | 12        |
| 2068. | CLOSET    | 12        |
| 2069. | CLUSTER   | 12        |
| 2070. | CNAS      | 12        |
| 2071. | COLD      | 12        |
| 2072. | CONFIRMED | 12        |
| 2073. | CONSULT   | 12        |

-99-

DOCKET NO.: PAGE01-00116 PATENT

| NO. | PHRASE | FREQUENCY |
|---|---|---|
| 2074. | COOLING | 12 |
| 2075. | CORRUPT | 12 |
| 2076. | CPUC | 12 |
| 2077. | CTVVA | 12 |
| 2078. | CUTOFF | 12 |
| 2079. | CVC | 12 |
| 2080. | DARLENE | 12 |
| 2081. | DF | 12 |
| 2082. | DIED | 12 |
| 2083. | DIFFICULTIES | 12 |
| 2084. | DISCOUNT | 12 |
| 2085. | DISPATCHED | 12 |
| 2086. | DOWNTOWN | 12 |
| 2087. | DURING | 12 |
| 2088. | ERRNO | 12 |
| 2089. | EVANS | 12 |
| 2090. | EXEC | 12 |
| 2091. | FIELD | 12 |
| 2092. | GAME | 12 |
| 2093. | GINA | 12 |
| 2094. | GLASS | 12 |
| 2095. | GONE | 12 |
| 2096. | GORDON | 12 |
| 2097. | GRAHAM | 12 |
| 2098. | GREP | 12 |
| 2099. | HAUSER | 12 |
| 2100. | HOWARD | 12 |
| 2101. | HRS | 12 |
| 2102. | INN | 12 |
| 2103. | IRENE | 12 |
| 2104. | JAMAIC | 12 |
| 2105. | JJ | 12 |
| 2106. | JOANNE | 12 |

-100-

DOCKET NO.: PAGE01-00116                                    PATENT

| NO.   | PHRASE   | FREQUENCY |
|-------|----------|-----------|
| 2107. | KRANTZ   | 12 |
| 2108. | LAND     | 12 |
| 2109. | LCLN     | 12 |
| 2110. | LEAK     | 12 |
| 2111. | LEI      | 12 |
| 2112. | LELA     | 12 |
| 2113. | LEVER    | 12 |
| 2114. | LIGHTS   | 12 |
| 2115. | LIMIT    | 12 |
| 2116. | LOGONS   | 12 |
| 2117. | LONGER   | 12 |
| 2118. | LTC      | 12 |
| 2119. | LZB      | 12 |
| 2120. | MANUALLY | 12 |
| 2121. | MARKS    | 12 |
| 2122. | MARQ     | 12 |
| 2123. | MARTY    | 12 |
| 2124. | MASPET   | 12 |
| 2125. | MB       | 12 |
| 2126. | METER    | 12 |
| 2127. | MIAMI    | 12 |
| 2128. | MILK     | 12 |
| 2129. | MINS     | 12 |
| 2130. | MKLINUX  | 12 |
| 2131. | MODEL    | 12 |
| 2132. | MUCP     | 12 |
| 2133. | MURRAY   | 12 |
| 2134. | NAPM     | 12 |
| 2135. | NATIONS  | 12 |
| 2136. | NELSON   | 12 |
| 2137. | NITE     | 12 |
| 2138. | OFICINA  | 12 |
| 2139. | PE       | 12 |

-101-

DOCKET NO.: PAGE01-00116                                            PATENT

| NO.   | PHRASE     | FREQUENCY |
|-------|------------|-----------|
| 2140. | PHN        | 12        |
| 2141. | PHONES     | 12        |
| 2142. | PLANNING   | 12        |
| 2143. | PLANS      | 12        |
| 2144. | POLICE     | 12        |
| 2145. | PRESS      | 12        |
| 2146. | PRIVATE    | 12        |
| 2147. | PRO        | 12        |
| 2148. | PROD       | 12        |
| 2149. | PTRSRV     | 12        |
| 2150. | RACHEL     | 12        |
| 2151. | RECEIPTS   | 12        |
| 2152. | RECEIVING  | 12        |
| 2153. | RECORDS    | 12        |
| 2154. | RICHARDSON | 12        |
| 2155. | ROBO       | 12        |
| 2156. | ROY        | 12        |
| 2157. | ROYAL      | 12        |
| 2158. | SBBS       | 12        |
| 2159. | SER        | 12        |
| 2160. | SEVEN      | 12        |
| 2161. | SHIFT      | 12        |
| 2162. | SPOKE      | 12        |
| 2163. | STORY      | 12        |
| 2164. | SUCCESSFUL | 12        |
| 2165. | SUGAR      | 12        |
| 2166. | SUMHOST    | 12        |
| 2167. | TERRA      | 12        |
| 2168. | TITLE      | 12        |
| 2169. | TOGETHER   | 12        |
| 2170. | TONYA      | 12        |
| 2171. | TRIPOLI    | 12        |
| 2172. | UPD        | 12        |

DOCKET NO.: PAGE01-00116                                    PATENT

| NO.   | PHRASE     | FREQUENCY |
|-------|------------|-----------|
| 2173. | UR         | 12        |
| 2174. | WARM       | 12        |
| 2175. | WATCHER    | 12        |
| 2176. | WEAR       | 12        |
| 2177. | WESTBU     | 12        |
| 2178. | WISC       | 12        |
| 2179. | AAPL       | 11        |
| 2180. | ACE        | 11        |
| 2181. | AGENTS     | 11        |
| 2182. | AHEAD      | 11        |
| 2183. | AIRPORT    | 11        |
| 2184. | ALMOST     | 11        |
| 2185. | ALWAYS     | 11        |
| 2186. | AMC        | 11        |
| 2187. | AMDOCS     | 11        |
| 2188. | ANT        | 11        |
| 2189. | ATTE       | 11        |
| 2190. | ATTEMPTED  | 11        |
| 2191. | BARRY      | 11        |
| 2192. | BEDNARSKI  | 11        |
| 2193. | BETH       | 11        |
| 2194. | BL         | 11        |
| 2195. | BODY       | 11        |
| 2196. | BRET       | 11        |
| 2197. | CITYWARE   | 11        |
| 2198. | CLEAN      | 11        |
| 2199. | CLEAN      | 11        |
| 2200. | CLINIC     | 11        |
| 2201. | CLIVE      | 11        |
| 2202. | COMMERCIAL | 11        |
| 2203. | COMUNICATE | 11        |
| 2204. | CONNECTOR  | 11        |
| 2205. | CONNIE     | 11        |

-103-

DOCKET NO.: PAGE01-00116                                    PATENT

| NO.   | PHRASE      | FREQUENCY |
|-------|-------------|-----------|
| 2206. | CONTINENTAL | 11        |
| 2207. | CORNER      | 11        |
| 2208. | COURSE      | 11        |
| 2209. | CREATIVE    | 11        |
| 2210. | DEAL        | 11        |
| 2211. | DEAN        | 11        |
| 2212. | DELIVER     | 11        |
| 2213. | DORIS       | 11        |
| 2214. | DORS        | 11        |
| 2215. | DOUBLE      | 11        |
| 2216. | EAT         | 11        |
| 2217. | EC          | 11        |
| 2218. | EDWARDS     | 11        |
| 2219. | ELEVEN      | 11        |
| 2220. | EQUIP       | 11        |
| 2221. | EVENINGAND  | 11        |
| 2222. | EXETER      | 11        |
| 2223. | EXIT        | 11        |
| 2224. | FLANAGAN    | 11        |
| 2225. | FLORIDA     | 11        |
| 2226. | FRANKLIN    | 11        |
| 2227. | FUNCTIONING | 11        |
| 2228. | HABLAME     | 11        |
| 2229. | HAROLD      | 11        |
| 2230. | HERRON      | 11        |
| 2231. | HS          | 11        |
| 2232. | HUNT        | 11        |
| 2233. | IDA         | 11        |
| 2234. | INK         | 11        |
| 2235. | INT         | 11        |
| 2236. | INVOICE     | 11        |
| 2237. | JB          | 11        |
| 2238. | JON         | 11        |

-104-

DOCKET NO.: PAGE01-00116                                    PATENT

| NO.   | PHRASE      | FREQUENCY |
|-------|-------------|-----------|
| 2239. | KAPPA       | 11        |
| 2240. | KIDS        | 11        |
| 2241. | LIFTGT      | 11        |
| 2242. | LOIS        | 11        |
| 2243. | LORRAINE    | 11        |
| 2244. | MARCOS      | 11        |
| 2245. | MARGARET    | 11        |
| 2246. | MARIO       | 11        |
| 2247. | MEAN        | 11        |
| 2248. | MET         | 11        |
| 2249. | MOVING      | 11        |
| 2250. | MURPHY      | 11        |
| 2251. | NETWORKPING | 11        |
| 2252. | NT          | 11        |
| 2253. | OWN         | 11        |
| 2254. | PASO        | 11        |
| 2255. | PCLOUDY     | 11        |
| 2256. | PEACE       | 11        |
| 2257. | PICKER      | 11        |
| 2258. | PID         | 11        |
| 2259. | PLAY        | 11        |
| 2260. | PN          | 11        |
| 2261. | PROGNET     | 11        |
| 2262. | PRUCHK      | 11        |
| 2263. | PTS         | 11        |
| 2264. | PULSE       | 11        |
| 2265. | QSYSPRT     | 11        |
| 2266. | QUICKER     | 11        |
| 2267. | RALPH       | 11        |
| 2268. | RAMON       | 11        |
| 2269. | RATES       | 11        |
| 2270. | REBOOT      | 11        |
| 2271. | RECVD       | 11        |

DOCKET NO.: PAGE01-00116    PATENT

| NO. | PHRASE | FREQUENCY |
|---|---|---|
| 2272. | REGARDS | 11 |
| 2273. | REGGIE | 11 |
| 2274. | RENO | 11 |
| 2275. | REQUIRE | 11 |
| 2276. | ROLAND | 11 |
| 2277. | ROLL | 11 |
| 2278. | ROUTCDE | 11 |
| 2279. | RSS | 11 |
| 2280. | RUTH | 11 |
| 2281. | SHE'S | 11 |
| 2282. | SIGNAL | 11 |
| 2283. | SK | 11 |
| 2284. | SUBSYSTEM | 11 |
| 2285. | SUITE | 11 |
| 2286. | SUMMIT | 11 |
| 2287. | TAMPA | 11 |
| 2288. | TLA | 11 |
| 2289. | TOILET | 11 |
| 2290. | TONY'S | 11 |
| 2291. | TOOL | 11 |
| 2292. | TOWN | 11 |
| 2293. | TRC | 11 |
| 2294. | TXS | 11 |
| 2295. | UNDERSTAND | 11 |
| 2296. | URGE | 11 |
| 2297. | USRX | 11 |
| 2298. | VALID | 11 |
| 2299. | VARY | 11 |
| 2300. | VF | 11 |
| 2301. | VIA | 11 |
| 2302. | VICKY | 11 |
| 2303. | VOEKEL | 11 |
| 2304. | VOSKOYAN | 11 |

DOCKET NO.: PAGE01-00116                                              PATENT

| NO.   | PHRASE     | FREQUENCY |
|-------|------------|-----------|
| 2305. | WASTHE     | 11        |
| 2306. | WE'RE      | 11        |
| 2307. | WILLING    | 11        |
| 2308. | WILSON     | 11        |
| 2309. | WOOD       | 11        |
| 2310. | ABNORMALLY | 10        |
| 2311. | ACCURAL    | 10        |
| 2312. | ACTUALLY   | 10        |
| 2313. | ADVISED    | 10        |
| 2314. | AFT        | 10        |
| 2315. | AGENDA     | 10        |
| 2316. | ALMA       | 10        |
| 2317. | ALOT       | 10        |
| 2318. | ASKING     | 10        |
| 2319. | ASS        | 10        |
| 2320. | ATL        | 10        |
| 2321. | ATT        | 10        |
| 2322. | AUG        | 10        |
| 2323. | AUTORESP   | 10        |
| 2324. | BABE       | 10        |
| 2325. | BAKER      | 10        |
| 2326. | BANKS      | 10        |
| 2327. | BAR        | 10        |
| 2328. | BATCH      | 10        |
| 2329. | BECOMING   | 10        |
| 2330. | BEVERAGE   | 10        |
| 2331. | BILLS      | 10        |
| 2332. | BONITA     | 10        |
| 2333. | BROKE      | 10        |
| 2334. | BUDDY      | 10        |
| 2335. | BUDWEISER  | 10        |
| 2336. | BUFFERS    | 10        |
| 2337. | CALIFORNIA | 10        |

DOCKET NO.: PAGE01-00116 PATENT

| NO. | PHRASE | FREQUENCY |
|---|---|---|
| 2338. | CARSON | 10 |
| 2339. | CCACTIV | 10 |
| 2340. | CESAR | 10 |
| 2341. | CFS | 10 |
| 2342. | CHRISTINA | 10 |
| 2343. | COAST | 10 |
| 2344. | COLLINS | 10 |
| 2345. | COMMUNICATIONS | 10 |
| 2346. | CONSTRUCTION | 10 |
| 2347. | CONVENIENCE | 10 |
| 2348. | CONVENIENT | 10 |
| 2349. | CORE | 10 |
| 2350. | COULDN'T | 10 |
| 2351. | CRM | 10 |
| 2352. | CROOKED | 10 |
| 2353. | CUFF | 10 |
| 2354. | DAIRY | 10 |
| 2355. | DANI | 10 |
| 2356. | DARRIGO | 10 |
| 2357. | DELAYED | 10 |
| 2358. | DETAILS | 10 |
| 2359. | DIE | 10 |
| 2360. | DIRECTO | 10 |
| 2361. | DISCO | 10 |
| 2362. | DIVISION | 10 |
| 2363. | DOGS | 10 |
| 2364. | DRAIN | 10 |
| 2365. | ELIZABETH | 10 |
| 2366. | ENCELADUS | 10 |
| 2367. | ERNEST | 10 |
| 2368. | ES | 10 |
| 2369. | FEEDIN | 10 |
| 2370. | FISHER | 10 |

-108-

DOCKET NO.: PAGE01-00116                                         PATENT

| NO.   | PHRASE       | FREQUENCY |
|-------|--------------|-----------|
| 2371. | FLEMING      | 10        |
| 2372. | FORECAST     | 10        |
| 2373. | FRANCIS      | 10        |
| 2374. | GATE         | 10        |
| 2375. | GELMART      | 10        |
| 2376. | GLORIA       | 10        |
| 2377. | GOLDEN       | 10        |
| 2378. | GONNA        | 10        |
| 2379. | GREGG        | 10        |
| 2380. | GTFX         | 10        |
| 2381. | GUSTO        | 10        |
| 2382. | HAMPTON      | 10        |
| 2383. | HAVEGIVEN    | 10        |
| 2384. | HILLS        | 10        |
| 2385. | HOWARD'S     | 10        |
| 2386. | ICE          | 10        |
| 2387. | IMMEDIATELY  | 10        |
| 2388. | INSTALLATION | 10        |
| 2389. | INSTEAD      | 10        |
| 2390. | INTREPID     | 10        |
| 2391. | INVESTOR     | 10        |
| 2392. | IRVING       | 10        |
| 2393. | ITEMS        | 10        |
| 2394. | JAMIE        | 10        |
| 2395. | JANETTE      | 10        |
| 2396. | JEANINE      | 10        |
| 2397. | JESSE        | 10        |
| 2398. | KICK         | 10        |
| 2399. | KILL         | 10        |
| 2400. | KNOWN        | 10        |
| 2401. | LAMP         | 10        |
| 2402. | LAW          | 10        |
| 2403. | LEASE        | 10        |

DOCKET NO.: PAGE01-00116                                    PATENT

| NO.   | PHRASE         | FREQUENCY |
|-------|----------------|-----------|
| 2404. | LOCK           | 10        |
| 2405. | LOUISE         | 10        |
| 2406. | LOX            | 10        |
| 2407. | LP             | 10        |
| 2408. | MANU           | 10        |
| 2409. | MAXIMO         | 10        |
| 2410. | MCLOUDY        | 10        |
| 2411. | MEDS           | 10        |
| 2412. | MILL           | 10        |
| 2413. | MOB            | 10        |
| 2414. | MONSEP         | 10        |
| 2415. | MORALE         | 10        |
| 2416. | MORRIS         | 10        |
| 2417. | MUNOZM         | 10        |
| 2418. | NIELSEN        | 10        |
| 2419. | NURSE          | 10        |
| 2420. | OCEAN          | 10        |
| 2421. | OPERATIONAL    | 10        |
| 2422. | OTHERWISE      | 10        |
| 2423. | OUTOFSERVERCON | 10        |
| 2424. | OWEN           | 10        |
| 2425. | PASS           | 10        |
| 2426. | PHOTO          | 10        |
| 2427. | PHYLLIS        | 10        |
| 2428. | PINE           | 10        |
| 2429. | PLA            | 10        |
| 2430. | PLAYERROR      | 10        |
| 2431. | PM'S           | 10        |
| 2432. | PRD            | 10        |
| 2433. | PRIORITY       | 10        |
| 2434. | PROBE          | 10        |
| 2435. | PROTEIN        | 10        |
| 2436. | QAR            | 10        |

-110-

DOCKET NO.: PAGE01-00116                                          PATENT

| NO.   | PHRASE    | FREQUENCY |
|-------|-----------|-----------|
| 2437. | RECONCILE | 10        |
| 2438. | REFERRAL  | 10        |
| 2439. | REFERRED  | 10        |
| 2440. | REMOTE    | 10        |
| 2441. | RESEARCH  | 10        |
| 2442. | RIDE      | 10        |
| 2443. | RITE      | 10        |
| 2444. | ROACHES   | 10        |
| 2445. | ROM       | 10        |
| 2446. | RONNIE    | 10        |
| 2447. | ROSIE     | 10        |
| 2448. | RS        | 10        |
| 2449. | RUSSELL   | 10        |
| 2450. | SALE      | 10        |
| 2451. | SARAH     | 10        |
| 2452. | SAT       | 10        |
| 2453. | SCOOP     | 10        |
| 2454. | SELL      | 10        |
| 2455. | SELLS     | 10        |
| 2456. | SFS       | 10        |
| 2457. | SHIRLEY   | 10        |
| 2458. | SHORTLY   | 10        |
| 2459. | SHUT      | 10        |
| 2460. | SIZE      | 10        |
| 2461. | SKYTEL    | 10        |
| 2462. | SN        | 10        |
| 2463. | SOUND     | 10        |
| 2464. | SOYUZ     | 10        |
| 2465. | STCK      | 10        |
| 2466. | STEPH     | 10        |
| 2467. | STRAIGHT  | 10        |
| 2468. | SUCCESS   | 10        |
| 2469. | SUCH      | 10        |

DOCKET NO.: PAGE01-00116                                              PATENT

| NO.   | PHRASE     | FREQUENCY |
|-------|------------|-----------|
| 2470. | SURPRISE   | 10        |
| 2471. | SWEETIE    | 10        |
| 2472. | TAKEN      | 10        |
| 2473. | TER        | 10        |
| 2474. | THERE'S    | 10        |
| 2475. | THINKS     | 10        |
| 2476. | TL         | 10        |
| 2477. | TMP        | 10        |
| 2478. | TODAY'S    | 10        |
| 2479. | TOOK       | 10        |
| 2480. | TORRES     | 10        |
| 2481. | TREE       | 10        |
| 2482. | TROUBLE    | 10        |
| 2483. | TRUE       | 10        |
| 2484. | TWCFINCD   | 10        |
| 2485. | ULTI       | 10        |
| 2486. | UNLESS     | 10        |
| 2487. | VACATION   | 10        |
| 2488. | VIEW       | 10        |
| 2489. | WALK       | 10        |
| 2490. | WALTON     | 10        |
| 2491. | WANTING    | 10        |
| 2492. | WARREN     | 10        |
| 2493. | WEEKLY     | 10        |
| 2494. | WELLINGTON | 10        |
| 2495. | WILRAY     | 10        |
| 2496. | RISDBFIN   | 10        |
| 2497. | WITCO      | 10        |
| 2498. | WRITE      | 10        |
| 2499. | YELLO      | 10        |
| 2500. | YJZ        | 10        |
| 2501. | YNZ        | 10        |
| 2502. | YONKER     | 10        |

DOCKET NO.: PAGE01-00116  PATENT

| NO. | PHRASE | FREQUENCY |
|---|---|---|
| 2503. | YOURS | 10 |
| 2504. | YR | 10 |
| 2505. | ZG | 10 |
| 2506. | ZN | 10 |
| 2507. | ABUT | 9 |
| 2508. | ANGELA | 9 |
| 2509. | ANNIE | 9 |
| 2510. | ANTONIO | 9 |
| 2511. | ANYWAY | 9 |
| 2512. | APPLE | 9 |
| 2513. | APRIL | 9 |
| 2514. | ARLENE | 9 |
| 2515. | ARLINGTON | 9 |
| 2516. | ARRIVE | 9 |
| 2517. | ATTORNEY | 9 |
| 2518. | AUGUST | 9 |
| 2519. | AUSPEX | 9 |
| 2520. | AVAILABILITY | 9 |
| 2521. | AVERAGE | 9 |
| 2522. | BAG | 9 |
| 2523. | BAIGELMAN | 9 |
| 2524. | BAILEY | 9 |
| 2525. | BAPTIST | 9 |
| 2526. | BESOS | 9 |
| 2527. | BKCMS | 9 |
| 2528. | BONUS | 9 |
| 2529. | BOULEVARD | 9 |
| 2530. | BOXES | 9 |
| 2531. | BOYS | 9 |
| 2532. | CALLME | 9 |
| 2533. | CARDS | 9 |
| 2534. | CARRIE | 9 |
| 2535. | CASES | 9 |

-113-

DOCKET NO.: PAGE01-00116                                         PATENT

| NO.   | PHRASE      | FREQUENCY |
|-------|-------------|-----------|
| 2536. | CAUGHT      | 9         |
| 2537. | CCACT       | 9         |
| 2538. | CG          | 9         |
| 2539. | CHRISTOPHER | 9         |
| 2540. | CHRISTY     | 9         |
| 2541. | CHURCH      | 9         |
| 2542. | CLARE       | 9         |
| 2543. | COMPLETELY  | 9         |
| 2544. | CONTINUE    | 9         |
| 2545. | CORRECTION  | 9         |
| 2546. | COUNTS      | 9         |
| 2547. | CSD         | 9         |
| 2548. | DALEE       | 9         |
| 2549. | DENVER      | 9         |
| 2550. | DEPOSIT     | 9         |
| 2551. | DESERT      | 9         |
| 2552. | DESIGN      | 9         |
| 2553. | DESIGNER    | 9         |
| 2554. | DIDNT       | 9         |
| 2555. | DOCS        | 9         |
| 2556. | DONALD      | 9         |
| 2557. | DRUGS       | 9         |
| 2558. | DSS         | 9         |
| 2559. | DUPLICATE   | 9         |
| 2560. | EAGLES      | 9         |
| 2561. | EDDIE       | 9         |
| 2562. | EDWARD      | 9         |
| 2563. | ENCC        | 9         |
| 2564. | EP          | 9         |
| 2565. | ESPERANDO   | 9         |
| 2566. | ET          | 9         |
| 2567. | EVERETT     | 9         |
| 2568. | EXCEL       | 9         |

-114-

DOCKET NO.: PAGE01-00116                              PATENT

| NO. | PHRASE | FREQUENCY |
|---|---|---|
| 2569. | EXCELLENT | 9 |
| 2570. | EXPENSE | 9 |
| 2571. | FABR | 9 |
| 2572. | FARMS | 9 |
| 2573. | FAS | 9 |
| 2574. | FF | 9 |
| 2575. | FLORENCE | 9 |
| 2576. | FLUSHING | 9 |
| 2577. | FORT | 9 |
| 2578. | FRIEND | 9 |
| 2579. | FTP | 9 |
| 2580. | GAIL | 9 |
| 2581. | GAL | 9 |
| 2582. | GIVEN | 9 |
| 2583. | GLADSTONE | 9 |
| 2584. | HANDTOOLS | 9 |
| 2585. | HASN'T | 9 |
| 2586. | HECTOR | 9 |
| 2587. | HEDAYA | 9 |
| 2588. | HERNANDEZ | 9 |
| 2589. | HIGHWAY | 9 |
| 2590. | HORNET | 9 |
| 2591. | HTS | 9 |
| 2592. | HUMBLE | 9 |
| 2593. | INBOUND | 9 |
| 2594. | INDUSTRIES | 9 |
| 2595. | INSTI | 9 |
| 2596. | INTERVAL | 9 |
| 2597. | INVITED | 9 |
| 2598. | ISN'T | 9 |
| 2599. | JAM'N | 9 |
| 2600. | JOANN | 9 |
| 2601. | JOIN | 9 |

-115-

DOCKET NO.: PAGE01-00116                                          PATENT

| NO.   | PHRASE   | FREQUENCY |
|-------|----------|-----------|
| 2602. | JORGE    | 9 |
| 2603. | JOSH     | 9 |
| 2604. | JP       | 9 |
| 2605. | JULY     | 9 |
| 2606. | KISS     | 9 |
| 2607. | LABOR    | 9 |
| 2608. | LACK     | 9 |
| 2609. | LADY     | 9 |
| 2610. | LAPTOP   | 9 |
| 2611. | LAZH     | 9 |
| 2612. | LEGAL    | 9 |
| 2613. | LIBERTY  | 9 |
| 2614. | LINCOLN  | 9 |
| 2615. | LR       | 9 |
| 2616. | LSG      | 9 |
| 2617. | MAILBOX  | 9 |
| 2618. | MANAGERS | 9 |
| 2619. | MANNY    | 9 |
| 2620. | MARC     | 9 |
| 2621. | MARGIE   | 9 |
| 2622. | MARIE'S  | 9 |
| 2623. | MARION   | 9 |
| 2624. | MASON    | 9 |
| 2625. | MBUF     | 9 |
| 2626. | MBUFS    | 9 |
| 2627. | MD       | 9 |
| 2628. | MDR      | 9 |
| 2629. | MEDICINE | 9 |
| 2630. | MEN      | 9 |
| 2631. | MINN     | 9 |
| 2632. | MISSION  | 9 |
| 2633. | MIXED    | 9 |
| 2634. | MOBIL    | 9 |

-116-

DOCKET NO.: PAGE01-00116  PATENT

| NO. | PHRASE | FREQUENCY |
|---|---|---|
| 2635. | MONICA | 9 |
| 2636. | MONTGOMERY | 9 |
| 2637. | MOTORS | 9 |
| 2638. | MUCHO | 9 |
| 2639. | MULTIPLE | 9 |
| 2640. | MWINNOPS | 9 |
| 2641. | NANDO | 9 |
| 2642. | NCR | 9 |
| 2643. | NIKKI | 9 |
| 2644. | NORMA | 9 |
| 2645. | NTA | 9 |
| 2646. | OAK | 9 |
| 2647. | OCTO | 9 |
| 2648. | PAIN | 9 |
| 2649. | PATROL | 9 |
| 2650. | PEGGY | 9 |
| 2651. | PENDING | 9 |
| 2652. | PHILLIPS | 9 |
| 2653. | PICKING | 9 |
| 2654. | PLANT | 9 |
| 2655. | POLLER | 9 |
| 2656. | POT | 9 |
| 2657. | PRICES | 9 |
| 2658. | PRICING | 9 |
| 2659. | PUBLIC | 9 |
| 2660. | PY | 9 |
| 2661. | QUARTER | 9 |
| 2662. | REASON | 9 |
| 2663. | RECEIPT | 9 |
| 2664. | RENE | 9 |
| 2665. | REQ | 9 |
| 2666. | RITA | 9 |
| 2667. | ROBINSON | 9 |

DOCKET NO.: PAGE01-00116                                          PATENT

| NO.   | PHRASE       | FREQUENCY |
|-------|--------------|-----------|
| 2668. | ROCKY        | 9         |
| 2669. | SCHULZRINNE  | 9         |
| 2670. | SDTI         | 9         |
| 2671. | SEPTEMBER    | 9         |
| 2672. | SEV          | 9         |
| 2673. | SHB          | 9         |
| 2674. | SHEILA       | 9         |
| 2675. | SHIRTS       | 9         |
| 2676. | SIMMONS      | 9         |
| 2677. | SOC          | 9         |
| 2678. | SOLOMON      | 9         |
| 2679. | SOMETIME     | 9         |
| 2680. | SPRINGS      | 9         |
| 2681. | SPX          | 9         |
| 2682. | STACEY       | 9         |
| 2683. | STAN         | 9         |
| 2684. | STANDARD     | 9         |
| 2685. | STARTCHEMICAL| 9         |
| 2686. | STONE        | 9         |
| 2687. | STORM        | 9         |
| 2688. | STUDLEY      | 9         |
| 2689. | SUMMERVILLE  | 9         |
| 2690. | SYQT         | 9         |
| 2691. | TANKS        | 9         |
| 2692. | TAPE         | 9         |
| 2693. | TERMINATED   | 9         |
| 2694. | THANKYOU     | 9         |
| 2695. | THRESHOLD    | 9         |
| 2696. | TJ           | 9         |
| 2697. | TRAIL        | 9         |
| 2698. | TW           | 9         |
| 2699. | TWICE        | 9         |
| 2700. | UN           | 9         |

-118-

DOCKET NO.: PAGE01-00116						PATENT

| NO.   | PHRASE    | FREQUENCY |
|-------|-----------|-----------|
| 2701. | UNIFLEX   | 9 |
| 2702. | USA       | 9 |
| 2703. | VERBAL    | 9 |
| 2704. | VILLAGE   | 9 |
| 2705. | WALLACE   | 9 |
| 2706. | WAREHOUSE | 9 |
| 2707. | WARRANTY  | 9 |
| 2708. | WASH      | 9 |
| 2709. | WASHOE    | 9 |
| 2710. | WEEKS     | 9 |
| 2711. | WINDOW    | 9 |
| 2712. | WITHOUT   | 9 |
| 2713. | WMT       | 9 |
| 2714. | WONDERFUL | 9 |
| 2715. | WONDERING | 9 |
| 2716. | WORRY     | 9 |
| 2717. | WRON      | 9 |
| 2718. | WWM       | 9 |
| 2719. | YK        | 9 |
| 2720. | YRS       | 9 |
| 2721. | ZW        | 9 |
| 2722. | ACB       | 8 |
| 2723. | ACCTS     | 8 |
| 2724. | ACIS      | 8 |
| 2725. | ACTIO     | 8 |
| 2726. | ACTIVE    | 8 |
| 2727. | ADF       |   |
| 2728. | ADVANTIS  | 8 |
| 2729. | AE        | 8 |
| 2730. | AFRAID    | 8 |
| 2731. | AGENCY    | 8 |
| 2732. | AIS       | 8 |
| 2733. | ALONG     | 8 |

-119-

DOCKET NO.: PAGE01-00116                                         PATENT

| NO.   | PHRASE        | FREQUENCY |
|-------|---------------|-----------|
| 2734. | AMERICA       | 8 |
| 2735. | ANAHEIM       | 8 |
| 2736. | ANS           | 8 |
| 2737. | ARNOLD        | 8 |
| 2738. | ASCEND        | 8 |
| 2739. | ASSEMBLY      | 8 |
| 2740. | BARNES        | 8 |
| 2741. | BEENTERMINATED| 8 |
| 2742. | BELINDA       | 8 |
| 2743. | BGLS          | 8 |
| 2744. | BILL'S        | 8 |
| 2745. | BKLYN         | 8 |
| 2746. | BLIND         | 8 |
| 2747. | BLOCA         | 8 |
| 2748. | BOAR          | 8 |
| 2749. | BOB'S         | 8 |
| 2750. | BOND          | 8 |
| 2751. | BOOT          | 8 |
| 2752. | BORL          | 8 |
| 2753. | BUD           | 8 |
| 2754. | CABLES        | 8 |
| 2755. | CAMPBELL      | 8 |
| 2756. | CANDY         | 8 |
| 2757. | CAPACITY      | 8 |
| 2758. | CASTI         | 8 |
| 2759. | CCMAIL        | 8 |
| 2760. | CHARACTERS    | 8 |
| 2761. | CHERI         | 8 |
| 2762. | CHIP          | 8 |
| 2763. | CIR           | 8 |
| 2764. | CIS           | 8 |
| 2765. | CJDB          | 8 |
| 2766. | CLARA         | 8 |

-120-

DOCKET NO.: PAGE01-00116                                    PATENT

| NO.   | PHRASE     | FREQUENCY |
|-------|------------|-----------|
| 2767. | CLARK      | 8         |
| 2768. | CLB        | 8         |
| 2769. | CMPD       | 8         |
| 2770. | CNXS       | 8         |
| 2771. | COLA       | 8         |
| 2772. | COMMAND    | 8         |
| 2773. | COMMING    | 8         |
| 2774. | COMPANIES  | 8         |
| 2775. | COMPLAINT  | 8         |
| 2776. | CSO        | 8         |
| 2777. | CUS        | 8         |
| 2778. | CYMBOLIC   | 8         |
| 2779. | CYTO       | 8         |
| 2780. | DEE        | 8         |
| 2781. | DELAY      | 8         |
| 2782. | DELETED    | 8         |
| 2783. | DELIVERED  | 8         |
| 2784. | DEPLOYMENT | 8         |
| 2785. | DFWAS      | 8         |
| 2786. | DOCTOR     | 8         |
| 2787. | DOLORES    | 8         |
| 2788. | DOWNLOADED | 8         |
| 2789. | DTKEYS     | 8         |
| 2790. | DUTY       | 8         |
| 2791. | EAGLE      | 8         |
| 2792. | EILEEN     | 8         |
| 2793. | EMPLOYEE   | 8         |
| 2794. | ENF        | 8         |
| 2795. | EXINIS     | 8         |
| 2796. | FAC        | 8         |
| 2797. | FED        | 8         |
| 2798. | FEDERAL    | 8         |
| 2799. | FEVER      | 8         |

DOCKET NO.: PAGE01-00116                                              PATENT

| NO.   | PHRASE     | FREQUENCY |
|-------|------------|-----------|
| 2800. | FINANCIAL  | 8         |
| 2801. | FINISH     | 8         |
| 2802. | FLYING     | 8         |
| 2803. | FORWARD    | 8         |
| 2804. | FOSTER     | 8         |
| 2805. | FUCK       | 8         |
| 2806. | GABR       | 8         |
| 2807. | GARAGE     | 8         |
| 2808. | GARDNER    | 8         |
| 2809. | GARLAND    | 8         |
| 2810. | GM'S       | 8         |
| 2811. | GOAL       | 8         |
| 2812. | GOTTA      | 8         |
| 2813. | GRACIAS    | 8         |
| 2814. | GRINDING   | 8         |
| 2815. | GTBR       | 8         |
| 2816. | GTTR       | 8         |
| 2817. | GUNS       | 8         |
| 2818. | HANDLE     | 8         |
| 2819. | HARVEY     | 8         |
| 2820. | HAZARD     | 8         |
| 2821. | HEADEND    | 8         |
| 2822. | HELL       | 8         |
| 2823. | HIAHDLN    | 8         |
| 2824. | HILTON     | 8         |
| 2825. | HOLLIS     | 8         |
| 2826. | HOMES      | 8         |
| 2827. | HROES      | 8         |
| 2828. | HUNGRY     | 8         |
| 2829. | HWCC       | 8         |
| 2830. | HWP        | 8         |
| 2831. | IMPX       | 8         |
| 2832. | INDUSTRIAL | 8         |

-122-

DOCKET NO.: PAGE01-00116                                    PATENT

| NO.   | PHRASE   | FREQUENCY |
|-------|----------|-----------|
| 2833. | INFORM   | 8 |
| 2834. | INTEGRAL | 8 |
| 2835. | INTRANET | 8 |
| 2836. | INTU     | 8 |
| 2837. | INV      | 8 |
| 2838. | INWOOD   | 8 |
| 2839. | JANSEN   | 8 |
| 2840. | JAVIER   | 8 |
| 2841. | JENNY    | 8 |
| 2842. | JUNE     | 8 |
| 2843. | JV       | 8 |
| 2844. | KATE     | 8 |
| 2845. | KENT     | 8 |
| 2846. | KERM     | 8 |
| 2847. | KERR     | 8 |
| 2848. | KURT     | 8 |
| 2849. | LANG     | 8 |
| 2850. | LESS     | 8 |
| 2851. | LI       | 8 |
| 2852. | LILLIAN  | 8 |
| 2853. | LISTEN   | 8 |
| 2854. | LIZ      | 8 |
| 2855. | LLAMA    | 8 |
| 2856. | LM       | 8 |
| 2857. | LOADING  | 8 |
| 2858. | LOANER   | 8 |
| 2859. | LOBBY    | 8 |
| 2860. | LOOKED   | 8 |
| 2861. | LOPEZ    | 8 |
| 2862. | LOUD     | 8 |
| 2863. | LV       | 8 |
| 2864. | LYNBRO   | 8 |
| 2865. | MAILCD   | 8 |

DOCKET NO.: PAGE01-00116                                           PATENT

| NO.   | PHRASE     | FREQUENCY |
|-------|------------|-----------|
| 2866. | MAILED     | 8         |
| 2867. | MAINFRAME  | 8         |
| 2868. | MANOR      | 8         |
| 2869. | MARLENE    | 8         |
| 2870. | MARTHA     | 8         |
| 2871. | MAURICE    | 8         |
| 2872. | MCLAUGHLIN | 8         |
| 2873. | MEDA       | 8         |
| 2874. | MERC       | 8         |
| 2875. | MESA       | 8         |
| 2876. | METRO      | 8         |
| 2877. | MIDEAST    | 8         |
| 2878. | MIIWDS     | 8         |
| 2879. | MITCHELL   | 8         |
| 2880. | MU         | 8         |
| 2881. | MULTIS     | 8         |
| 2882. | MUSIC      | 8         |
| 2883. | NATHAN     | 8         |
| 2884. | NFS        | 8         |
| 2885. | NONE       | 8         |
| 2886. | NURSING    | 8         |
| 2887. | NYC        | 8         |
| 2888. | O'CLOCK    | 8         |
| 2889. | OIL        | 8         |
| 2890. | OPENED     | 8         |
| 2891. | ORANGE     | 8         |
| 2892. | OU         | 8         |
| 2893. | PAL        | 8         |
| 2894. | PARKER     | 8         |
| 2895. | PAYLESS    | 8         |
| 2896. | PAYM       | 8         |
| 2897. | PCQ        | 8         |
| 2898. | PCS        | 8         |

-124-

DOCKET NO.: PAGE01-00116 　　　　　　　　　　　　　　　　　　　　PATENT

| NO. | PHRASE | FREQUENCY |
|---|---|---|
| 2899. | PENNY | 8 |
| 2900. | PHILLIP | 8 |
| 2901. | PHILLY | 8 |
| 2902. | PICKUP | 8 |
| 2903. | PLOG | 8 |
| 2904. | POCKETS | 8 |
| 2905. | POP | 8 |
| 2906. | POTENTIAL | 8 |
| 2907. | PPP | 8 |
| 2908. | PRESENTATION | 8 |
| 2909. | PRESTLEY | 8 |
| 2910. | PRLN | 8 |
| 2911. | PSUNNY | 8 |
| 2912. | PULL | 8 |
| 2913. | PURGES | 8 |
| 2914. | QRIMAILSERVER | 8 |
| 2915. | RCHF | 8 |
| 2916. | READER | 8 |
| 2917. | REED | 8 |
| 2918. | REPAIRED | 8 |
| 2919. | REPLACE | 8 |
| 2920. | RESELLER | 8 |
| 2921. | RGAINDM | 8 |
| 2922. | RHONDA | 8 |
| 2923. | RILEY | 8 |
| 2924. | RINGS | 8 |
| 2925. | RIVERA | 8 |
| 2926. | RLB | 8 |
| 2927. | ROBERTS | 8 |
| 2928. | RP | 8 |
| 2929. | SANTA | 8 |
| 2930. | SCIENCE | 8 |
| 2931. | SEEING | 8 |

DOCKET NO.: PAGE01-00116 PATENT

| NO. | PHRASE | FREQUENCY |
|---|---|---|
| 2932. | SEG | 8 |
| 2933. | SHARE | 8 |
| 2934. | SHERI | 8 |
| 2935. | SHOOT | 8 |
| 2936. | SNUBU | 8 |
| 2937. | SONDRA | 8 |
| 2938. | SOUTHEAST | 8 |
| 2939. | SPEECH | 8 |
| 2940. | SPEED | 8 |
| 2941. | SPXX | 8 |
| 2942. | SRA | 8 |
| 2943. | SSN | 8 |
| 2944. | STACY | 8 |
| 2945. | STARTING | 8 |
| 2946. | STOCKTON | 8 |
| 2947. | STOPS | 8 |
| 2948. | STOR | 8 |
| 2949. | SUPPOSED | 8 |
| 2950. | SUSPECT | 8 |
| 2951. | SUZANNE | 8 |
| 2952. | TARA | 8 |
| 2953. | TECHNOLOGIES | 8 |
| 2954. | TF | 8 |
| 2955. | THERESA | 8 |
| 2956. | THOM | 8 |
| 2957. | TIENE | 8 |
| 2958. | TITAN | 8 |
| 2959. | TRAY | 8 |
| 2960. | TURNING | 8 |
| 2961. | UCHANGED | 8 |
| 2962. | UPDATED | 8 |
| 2963. | VARIETY | 8 |
| 2964. | VERSION | 8 |

-126-

DOCKET NO.: PAGE01-00116 	PATENT

| NO. | PHRASE | FREQUENCY |
|---|---|---|
| 2965. | VINCE | 8 |
| 2966. | VL | 8 |
| 2967. | WALGREENS | 8 |
| 2968. | WARNER | 8 |
| 2969. | WATCHDOG | 8 |
| 2970. | WINDOWS | 8 |
| 2971. | WJZ | 8 |
| 2972. | WM | 8 |
| 2973. | WROTE | 8 |
| 2974. | XON | 8 |
| 2975. | YARD | 8 |
| 2976. | YEAH | 8 |
| 2977. | ZC | 8 |
| 2978. | ZIUS | 8 |
| 2979. | ZNZ | 8 |
| 2980. | ZZ | 8 |
| 2981. | ZZZ | 8 |
| 2982. | AARON | 7 |
| 2983. | ACTIVATIONS | 7 |
| 2984. | ADS | 7 |
| 2985. | ADV | 7 |
| 2986. | AEROBIC | 7 |
| 2987. | AGAINST | 7 |
| 2988. | AKHWAND | 7 |
| 2989. | ALLAN | 7 |
| 2990. | ANA | 7 |
| 2991. | ANNE | 7 |
| 2992. | ANTOLIN | 7 |
| 2993. | ANYTHINGGOES | 7 |
| 2994. | ANYTIME | 7 |
| 2995. | AOL | 7 |
| 2996. | APPEARS | 7 |
| 2997. | ATLANTIC | 7 |

DOCKET NO.: PAGE01-00116                            PATENT

| NO. | PHRASE | FREQUENCY |
|---|---|---|
| 2998. | ATTENDING | 7 |
| 2999. | AVI | 7 |
| 3000. | AWAKE | 7 |
| 3001. | BALL | 7 |
| 3002. | BARKING | 7 |
| 3003. | BARNEY | 7 |
| 3004. | BARREL | 7 |
| 3005. | BATHROOM | 7 |
| 3006. | BATTERIES | 7 |
| 3007. | BBS | 7 |
| 3008. | BEHIND | 7 |
| 3009. | BENT | 7 |
| 3010. | BERT | 7 |
| 3011. | BIGGER | 7 |
| 3012. | BIN | 7 |
| 3013. | BITCH | 7 |
| 3014. | BITE | 7 |
| 3015. | BLK | 7 |
| 3016. | BLUE | 7 |
| 3017. | BMW | 7 |
| 3018. | BNN | 7 |
| 3019. | BOOTH | 7 |
| 3020. | BORED | 7 |
| 3021. | BOSTON | 7 |
| 3022. | BOUT | 7 |
| 3023. | BPN | 7 |
| 3024. | BRENDAN | 7 |
| 3025. | BURNS | 7 |
| 3026. | BUSTAMANTE | 7 |
| 3027. | CABS | 7 |
| 3028. | CAMBRIDGE | 7 |
| 3029. | CAMPO | 7 |
| 3030. | CANCELED | 7 |

-128-

DOCKET NO.: PAGE01-00116                                             PATENT

| NO.   | PHRASE      | FREQUENCY |
|-------|-------------|-----------|
| 3031. | CANTON      | 7         |
| 3032. | CAPSULE     | 7         |
| 3033. | CASING      | 7         |
| 3034. | CATHERINE   | 7         |
| 3035. | CB          | 7         |
| 3036. | CBS         | 7         |
| 3037. | CHARGER     | 7         |
| 3038. | CHARLOTTE   | 7         |
| 3039. | CHEN        | 7         |
| 3040. | CHIEF       | 7         |
| 3041. | CHRISTIAN   | 7         |
| 3042. | CLR         | 7         |
| 3043. | COLUMBUS    | 7         |
| 3044. | CONCERNING  | 7         |
| 3045. | CONCORD     | 7         |
| 3046. | CONTRACTION | 7         |
| 3047. | COUNTER     | 7         |
| 3048. | COUNTRY     | 7         |
| 3049. | CRITICAL    | 7         |
| 3050. | CW          | 7         |
| 3051. | DAC         | 7         |
| 3052. | DECORATIVE  | 7         |
| 3053. | DERRICK     | 7         |
| 3054. | DESPITE     | 7         |
| 3055. | DETERMINE   | 7         |
| 3056. | DEVELOPMENT | 7         |
| 3057. | DG          | 7         |
| 3058. | DIS         | 7         |
| 3059. | DISREGARD   | 7         |
| 3060. | DIV         | 7         |
| 3061. | DRY         | 7         |
| 3062. | DYING       | 7         |
| 3063. | ECHO        | 7         |

-129-

DOCKET NO.: PAGE01-00116  PATENT

| NO. | PHRASE | FREQUENCY |
|---|---|---|
| 3064. | EFFECT | 7 |
| 3065. | EFFECTIVE | 7 |
| 3066. | ELEV | 7 |
| 3067. | ELLIS | 7 |
| 3068. | EMERALD | 7 |
| 3069. | ENRON | 7 |
| 3070. | EXERCISES | 7 |
| 3071. | EXPECTED | 7 |
| 3072. | EXPECTING | 7 |
| 3073. | FABRIC | 7 |
| 3074. | FAST | 7 |
| 3075. | FATHER | 7 |
| 3076. | FE | 7 |
| 3077. | FLOW | 7 |
| 3078. | FRAME | 7 |
| 3079. | FRIENDSHIP | 7 |
| 3080. | FU | 7 |
| 3081. | FUSA | 7 |
| 3082. | GCAS | 7 |
| 3083. | GEORGETTE | 7 |
| 3084. | GIBBONS | 7 |
| 3085. | GIRLS | 7 |
| 3086. | GOIN | 7 |
| 3087. | GONZALES | 7 |
| 3088. | GRACE | 7 |
| 3089. | GRAY | 7 |
| 3090. | HANSEN | 7 |
| 3091. | HE'LL | 7 |
| 3092. | HEADS | 7 |
| 3093. | HENNING | 7 |
| 3094. | HERB | 7 |
| 3095. | HIA | 7 |
| 3096. | HO | 7 |

DOCKET NO.: PAGE01-00116                                              PATENT

| NO.   | PHRASE     | FREQUENCY |
|-------|------------|-----------|
| 3097. | HOSE       | 7         |
| 3098. | HUGHES     | 7         |
| 3099. | HUNG       | 7         |
| 3100. | HV         | 7         |
| 3101. | HYATT      | 7         |
| 3102. | I'D        | 7         |
| 3103. | INDU       | 7         |
| 3104. | INTERSTATE | 7         |
| 3105. | JC         | 7         |
| 3106. | JEANNE     | 7         |
| 3107. | JEMS       | 7         |
| 3108. | JESSICA    | 7         |
| 3109. | JOEY       | 7         |
| 3110. | JUANITA    | 7         |
| 3111. | KE         | 7         |
| 3112. | KEMERER    | 7         |
| 3113. | KIND       | 7         |
| 3114. | KITCHEN    | 7         |
| 3115. | KJ         | 7         |
| 3116. | KWIK       | 7         |
| 3117. | LEAD       | 7         |
| 3118. | LEAGUE     | 7         |
| 3119. | LEAKS      | 7         |
| 3120. | LESTER     | 7         |
| 3121. | LETTERS    | 7         |
| 3122. | LIFT       | 7         |
| 3123. | LIQUO      | 7         |
| 3124. | LIZA       | 7         |
| 3125. | LOU        | 7         |
| 3126. | LOWALERT   | 7         |
| 3127. | LOWS       | 7         |
| 3128. | LTD        | 7         |
| 3129. | LTE        | 7         |

-131-

DOCKET NO.: PAGE01-00116                                           PATENT

| NO.   | PHRASE       | FREQUENCY |
|-------|--------------|-----------|
| 3130. | LUMPC        | 7         |
| 3131. | MADISON      | 7         |
| 3132. | MARCUS       | 7         |
| 3133. | MARVIN       | 7         |
| 3134. | MARY'S       | 7         |
| 3135. | MCC          | 7         |
| 3136. | MCDONALD     | 7         |
| 3137. | MERRICK      | 7         |
| 3138. | METROPOLITAN | 7         |
| 3139. | MIDLAND      | 7         |
| 3140. | MIGRATION    | 7         |
| 3141. | MM           | 7         |
| 3142. | MODS         | 7         |
| 3143. | MOST         | 7         |
| 3144. | MSA          | 7         |
| 3145. | MSAMUEL      | 7         |
| 3146. | MTN          | 7         |
| 3147. | MZ           | 7         |
| 3148. | NAMES        | 7         |
| 3149. | NAS          | 7         |
| 3150. | NERVE        | 7         |
| 3151. | METCOM       | 7         |
| 3152. | NG           | 7         |
| 3153. | NISAA        | 7         |
| 3154. | NORMAL       | 7         |
| 3155. | NORMAN       | 7         |
| 3156. | NORTHERN     | 7         |
| 3157. | NTS          | 7         |
| 3158. | OCONNORC     | 7         |
| 3159. | OCTOB        | 7         |
| 3160. | OFFER        | 7         |
| 3161. | OGULNICK     | 7         |
| 3162. | ONTO         | 7         |

-132-

DOCKET NO.: PAGE01-00116                                    PATENT

| NO.   | PHRASE       | FREQUENCY |
|-------|--------------|-----------|
| 3163. | ORTIZ        | 7         |
| 3164. | OUTAGES      | 7         |
| 3165. | PANEL        | 7         |
| 3166. | PANTRY       | 7         |
| 3167. | PARKWAY      | 7         |
| 3168. | PATEL        | 7         |
| 3169. | PAYCHECK     | 7         |
| 3170. | PB           | 7         |
| 3171. | PENN         | 7         |
| 3172. | PHILIP       | 7         |
| 3173. | PICKED       | 7         |
| 3174. | PINKS        | 7         |
| 3175. | PIZZA        | 7         |
| 3176. | PKWY         | 7         |
| 3177. | PLEASECALL   | 7         |
| 3178. | PLMTRGN      | 7         |
| 3179. | POOL         | 7         |
| 3180. | POOR         | 7         |
| 3181. | PRE          | 7         |
| 3182. | PRETTY       | 7         |
| 3183. | PRINTED      | 7         |
| 3184. | PRINTS       | 7         |
| 3185. | PRODCICS     | 7         |
| 3186. | PRODUCTIVITY | 7         |
| 3187. | PUP          | 7         |
| 3188. | QUIK         | 7         |
| 3189. | RAFAEL       | 7         |
| 3190. | RAINBOW      | 7         |
| 3191. | REACHED      | 7         |
| 3192. | REASONS      | 7         |
| 3193. | RECENT       | 7         |
| 3194. | RECEPTIONIST | 7         |
| 3195. | RECF         | 7         |

-133-

DOCKET NO.: PAGE01-00116                                    PATENT

| NO.   | PHRASE     | FREQUENCY |
|-------|------------|-----------|
| 3196. | REMOVE     | 7         |
| 3197. | RENT       | 7         |
| 3198. | RET        | 7         |
| 3199. | REX        | 7         |
| 3200. | REYNOLDS   | 7         |
| 3201. | RICE       | 7         |
| 3202. | ROBERTO    | 7         |
| 3203. | RODRIGUES  | 7         |
| 3204. | RPTS       | 7         |
| 3205. | SABER      | 7         |
| 3206. | SAC        | 7         |
| 3207. | SAGE       | 7         |
| 3208. | SAND       | 7         |
| 3209. | SCHECHE    | 7         |
| 3210. | SCW        | 7         |
| 3211. | SEAL       | 7         |
| 3212. | SERIAL     | 7         |
| 3213. | SERVICED   | 7         |
| 3214. | SETS       | 7         |
| 3215. | SHAW'S     | 7         |
| 3216. | SHELL      | 7         |
| 3217. | SHINLIEVER | 7         |
| 3218. | SHOWER     | 7         |
| 3219. | SHOWS      | 7         |
| 3220. | SHUTTING   | 7         |
| 3221. | SIMPLE     | 7         |
| 3222. | SITUATION  | 7         |
| 3223. | SLEEP      | 7         |
| 3224. | SLEEPY     | 7         |
| 3225. | SLIP       | 7         |
| 3226. | SMILE      | 7         |
| 3227. | SNOW       | 7         |
| 3228. | SOLD       | 7         |

-134-

DOCKET NO.: PAGE01-00116                                    PATENT

| NO.   | PHRASE    | FREQUENCY |
|-------|-----------|-----------|
| 3229. | SPB       | 7         |
| 3230. | SQ        | 7         |
| 3231. | STATEMENT | 7         |
| 3232. | STEF      | 7         |
| 3233. | STK       | 7         |
| 3234. | STO       | 7         |
| 3235. | STORAGE   | 7         |
| 3236. | SURGERY   | 7         |
| 3237. | TALKS     | 7         |
| 3238. | TANK      | 7         |
| 3239. | TECHNICAL | 7         |
| 3240. | TECHNO    | 7         |
| 3241. | TELNETED  | 7         |
| 3242. | TEXACO    | 7         |
| 3243. | THH       | 7         |
| 3244. | THOMSON   | 7         |
| 3245. | TMRW      | 7         |
| 3246. | TOLEDO    | 7         |
| 3247. | TOMMOROW  | 7         |
| 3248. | TOR       | 7         |
| 3249. | TPP       | 7         |
| 3250. | TRANS     | 7         |
| 3251. | TRAVEL    | 7         |
| 3252. | TRENT     | 7         |
| 3253. | TROY      | 7         |
| 3254. | TSTORMS   | 7         |
| 3255. | UNIVE     | 7         |
| 3256. | UNIVERSAL | 7         |
| 3257. | UNLIMITED | 7         |
| 3258. | USAA      | 7         |
| 3259. | V'S       | 7         |
| 3260. | VAC       | 7         |
| 3261. | VANTIVE   | 7         |

DOCKET NO.: PAGE01-00116					PATENT

| NO. | PHRASE | FREQUENCY |
|---|---|---|
| 3262. | VC | 7 |
| 3263. | VENUS | 7 |
| 3264. | VICTORIA | 7 |
| 3265. | WADE | 7 |
| 3266. | WALMART | 7 |
| 3267. | WALT | 7 |
| 3268. | WANDA | 7 |
| 3269. | WEBSTER | 7 |
| 3270. | WELAND | 7 |
| 3271. | WEV | 7 |
| 3272. | WHOSE | 7 |
| 3273. | WISH | 7 |
| 3274. | WOLFSON | 7 |
| 3275. | WOODS | 7 |
| 3276. | WRENCH | 7 |
| 3277. | WY | 7 |
| 3278. | WYOMING | 7 |
| 3279. | XXXXX | 7 |
| 3280. | YORK | 7 |
| 3281. | YOU'VE | 7 |
| 3282. | ZIP | 7 |
| 3283. | ACCEPT | 6 |
| 3284. | ACCIDENT | 6 |
| 3285. | ACG | 6 |
| 3286. | ACTIVATED | 6 |
| 3287. | ADAMS | 6 |
| 3288. | ADD'L | 6 |
| 3289. | ADERMAN | 6 |
| 3290. | ADHOC | 6 |
| 3291. | ADRIAN | 6 |
| 3292. | AID | 6 |
| 3293. | ALEXANDER | 6 |
| 3294. | ALIVE | 6 |

DOCKET NO.: PAGE01-00116                                    PATENT

| NO.   | PHRASE     | FREQUENCY |
|-------|------------|-----------|
| 3295. | ANNETTE    | 6 |
| 3296. | APPARENTLY | 6 |
| 3297. | APPLS      | 6 |
| 3298. | ARAFAT     | 6 |
| 3299. | ASSIGNMENT | 6 |
| 3300. | ASSISTANCE | 6 |
| 3301. | AVIANCA    | 6 |
| 3302. | AWAS       | 6 |
| 3303. | BACKED     | 6 |
| 3304. | BADLY      | 6 |
| 3305. | BALTIMORE  | 6 |
| 3306. | BARTON     | 6 |
| 3307. | BASEMENT   | 6 |
| 3308. | BASYE      | 6 |
| 3309. | BEAVER     | 6 |
| 3310. | BELIEVE    | 6 |
| 3311. | BEND       | 6 |
| 3312. | BENNY      | 6 |
| 3313. | BEV        | 6 |
| 3314. | BEVERLY    | 6 |
| 3315. | BEWARE     | 6 |
| 3316. | BF         | 6 |
| 3317. | BK         | 6 |
| 3318. | BLEW       | 6 |
| 3319. | BO         | 6 |
| 3320. | BOTTLE     | 6 |
| 3321. | BOXING     | 6 |
| 3322. | BOYNTON    | 6 |
| 3323. | BRAVO      | 6 |
| 3324. | BRETT      | 6 |
| 3325. | BRICOLAGE  | 6 |
| 3326. | BUEHRING   | 6 |
| 3327. | BUNCHES    | 6 |

DOCKET NO.: PAGE01-00116                                                      PATENT

| NO.   | PHRASE      | FREQUENCY |
|-------|-------------|-----------|
| 3328. | BUTT        | 6         |
| 3329. | BYPASSED    | 6         |
| 3330. | CAB         | 6         |
| 3331. | CABINET     | 6         |
| 3332. | CABLEVISION | 6         |
| 3333. | CANCELLING  | 6         |
| 3334. | CANDICE     | 6         |
| 3335. | CANNON      | 6         |
| 3336. | CAPE        | 6         |
| 3337. | CAPITOL     | 6         |
| 3338. | CAPS        | 6         |
| 3339. | CARA        | 6         |
| 3340. | CAREFUL     | 6         |
| 3341. | CAUSING     | 6         |
| 3342. | CFF         | 6         |
| 3343. | CHARLENE    | 6         |
| 3344. | CHARLESTO   | 6         |
| 3345. | CHELL       | 6         |
| 3346. | CHRISTY'S   | 6         |
| 3347. | CLAIMS      | 6         |
| 3348. | CLAUDIA     | 6         |
| 3349. | CLEAT       | 6         |
| 3350. | CLH         | 6         |
| 3351. | CLIENTS     | 6         |
| 3352. | CLINTON     | 6         |
| 3353. | COBB        | 6         |
| 3354. | COCA        | 6         |
| 3355. | COLLECTION  | 6         |
| 3356. | COLLEGE     | 6         |
| 3357. | COMMUNITY   | 6         |
| 3358. | COMPUSERVE  | 6         |
| 3359. | COMUNIQUE   | 6         |
| 3360. | CONNECTIONS | 6         |

-138-

DOCKET NO.: PAGE01-00116                                    PATENT

| NO.   | PHRASE       | FREQUENCY |
|-------|--------------|-----------|
| 3361. | CONSTANTLY   | 6         |
| 3362. | CONTAINED    | 6         |
| 3363. | CONTEL       | 6         |
| 3364. | CONVENTION   | 6         |
| 3365. | COOLER       | 6         |
| 3366. | COPYING      | 6         |
| 3367. | CORRECTED    | 6         |
| 3368. | COST         | 6         |
| 3369. | COTTAGE      | 6         |
| 3370. | COUPON       | 6         |
| 3371. | COVERAGE     | 6         |
| 3372. | CPYS         | 6         |
| 3373. | CREAM        | 6         |
| 3374. | CST          | 6         |
| 3375. | CTVV         | 6         |
| 3376. | CUELLAR      | 6         |
| 3377. | CUSTEMP      | 6         |
| 3378. | CZ           | 6         |
| 3379. | DAMAGE       | 6         |
| 3380. | DARREN       | 6         |
| 3381. | DEADLINE     | 6         |
| 3382. | DELIVERIES   | 6         |
| 3383. | DEMO         | 6         |
| 3384. | DESIG        | 6         |
| 3385. | DIRECTIONS   | 6         |
| 3386. | DIRT         | 6         |
| 3387. | DISCONNECTED | 6         |
| 3388. | DISPLAY      | 6         |
| 3389. | DIST         | 6         |
| 3390. | DOCK         | 6         |
| 3391. | DOESNT       | 6         |
| 3392. | DOLLAR       | 6         |
| 3393. | DOWNSINCE    | 6         |

-139-

DOCKET NO.: PAGE01-00116                              PATENT

| NO.   | PHRASE      | FREQUENCY |
|-------|-------------|-----------|
| 3394. | DRAW        | 6         |
| 3395. | DRINK       | 6         |
| 3396. | DRUM        | 6         |
| 3397. | DSF         | 6         |
| 3398. | DTMF        | 6         |
| 3399. | DUPLI       | 6         |
| 3400. | DXXXB       | 6         |
| 3401. | EACHHAVE    | 6         |
| 3402. | EDT         | 6         |
| 3403. | EJV         | 6         |
| 3404. | ELEC        | 6         |
| 3405. | ELENA       | 6         |
| 3406. | EMPTY       | 6         |
| 3407. | ENGINEERING | 6         |
| 3408. | EQUIFAX     | 6         |
| 3409. | EXPRESS     | 6         |
| 3410. | EXTERNAL    | 6         |
| 3411. | FAI         | 6         |
| 3412. | FALL        | 6         |
| 3413. | FARMER      | 6         |
| 3414. | FAULT       | 6         |
| 3415. | FENTON      | 6         |
| 3416. | FERNANDINA  | 6         |
| 3417. | FLAT        | 6         |
| 3418. | FLR         | 6         |
| 3419. | FLUID       | 6         |
| 3420. | FLY         | 6         |
| 3421. | FLYNN       | 6         |
| 3422. | FOG         | 6         |
| 3423. | FOO         | 6         |
| 3424. | FOOT        | 6         |
| 3425. | FREEZER     | 6         |
| 3426. | GABBY       | 6         |

DOCKET NO.: PAGE01-00116                                    PATENT

| NO. | PHRASE | FREQUENCY |
|---|---|---|
| 3427. | GEN | 6 |
| 3428. | GERALD | 6 |
| 3429. | GI | 6 |
| 3430. | GIOVANNI | 6 |
| 3431. | GIRLFRIEND | 6 |
| 3432. | GIVING | 6 |
| 3433. | GJC | 6 |
| 3434. | GLENDALE | 6 |
| 3435. | GOD | 6 |
| 3436. | GOLF | 6 |
| 3437. | GOTAY | 6 |
| 3438. | GRAB | 6 |
| 3439. | GRAPHICS | 6 |
| 3440. | GREATEST | 6 |
| 3441. | GWVL | 6 |
| 3442. | HABLO | 6 |
| 3443. | HAIR | 6 |
| 3444. | HAND | 6 |
| 3445. | HANGING | 6 |
| 3446. | HARRISON | 6 |
| 3447. | HAYNES | 6 |
| 3448. | HEADING | 6 |
| 3449. | HEARDANYTHING | 6 |
| 3450. | HEAT | 6 |
| 3451. | HENDERSON | 6 |
| 3452. | HICAP | 6 |
| 3453. | HINES | 6 |
| 3454. | HISTORY | 6 |
| 3455. | HOLA | 6 |
| 3456. | HOLIDAY | 6 |
| 3457. | HOOK | 6 |
| 3458. | HOPKINS | 6 |
| 3459. | HPPOWERON | 6 |

DOCKET NO.: PAGE01-00116                                    PATENT

| NO.   | PHRASE        | FREQUENCY |
|-------|---------------|-----------|
| 3460. | HPUX          | 6         |
| 3461. | HTC           | 6         |
| 3462. | HUDSON        | 6         |
| 3463. | HUEBNER       | 6         |
| 3464. | HUG           | 6         |
| 3465. | IDEA          | 6         |
| 3466. | II            | 6         |
| 3467. | ILY           | 6         |
| 3468. | IMM           | 6         |
| 3469. | INCLUDING     | 6         |
| 3470. | INIT          | 6         |
| 3471. | INT'L         | 6         |
| 3472. | INTERMITTMENT | 6         |
| 3473. | INVESTIGATION | 6         |
| 3474. | IPX           | 6         |
| 3475. | ISDOWN        | 6         |
| 3476. | ISSUES        | 6         |
| 3477. | ISTRYING      | 6         |
| 3478. | ISUP          | 6         |
| 3479. | ITMSGLOG      | 6         |
| 3480. | ITNOW         | 6         |
| 3481. | JEJ           | 6         |
| 3482. | JERICHO       | 6         |
| 3483. | JK            | 6         |
| 3484. | JOBNAME       | 6         |
| 3485. | JORDAN        | 6         |
| 3486. | JOY           | 6         |
| 3487. | JRB           | 6         |
| 3488. | JUDITH        | 6         |
| 3489. | JUMP          | 6         |
| 3490. | KAMINSKI      | 6         |
| 3491. | KATHERINE     | 6         |
| 3492. | KATHLEEN      | 6         |

-142-

DOCKET NO.: PAGE01-00116                                                      PATENT

| NO.   | PHRASE     | FREQUENCY |
|-------|------------|-----------|
| 3493. | KATIE      | 6         |
| 3494. | KBCC       | 6         |
| 3495. | KC         | 6         |
| 3496. | KELLEY     | 6         |
| 3497. | KELLI      | 6         |
| 3498. | KERXIS     | 6         |
| 3499. | KJY        | 6         |
| 3500. | KKJBJ      | 6         |
| 3501. | KNOWS      | 6         |
| 3502. | KOREA      | 6         |
| 3503. | KYLE       | 6         |
| 3504. | LABS       | 6         |
| 3505. | LACC       | 6         |
| 3506. | LC         | 6         |
| 3507. | LEHR       | 6         |
| 3508. | LEONARD    | 6         |
| 3509. | LG         | 6         |
| 3510. | LIGHTING   | 6         |
| 3511. | LIQU       | 6         |
| 3512. | LLAMAME    | 6         |
| 3513. | LMC        | 6         |
| 3514. | LMH        | 6         |
| 3515. | LOGISTICS  | 6         |
| 3516. | LORENZO    | 6         |
| 3517. | LOSS       | 6         |
| 3518. | LOUIS      | 6         |
| 3519. | LOWCOPY    | 6         |
| 3520. | LUCERNE    | 6         |
| 3521. | LUCK       | 6         |
| 3522. | LUV        | 6         |
| 3523. | MABLE      | 6         |
| 3524. | MAD        | 6         |
| 3525. | MAGISTRATE | 6         |

-143-

DOCKET NO.: PAGE01-00116                                      PATENT

| NO.   | PHRASE    | FREQUENCY |
|-------|-----------|-----------|
| 3526. | MARCIA    | 6         |
| 3527. | MARSHAL   | 6         |
| 3528. | MARTIN'S  | 6         |
| 3529. | MARYANN   | 6         |
| 3530. | MCAFEE    | 6         |
| 3531. | MEG       | 6         |
| 3532. | MEMORIAL  | 6         |
| 3533. | MENTION   | 6         |
| 3534. | MESS      | 6         |
| 3535. | MGAMD     | 6         |
| 3536. | MGT       | 6         |
| 3537. | MICHEAL   | 6         |
| 3538. | MICROSOFT | 6         |
| 3539. | MIDWEST   | 6         |
| 3540. | MINUTOS   | 6         |
| 3541. | MITTELST  | 6         |
| 3542. | MJT       | 6         |
| 3543. | MK        | 6         |
| 3544. | MOMS      | 6         |
| 3545. | MONARCH   | 6         |
| 3546. | MORABITO  | 6         |
| 3547. | MOUSE     | 6         |
| 3548. | MSGLOG    | 6         |
| 3549. | MUSTANG   | 6         |
| 3550. | MWINCSTN  | 6         |
| 3551. | NAMED     | 6         |
| 3552. | NARRITIVE | 6         |
| 3553. | NAZ       | 6         |
| 3554. | NB        | 6         |
| 3555. | NCC       | 6         |
| 3556. | NCPOST    | 6         |
| 3557. | NEG       | 6         |
| 3558. | NOISES    | 6         |

DOCKET NO.: PAGE01-00116                                          PATENT

| NO.   | PHRASE        | FREQUENCY |
|-------|---------------|-----------|
| 3559. | NOS           | 6         |
| 3560. | NOTICED       | 6         |
| 3561. | NOTIFY        | 6         |
| 3562. | NOVE          | 6         |
| 3563. | NTWKPLNG      | 6         |
| 3564. | NUMERIC       | 6         |
| 3565. | NVR           | 6         |
| 3566. | OFFERING      | 6         |
| 3567. | OFFICER       | 6         |
| 3568. | OMNI          | 6         |
| 3569. | OUNCE         | 6         |
| 3570. | PACIENTE      | 6         |
| 3571. | PAGESENTRY    | 6         |
| 3572. | PAPERS        | 6         |
| 3573. | PARELLO       | 6         |
| 3574. | PASSCODE      | 6         |
| 3575. | PATRICE       | 6         |
| 3576. | PAULA         | 6         |
| 3577. | PEACH         | 6         |
| 3578. | PEACHTREE     | 6         |
| 3579. | PHARMA        | 6         |
| 3580. | PHOTOCIRCUITS | 6         |
| 3581. | PILLOW        | 6         |
| 3582. | PITMAN        | 6         |
| 3583. | PLNGCP        | 6         |
| 3584. | PLO           | 6         |
| 3585. | PLUG          | 6         |
| 3586. | PLUMBING      | 6         |
| 3587. | PLUTO         | 6         |
| 3588. | POLICY        | 6         |
| 3589. | POLIPLAZA     | 6         |
| 3590. | POSTED        | 6         |
| 3591. | PP            | 6         |

-145-

DOCKET NO.: PAGE01-00116                                    PATENT

| NO.   | PHRASE     | FREQUENCY |
|-------|------------|-----------|
| 3592. | PPD        | 6         |
| 3593. | PRACTICE   | 6         |
| 3594. | PRB        | 6         |
| 3595. | PREVIEW    | 6         |
| 3596. | PREVIOUS   | 6         |
| 3597. | PRKWY      | 6         |
| 3598. | PROJECTS   | 6         |
| 3599. | PROMOTION  | 6         |
| 3600. | PROOF      | 6         |
| 3601. | PROPERLY   | 6         |
| 3602. | PROS       | 6         |
| 3603. | PSF        | 6         |
| 3604. | PULLED     | 6         |
| 3605. | PWD        | 6         |
| 3606. | QCLASS     | 6         |
| 3607. | QINTER     | 6         |
| 3608. | QUIERO     | 6         |
| 3609. | QUIT       | 6         |
| 3610. | RAN        | 6         |
| 3611. | RAZ        | 6         |
| 3612. | REACTIVATE | 6         |
| 3613. | REAR       | 6         |
| 3614. | REBECCA    | 6         |
| 3615. | RECIEVED   | 6         |
| 3616. | REDALERT   | 6         |
| 3617. | REDIRECT   | 6         |
| 3618. | REGINA     | 6         |
| 3619. | REMOVED    | 6         |
| 3620. | REPORTING  | 6         |
| 3621. | RESTORE    | 6         |
| 3622. | REVISED    | 6         |
| 3623. | RHODES     | 6         |
| 3624. | RICKY      | 6         |

-146-

DOCKET NO.: PAGE01-00116                                    PATENT

| NO.   | PHRASE       | FREQUENCY |
|-------|--------------|-----------|
| 3625. | ROBLES       | 6         |
| 3626. | RODRIGUEZ    | 6         |
| 3627. | ROLLER       | 6         |
| 3628. | ROOMS        | 6         |
| 3629. | ROSALIE      | 6         |
| 3630. | RSLVD        | 6         |
| 3631. | RYETOWN      | 6         |
| 3632. | SA           | 6         |
| 3633. | SANDERS      | 6         |
| 3634. | SAYING       | 6         |
| 3635. | SCH          | 6         |
| 3636. | SCHED        | 6         |
| 3637. | SCREW        | 6         |
| 3638. | SEA          | 6         |
| 3639. | SEC          | 6         |
| 3640. | SECRETARY    | 6         |
| 3641. | SECTION      | 6         |
| 3642. | SEEMS        | 6         |
| 3643. | SELF         | 6         |
| 3644. | SERIOUS      | 6         |
| 3645. | SERVICEGUARD | 6         |
| 3646. | SETPARM      | 6         |
| 3647. | SETTING      | 6         |
| 3648. | SEXY         | 6         |
| 3649. | SFTWR        | 6         |
| 3650. | SHAWANA      | 6         |
| 3651. | SHE'LL       | 6         |
| 3652. | SHEBA        | 6         |
| 3653. | SHIT         | 6         |
| 3654. | SHOT         | 6         |
| 3655. | SHOWED       | 6         |
| 3656. | SHOWERS      | 6         |
| 3657. | SILVA        | 6         |

-147-

DOCKET NO.: PAGE01-00116					PATENT

| NO. | PHRASE | FREQUENCY |
|---|---|---|
| 3658. | SINA | 6 |
| 3659. | SINK | 6 |
| 3660. | SLIDES | 6 |
| 3661. | SODSTART | 6 |
| 3662. | SONNY | 6 |
| 3663. | SOONER | 6 |
| 3664. | SOUNDNET | 6 |
| 3665. | SOUTHERN | 6 |
| 3666. | SOUTHWORTH | 6 |
| 3667. | SPECS | 6 |
| 3668. | SPK | 6 |
| 3669. | SPM | 6 |
| 3670. | SPOT | 6 |
| 3671. | SPY | 6 |
| 3672. | STABALIZED | 6 |
| 3673. | STACYG | 6 |
| 3674. | STEVENS | 6 |
| 3675. | STILLIN | 6 |
| 3676. | STOCKS | 6 |
| 3677. | STONEBROOK | 6 |
| 3678. | STRAY | 6 |
| 3679. | SULLIVAN | 6 |
| 3680. | SVOBODA | 6 |
| 3681. | SWW | 6 |
| 3682. | TABLETS | 6 |
| 3683. | TAHOE | 6 |
| 3684. | TALKING | 6 |
| 3685. | TAO | 6 |
| 3686. | TARRYT | 6 |
| 3687. | TEGRETOL | 6 |
| 3688. | TELLING | 6 |
| 3689. | TERM | 6 |
| 3690. | TEXTILE | 6 |

DOCKET NO.: PAGE01-00116 PATENT

| NO. | PHRASE | FREQUENCY |
|---|---|---|
| 3691. | TIFFANY | 6 |
| 3692. | TIRKS | 6 |
| 3693. | TNR | 6 |
| 3694. | TOMER | 6 |
| 3695. | TOWARDS | 6 |
| 3696. | TRACKING | 6 |
| 3697. | TRISH | 6 |
| 3698. | TRUCKING | 6 |
| 3699. | TS | 6 |
| 3700. | TULSA | 6 |
| 3701. | TWR | 6 |
| 3702. | UNIV | 6 |
| 3703. | VALUE | 6 |
| 3704. | VARIED | 6 |
| 3705. | VCR | 6 |
| 3706. | VDUMP | 6 |
| 3707. | VEGAS | 6 |
| 3708. | VOCAB | 6 |
| 3709. | VOICEMAIL | 6 |
| 3710. | VPR | 6 |
| 3711. | VR | 6 |
| 3712. | VRINT | 6 |
| 3713. | WASU | 6 |
| 3714. | WDI | 6 |
| 3715. | WE'LL | 6 |
| 3716. | WEVVG | 6 |
| 3717. | WFA | 6 |
| 3718. | WHATEVER | 6 |
| 3719. | WHEAT | 6 |
| 3720. | WHIS | 6 |
| 3721. | WICVRD | 6 |
| 3722. | WILLOW | 6 |
| 3723. | WINBEEP | 6 |

DOCKET NO.: PAGE01-00116                                    PATENT

| NO.   | PHRASE      | FREQUENCY |
|-------|-------------|-----------|
| 3724. | WINTER      | 6         |
| 3725. | WOBBLE      | 6         |
| 3726. | XOXOXO      | 6         |
| 3727. | XXX         | 6         |
| 3728. | XXXXXOOOOO  | 6         |
| 3729. | Z'          | 6         |
| 3730. | ZHBGJXG     | 6         |
| 3731. | ZIPXFER     | 6         |
| 3732. | ABS         | 5         |
| 3733. | ACCEPTING   | 5         |
| 3734. | ACROSS      | 5         |
| 3735. | ACTION      | 5         |
| 3736. | ACTIVATION  | 5         |
| 3737. | AJ          | 5         |
| 3738. | ALBERT      | 5         |
| 3739. | ALI         | 5         |
| 3740. | ALLISON     | 5         |
| 3741. | ALVAREZ     | 5         |
| 3742. | AMANDA      | 5         |
| 3743. | ANGEL       | 5         |
| 3744. | ANGELES     | 5         |
| 3745. | ANGELO      | 5         |
| 3746. | ANYWAYS     | 5         |
| 3747. | APPLETON    | 5         |
| 3748. | APPROVAL    | 5         |
| 3749. | APRIA       | 5         |
| 3750. | AQUI        | 5         |
| 3751. | AREN'T      | 5         |
| 3752. | ARM         | 5         |
| 3753. | ARROW       | 5         |
| 3754. | ARROWHEAD`  | 5         |
| 3755. | ASH         | 5         |
| 3756. | ASHLEY      | 5         |

-150-

DOCKET NO.: PAGE01-00116                                    PATENT

| NO.   | PHRASE    | FREQUENCY |
|-------|-----------|-----------|
| 3757. | ATTY      | 5 |
| 3758. | AUTHORIT  | 5 |
| 3759. | AUTHORITY | 5 |
| 3760. | AUTOHALER | 5 |
| 3761. | AVAIL     | 5 |
| 3762. | AVSLC     | 5 |
| 3763. | AWARE     | 5 |
| 3764. | AWHILE    | 5 |
| 3765. | AX        | 5 |
| 3766. | AY        | 5 |
| 3767. | AYS       | 5 |
| 3768. | BASH      | 5 |
| 3769. | BEE       | 5 |
| 3770. | BEGIN     | 5 |
| 3771. | BEGINNING | 5 |
| 3772. | BEHALF    | 5 |
| 3773. | BELFROM   | 5 |
| 3774. | BELMONT   | 5 |
| 3775. | BELOW     | 5 |
| 3776. | BENTLEY   | 5 |
| 3777. | BERRY     | 5 |
| 3778. | BILLY     | 5 |
| 3779. | BIRD      | 5 |
| 3780. | BNCD      | 5 |
| 3781. | BNEWT     | 5 |
| 3782. | BOBB      | 5 |
| 3783. | BOBBIE    | 5 |
| 3784. | BOGGS     | 5 |
| 3785. | BOONE     | 5 |
| 3786. | BOOTING   | 5 |
| 3787. | BOWLING   | 5 |
| 3788. | BRADLEY   | 5 |
| 3789. | BRENT     | 5 |

DOCKET NO.: PAGE01-00116 PATENT

| NO. | PHRASE | FREQUENCY |
|---|---|---|
| 3790. | BRK | 5 |
| 3791. | BRKN | 5 |
| 3792. | BROOKE | 5 |
| 3793. | BROOKS | 5 |
| 3794. | BS | 5 |
| 3795. | BT | 5 |
| 3796. | BUENAS | 5 |
| 3797. | BUFFY | 5 |
| 3798. | BUS | 5 |
| 3799. | BX | 5 |
| 3800. | CADILLAC | 5 |
| 3801. | CAH | 5 |
| 3802. | CALLSIN | 5 |
| 3803. | CANADA | 5 |
| 3804. | CAPITAL | 5 |
| 3805. | CARMEN | 5 |
| 3806. | CARRY | 5 |
| 3807. | CARTER | 5 |
| 3808. | CATALOG | 5 |
| 3809. | CE | 5 |
| 3810. | CELESTE | 5 |
| 3811. | CENTNNIAL | 5 |
| 3812. | CHALLENGER | 5 |
| 3813. | CHEST | 5 |
| 3814. | CHICKEN | 5 |
| 3815. | CHILD | 5 |
| 3816. | CHIPS | 5 |
| 3817. | CHRISTIE | 5 |
| 3818. | CLAIRE | 5 |
| 3819. | CLASSES | 5 |
| 3820. | CLD | 5 |
| 3821. | CLLD | 5 |
| 3822. | CLOSINGS | 5 |

DOCKET NO.: PAGE01-00116								PATENT

| NO. | PHRASE | FREQUENCY |
|---|---|---|
| 3823. | CLYDE | 5 |
| 3824. | COAT | 5 |
| 3825. | COLE | 5 |
| 3826. | COLEMAN | 5 |
| 3827. | COMPUTERS | 5 |
| 3828. | CONDMAIN | 5 |
| 3829. | CONFUSION | 5 |
| 3830. | CONSULTORIO | 5 |
| 3831. | CONVERSATION | 5 |
| 3832. | COOK | 5 |
| 3833. | COORDINATORS | 5 |
| 3834. | COPIER | 5 |
| 3835. | CORBO | 5 |
| 3836. | COUNTING | 5 |
| 3837. | COVER | 5 |
| 3838. | COX | 5 |
| 3839. | CPR | 5 |
| 3840. | CRATE | 5 |
| 3841. | CREST | 5 |
| 3842. | CUMBERLAND | 5 |
| 3843. | CURTIS | 5 |
| 3844. | CUTTING | 5 |
| 3845. | CY | 5 |
| 3846. | CYPRESS | 5 |
| 3847. | DANNON | 5 |
| 3848. | DAUGHTERS | 5 |
| 3849. | DBF | 5 |
| 3850. | DDTQRM | 5 |
| 3851. | DEATILS | 5 |
| 3852. | DECK | 5 |
| 3853. | DELI | 5 |
| 3854. | DELTE | 5 |
| 3855. | DENA | 5 |

-153-

DOCKET NO.: PAGE01-00116 PATENT

| NO. | PHRASE | FREQUENCY |
|---|---|---|
| 3856. | DESIREE | 5 |
| 3857. | DI | 5 |
| 3858. | DIAMOND | 5 |
| 3859. | DIRECTLY | 5 |
| 3860. | DIRECTORY | 5 |
| 3861. | DISCOVERED | 5 |
| 3862. | DISTRIBUTION | 5 |
| 3863. | DODGE | 5 |
| 3864. | DOMAIN | 5 |
| 3865. | DRAWINGS | 5 |
| 3866. | DRESSING | 5 |
| 3867. | DRIZZLE | 5 |
| 3868. | DSP | 5 |
| 3869. | DUAL | 5 |
| 3870. | DWIGHT | 5 |
| 3871. | EARLIEST | 5 |
| 3872. | EATING | 5 |
| 3873. | EBONY | 5 |
| 3874. | EH | 5 |
| 3875. | ELEMENTARY | 5 |
| 3876. | ELI | 5 |
| 3877. | EMS | 5 |
| 3878. | ENGINE | 5 |
| 3879. | ENGLAND | 5 |
| 3880. | ENTERED | 5 |
| 3881. | EQUAL | 5 |
| 3882. | ERIN | 5 |
| 3883. | ERNST | 5 |
| 3884. | ESB | 5 |
| 3885. | ESPOSA | 5 |
| 3886. | EXCEEDED | 5 |
| 3887. | EXCHANGE | 5 |
| 3888. | EXGN | 5 |

-154-

DOCKET NO.: PAGE01-00116                                              PATENT

| NO.   | PHRASE      | FREQUENCY |
|-------|-------------|-----------|
| 3889. | EXPLAIN     | 5         |
| 3890. | EYES        | 5         |
| 3891. | FACILITY    | 5         |
| 3892. | FARM        | 5         |
| 3893. | FATAL       | 5         |
| 3894. | FAV         | 5         |
| 3895. | FAXING      | 5         |
| 3896. | FAY         | 5         |
| 3897. | FAYE        | 5         |
| 3898. | FEE         | 5         |
| 3899. | FEEDBACK    | 5         |
| 3900. | FELLOW      | 5         |
| 3901. | FERN        | 5         |
| 3902. | FERNANDO    | 5         |
| 3903. | FERNY       | 5         |
| 3904. | FILESYSTEMS | 5         |
| 3905. | FILTER      | 5         |
| 3906. | FINALLY     | 5         |
| 3907. | FIRED       | 5         |
| 3908. | FIRSEL      | 5         |
| 3909. | FLASHING    | 5         |
| 3910. | FLOOD       | 5         |
| 3911. | FLOODED     | 5         |
| 3912. | FM          | 5         |
| 3913. | FOLDING     | 5         |
| 3914. | FONTA       | 5         |
| 3915. | FOREVER     | 5         |
| 3916. | FRANKFORT   | 5         |
| 3917. | FREEMAN     | 5         |
| 3918. | FREEPO      | 5         |
| 3919. | FREQ        | 5         |
| 3920. | FROMTODAY   | 5         |
| 3921. | FUCKING     | 5         |

DOCKET NO.: PAGE01-00116                                              PATENT

| NO.   | PHRASE    | FREQUENCY |
|-------|-----------|-----------|
| 3922. | FULTON    | 5         |
| 3923. | FUNNY     | 5         |
| 3924. | FUSACOM   | 5         |
| 3925. | GATES     | 5         |
| 3926. | GELLA     | 5         |
| 3927. | GERI      | 5         |
| 3928. | GERRY     | 5         |
| 3929. | GETTHIS   | 5         |
| 3930. | GETYOU    | 5         |
| 3931. | GIOIA     | 5         |
| 3932. | GLAD      | 5         |
| 3933. | GLOMPH    | 5         |
| 3934. | GRANDE    | 5         |
| 3935. | GRAYBAR'S | 5         |
| 3936. | GRAYBARS  | 5         |
| 3937. | GRETCHEN  | 5         |
| 3938. | GROCERY   | 5         |
| 3939. | GROUPS    | 5         |
| 3940. | GUARD     | 5         |
| 3941. | GUNSTEN   | 5         |
| 3942. | GUS       | 5         |
| 3943. | GUTTERS   | 5         |
| 3944. | GWINNETT  | 5         |
| 3945. | HALLS     | 5         |
| 3946. | HAPPENS   | 5         |
| 3947. | HASA      | 5         |
| 3948. | HASTINGS  | 5         |
| 3949. | HATE      | 5         |
| 3950. | HAVEN     | 5         |
| 3951. | HAVENT    | 5         |
| 3952. | HAWAII    | 5         |
| 3953. | HB        | 5         |
| 3954. | HDEZ      | 5         |

DOCKET NO.: PAGE01-00116                                              PATENT

| NO.   | PHRASE        | FREQUENCY |
|-------|---------------|-----------|
| 3955. | HEALTHCARE    | 5 |
| 3956. | HEART         | 5 |
| 3957. | HELVEY        | 5 |
| 3958. | HERE'S        | 5 |
| 3959. | HIRING        | 5 |
| 3960. | HJ            | 5 |
| 3961. | HOLDERS       | 5 |
| 3962. | HOLLAND       | 5 |
| 3963. | HOLLY         | 5 |
| 3964. | HOOD          | 5 |
| 3965. | HOTLINE       | 5 |
| 3966. | HREF          | 5 |
| 3967. | HT            | 5 |
| 3968. | HTML          | 5 |
| 3969. | HUGH          | 5 |
| 3970. | HUH           | 5 |
| 3971. | HURT          | 5 |
| 3972. | ICON          | 5 |
| 3973. | IMPORT        | 5 |
| 3974. | INCONVENIENCE | 5 |
| 3975. | INDIAN        | 5 |
| 3976. | INDICE        | 5 |
| 3977. | INLAND        | 5 |
| 3978. | INPUT         | 5 |
| 3979. | INSPECTION    | 5 |
| 3980. | INSTALLER     | 5 |
| 3981. | INTAKE        | 5 |
| 3982. | INTER         | 5 |
| 3983. | INTERNATIONAL | 5 |
| 3984. | INTERVIEW     | 5 |
| 3985. | INTHE         | 5 |
| 3986. | INTOLEDO      | 5 |
| 3987. | INVOICES      | 5 |

-157-

DOCKET NO.: PAGE01-00116                                             PATENT

| NO.   | PHRASE      | FREQUENCY |
|-------|-------------|-----------|
| 3988. | INVOICING   | 5         |
| 3989. | INVOLVED    | 5         |
| 3990. | ISLE        | 5         |
| 3991. | IVAN        | 5         |
| 3992. | JAM'D       | 5         |
| 3993. | JCLENDENNEN | 5         |
| 3994. | JEANNETTE   | 5         |
| 3995. | JEREMY      | 5         |
| 3996. | JERICH      | 5         |
| 3997. | JESUS       | 5         |
| 3998. | JIMN        | 5         |
| 3999. | JM          | 5         |
| 4000. | JOHNS       | 5         |
| 4001. | JONATHAN    | 5         |
| 4002. | JTHOMAS     | 5         |
| 4003. | JUNK        | 5         |
| 4004. | JUSTIN      | 5         |
| 4005. | KAT         | 5         |
| 4006. | KENNY       | 5         |
| 4007. | KERRY       | 5         |
| 4008. | KF          | 5         |
| 4009. | KID         | 5         |
| 4010. | KISSES      | 5         |
| 4011. | KNITWEAR    | 5         |
| 4012. | LAFAYETTE   | 5         |
| 4013. | LANGFORD    | 5         |
| 4014. | LARGE       | 5         |
| 4015. | LEROY       | 5         |
| 4016. | LEW         | 5         |
| 4017. | LFT         | 5         |
| 4018. | LIFELINE    | 5         |
| 4019. | LIKELY      | 5         |
| 4020. | LIL         | 5         |

DOCKET NO.: PAGE01-00116                                    PATENT

| NO.   | PHRASE      | FREQUENCY |
|-------|-------------|-----------|
| 4021. | LISTED      | 5         |
| 4022. | LISTS       | 5         |
| 4023. | LIVE        | 5         |
| 4024. | LIVES       | 5         |
| 4025. | LIVING      | 5         |
| 4026. | LOADED      | 5         |
| 4027. | LOTUS       | 5         |
| 4028. | LOUIE       | 5         |
| 4029. | LYNNE       | 5         |
| 4030. | LYONS       | 5         |
| 4031. | MACHINES    | 5         |
| 4032. | MACOLA      | 5         |
| 4033. | MACY'C      | 5         |
| 4034. | MAGNOLIA    | 5         |
| 4035. | MAMA        | 5         |
| 4036. | MANANA      | 5         |
| 4037. | MANDATORY   | 5         |
| 4038. | MANHAR      | 5         |
| 4039. | MANN        | 5         |
| 4040. | MARGE       | 5         |
| 4041. | MARINA      | 5         |
| 4042. | MARKETING   | 5         |
| 4043. | MARS        | 5         |
| 4044. | MARSHA      | 5         |
| 4045. | MARTI       | 5         |
| 4046. | MARTINEZ'S  | 5         |
| 4047. | MARV        | 5         |
| 4048. | MAS         | 5         |
| 4049. | MATERIALS   | 5         |
| 4050. | MAXAIR      | 5         |
| 4051. | MAYFIELD    | 5         |
| 4052. | MBNA        | 5         |
| 4053. | MCK         | 5         |

DOCKET NO.: PAGE01-00116                                    PATENT

| NO.   | PHRASE          | FREQUENCY |
|-------|-----------------|-----------|
| 4054. | MECHANICAL      | 5         |
| 4055. | MEDICA          | 5         |
| 4056. | MELINDA         | 5         |
| 4057. | MEMBERS         | 5         |
| 4058. | MESQUITE        | 5         |
| 4059. | METALS          | 5         |
| 4060. | MH              | 5         |
| 4061. | MIKE'S          | 5         |
| 4062. | MILE            | 5         |
| 4063. | MILES           | 5         |
| 4064. | MINE            | 5         |
| 4065. | MINIUTTM        | 5         |
| 4066. | MIRIAM          | 5         |
| 4067. | MN              | 5         |
| 4068. | MOM'S           | 5         |
| 4069. | MOMENT          | 5         |
| 4070. | MOON            | 5         |
| 4071. | MOUNTS          | 5         |
| 4072. | MOVIE           | 5         |
| 4073. | MSR             | 5         |
| 4074. | MTY             | 5         |
| 4075. | MWINFWOP        | 5         |
| 4076. | MWINGRWD        | 5         |
| 4077. | MYRTLE          | 5         |
| 4078. | NATURAL         | 5         |
| 4079. | NEARLY          | 5         |
| 4080. | NECESITO        | 5         |
| 4081. | NEWBOLD         | 5         |
| 4082. | NIGHTLY         | 5         |
| 4083. | NINA            | 5         |
| 4084. | NK              | 5         |
| 4085. | NNNNNNNNNNNNNN  | 5         |
| 4086. | NOMINA          | 5         |

-160-

DOCKET NO.: PAGE01-00116                                        PATENT

| NO.   | PHRASE     | FREQUENCY |
|-------|------------|-----------|
| 4087. | NORTHLAKE  | 5 |
| 4088. | NORWOOD    | 5 |
| 4089. | NTE        | 5 |
| 4090. | NWE        | 5 |
| 4091. | NYIBDF     | 5 |
| 4092. | OAKS       | 5 |
| 4093. | OMAHA      | 5 |
| 4094. | ONCOLOGY   | 5 |
| 4095. | ONPM       | 5 |
| 4096. | OPERATOR   | 5 |
| 4097. | OPTIONAL   | 5 |
| 4098. | OUTPUT     | 5 |
| 4099. | OWE        | 5 |
| 4100. | OZARKA     | 5 |
| 4101. | OZONE      | 5 |
| 4102. | PACKAGING  | 5 |
| 4103. | PADS       | 5 |
| 4104. | PAINT      | 5 |
| 4105. | PARSONS    | 5 |
| 4106. | PASSWD     | 5 |
| 4107. | PAVEME     | 5 |
| 4108. | PEDI       | 5 |
| 4109. | PEPSI      | 5 |
| 4110. | PERFORMED  | 5 |
| 4111. | PERMIT     | 5 |
| 4112. | PETERSON   | 5 |
| 4113. | PHA        | 5 |
| 4114. | PHARMAC    | 5 |
| 4115. | PIECE      | 5 |
| 4116. | PLACED     | 5 |
| 4117. | PLAYING    | 5 |
| 4118. | PLEASANT   | 5 |
| 4119. | POWERPOINT | 5 |

-161-

DOCKET NO.: PAGE01-00116  PATENT

| NO. | PHRASE | FREQUENCY |
|---|---|---|
| 4120. | PPR | 5 |
| 4121. | PRATT | 5 |
| 4122. | PREFER | 5 |
| 4123. | PRELIMINARY | 5 |
| 4124. | PRENDE | 5 |
| 4125. | PRESENT | 5 |
| 4126. | PRESIDENT | 5 |
| 4127. | PRESTON | 5 |
| 4128. | PRINCESS | 5 |
| 4129. | PROBS | 5 |
| 4130. | PROPULSID | 5 |
| 4131. | PROTOPSE | 5 |
| 4132. | PRUEBA | 5 |
| 4133. | PTCLDY | 5 |
| 4134. | PULSO | 5 |
| 4135. | PURCHASE | 5 |
| 4136. | PURGE | 5 |
| 4137. | PUTTING | 5 |
| 4138. | RAISINS | 5 |
| 4139. | RAMOS | 5 |
| 4140. | RASH | 5 |
| 4141. | RATE | 5 |
| 4142. | RDY | 5 |
| 4143. | REBATE | 5 |
| 4144. | RECREATION | 5 |
| 4145. | REGIONAL | 5 |
| 4146. | REMEMBERED | 5 |
| 4147. | REPLACEMENT | 5 |
| 4148. | REPLY | 5 |
| 4149. | RESOURCE | 5 |
| 4150. | RIDGE | 5 |
| 4151. | RIGHTS | 5 |
| 4152. | RIPPED | 5 |

-162-

DOCKET NO.: PAGE01-00116                                    PATENT

| NO. | PHRASE | FREQUENCY |
|---|---|---|
| 4153. | RL | 5 |
| 4154. | ROCKVI | 5 |
| 4155. | RODERL | 5 |
| 4156. | ROG | 5 |
| 4157. | ROSA | 5 |
| 4158. | ROUND | 5 |
| 4159. | ORWLAND | 5 |
| 4160. | ROXANOL | 5 |
| 4161. | RTA | 5 |
| 4162. | RUBEN | 5 |
| 4163. | RUTLEDGE | 5 |
| 4164. | RYC | 5 |
| 4165. | SALAS | 5 |
| 4166. | SAMMY | 5 |
| 4167. | SATURDAY | 5 |
| 4168. | SCAN | 5 |
| 4169. | SELECTEDLOCATE | 5 |
| 4170. | SENDER | 5 |
| 4171. | SENIOR | 5 |
| 4172. | SERENA | 5 |
| 4173. | SERVERS | 5 |
| 4174. | SGW | 5 |
| 4175. | SHEIKHM | 5 |
| 4176. | SHERRI | 5 |
| 4177. | SHERRIE | 5 |
| 4178. | SHIPPING | 5 |
| 4179. | SHOWN | 5 |
| 4180. | SHREDDED | 5 |
| 4181. | SIGNATURE | 5 |
| 4182. | SKINNER | 5 |
| 4183. | SOOOO | 5 |
| 4184. | SPARKS | 5 |
| 4185. | SPEAKER | 5 |

DOCKET NO.: PAGE01-00116                    PATENT

| NO.   | PHRASE      | FREQUENCY |
|-------|-------------|-----------|
| 4186. | SPI         | 5         |
| 4187. | SPICER      | 5         |
| 4188. | SPNB        | 5         |
| 4189. | SPRAY       | 5         |
| 4190. | SPS         | 5         |
| 4191. | SST         | 5         |
| 4192. | STAIRS      | 5         |
| 4193. | STANTON     | 5         |
| 4194. | STAYING     | 5         |
| 4195. | STRUCTURE   | 5         |
| 4196. | STU         | 5         |
| 4197. | STUNNING    | 5         |
| 4198. | SUBMITTED   | 5         |
| 4199. | SUBURBAN    | 5         |
| 4200. | SUCCESSFULL | 5         |
| 4201. | SUCESSFULL  | 5         |
| 4202. | SUMMA       | 5         |
| 4203. | SUNDAY      | 5         |
| 4204. | SURGE       | 5         |
| 4205. | SUZIE       | 5         |
| 4206. | TAP         | 5         |
| 4207. | TAS         | 5         |
| 4208. | TEA         | 5         |
| 4209. | TEAR        | 5         |
| 4210. | TECHNOLOGY  | 5         |
| 4211. | TEN         | 5         |
| 4212. | TERMINALS   | 5         |
| 4213. | TERNES      | 5         |
| 4214. | TESAR       | 5         |
| 4215. | TEXMEX      | 5         |
| 4216. | THEY'RE     | 5         |
| 4217. | THXS        | 5         |
| 4218. | TILE        | 5         |

-164-

DOCKET NO.: PAGE01-00116                                    PATENT

| NO.   | PHRASE       | FREQUENCY |
|-------|--------------|-----------|
| 4219. | TIRED        | 5         |
| 4220. | TIRES        | 5         |
| 4221. | TISHA        | 5         |
| 4222. | TK           | 5         |
| 4223. | TOBY         | 5         |
| 4224. | TOGASHI      | 5         |
| 4225. | TONES        | 5         |
| 4226. | TONIE        | 5         |
| 4227. | TOW          | 5         |
| 4228. | TRANSMISSION | 5         |
| 4229. | TRANSMITTED  | 5         |
| 4230. | TRANSPORT    | 5         |
| 4231. | TRAP         | 5         |
| 4232. | TRUAN        | 5         |
| 4233. | TRUNK        | 5         |
| 4234. | TUB          | 5         |
| 4235. | UGH          | 5         |
| 4236. | UNA          | 5         |
| 4237. | UNK          | 5         |
| 4238. | UNO          | 5         |
| 4239. | UNREGISTERED | 5         |
| 4240. | UPDATER      | 5         |
| 4241. | UPGRADE      | 5         |
| 4242. | UTIL         | 5         |
| 4243. | VAL          | 5         |
| 4244. | VALVE        | 5         |
| 4245. | VANESSA      | 5         |
| 4246. | VCAGENT      | 5         |
| 4247. | VG           | 5         |
| 4248. | VIRUS        | 5         |
| 4249. | VISITING     | 5         |
| 4250. | VISITS       | 5         |
| 4251. | VISTA        | 5         |

-165-

DOCKET NO.: PAGE01-00116                                    PATENT

| NO.   | PHRASE     | FREQUENCY |
|-------|------------|-----------|
| 4252. | VITAMIN    | 5         |
| 4253. | VOIC       | 5         |
| 4254. | VOY        | 5         |
| 4255. | WAKER      | 5         |
| 4256. | WAL        | 5         |
| 4257. | WALNUT     | 5         |
| 4258. | WARE       | 5         |
| 4259. | WARR       | 5         |
| 4260. | WE'VE      | 5         |
| 4261. | WEBSTORAGE | 5         |
| 4262. | WEDS       | 5         |
| 4263. | WH         | 5         |
| 4264. | WHIPPED    | 5         |
| 4265. | WHOEVER    | 5         |
| 4266. | WHOLESAL   | 5         |
| 4267. | WIL        | 5         |
| 4268. | WILLIE     | 5         |
| 4269. | WILLTRY    | 5         |
| 4270. | WILMA      | 5         |
| 4271. | WINDY      | 5         |
| 4272. | WINSTON    | 5         |
| 4273. | WKZ        | 5         |
| 4274. | WOMAN      | 5         |
| 4275. | WOODY      | 5         |
| 4276. | WRIGHT     | 5         |
| 4277. | XOXO       | 5         |
| 4278. | XT         | 5         |
| 4279. | YOGURT     | 5         |
| 4280. | ZUNIGA     | 5         |
| 4281. | ABSOLUTELY | 4         |
| 4282. | ACADEMY    | 4         |
| 4283. | ACCEPTED   | 4         |
| 4284. | ACCESSING  | 4         |

-166-

DOCKET NO.: PAGE01-00116                                              PATENT

| NO.   | PHRASE          | FREQUENCY |
|-------|-----------------|-----------|
| 4285. | ACCORDING       | 4         |
| 4286. | ACECOL          | 4         |
| 4287. | ACHILLES        | 4         |
| 4288. | ADDR            | 4         |
| 4289. | ADVANCED        | 4         |
| 4290. | ADVERTISING     | 4         |
| 4291. | ALAMO           | 4         |
| 4292. | ALB             | 4         |
| 4293. | ALISA           | 4         |
| 4294. | ALLA            | 4         |
| 4295. | ALLIANT         | 4         |
| 4296. | ALLOWANCE       | 4         |
| 4297. | ALTERNATIVE     | 4         |
| 4298. | AMEX            | 4         |
| 4299. | AMIA            | 4         |
| 4300. | AMIPRO          | 4         |
| 4301. | ANDGET          | 4         |
| 4302. | ANDOVER         | 4         |
| 4303. | ANNEX           | 4         |
| 4304. | ANWZYZZWZNXZWZ  | 4         |
| 4305. | ANZ             | 4         |
| 4306. | ANZSZJLW        | 4         |
| 4307. | APPLICATION     | 4         |
| 4308. | APPLICATIONS    | 4         |
| 4309. | APPROVE         | 4         |
| 4310. | APTS            | 4         |
| 4311. | ARIZONA         | 4         |
| 4312. | ARMY            | 4         |
| 4313. | ASONMS          | 4         |
| 4314. | ASSHOLE         | 4         |
| 4315. | ASSIGN          | 4         |
| 4316. | ATIVAN          | 4         |
| 4317. | ATTEMPTING      | 4         |

-167-

DOCKET NO.: PAGE01-00116　　　　　　　　　　　　　　　　　　　　　　　PATENT

| NO. | PHRASE | FREQUENCY |
|---|---|---|
| 4318. | ATTORDR | 4 |
| 4319. | AUSTIN | 4 |
| 4320. | AVTUL | 4 |
| 4321. | BACKING | 4 |
| 4322. | BACKLINE | 4 |
| 4323. | BASED | 4 |
| 4324. | BASTON | 4 |
| 4325. | BBB | 4 |
| 4326. | BCK | 4 |
| 4327. | BEAN | 4 |
| 4328. | BEARS | 4 |
| 4329. | BECKERMAN | 4 |
| 4330. | BEER | 4 |
| 4331. | BEES | 4 |
| 4332. | BENJAMIN | 4 |
| 4333. | BENNETT | 4 |
| 4334. | BERTHA | 4 |
| 4335. | BETTE'S | 4 |
| 4336. | BETTYT | 4 |
| 4337. | BIDSTEST | 4 |
| 4338. | BLOCKED | 4 |
| 4339. | BOAT | 4 |
| 4340. | BOO | 4 |
| 4341. | BOOTED | 4 |
| 4342. | BOTHER | 4 |
| 4343. | BOTTOM | 4 |
| 4344. | BOUGHT | 4 |
| 4345. | BOYD | 4 |
| 4346. | BP | 4 |
| 4347. | BRADY | 4 |
| 4348. | BRANDON | 4 |
| 4349. | BRDGE | 4 |
| 4350. | BREAD | 4 |

DOCKET NO.: PAGE01-00116                                    PATENT

| NO.   | PHRASE    | FREQUENCY |
|-------|-----------|-----------|
| 4351. | BROCK     | 4         |
| 4352. | BROOK     | 4         |
| 4353. | BROS      | 4         |
| 4354. | BROTHERS  | 4         |
| 4355. | BROWARD   | 4         |
| 4356. | BROWSE    | 4         |
| 4357. | BROWSER   | 4         |
| 4358. | BTW       | 4         |
| 4359. | BU        | 4         |
| 4360. | BUDGET    | 4         |
| 4361. | BURDINE   | 4         |
| 4362. | BURGER    | 4         |
| 4363. | BURGNER   | 4         |
| 4364. | BURNING   | 4         |
| 4365. | BURTON    | 4         |
| 4366. | BWZZ      | 4         |
| 4367. | BYTE      | 4         |
| 4368. | BYTES     | 4         |
| 4369. | CAFAROT   | 4         |
| 4370. | CALICO    | 4         |
| 4371. | CAMERON   | 4         |
| 4372. | CANCELING | 4         |
| 4373. | CANCELL   | 4         |
| 4374. | CAPLETS   | 4         |
| 4375. | CAROLE    | 4         |
| 4376. | CARRO     | 4         |
| 4377. | CARROLL   | 4         |
| 4378. | CAS       | 4         |
| 4379. | CASEY     | 4         |
| 4380. | CASSETTE  | 4         |
| 4381. | CAT'S     | 4         |
| 4382. | CATCH     | 4         |
| 4383. | CBMX      | 4         |

DOCKET NO.: PAGE01-00116                                              PATENT

| NO.   | PHRASE       | FREQUENCY |
|-------|--------------|-----------|
| 4384. | CEILING      | 4         |
| 4385. | CELULAR      | 4         |
| 4386. | CENT         | 4         |
| 4387. | CENTS        | 4         |
| 4388. | CERTIFICATE  | 4         |
| 4389. | CHAIRMASTERS | 4         |
| 4390. | CHAS         | 4         |
| 4391. | CHASE        | 4         |
| 4392. | CHIC         | 4         |
| 4393. | CHOOSE       | 4         |
| 4394. | CIRCUS       | 4         |
| 4395. | CKED         | 4         |
| 4396. | CKMARK       | 4         |
| 4397. | CLA          | 4         |
| 4398. | CLAIR        | 4         |
| 4399. | CLAVE        | 4         |
| 4400. | CLEOLA       | 4         |
| 4401. | CLINICAL     | 4         |
| 4402. | CLINT        | 4         |
| 4403. | CLOCK        | 4         |
| 4404. | CLOGGED      | 4         |
| 4405. | CLOUDS       | 4         |
| 4406. | CM           | 4         |
| 4407. | CNT          | 4         |
| 4408. | CODY         | 4         |
| 4409. | COHEN        | 4         |
| 4410. | COIL         | 4         |
| 4411. | COLL         | 4         |
| 4412. | COLLEEN      | 4         |
| 4413. | COLORADO     | 4         |
| 4414. | COMES        | 4         |
| 4415. | COMMENTS     | 4         |
| 4416. | COMMITTED    | 4         |

DOCKET NO.: PAGE01-00116                                       PATENT

| NO.   | PHRASE       | FREQUENCY |
|-------|--------------|-----------|
| 4417. | COMMONWEALTH | 4         |
| 4418. | CONCERNED    | 4         |
| 4419. | CONDOS       | 4         |
| 4420. | CONFIG       | 4         |
| 4421. | CONFIGURED   | 4         |
| 4422. | CONGRESS     | 4         |
| 4423. | CONSECUTIVE  | 4         |
| 4424. | CONSERVE     | 4         |
| 4425. | CONTAINER    | 4         |
| 4426. | CONTE        | 4         |
| 4427. | CONV         | 4         |
| 4428. | COR          | 4         |
| 4429. | COULDNT      | 4         |
| 4430. | COURTS       | 4         |
| 4431. | COVERS       | 4         |
| 4432. | CPY          | 4         |
| 4433. | CREW         | 4         |
| 4434. | CREWS        | 4         |
| 4435. | CRJ          | 4         |
| 4436. | CRK          | 4         |
| 4437. | CSG          | 4         |
| 4438. | CSM          | 4         |
| 4439. | CTH          | 4         |
| 4440. | CTNS         | 4         |
| 4441. | CTY          | 4         |
| 4442. | CUCIS        | 4         |
| 4443. | CULVER       | 4         |
| 4444. | DANIELS      | 4         |
| 4445. | DARYL        | 4         |
| 4446. | DATAB        | 4         |
| 4447. | DAWSON       | 4         |
| 4448. | DBM          | 4         |
| 4449. | DEAR         | 4         |

-171-

DOCKET NO.: PAGE01-00116                                    PATENT

| NO.   | PHRASE   | FREQUENCY |
|-------|----------|-----------|
| 4450. | DEEP     | 4 |
| 4451. | DEKALB   | 4 |
| 4452. | DELL     | 4 |
| 4453. | DENTON   | 4 |
| 4454. | DENION   | 4 |
| 4455. | DENTAL   | 4 |
| 4456. | DENTON   | 4 |
| 4457. | DEP      | 4 |
| 4458. | DESERVE  | 4 |
| 4459. | DET      | 4 |
| 4460. | DICUS    | 4 |
| 4461. | DIEGO    | 4 |
| 4462. | DINO     | 4 |
| 4463. | DIRECT   | 4 |
| 4464. | DIRECTOR | 4 |
| 4465. | DISNEY   | 4 |
| 4466. | DISTANCE | 4 |
| 4467. | DK       | 4 |
| 4468. | DLN      | 4 |
| 4469. | DMV      | 4 |
| 4470. | DNA      | 4 |
| 4471. | DOAN     | 4 |
| 4472. | DOCTOR'S | 4 |
| 4473. | DOIT     | 4 |
| 4474. | DOMINO   | 4 |
| 4475. | DOT      | 4 |
| 4476. | DRIVERS  | 4 |
| 4477. | DTR      | 4 |
| 4478. | DUANE    | 4 |
| 4479. | DUBOIS   | 4 |
| 4480. | DUDLEY   | 4 |
| 4481. | DUR      | 4 |
| 4482. | DUV      | 4 |

-172-

DOCKET NO.: PAGE01-00116                                   PATENT

| NO.   | PHRASE     | FREQUENCY |
|-------|------------|-----------|
| 4483. | DWAYNE     | 4 |
| 4484. | DZ         | 4 |
| 4485. | EEA        | 4 |
| 4486. | EASY       | 4 |
| 4487. | EDGAR      | 4 |
| 4488. | EICHENBAUM | 4 |
| 4489. | ELECT      | 4 |
| 4490. | ELIJAH     | 4 |
| 4491. | ELLIOT     | 4 |
| 4492. | ELLIOTT    | 4 |
| 4493. | EMILY      | 4 |
| 4494. | EMPLOYMENT | 4 |
| 4495. | ENULATORS  | 4 |
| 4496. | ENGLISH    | 4 |
| 4497. | ENJOY      | 4 |
| 4498. | ENTERPRISE | 4 |
| 4499. | ENVELOPES  | 4 |
| 4500. | EOMER      | 4 |
| 4501. | ERIKA      | 4 |
| 4502. | ESPERA     | 4 |
| 4503. | ETSP       | 4 |
| 4504. | ETZEL      | 4 |
| 4505. | EUGENE     | 4 |
| 4506. | EVIE       | 4 |
| 4507. | EXACTLY    | 4 |
| 4508. | EXCEPT     | 4 |
| 4509. | EXE        | 4 |
| 4510. | EXECUTIVE  | 4 |
| 4511. | EXEL       | 4 |
| 4512. | EXISTING   | 4 |
| 4513. | EXPIRES    | 4 |
| 4514. | EXTENSION  | 4 |
| 4515. | EXTRA      | 4 |

-173-

DOCKET NO.: PAGE01-00116                                              PATENT

| NO.   | PHRASE     | FREQUENCY |
|-------|------------|-----------|
| 4516. | FACE       | 4         |
| 4517. | FACTORY    | 4         |
| 4518. | FAM        | 4         |
| 4519. | FARES      | 4         |
| 4520. | FASHION    | 4         |
| 4521. | FB         | 4         |
| 4522. | FC         | 4         |
| 4523. | FERRIS     | 4         |
| 4524. | FIBER      | 4         |
| 4525. | FIGURE     | 4         |
| 4526. | FIN        | 4         |
| 4527. | FIRM       | 4         |
| 4528. | FLAGLER    | 4         |
| 4529. | FLASH      | 4         |
| 4530. | FLEX       | 4         |
| 4531. | FLO        | 4         |
| 4532. | FLOR       | 4         |
| 4533. | FLOSS      | 4         |
| 4534. | FLOUR      | 4         |
| 4535. | FLU        | 4         |
| 4536. | FLUSHI     | 4         |
| 4537. | FMC        | 4         |
| 4538. | FOLSOM     | 4         |
| 4539. | FORREST    | 4         |
| 4540. | FOUNTAIN   | 4         |
| 4541. | FOX        | 4         |
| 4542. | FRAM       | 4         |
| 4543. | FRANCINE   | 4         |
| 4544. | FRANZ      | 4         |
| 4545. | FRIENDS    | 4         |
| 4546. | FRODO      | 4         |
| 4547. | FUNCTIONAL | 4         |
| 4548. | FUNERAL    | 4         |

-174-

DOCKET NO.: PAGE01-00116                                      PATENT

| NO.   | PHRASE    | FREQUENCY |
|-------|-----------|-----------|
| 4549. | FYYA      | 4         |
| 4550. | GABLES    | 4         |
| 4551. | GANG      | 4         |
| 4552. | GAYNA     | 4         |
| 4553. | GB        | 4         |
| 4554. | GENESIS   | 4         |
| 4555. | GEORGIA   | 4         |
| 4556. | GERA      | 4         |
| 4557. | GEYER     | 4         |
| 4558. | GIFT      | 4         |
| 4559. | GIL       | 4         |
| 4560. | GLOBAL    | 4         |
| 4561. | GOLD      | 4         |
| 4562. | GONZALEZ  | 4         |
| 4563. | GONZALO   | 4         |
| 4564. | GOODNIGHT | 4         |
| 4565. | GR        | 4         |
| 4566. | GRCI      | 4         |
| 4567. | GREGORY   | 4         |
| 4568. | GROCER    | 4         |
| 4569. | GROSS     | 4         |
| 4570. | GRP       | 4         |
| 4571. | GRZZZJN   | 4         |
| 4572. | GTES      | 4         |
| 4573. | GUILLERMO | 4         |
| 4574. | GUSEK     | 4         |
| 4575. | GWEN      | 4         |
| 4576. | HABER     | 4         |
| 4577. | HADN'T    | 4         |
| 4578. | HAL       | 4         |
| 4579. | HALE      | 4         |
| 4580. | HALLMA    | 4         |
| 4581. | HAR       | 4         |

-175-

DOCKET NO.: PAGE01-00116                                    PATENT

| NO.   | PHRASE      | FREQUENCY |
|-------|-------------|-----------|
| 4582. | HARDLY      | 4         |
| 4583. | HARDW       | 4         |
| 4584. | HARDWAR     | 4         |
| 4585. | HARMON      | 4         |
| 4586. | HART        | 4         |
| 4587. | HATCH       | 4         |
| 4588. | HAYWARD     | 4         |
| 4589. | HCGS        | 4         |
| 4590. | HDWRLPTP    | 4         |
| 4591. | HEATER      | 4         |
| 4592. | HEIGHTS     | 4         |
| 4593. | HEINEKEN    | 4         |
| 4594. | HELD        | 4         |
| 4595. | HELPING     | 4         |
| 4596. | HEMPSTEAD   | 4         |
| 4597. | HENDLER     | 4         |
| 4598. | HERMAN      | 4         |
| 4599. | HGTV        | 4         |
| 4600. | HICKS       | 4         |
| 4601. | HIMMELFARB  | 4         |
| 4602. | HITACHI     | 4         |
| 4603. | HON         | 4         |
| 4604. | HOPPER      | 4         |
| 4605. | HOSPIT      | 4         |
| 4606. | HOUSES      | 4         |
| 4607. | HOWS        | 4         |
| 4608. | HPG         | 4         |
| 4609. | HPJ         | 4         |
| 4610. | HRSC        | 4         |
| 4611. | HYDE        | 4         |
| 4612. | IC          | 4         |
| 4613. | IG          | 4         |
| 4614. | IJ          | 4         |

-176-

DOCKET NO.: PAGE01-00116                                              PATENT

| NO.   | PHRASE      | FREQUENCY |
|-------|-------------|-----------|
| 4615. | ILOVE       | 4         |
| 4616. | ILSOU       | 4         |
| 4617. | IMPORTS     | 4         |
| 4618. | INCLUDES    | 4         |
| 4619. | INDUSTRIE   | 4         |
| 4620. | INFECTION   | 4         |
| 4621. | INIP        | 4         |
| 4622. | INJURY      | 4         |
| 4623. | INQ         | 4         |
| 4624. | INST        | 4         |
| 4625. | INTERESTING | 4         |
| 4626. | INVALID     | 4         |
| 4627. | INVENTORY   | 4         |
| 4628. | IONE        | 4         |
| 4629. | IRIS        | 4         |
| 4630. | JANNA       | 4         |
| 4631. | JEANNIE     | 4         |
| 4632. | JERI        | 4         |
| 4633. | JESSIE      | 4         |
| 4634. | JFK         | 4         |
| 4635. | JILL        | 4         |
| 4636. | JIMBO       | 4         |
| 4637. | JJJDK       | 4         |
| 4638. | JJJDS       | 4         |
| 4639. | JJJDW       | 4         |
| 4640. | JJJGSJKZ    | 4         |
| 4641. | JJJGT       | 4         |
| 4642. | JJJGWZZZ    | 4         |
| 4643. | JJJGY       | 4         |
| 4644. | JMM         | 4         |
| 4645. | JOANIE      | 4         |
| 4646. | JODY        | 4         |
| 4647. | JOLIE       | 4         |

-177-

DOCKET NO.: PAGE01-00116                                        PATENT

| NO. | PHRASE | FREQUENCY |
|---|---|---|
| 4648. | JOURNAL | 4 |
| 4649. | JOYC | 4 |
| 4650. | JULIO | 4 |
| 4651. | JVLNET | 4 |
| 4652. | JZZKZZJZ | 4 |
| 4653. | KAISER | 4 |
| 4654. | KARL | 4 |
| 4655. | KARYN | 4 |
| 4656. | KEENAN | 4 |
| 4657. | KENNEDY | 4 |
| 4658. | KHAN | 4 |
| 4659. | KIA | 4 |
| 4660. | KICKOFF | 4 |
| 4661. | KILOBITS | 4 |
| 4662. | KIMBERLY | 4 |
| 4663. | KJYN | 4 |
| 4664. | KLONOPIN | 4 |
| 4665. | KMM | 4 |
| 4666. | KONA | 4 |
| 4667. | KRISTIN | 4 |
| 4668. | KRISTY | 4 |
| 4669. | KROGER | 4 |
| 4670. | KT | 4 |
| 4671. | KZ | 4 |
| 4672. | KZYV | 4 |
| 4673. | LAINE | 4 |
| 4674. | LANCASTER | 4 |
| 4675. | LANCE | 4 |
| 4676. | LANID | 4 |
| 4677. | LANIER | 4 |
| 4678. | LANSERVER | 4 |
| 4679. | LATROB | 4 |
| 4680. | LAUNDRY | 4 |

-178-

DOCKET NO.: PAGE01-00116                                                          PATENT

| NO. | PHRASE | FREQUENCY |
|---|---|---|
| 4681. | LAUREN | 4 |
| 4682. | LAWRENCE | 4 |
| 4683. | LCSMVS | 4 |
| 4684. | LEARN | 4 |
| 4685. | LEATHERN | 4 |
| 4686. | LERITTA | 4 |
| 4687. | LES | 4 |
| 4688. | LETTING | 4 |
| 4689. | LEVINE | 4 |
| 4690. | LF | 4 |
| 4691. | LIMITS | 4 |
| 4692. | LOAN | 4 |
| 4693. | LOC | 4 |
| 4694. | LOCATE | 4 |
| 4695. | LOGGED | 4 |
| 4696. | LOGGER | 4 |
| 4697. | LOGIC | 4 |
| 4698. | LORD | 4 |
| 4699. | LUKE | 4 |
| 4700. | LXB | 4 |
| 4701. | LYNCH | 4 |
| 4702. | MAHER | 4 |
| 4703. | MAILING | 4 |
| 4704. | MAINBANK | 4 |
| 4705. | MAINLINE | 4 |
| 4706. | MAKES | 4 |
| 4707. | MANAGE | 4 |
| 4708. | MARKD | 4 |
| 4709. | MARKE | 4 |
| 4710. | MARRIOTT | 4 |
| 4711. | MARSH | 4 |
| 4712. | MARTEY | 4 |
| 4713. | MASGATE | 4 |

DOCKET NO.: PAGE01-00116                                        PATENT

| NO. | PHRASE | FREQUENCY |
|---|---|---|
| 4714. | MASS | 4 |
| 4715. | MATTER | 4 |
| 4716. | MAZDA | 4 |
| 4717. | MCCORMICK | 4 |
| 4718. | MCLEAR | 4 |
| 4719. | MEASURE | 4 |
| 4720. | MEGA | 4 |
| 4721. | MELYNDA | 4 |
| 4722. | MERCY | 4 |
| 4723. | MEYER | 4 |
| 4724. | MEYERS | 4 |
| 4725. | MF | 4 |
| 4726. | MICHELE | 4 |
| 4727. | MIDNITE | 4 |
| 4728. | MIDWAY | 4 |
| 4729. | MIECHELE | 4 |
| 4730. | MIG | 4 |
| 4731. | MIL | 4 |
| 4732. | MILEAGE | 4 |
| 4733. | MILLS | 4 |
| 4734. | MINOR | 4 |
| 4735. | MISSES | 4 |
| 4736. | MITCH | 4 |
| 4737. | MJ | 4 |
| 4738. | MO | 4 |
| 4739. | MODERN | 4 |
| 4740. | MOHAMMED | 4 |
| 4741. | MOLLY | 4 |
| 4742. | MONACA | 4 |
| 4743. | MONCKS | 4 |
| 4744. | MONSANTO | 4 |
| 4745. | MONT | 4 |
| 4746. | MORAINE | 4 |

DOCKET NO.: PAGE01-00116　　　　　　　　　　　　　　　　　　　　　　　　PATENT

| NO. | PHRASE | FREQUENCY |
|---|---|---|
| 4747. | MORALES | 4 |
| 4748. | MOUNTAIN | 4 |
| 4749. | MQM | 4 |
| 4750. | MRC | 4 |
| 4751. | MROT | 4 |
| 4752. | MSM | 4 |
| 4753. | MSMCLUB | 4 |
| 4754. | MSUNNY | 4 |
| 4755. | MURDOCH | 4 |
| 4756. | MW | 4 |
| 4757. | MWINFWNC | 4 |
| 4758. | MWJ | 4 |
| 4759. | NA | 4 |
| 4760. | NAFTA | 4 |
| 4761. | NATIONWIDE | 4 |
| 4762. | NATL | 4 |
| 4763. | NATP | 4 |
| 4764. | NATURE | 4 |
| 4765. | NAVY | 4 |
| 4766. | NEVERMIND | 4 |
| 4767. | NEWMARK | 4 |
| 4768. | NOBODY | 4 |
| 4769. | NOCHES | 4 |
| 4770. | NOELLE | 4 |
| 4771. | NOLAN | 4 |
| 4772. | NON | 4 |
| 4773. | NORTHEAST | 4 |
| 4774. | NORTHM | 4 |
| 4775. | NORWEST | 4 |
| 4776. | NOTIFIED | 4 |
| 4777. | NOTIFYD | 4 |
| 4778. | NOV | 4 |
| 4779. | NOVELL | 4 |

-181-

DOCKET NO.: PAGE01-00116  PATENT

| NO.   | PHRASE      | FREQUENCY |
|-------|-------------|-----------|
| 4780. | NOVL        | 4 |
| 4781. | NZ          | 4 |
| 4782. | NZSZ        | 4 |
| 4783. | O'H         | 4 |
| 4784. | OBDYJW      | 4 |
| 4785. | OCC         | 4 |
| 4786. | OCCASIONAL  | 4 |
| 4787. | OHBICG      | 4 |
| 4788. | OHIO        | 4 |
| 4789. | OHWOCG      | 4 |
| 4790. | ONS         | 4 |
| 4791. | OPERATION   | 4 |
| 4792. | OPPORTUNITY | 4 |
| 4793. | ORDERDEPT   | 4 |
| 4794. | ORGELE      | 4 |
| 4795. | OSCO        | 4 |
| 4796. | OSZBZZZ     | 4 |
| 4797. | OTHERS      | 4 |
| 4798. | OVERHEAD    | 4 |
| 4799. | PAC         | 4 |
| 4800. | PACK        | 4 |
| 4801. | PACKARD     | 4 |
| 4802. | PADSCHDCHK  | 4 |
| 4803. | PAINS       | 4 |
| 4804. | PALACE      | 4 |
| 4805. | PAN         | 4 |
| 4806. | PAPE        | 4 |
| 4807. | PASSED      | 4 |
| 4808. | PATIENCE    | 4 |
| 4809. | PATRICIA    | 4 |
| 4810. | PATTON      | 4 |
| 4811. | PAYPHONE    | 4 |
| 4812. | PCFNM       | 4 |

DOCKET NO.: PAGE01-00116                                      PATENT

| NO.   | PHRASE     | FREQUENCY |
|-------|------------|-----------|
| 4813. | PDPAGE     | 4 |
| 4814. | PEDRO      | 4 |
| 4815. | PEMBERTON  | 4 |
| 4816. | PENTIUM    | 4 |
| 4817. | PEREDA     | 4 |
| 4818. | PEREZ      | 4 |
| 4819. | PERIOD     | 4 |
| 4820. | PERO       | 4 |
| 4821. | PGD        | 4 |
| 4822. | PGRS       | 4 |
| 4823. | PICARDY    | 4 |
| 4824. | PIGNET     | 4 |
| 4825. | PICTURES   | 4 |
| 4826. | PIERCE     | 4 |
| 4827. | PIKE       | 4 |
| 4828. | PITTSBURGH | 4 |
| 4829. | PJR        | 4 |
| 4830. | PKG        | 4 |
| 4831. | PLANNED    | 4 |
| 4832. | PLANO      | 4 |
| 4833. | PLATFORM   | 4 |
| 4834. | PLAYED     | 4 |
| 4835. | PLETED     | 4 |
| 4836. | PLMCEPR    | 4 |
| 4837. | PLMGPITAPE | 4 |
| 4838. | PLT        | 4 |
| 4839. | PMA        | 4 |
| 4840. | PONTIAC    | 4 |
| 4841. | PORTABLE   | 4 |
| 4842. | POTTER     | 4 |
| 4843. | PRECISION  | 4 |
| 4844. | PREDNISONE | 4 |
| 4845. | PROCESSING | 4 |

-183-

DOCKET NO.: PAGE01-00116                                              PATENT

| NO.   | PHRASE      | FREQUENCY |
|-------|-------------|-----------|
| 4846. | PROGRESS    | 4         |
| 4847. | PROPAINE    | 4         |
| 4848. | PROPOSAL    | 4         |
| 4849. | PROSPECT    | 4         |
| 4850. | PSERVER     | 4         |
| 4851. | PUBLISHING  | 4         |
| 4852. | PUEDES      | 4         |
| 4853. | PURINA      | 4         |
| 4854. | PURPOSE     | 4         |
| 4855. | PVC'S       | 4         |
| 4856. | QUIRKS      | 4         |
| 4857. | RAB         | 4         |
| 4858. | RAJ         | 4         |
| 4859. | RANSHAW     | 4         |
| 4860. | RAYMOND     | 4         |
| 4861. | RCC         | 4         |
| 4862. | REBECA      | 4         |
| 4863. | RECIEVE     | 4         |
| 4864. | RECV        | 4         |
| 4865. | REELS       | 4         |
| 4866. | REFERENCES  | 4         |
| 4867. | REGULAR     | 4         |
| 4868. | REGULATORY  | 4         |
| 4869. | REI         | 4         |
| 4870. | RELAX       | 4         |
| 4871. | REMIDER     | 4         |
| 4872. | REMIT       | 4         |
| 4873. | REPAIRS     | 4         |
| 4874. | REPEAT      | 4         |
| 4875. | REPTS       | 4         |
| 4876. | REQUESTING  | 4         |
| 4877. | RESCHEDULED | 4         |
| 4878. | RESOLVE     | 4         |

DOCKET NO.: PAGE01-00116                                              PATENT

| NO.   | PHRASE    | FREQUENCY |
|-------|-----------|-----------|
| 4879. | RESPECTO  | 4         |
| 4880. | RETX      | 4         |
| 4881. | RGO       | 4         |
| 4882. | RICK'S    | 4         |
| 4883. | RIECKHOFF | 4         |
| 4884. | RISPERDAL | 4         |
| 4885. | ROCKAWAY  | 4         |
| 4886. | ROCKLAND  | 4         |
| 4887. | ROGERS    | 4         |
| 4888. | ROLLED    | 4         |
| 4889. | ROMERO    | 4         |
| 4890. | ROW       | 4         |
| 4891. | RPT       | 4         |
| 4892. | RTE       | 4         |
| 4893. | RUBIN     | 4         |
| 4894. | RUBY      | 4         |
| 4895. | RUDY      | 4         |
| 4896. | RV        | 4         |
| 4897. | SAINTS    | 4         |
| 4898. | SALLY     | 4         |
| 4899. | SAM'S     | 4         |
| 4900. | SANATORIO | 4         |
| 4901. | SANDS     | 4         |
| 4902. | SANTORI   | 4         |
| 4903. | SAVAGE    | 4         |
| 4904. | SAVER     | 4         |
| 4905. | SCHWAB    | 4         |
| 4906. | SCOPUS    | 4         |
| 4907. | SEASONS   | 4         |
| 4908. | SEQUENCE  | 4         |
| 4909. | SEREVENT  | 4         |
| 4910. | SFA       | 4         |
| 4911. | SHADOW    | 4         |

-185-

DOCKET NO.: PAGE01-00116                                    PATENT

| NO. | PHRASE | FREQUENCY |
|---|---|---|
| 4912. | SHERATON | 4 |
| 4913. | SHIPMENT | 4 |
| 4914. | SHIRT | 4 |
| 4915. | SHO | 4 |
| 4916. | SHORE | 4 |
| 4917. | SID | 4 |
| 4918. | SIERRA | 4 |
| 4919. | SILVER | 4 |
| 4920. | SIMPLY | 4 |
| 4921. | SINGER | 4 |
| 4922. | SINGLE | 4 |
| 4923. | SJ | 4 |
| 4924. | SKIP | 4 |
| 4925. | SLCDOMAIN | 4 |
| 4926. | SMART | 4 |
| 4927. | SMOKE | 4 |
| 4928. | SMTPPING | 4 |
| 4929. | SNYDER | 4 |
| 4930. | SOF | 4 |
| 4931. | SOFT | 4 |
| 4932. | SOMETIMES | 4 |
| 4933. | SOONYA | 4 |
| 4934. | SOOOOO | 4 |
| 4935. | SORTER | 4 |
| 4936. | SPEAKING | 4 |
| 4937. | SPEC | 4 |
| 4938. | SPIES | 4 |
| 4939. | SPILL | 4 |
| 4940. | SPIRE | 4 |
| 4941. | SPOTTY | 4 |
| 4942. | SQUICCIARINI | 4 |
| 4943. | SRVC | 4 |
| 4944. | STACI | 4 |

DOCKET NO.: PAGE01-00116                                              PATENT

| NO. | PHRASE | FREQUENCY |
|---|---|---|
| 4945. | STAMP | 4 |
| 4946. | STAPLES | 4 |
| 4947. | STARTS | 4 |
| 4948. | STATISTICS | 4 |
| 4949. | STEPHEN | 4 |
| 4950. | STEREO | 4 |
| 4951. | STOMACH | 4 |
| 4952. | STOVE | 4 |
| 4953. | STRAND | 4 |
| 4954. | STRONLGLY | 4 |
| 4955. | STROOP | 4 |
| 4956. | SUCK | 4 |
| 4957. | SUGGEST | 4 |
| 4958. | SUMMARY | 4 |
| 4959. | SUNSHINE | 4 |
| 4960. | SUPERIOR | 4 |
| 4961. | SUPERLINK | 4 |
| 4962. | SURVEY | 4 |
| 4963. | SUSI | 4 |
| 4964. | SUSIE | 4 |
| 4965. | SV | 4 |
| 4966. | SWAN | 4 |
| 4967. | SWAP | 4 |
| 4968. | SWEEPER | 4 |
| 4969. | SWEETHEART | 4 |
| 4970. | SWISS | 4 |
| 4971. | SY | 4 |
| 4972. | SYLVIA | 4 |
| 4973. | SYSLOGD | 4 |
| 4974. | TAKES | 4 |
| 4975. | TARB | 4 |
| 4976. | TASHA | 4 |
| 4977. | TAX | 4 |

-187-

DOCKET NO.: PAGE01-00116							PATENT

| NO.   | PHRASE      | FREQUENCY |
|-------|-------------|-----------|
| 4978. | TAXED       | 4         |
| 4979. | TEAMW       | 4         |
| 4980. | TEC         | 4         |
| 4981. | TEETH       | 4         |
| 4982. | TEMPORARILY | 4         |
| 4983. | TENNIS      | 4         |
| 4984. | TESTPAGER   | 4         |
| 4985. | TESTPM      | 4         |
| 4986. | THATS       | 4         |
| 4987. | THER        | 4         |
| 4988. | THERES      | 4         |
| 4989. | THOUGHTS    | 4         |
| 4990. | THROW       | 4         |
| 4991. | THT         | 4         |
| 4992. | THULE       | 4         |
| 4993. | TIA         | 4         |
| 4994. | TIMER       | 4         |
| 4995. | TMIAS       | 4         |
| 4996. | TNER        | 4         |
| 4997. | TNX         | 4         |
| 4998. | TOLERAN     | 4         |
| 4999. | TOMORRO     | 4         |
| 5000. | TOPICS      | 4         |
| 5001. | TRACK       | 4         |
| 5002. | TRADE       | 4         |
| 5003. | TRIFFIC     | 4         |
| 5004. | TRAILER     | 4         |
| 5005. | TRAIN       | 4         |
| 5006. | TRASH       | 4         |
| 5007. | TRAVELING   | 4         |
| 5008. | TREASA      | 4         |
| 5009. | TRI         | 4         |
| 5010. | TRUST       | 4         |

*-188-*

DOCKET NO.: PAGE01-00116                                      PATENT

| NO.   | PHRASE         | FREQUENCY |
|-------|----------------|-----------|
| 5011. | TV             | 4         |
| 5012. | TWC            | 4         |
| 5013. | TYLER          | 4         |
| 5014. | TYPING         | 4         |
| 5015. | ULTRA          | 4         |
| 5016. | UNCLE          | 4         |
| 5017. | UPDATES        | 4         |
| 5018. | UPJOHN         | 4         |
| 5019. | UPON           | 4         |
| 5020. | UPSTAIRS       | 4         |
| 5021. | URGENCIAS      | 4         |
| 5022. | URL            | 4         |
| 5023. | USUAL          | 4         |
| 5024. | UW             | 4         |
| 5025. | UYZ            | 4         |
| 5026. | VALUJET        | 4         |
| 5027. | VANDERPOOL     | 4         |
| 5028. | VASQUEZ        | 4         |
| 5029. | VE             | 4         |
| 5030. | VERONICA       | 4         |
| 5031. | VFIN           | 4         |
| 5032. | VIBRATING      | 4         |
| 5033. | VIOKASE        | 4         |
| 5034. | VIOLATIONPROSP | 4         |
| 5035. | VMX            | 4         |
| 5036. | VZB            | 4         |
| 5037. | WANNA          | 4         |
| 5038. | WASHER         | 4         |
| 5039. | WASN'T         | 4         |
| 5040. | WATCHING       | 4         |
| 5041. | WB             | 4         |
| 5042. | WEASLE         | 4         |
| 5043. | WELLS          | 4         |

-189-

DOCKET NO.: PAGE01-00116                                         PATENT

| NO.   | PHRASE      | FREQUENCY |
|-------|-------------|-----------|
| 5044. | WEREN'T     | 4         |
| 5045. | WERY        | 4         |
| 5046. | WESLEY      | 4         |
| 5047. | WFSSLC      | 4         |
| 5048. | WHO'S       | 4         |
| 5049. | WHVZZZZZJZ  | 4         |
| 5050. | WIDE        | 4         |
| 5051. | WILLIS      | 4         |
| 5052. | WILTEL      | 4         |
| 5053. | WISE        | 4         |
| 5054. | WISHES      | 4         |
| 5055. | WJW         | 4         |
| 5056. | WJY         | 4         |
| 5057. | WJZBWZZ     | 4         |
| 5058. | WJZW        | 4         |
| 5059. | WOLF        | 4         |
| 5060. | WORKSTATION | 4         |
| 5061. | WRITING     | 4         |
| 5062. | WRITTEN     | 4         |
| 5063. | WSZ         | 4         |
| 5064. | WT          | 4         |
| 5065. | WTS         | 4         |
| 5066. | WUNDER      | 4         |
| 5067. | WX          | 4         |
| 5068. | XO          | 4         |
| 5069. | YALL        | 4         |
| 5070. | YBSBWZZ     | 4         |
| 5071. | JYK         | 4         |
| 5072. | YOLANDA     | 4         |
| 5073. | YOU'D       | 4         |
| 5074. | YOURE       | 4         |
| 5075. | YOURMORNING | 4         |
| 5076. | YVETTE      | 4         |

DOCKET NO.: PAGE01-00116					PATENT

| NO. | PHRASE | FREQUENCY |
|---|---|---|
| 5077. | YWZKZ | 4 |
| 5078. | YZB | 4 |
| 5079. | ZANE | 4 |
| 5080. | ZANG | 4 |
| 5081. | ZBK | 4 |
| 5082. | ZEUS | 4 |
| 5083. | ZIVGJXM | 4 |
| 5084. | ZL | 4 |
| 5085. | ZNS | 4 |
| 5086. | ZOFRAN | 4 |
| 5087. | ZRZ | 4 |
| 5088. | ZY | 4 |
| 5089. | ABCO | 3 |
| 5090. | ABOVE | 3 |
| 5091. | ACCT'S | 3 |
| 5092. | ACHANCE | 3 |
| 5093. | ACTING | 3 |
| 5094. | ACTIVATE | 3 |
| 5095. | ADAM | 3 |
| 5096. | ADSP | 3 |
| 5097. | ADULT | 3 |
| 5098. | ADVANCE | 3 |
| 5099. | ADVICE | 3 |
| 5100. | AFTERWARDS | 3 |
| 5101. | AGE | 3 |
| 5102. | AGREEMENT | 3 |
| 5103. | AGS | 3 |
| 5104. | AHOLD | 3 |
| 5105. | AILEEN | 3 |
| 5106. | AIRLIN | 3 |
| 5107. | AKARD | 3 |
| 5108. | ALABAMA | 3 |
| 5109. | ALARCON | 3 |

DOCKET NO.: PAGE01-00116                                    PATENT

| NO.   | PHRASE       | FREQUENCY |
|-------|--------------|-----------|
| 5110. | ALBOR        | 3         |
| 5111. | ALIGNMENT    | 3         |
| 5112. | ALLIED       | 3         |
| 5113. | ALLSTATE     | 3         |
| 5114. | ALLWAY       | 3         |
| 5115. | ALOHA        | 3         |
| 5116. | ALOMAR       | 3         |
| 5117. | ALONE        | 3         |
| 5118. | ALPHANUMERIC | 3         |
| 5119. | ALRIGHT      | 3         |
| 5120. | ALT          | 3         |
| 5121. | ALUMINUM     | 3         |
| 5122. | AMBER        | 3         |
| 5123. | AME          | 3         |
| 5124. | AMIN         | 3         |
| 5125. | AMOCO        | 3         |
| 5126. | AMOR         | 3         |
| 5127. | AMOS         | 3         |
| 5128. | ANDREI       | 3         |
| 5129. | ANDREWS      | 3         |
| 5130. | ANEW         | 3         |
| 5131. | ANGY         | 3         |
| 5132. | ANIMAL       | 3         |
| 5133. | ANIXTER      | 3         |
| 5134. | ANNUNZ       | 3         |
| 5135. | ANSWERS      | 3         |
| 5136. | ANTIOCH      | 3         |
| 5137. | ANTS         | 3         |
| 5138. | APC          | 3         |
| 5139. | APN          | 3         |
| 5140. | APPL         | 3         |
| 5141. | APPLEGATE    | 3         |
| 5142. | APPLIANCES   | 3         |

-192-

DOCKET NO.: PAGE01-00116                                              PATENT

| NO.   | PHRASE          | FREQUENCY |
|-------|-----------------|-----------|
| 5143. | APPOINTMENTSSO  | 3         |
| 5144. | APPRECIATE      | 3         |
| 5145. | ARBY'S          | 3         |
| 5146. | ARCHER          | 3         |
| 5147. | ARCHIVE         | 3         |
| 5148. | ARDEN           | 3         |
| 5149. | ARL             | 3         |
| 5150. | ARNIE           | 3         |
| 5151. | ARQ             | 3         |
| 5152. | ARRANGEMENTS    | 3         |
| 5153. | ARTIE           | 3         |
| 5154. | ASE             | 3         |
| 5155. | ASSIGNED        | 3         |
| 5156. | ASSLA           | 3         |
| 5157. | ASSOCIATES      | 3         |
| 5158. | ASSY            | 3         |
| 5159. | ATLANTICAVE     | 3         |
| 5160. | ATRIUM          | 3         |
| 5161. | ATTACH          | 3         |
| 5162. | ATTEMPTS        | 3         |
| 5163. | AUDIO           | 3         |
| 5164. | AUTOSYS         | 3         |
| 5165. | AVILLA          | 3         |
| 5166. | AVON            | 3         |
| 5167. | AZMACORT        | 3         |
| 5168. | BACKGROUND      | 3         |
| 5169. | BACKHOE         | 3         |
| 5170. | BAE             | 3         |
| 5171. | BAGELS          | 3         |
| 5172. | BAK             | 3         |
| 5173. | BAKED           | 3         |
| 5174. | BALLARD         | 3         |
| 5175. | BAMBA           | 3         |

-193-

DOCKET NO.: PAGE01-00116                                    PATENT

| NO.   | PHRASE         | FREQUENCY |
|-------|----------------|-----------|
| 5176. | BAMBERG        | 3         |
| 5177. | BARCLAY        | 3         |
| 5178. | BARRETT        | 3         |
| 5179. | BART           | 3         |
| 5180. | BASEBALL       | 3         |
| 5181. | BASF           | 3         |
| 5182. | BASIC          | 3         |
| 5183. | BATHGATE       | 3         |
| 5184. | BAUER          | 3         |
| 5185. | BAUM           | 3         |
| 5186. | BAXTER         | 3         |
| 5187. | BAYSE          | 3         |
| 5188. | BBBBBBBBBBBBB  | 3         |
| 5189. | BBTBBT         | 3         |
| 5190. | BBU            | 3         |
| 5191. | BCAW           | 3         |
| 5192. | BEARING        | 3         |
| 5193. | BECKER         | 3         |
| 5194. | BEDROOM        | 3         |
| 5195. | BEEPING        | 3         |
| 5196. | BEFOR          | 3         |
| 5197. | BEHRMAN        | 3         |
| 5198. | BEIRN          | 3         |
| 5199. | BELLFLOWER     | 3         |
| 5200. | BELLWRIGHT     | 3         |
| 5201. | BG             | 3         |
| 5202. | BIA            | 3         |
| 5203. | BIA'S          | 3         |
| 5204. | BIDS           | 3         |
| 5205. | BIEN           | 3         |
| 5206. | BIGGERS        | 3         |
| 5207. | BIJON          | 3         |
| 5208. | BILAS          | 3         |

DOCKET NO.: PAGE01-00116								PATENT

| NO. | PHRASE | FREQUENCY |
|---|---|---|
| 5209. | BILLED | 3 |
| 5210. | BINEK | 3 |
| 5211. | BISAHA | 3 |
| 5212. | BITTERS | 3 |
| 5213. | BKJTS | 3 |
| 5214. | BKTPP | 3 |
| 5215. | BLACKMAN | 3 |
| 5216. | BLD | 3 |
| 5217. | BLONDE | 3 |
| 5218. | BLOOD | 3 |
| 5219. | BLOOM | 3 |
| 5220. | BLOSSOM | 3 |
| 5221. | BLURRY | 3 |
| 5222. | BNEWMAN | 3 |
| 5223. | BOCA | 3 |
| 5224. | BOGAR | 3 |
| 5225. | BON | 3 |
| 5226. | BONE | 3 |
| 5227. | BOREN | 3 |
| 5228. | BORROW | 3 |
| 5229. | BOSCO | 3 |
| 5230. | BOXWELL | 3 |
| 5231. | BOWER | 3 |
| 5232. | BOXX | 3 |
| 5233. | BOYCOTT | 3 |
| 5234. | BOYFRIEND | 3 |
| 5235. | BRASS | 3 |
| 5236. | BRIDGES | 3 |
| 5237. | BRIEFLY | 3 |
| 5238. | BROOKV | 3 |
| 5239. | BROOKYLN | 3 |
| 5240. | BROUGHT | 3 |
| 5241. | BROWNING | 3 |

DOCKET NO.: PAGE01-00116                                              PATENT

| NO.   | PHRASE   | FREQUENCY |
|-------|----------|-----------|
| 5242. | BRT      | 3         |
| 5243. | BUFORD   | 3         |
| 5244. | BUG      | 3         |
| 5245. | BUICK    | 3         |
| 5246. | BUNNY    | 3         |
| 5247. | BUREAU   | 3         |
| 5248. | BUREN    | 3         |
| 5249. | BURKE    | 3         |
| 5250. | BURNED   | 3         |
| 5251. | BUSCH    | 3         |
| 5252. | BUSH     | 3         |
| 5253. | BUSKIRK  | 3         |
| 5254. | BUSMKT   | 3         |
| 5255. | BUTTON   | 3         |
| 5256. | BYRD     | 3         |
| 5257. | CAA      | 3         |
| 5258. | CAFE     | 3         |
| 5259. | CAGE     | 3         |
| 5260. | CAIN     | 3         |
| 5261. | CALBRE   | 3         |
| 5262. | CALDERAS | 3         |
| 5263. | CALDERON | 3         |
| 5264. | CALDWELL | 3         |
| 5265. | CALENDAR | 3         |
| 5266. | CALHOUN  | 3         |
| 5267. | CALLBACK | 3         |
| 5268. | CALLOWAY | 3         |
| 5269. | CALLSTO  | 3         |
| 5270. | CAMERA   | 3         |
| 5271. | CAPCODES | 3         |
| 5272. | CARBAKAL | 3         |
| 5273. | CARGO    | 3         |
| 5274. | CARI     | 3         |

-196-

DOCKET NO.: PAGE01-00116                                               PATENT

| NO.   | PHRASE        | FREQUENCY |
|-------|---------------|-----------|
| 5275. | CARLSON       | 3         |
| 5276. | CAROLINACROSS | 3         |
| 5277. | CARPENTER     | 3         |
| 5278. | CARTRIDGE     | 3         |
| 5279. | CASSIDY       | 3         |
| 5280. | CAYGHOST      | 3         |
| 5281. | CENTERING     | 3         |
| 5282. | CENTRE        | 3         |
| 5283. | CERTIFIED     | 3         |
| 5284. | CERVE         | 3         |
| 5285. | CHAD          | 3         |
| 5286. | CHADWICK      | 3         |
| 5287. | CHALKER       | 3         |
| 5288. | CHALL         | 3         |
| 5289. | CHAMBER       | 3         |
| 5290. | CHAMBERS      | 3         |
| 5291. | CHAPEL        | 3         |
| 5292. | CHEDDAR       | 3         |
| 5293. | CHEROKEE      | 3         |
| 5294. | CHGD          | 3         |
| 5295. | CHGED         | 3         |
| 5296. | CHI           | 3         |
| 5297. | CHICO         | 3         |
| 5298. | CHILDRENS     | 3         |
| 5299. | CHILLICOTHE   | 3         |
| 5300. | CHIQUITA      | 3         |
| 5301. | CHOICES       | 3         |
| 5302. | CITGO         | 3         |
| 5303. | CITIZENS      | 3         |
| 5304. | CITRUS        | 3         |
| 5305. | CITYWIDE      | 3         |
| 5306. | CLAIM         | 3         |
| 5307. | CLAYTON       | 3         |

-197-

DOCKET NO.: PAGE01-00116                                          PATENT

| NO.   | PHRASE      | FREQUENCY |
|-------|-------------|-----------|
| 5308. | CLEMENTS    | 3 |
| 5309. | CLIFFORD    | 3 |
| 5310. | CLIN        | 3 |
| 5311. | CLINIQUE    | 3 |
| 5312. | CLOTHING    | 3 |
| 5313. | CMC         | 3 |
| 5314. | CMS         | 3 |
| 5315. | COCHRAN     | 3 |
| 5316. | CODING      | 3 |
| 5317. | COELLAR     | 3 |
| 5318. | COIN        | 3 |
| 5319. | COIT        | 3 |
| 5320. | COL         | 3 |
| 5321. | COLETTE     | 3 |
| 5322. | COLLECT     | 3 |
| 5323. | COLPAL      | 3 |
| 5324. | COMCHECK    | 3 |
| 5325. | COMMERCE    | 3 |
| 5326. | COMMISSION  | 3 |
| 5327. | COMMODE     | 3 |
| 5328. | COMMON      | 3 |
| 5329. | COMMSRV     | 3 |
| 5330. | COMO        | 3 |
| 5331. | COMUNIQUES  | 3 |
| 5332. | CONCENTRIC  | 3 |
| 5333. | CONCEPTS    | 3 |
| 5334. | CONCERN     | 3 |
| 5335. | CONCRETE    | 3 |
| 5336. | CONDALM     | 3 |
| 5337. | CONDITION   | 3 |
| 5338. | CONFINED    | 3 |
| 5339. | CONFUSED    | 3 |
| 5340. | CONNECTED   | 3 |

-198-

DOCKET NO.: PAGE01-00116                                          PATENT

| NO.   | PHRASE         | FREQUENCY |
|-------|----------------|-----------|
| 5341. | CONNECTICUT    | 3 |
| 5342. | CONNECTING     | 3 |
| 5343. | CONNECTIONWATC | 3 |
| 5344. | CONNELLY       | 3 |
| 5345. | CONNER         | 3 |
| 5346. | CONST          | 3 |
| 5347. | CONSUMER       | 3 |
| 5348. | CONTACTED      | 3 |
| 5349. | CONTINUED      | 3 |
| 5350. | CONTR          | 3 |
| 5351. | CONTRACTS      | 3 |
| 5352. | CONVENI        | 3 |
| 5353. | COOKERS        | 3 |
| 5354. | COPYRIGHT      | 3 |
| 5355. | CORAL          | 3 |
| 5356. | CORAM          | 3 |
| 5357. | COREY          | 3 |
| 5358. | CORN           | 3 |
| 5359. | CORONA         | 3 |
| 5360. | CORRECTLY      | 3 |
| 5361. | COURTNEY       | 3 |
| 5362. | COUSIN         | 3 |
| 5363. | COVERED        | 3 |
| 5364. | COVERING       | 3 |
| 5365. | CRAWFORD       | 3 |
| 5366. | CRAZY          | 3 |
| 5367. | CRC            | 3 |
| 5368. | CRESTVIEW      | 3 |
| 5369. | CRTM           | 3 |
| 5370. | CSS            | 3 |
| 5371. | CTNMWS         | 3 |
| 5372. | CTPOLLER       | 3 |
| 5373. | CUANDO         | 3 |

-199-

DOCKET NO.: PAGE01-00116                                    PATENT

| NO.   | PHRASE    | FREQUENCY |
|-------|-----------|-----------|
| 5374. | CUBE      | 3 |
| 5375. | CURRY     | 3 |
| 5376. | CURT      | 3 |
| 5377. | CURTI     | 3 |
| 5378. | CUSTOM    | 3 |
| 5379. | CUSTOMS   | 3 |
| 5380. | CUTTI     | 3 |
| 5381. | CV        | 3 |
| 5382. | CX        | 3 |
| 5383. | CYBERLINK | 3 |
| 5384. | CYD       | 3 |
| 5385. | DACE      | 3 |
| 5386. | DAD'S     | 3 |
| 5387. | DAEMON    | 3 |
| 5388. | DALMASI   | 3 |
| 5389. | DANCE     | 3 |
| 5390. | DANEK     | 3 |
| 5391. | DANNI     | 3 |
| 5392. | DARR      | 3 |
| 5393. | DATED     | 3 |
| 5394. | DBDELETE  | 3 |
| 5395. | DEALER    | 3 |
| 5396. | DEBORAH   | 3 |
| 5397. | DEC       | 3 |
| 5398. | DECIDED   | 3 |
| 5399. | DEERFIEL  | 3 |
| 5400. | DELAWARE  | 3 |
| 5401. | DELEGATE  | 3 |
| 5402. | DELIVERING| 3 |
| 5403. | DELOSSAM  | 3 |
| 5404. | DELV      | 3 |
| 5405. | DEMETRIA  | 3 |
| 5406. | DENIS     | 3 |

-200-

DOCKET NO.: PAGE01-00116          PATENT

| NO.   | PHRASE      | FREQUENCY |
|-------|-------------|-----------|
| 5407. | DENTIST     | 3 |
| 5408. | DEPARTMENT  | 3 |
| 5409. | DEPOT       | 3 |
| 5410. | DERBY       | 3 |
| 5411. | DERICK      | 3 |
| 5412. | DERRY       | 3 |
| 5413. | DESIGNS     | 3 |
| 5414. | DESOTO      | 3 |
| 5415. | DESTIN      | 3 |
| 5416. | DESTINATION | 3 |
| 5417. | DEVICES     | 3 |
| 5418. | DGILES      | 3 |
| 5419. | DHB         | 3 |
| 5420. | DHS         | 3 |
| 5421. | DIA         | 3 |
| 5422. | DIDN        | 3 |
| 5423. | DIFFERENT   | 3 |
| 5424. | DIGFEX      | 3 |
| 5425. | DILANTIN    | 3 |
| 5426. | DINA        | 3 |
| 5427. | DINING      | 3 |
| 5428. | DINKELMA    | 3 |
| 5429. | DION        | 3 |
| 5430. | DISC        | 3 |
| 5431. | DISPLA      | 3 |
| 5432. | DISTSYS     | 3 |
| 5433. | DLM         | 3 |
| 5434. | DMO         | 3 |
| 5435. | DOA         | 3 |
| 5436. | DODGERS     | 3 |
| 5437. | DOIN        | 3 |
| 5438. | DOLL        | 3 |
| 5439. | DONOETRC    | 3 |

-201-

DOCKET NO.: PAGE01-00116                                                          PATENT

| NO.   | PHRASE   | FREQUENCY |
|-------|----------|-----------|
| 5440. | DONNIE   | 3 |
| 5441. | DORM     | 3 |
| 5442. | DOVE     | 3 |
| 5443. | DOW      | 3 |
| 5444. | DOWNERS  | 3 |
| 5445. | DRI      | 3 |
| 5446. | DRILL    | 3 |
| 5447. | DRIP     | 3 |
| 5448. | DRIV     | 3 |
| 5449. | DRIVES   | 3 |
| 5450. | DRIVEWAY | 3 |
| 5451. | DROPPING | 3 |
| 5452. | DRVM     | 3 |
| 5453. | DRW      | 3 |
| 5454. | DRYER    | 3 |
| 5455. | DSC      | 3 |
| 5456. | DTMFTLK  | 3 |
| 5457. | DUD      | 3 |
| 5458. | DUES     | 3 |
| 5459. | DUMB     | 3 |
| 5460. | DUNCAN   | 3 |
| 5461. | DUTCHESS | 3 |
| 5462. | DV       | 3 |
| 5463. | DW       | 3 |
| 5464. | DWI      | 3 |
| 5465. | DYAN     | 3 |
| 5466. | DYER     | 3 |
| 5467. | DYNATTNSA| 3 |
| 5468. | EARL     | 3 |
| 5469. | EARTH    | 3 |
| 5470. | EASIER   | 3 |
| 5471. | EAVES    | 3 |
| 5472. | ECLIPSE  | 3 |

-202-

DOCKET NO.: PAGE01-00116				PATENT

| NO.   | PHRASE      | FREQUENCY |
|-------|-------------|-----------|
| 5473. | ECTCONFIG   | 3 |
| 5474. | EDGES       | 3 |
| 5475. | EDITH       | 3 |
| 5476. | EDOUARDA    | 3 |
| 5477. | EDSAL       | 3 |
| 5478. | EDUARDO     | 3 |
| 5479. | EDUCATION   | 3 |
| 5480. | EDWIN       | 3 |
| 5481. | EG          | 3 |
| 5482. | EGGS        | 3 |
| 5483. | EISELEY     | 3 |
| 5484. | ELIS        | 3 |
| 5485. | ELITE       | 3 |
| 5486. | ELK         | 3 |
| 5487. | ELKINS      | 3 |
| 5488. | ELLEN       | 3 |
| 5489. | ELLISON     | 3 |
| 5490. | ELLWOO      | 3 |
| 5491. | EMAI        | 3 |
| 5492. | EMBEDME     | 3 |
| 5493. | EMERG       | 3 |
| 5494. | EMIL        | 3 |
| 5495. | ENBEE       | 3 |
| 5496. | ENCUENTRO   | 3 |
| 5497. | ENDO        | 3 |
| 5498. | ENOUGH      | 3 |
| 5499. | ENROLL      | 3 |
| 5500. | ENTERPRISES | 3 |
| 5501. | ENTIRE      | 3 |
| 5502. | ENTRANCE    | 3 |
| 5503. | ERIE        | 3 |
| 5504. | ERIK        | 3 |
| 5505. | ESPANOL     | 3 |

DOCKET NO.: PAGE01-00116                                    PATENT

| NO.   | PHRASE     | FREQUENCY |
|-------|------------|-----------|
| 5506. | ESPERO     | 3 |
| 5507. | ESTAS      | 3 |
| 5508. | ESTHER     | 3 |
| 5509. | ETHAN      | 3 |
| 5510. | ETHEL      | 3 |
| 5511. | EXCALIBUR  | 3 |
| 5512. | EXPECT     | 3 |
| 5513. | EXPERT     | 3 |
| 5514. | EZ         | 3 |
| 5515. | FAB        | 3 |
| 5516. | FABIAN     | 3 |
| 5517. | FAILS      | 3 |
| 5518. | FAITH      | 3 |
| 5519. | FALLING    | 3 |
| 5520. | FALLS      | 3 |
| 5521. | FANS       | 3 |
| 5522. | FASTER     | 3 |
| 5523. | FATALERROR | 3 |
| 5524. | FAUCET     | 3 |
| 5525. | FAXBRIDGE  | 3 |
| 5526. | FBG        | 3 |
| 5527. | FEEDING    | 3 |
| 5528. | FELIX      | 3 |
| 5529. | FERGUSON   | 3 |
| 5530. | FIBERCASE  | 3 |
| 5531. | FIFTH      | 3 |
| 5532. | FILTERS    | 3 |
| 5533. | FINA       | 3 |
| 5534. | FINANCE    | 3 |
| 5535. | FINMOOP    | 3 |
| 5536. | FIT        | 3 |
| 5537. | FLEET      | 3 |
| 5538. | FLIGHT     | 3 |

-204-

DOCKET NO.: PAGE01-00116                                              PATENT

| NO.   | PHRASE       | FREQUENCY |
|-------|--------------|-----------|
| 5539. | FLOO         | 3         |
| 5540. | FLOODING     | 3         |
| 5541. | FLORES       | 3         |
| 5542. | FLYER        | 3         |
| 5543. | FOGEL        | 3         |
| 5544. | FOLKS        | 3         |
| 5545. | FOODSERVICE  | 3         |
| 5546. | FOOTHILL     | 3         |
| 5547. | FORK         | 3         |
| 5548. | FORWARDED    | 3         |
| 5549. | FRANCES      | 3         |
| 5550. | FRAZIER      | 3         |
| 5551. | FREDERICK    | 3         |
| 5552. | FRIG         | 3         |
| 5553. | FRISCO       | 3         |
| 5554. | FRONTPAGE    | 3         |
| 5555. | FRT          | 3         |
| 5556. | FRYER        | 3         |
| 5557. | FTCI         | 3         |
| 5558. | FUERA        | 3         |
| 5559. | FUJITSU      | 3         |
| 5560. | FUSES        | 3         |
| 5561. | FUTURE       | 3         |
| 5562. | FV           | 3         |
| 5563. | FWALTER      | 3         |
| 5564. | GALAVIZ      | 3         |
| 5565. | GAP          | 3         |
| 5566. | GARBAGE      | 3         |
| 5567. | GARDENS      | 3         |
| 5568. | GARRETT      | 3         |
| 5569. | GARRY        | 3         |
| 5570. | GARVEY       | 3         |
| 5571. | GASYS        | 3         |

DOCKET NO.: PAGE01-00116                                         PATENT

| NO. | PHRASE | FREQUENCY |
|---|---|---|
| 5572. | GATITA | 3 |
| 5573. | GBO | 3 |
| 5574. | GEE | 3 |
| 5575. | GEMS | 3 |
| 5576. | GERARDO | 3 |
| 5577. | GH | 3 |
| 5578. | GHP | 3 |
| 5579. | GILES | 3 |
| 5580. | GILL | 3 |
| 5581. | GILLIBERTO | 3 |
| 5582. | GLD | 3 |
| 5583. | GLENDA | 3 |
| 5584. | GLO | 3 |
| 5585. | GMC | 3 |
| 5586. | GOLDBERGER | 3 |
| 5587. | GOMEZ | 3 |
| 5588. | GOODBYE | 3 |
| 5589. | GOODMAN | 3 |
| 5590. | GOODMORNING | 3 |
| 5591. | GOSH | 3 |
| 5592. | GRADING | 3 |
| 5593. | GRANADA | 3 |
| 5594. | GREENFIELD | 3 |
| 5595. | GREENS | 3 |
| 5596. | GREENWOOD | 3 |
| 5597. | GREY | 3 |
| 5598. | GRIFFIN | 3 |
| 5599. | GRILL | 3 |
| 5600. | GRKCUHG | 3 |
| 5601. | GTECC | 3 |
| 5602. | GTESNSA | 3 |
| 5603. | GULF | 3 |
| 5604. | GURU | 3 |

-206-

DOCKET NO.: PAGE01-00116                                                                    PATENT

| NO.   | PHRASE      | FREQUENCY |
|-------|-------------|-----------|
| 5605. | GW          | 3         |
| 5606. | GWS         | 3         |
| 5607. | GYM         | 3         |
| 5608. | HABLA       | 3         |
| 5609. | HAGEN       | 3         |
| 5610. | HALLWAY     | 3         |
| 5611. | HANDBAG     | 3         |
| 5612. | HANDS       | 3         |
| 5613. | HANG        | 3         |
| 5614. | HANKS       | 3         |
| 5615. | HAPPENING   | 3         |
| 5616. | HARDWA      | 3         |
| 5617. | HARDWICK    | 3         |
| 5618. | HARDWRE     | 3         |
| 5619. | HARGROVE    | 3         |
| 5620. | HARLOW      | 3         |
| 5621. | HARTFORD    | 3         |
| 5622. | HARVESTWOOD | 3         |
| 5623. | HASTA       | 3         |
| 5624. | HAUMAN      | 3         |
| 5625. | HAVERFIELD  | 3         |
| 5626. | HAWTHORNE   | 3         |
| 5627. | HAY         | 3         |
| 5628. | HAYES       | 3         |
| 5629. | HE'D        | 3         |
| 5630. | HEADLIGHTS  | 3         |
| 5631. | HEARING     | 3         |
| 5632. | HEATH       | 3         |
| 5633. | HEATHER     | 3         |
| 5634. | HEH         | 3         |
| 5635. | HELPDESK    | 3         |
| 5636. | HEMPST      | 3         |
| 5637. | HG          | 3         |

-207-

DOCKET NO.: PAGE01-00116                                                PATENT

| NO.   | PHRASE    | FREQUENCY |
|-------|-----------|-----------|
| 5638. | HGS       | 3         |
| 5639. | HIDALGO   | 3         |
| 5640. | HIGHLAND  | 3         |
| 5641. | HIL       | 3         |
| 5642. | HIRSCH    | 3         |
| 5643. | HIYA      | 3         |
| 5644. | HLADKY    | 3         |
| 5645. | HOE       | 3         |
| 5646. | HOKE      | 3         |
| 5647. | HOLBERT   | 3         |
| 5648. | HOLE      | 3         |
| 5649. | HOLMES    | 3         |
| 5650. | HOLT      | 3         |
| 5651. | HONG      | 3         |
| 5652. | HONOLULU  | 3         |
| 5653. | HOOKED    | 3         |
| 5654. | HOPEFULLY | 3         |
| 5655. | HORACE    | 3         |
| 5656. | HORAN     | 3         |
| 5657. | HORIZON   | 3         |
| 5658. | HORNE     | 3         |
| 5659. | HOUSING   | 3         |
| 5660. | HOWIE     | 3         |
| 5661. | HUB       | 3         |
| 5662. | HUBER     | 3         |
| 5663. | HUNTER    | 3         |
| 5664. | HURST     | 3         |
| 5665. | HUTTON    | 3         |
| 5666. | HY        | 3         |
| 5667. | HYPERION  | 3         |
| 5668. | IBMJ      | 3         |
| 5669. | ICONS     | 3         |
| 5670. | IDEAS     | 3         |

-208-

DOCKET NO.: PAGE01-00116                                    PATENT

| NO.   | PHRASE       | FREQUENCY |
|-------|--------------|-----------|
| 5671. | IE           | 3 |
| 5672. | IFS          | 3 |
| 5673. | IFYOU        | 3 |
| 5674. | IMAGE        | 3 |
| 5675. | IMAGINE      | 3 |
| 5676. | IMMED        | 3 |
| 5677. | IMPERIAL     | 3 |
| 5678. | IMPT         | 3 |
| 5679. | IMSW         | 3 |
| 5680. | INCOMING     | 3 |
| 5681. | INCORRECT    | 3 |
| 5682. | INDIANS      | 3 |
| 5683. | INDUSTRY     | 3 |
| 5684. | INETD        | 3 |
| 5685. | INEX         | 3 |
| 5686. | INF          | 3 |
| 5687. | INGRAM       | 3 |
| 5688. | INJURED      | 3 |
| 5689. | INPORTANT    | 3 |
| 5690. | INQUIRING    | 3 |
| 5691. | INSHOME      | 3 |
| 5692. | INSURED      | 3 |
| 5693. | INTERIOR     | 3 |
| 5694. | INTERNATIONA | 3 |
| 5695. | IPHONE       | 3 |
| 5696. | IRVINE       | 3 |
| 5697. | ISABEL       | 3 |
| 5698. | ISOPEN       | 3 |
| 5699. | ISSA         | 3 |
| 5700. | ITMCSA       | 3 |
| 5701. | IVONNE       | 3 |
| 5702. | JAMAL        | 3 |
| 5703. | JAMD         | 3 |

DOCKET NO.: PAGE01-00116 PATENT

| NO. | PHRASE | FREQUENCY |
|---|---|---|
| 5704. | JAO | 3 |
| 5705. | JAS | 3 |
| 5706. | JAYANN | 3 |
| 5707. | JDE | 3 |
| 5708. | JEANETTE | 3 |
| 5709. | JEFFERSON | 3 |
| 5710. | JER | 3 |
| 5711. | JEROME | 3 |
| 5712. | JES | 3 |
| 5713. | JESM | 3 |
| 5714. | JJJGW | 3 |
| 5715. | JKARR | 3 |
| 5716. | JOEL | 3 |
| 5717. | JOHN'S | 3 |
| 5718. | JOHNNY'S | 3 |
| 5719. | JOHNO | 3 |
| 5720. | JONLY | 3 |
| 5721. | JOSEY | 3 |
| 5722. | JOSHUA | 3 |
| 5723. | JRXP | 3 |
| 5724. | JSAXE | 3 |
| 5725. | JSTARNES | 3 |
| 5726. | JUANS | 3 |
| 5727. | JUDI | 3 |
| 5728. | JUICE | 3 |
| 5729. | JULIA | 3 |
| 5730. | JXPFUZ | 3 |
| 5731. | K'S | 3 |
| 5732. | KA | 3 |
| 5733. | KAMP | 3 |
| 5734. | KANSAS | 3 |
| 5735. | KAPIOLANI | 3 |
| 5736. | KEL | 3 |

-210-

DOCKET NO.: PAGE01-00116                                    PATENT

| NO.   | PHRASE         | FREQUENCY |
|-------|----------------|-----------|
| 5737. | KELVIN         | 3         |
| 5738. | KENNETH        | 3         |
| 5739. | KICKED         | 3         |
| 5740. | KINKO'S        | 3         |
| 5741. | KMV            | 3         |
| 5742. | KN             | 3         |
| 5743. | KNICKERBOCKER  | 3         |
| 5744. | KOHN           | 3         |
| 5745. | KRAMER         | 3         |
| 5746. | KRIS           | 3         |
| 5747. | KRISTI         | 3         |
| 5748. | KY             | 3         |
| 5749. | LACE           | 3         |
| 5750. | LADSON         | 3         |
| 5751. | LAKEWOOD       | 3         |
| 5752. | LAMB           | 3         |
| 5753. | LANITA         | 3         |
| 5754. | LASIX          | 3         |
| 5755. | LAUDERDALE     | 3         |
| 5756. | LAWREN         | 3         |
| 5757. | LAZERVOICE     | 3         |
| 5758. | LCR            | 3         |
| 5759. | LEADS          | 3         |
| 5760. | LEARNINGANYTHI | 3         |
| 5761. | LEAVES         | 3         |
| 5762. | LEE'S          | 3         |
| 5763. | LEMMON         | 3         |
| 5764. | LENA           | 3         |
| 5765. | LENNY          | 3         |
| 5766. | LEON           | 3         |
| 5767. | LEWANDOWSKI    | 3         |
| 5768. | LEXINGTON      | 3         |
| 5769. | LIABILITY      | 3         |

-211-

DOCKET NO.: PAGE01-00116                                                    PATENT

| NO.   | PHRASE     | FREQUENCY |
|-------|------------|-----------|
| 5770. | LICENSE    | 3         |
| 5771. | LICKAR     | 3         |
| 5772. | LID        | 3         |
| 5773. | LIED       | 3         |
| 5774. | LILA       | 3         |
| 5775. | LINDSAY    | 3         |
| 5776. | LINTON     | 3         |
| 5777. | LION       | 3         |
| 5778. | LISETTE    | 3         |
| 5779. | LISTN      | 3         |
| 5780. | LISTO      | 3         |
| 5781. | LISTSERV   | 3         |
| 5782. | LISTSERVER | 3         |
| 5783. | LIU        | 3         |
| 5784. | LIWEN      | 3         |
| 5785. | LK         | 3         |
| 5786. | LLAMAR     | 3         |
| 5787. | LNDG       | 3         |
| 5788. | LOCKBOX    | 3         |
| 5789. | LODGE      | 3         |
| 5790. | LONDON     | 3         |
| 5791. | LORIMER    | 3         |
| 5792. | LOSE       | 3         |
| 5793. | LOSING     | 3         |
| 5794. | LPS        | 3         |
| 5795. | LPT        | 3         |
| 5796. | LTR        | 3         |
| 5797. | LUCAS      | 3         |
| 5798. | LUDWIG     | 3         |
| 5799. | LUEDDEKE   | 3         |
| 5800. | LUNCHEON   | 3         |
| 5801. | LUTES      | 3         |
| 5802. | LYDIA      | 3         |

-212-

DOCKET NO.: PAGE01-00116                                    PATENT

| NO.   | PHRASE        | FREQUENCY |
|-------|---------------|-----------|
| 5803. | LYLE          | 3         |
| 5804. | LYN           | 3         |
| 5805. | MAI           | 3         |
| 5806. | MAILROOM      | 3         |
| 5807. | MALFUNCTIONING| 3         |
| 5808. | MANNING       | 3         |
| 5809. | MANSELL       | 3         |
| 5810. | MANUEL        | 3         |
| 5811. | MANUFACTURING | 3         |
| 5812. | MAPLE         | 3         |
| 5813. | MARCELLE      | 3         |
| 5814. | MARGARITA     | 3         |
| 5815. | MARGO         | 3         |
| 5816. | MARGRET       | 3         |
| 5817. | MARKEE        | 3         |
| 5818. | MARVA         | 3         |
| 5819. | MARX          | 3         |
| 5820. | MASPEE        | 3         |
| 5821. | MATCHPOLLER   | 3         |
| 5822. | MATLOCK       | 3         |
| 5823. | MAUJER        | 3         |
| 5824. | MAXWELL       | 3         |
| 5825. | MBL           | 3         |
| 5826. | MCCOY         | 3         |
| 5827. | MCG           | 3         |
| 5828. | MCGOVERN      | 3         |
| 5829. | MCGRAW        | 3         |
| 5830. | MCL           | 3         |
| 5831. | MCMULLEN      | 3         |
| 5832. | MEAL          | 3         |
| 5833. | MEANS         | 3         |
| 5834. | MEASAP        | 3         |
| 5835. | MEE           | 3         |

-213-

DOCKET NO.: PAGE01-00116                                    PATENT

| NO.   | PHRASE      | FREQUENCY |
|-------|-------------|-----------|
| 5836. | MEETINGS    | 3         |
| 5837. | MEGACENTER  | 3         |
| 5838. | MEGAN       | 3         |
| 5839. | MEMBER      | 3         |
| 5840. | MENDEZ      | 3         |
| 5841. | MENTOR      | 3         |
| 5842. | MERCHAN     | 3         |
| 5843. | MESSED      | 3         |
| 5844. | METRAHEALTH | 3         |
| 5845. | MGMT        | 3         |
| 5846. | MGP         | 3         |
| 5847. | MHAHN       | 3         |
| 5848. | MHF         | 3         |
| 5849. | MICA        | 3         |
| 5850. | MILWAUKEE   | 3         |
| 5851. | MINERVA     | 3         |
| 5852. | MINNESOTA   | 3         |
| 5853. | MISFEEDING  | 3         |
| 5854. | MISTAKE     | 3         |
| 5855. | MISTY       | 3         |
| 5856. | MITCHEL     | 3         |
| 5857. | MJKENNY     | 3         |
| 5858. | MJS         | 3         |
| 5859. | MKJ         | 3         |
| 5860. | MKTSVC      | 3         |
| 5861. | MMA         | 3         |
| 5862. | MMX         | 3         |
| 5863. | MOBILNET    | 3         |
| 5864. | MODULE      | 3         |
| 5865. | MOLINA      | 3         |
| 5866. | MONITORS    | 3         |
| 5867. | MONTENAY    | 3         |
| 5868. | MONTHLY     | 3         |

DOCKET NO.: PAGE01-00116                            PATENT

| NO.   | PHRASE     | FREQUENCY |
|-------|------------|-----------|
| 5869. | MOOREJO    | 3 |
| 5870. | MOOSE      | 3 |
| 5871. | MORIARTY   | 3 |
| 5872. | MORN       | 3 |
| 5873. | MORTGAGE   | 3 |
| 5874. | MORTON     | 3 |
| 5875. | MOSS       | 3 |
| 5876. | MOUNT      | 3 |
| 5877. | MOYER      | 3 |
| 5878. | MTH        | 3 |
| 5879. | MTTA       | 3 |
| 5880. | MUFFIN     | 3 |
| 5881. | MUNOZ      | 3 |
| 5882. | MWINBKUP   | 3 |
| 5883. | MYERS      | 3 |
| 5884. | MYRON      | 3 |
| 5885. | MYSELF     | 3 |
| 5886. | NADINE     | 3 |
| 5887. | NAN        | 3 |
| 5888. | NAOMI      | 3 |
| 5889. | NASA       | 3 |
| 5890. | NECESSARY  | 3 |
| 5891. | NECKWEAR   | 3 |
| 5892. | NEEDING    | 3 |
| 5893. | NEEDTO     | 3 |
| 5894. | NEI        | 3 |
| 5895. | NEITHER    | 3 |
| 5896. | NETSRV     | 3 |
| 5897. | NEWSLETTER | 3 |
| 5898. | NEWTON     | 3 |
| 5899. | NGM        | 3 |
| 5900. | NICKEL     | 3 |
| 5901. | NIGGER     | 3 |

-215-

DOCKET NO.: PAGE01-00116                                    PATENT

| NO.   | PHRASE       | FREQUENCY |
|-------|--------------|-----------|
| 5902. | NISSAN       | 3         |
| 5903. | NM           | 3         |
| 5904. | NODES        | 3         |
| 5905. | NOESTING     | 3         |
| 5906. | NOKESNOT     | 3         |
| 5907. | NOLA         | 3         |
| 5908. | NORA         | 3         |
| 5909. | NOREEN       | 3         |
| 5910. | NORM         | 3         |
| 5911. | NORTHSIDE    | 3         |
| 5912. | NORTHWDS     | 3         |
| 5913. | NORWICH      | 3         |
| 5914. | NOTRESPONDING| 3         |
| 5915. | NSP          | 3         |
| 5916. | NV           | 3         |
| 5917. | NVE          | 3         |
| 5918. | NYCNTA       | 3         |
| 5919. | O'PAY        | 3         |
| 5920. | OAKLAND      | 3         |
| 5921. | OBLIGATED    | 3         |
| 5922. | ODELL        | 3         |
| 5923. | OFFENHOUSER  | 3         |
| 5924. | OGDEN        | 3         |
| 5925. | OK'D         | 3         |
| 5926. | OLIVER       | 3         |
| 5927. | OMAR         | 3         |
| 5928. | OMD          | 3         |
| 5929. | ONTIME       | 3         |
| 5930. | OPENING      | 3         |
| 5931. | OPENS        | 3         |
| 5932. | OPINION      | 3         |
| 5933. | ORAB         | 3         |
| 5934. | ORBIT        | 3         |

-216-

DOCKET NO.: PAGE01-00116                                                      PATENT

| NO.   | PHRASE       | FREQUENCY |
|-------|--------------|-----------|
| 5935. | ORIGINAL     | 3         |
| 5936. | ORLEANS      | 3         |
| 5937. | OVERFLOWING  | 3         |
| 5938. | OVERLOADED   | 3         |
| 5939. | OVERTIME     | 3         |
| 5940. | OVERSEAS     | 3         |
| 5941. | OW           | 3         |
| 5942. | OWNERS       | 3         |
| 5943. | OXFORD       | 3         |
| 5944. | OXY          | 3         |
| 5945. | PABLO        | 3         |
| 5946. | PACDB        | 3         |
| 5947. | PACE         | 3         |
| 5948. | PAD          | 3         |
| 5949. | PAGENOTES    | 3         |
| 5950. | PAINTERS     | 3         |
| 5951. | PAINTING     | 3         |
| 5952. | PAIR         | 3         |
| 5953. | PAKISTAN     | 3         |
| 5954. | PANA         | 3         |
| 5955. | PARSON       | 3         |
| 5956. | PARTE        | 3         |
| 5957. | PARTNER      | 3         |
| 5958. | PASADENA     | 3         |
| 5959. | PASSES       | 3         |
| 5960. | PASTOR       | 3         |
| 5961. | PATEINT      | 3         |
| 5962. | PATIENTS     | 3         |
| 5963. | PATTERSONS   | 3         |
| 5964. | PDCSCHDCHK   | 3         |
| 5965. | PDJ          | 3         |
| 5966. | PELHAM       | 3         |
| 5967. | PEN          | 3         |

DOCKET NO.: PAGE01-00116  PATENT

| NO. | PHRASE | FREQUENCY |
|---|---|---|
| 5968. | PENNINGTON | 3 |
| 5969. | PENNSYLVANIA | 3 |
| 5970. | PEPPER | 3 |
| 5971. | PERFORMING | 3 |
| 5972. | PERMISSION | 3 |
| 5973. | PETITIONS | 3 |
| 5974. | PETRO | 3 |
| 5975. | PHAR | 3 |
| 5976. | PHARMACIST | 3 |
| 5977. | PHELPS | 3 |
| 5978. | PHILIPS | 3 |
| 5979. | PHONEMARTS | 3 |
| 5980. | PHYSICAL | 3 |
| 5981. | PILE | 3 |
| 5982. | PILLS | 3 |
| 5983. | PINK | 3 |
| 5984. | PIPE | 3 |
| 5985. | PITTMON | 3 |
| 5986. | PLAIN | 3 |
| 5987. | PLATES | 3 |
| 5988. | PLATTER | 3 |
| 5989. | PLAYERPUS | 3 |
| 5990. | PLAYF | 3 |
| 5991. | PLE | 3 |
| 5992. | PLEZ | 3 |
| 5993. | PLSCALL | 3 |
| 5994. | PLTS | 3 |
| 5995. | PLUMBI | 3 |
| 5996. | PMC | 3 |
| 5997. | PMINQ | 3 |
| 5998. | PNRL | 3 |
| 5999. | POMPA | 3 |
| 6000. | POMPANO | 3 |

DOCKET NO.: PAGE01-00116                                          PATENT

| NO.   | PHRASE      | FREQUENCY |
|-------|-------------|-----------|
| 6001. | PORQUE      | 3         |
| 6002. | PORTER      | 3         |
| 6003. | PORTS       | 3         |
| 6004. | POSITIVE    | 3         |
| 6005. | POSSIBLY    | 3         |
| 6006. | POW         | 3         |
| 6007. | PRAGER      | 3         |
| 6008. | PRASADG     | 3         |
| 6009. | PRCPRJ      | 3         |
| 6010. | PREMIER     | 3         |
| 6011. | PRESSURE    | 3         |
| 6012. | PREUSER     | 3         |
| 6013. | PRIDE       | 3         |
| 6014. | PRIMTIM     | 3         |
| 6015. | PRINCE      | 3         |
| 6016. | PRK         | 3         |
| 6017. | PROC        | 3         |
| 6018. | PROCESSS    | 3         |
| 6019. | PROFF       | 3         |
| 6020. | PROFILE     | 3         |
| 6021. | PROGRESSIVE | 3         |
| 6022. | PROMISED    | 3         |
| 6023. | PROPERTIES  | 3         |
| 6024. | PROSOURCE   | 3         |
| 6025. | PROUD       | 3         |
| 6026. | PROVIDE     | 3         |
| 6027. | PROVIDED    | 3         |
| 6028. | PSCHMIGLE   | 3         |
| 6029. | PTERAD      | 3         |
| 6030. | PUENTE      | 3         |
| 6031. | PUNCH       | 3         |
| 6032. | PVC         | 3         |
| 6033. | PYRAMID     | 3         |

-219-

DOCKET NO.: PAGE01-00116                                          PATENT

| NO.   | PHRASE       | FREQUENCY |
|-------|--------------|-----------|
| 6034. | QAS          | 3         |
| 6035. | QBC          | 3         |
| 6036. | QCMN         | 3         |
| 6037. | QE           | 3         |
| 6038. | QUICKLY      | 3         |
| 6039. | QUIERE       | 3         |
| 6040. | QUINN        | 3         |
| 6041. | QVC          | 3         |
| 6042. | RABANG       | 3         |
| 6043. | RACE         | 3         |
| 6044. | RACK         | 3         |
| 6045. | RAILROAD     | 3         |
| 6046. | RAISE        | 3         |
| 6047. | RAMDOUBLER   | 3         |
| 6048. | RANGING      | 3         |
| 6049. | RAQUEL       | 3         |
| 6050. | RAS          | 3         |
| 6051. | RCV          | 3         |
| 6052. | REA          | 3         |
| 6053. | READING      | 3         |
| 6054. | REBUILD      | 3         |
| 6055. | RECOVERY     | 3         |
| 6056. | RECVDG       | 3         |
| 6057. | RECYCLED     | 3         |
| 6058. | RECYCLING    | 3         |
| 6059. | REDO         | 3         |
| 6060. | REFERENCE    | 3         |
| 6061. | REFLECT      | 3         |
| 6062. | REGENCY      | 3         |
| 6063. | REGISTRATION | 3         |
| 6064. | REGUARDING   | 3         |
| 6065. | REHAB        | 3         |
| 6066. | REMOVAL      | 3         |

-220-

DOCKET NO.: PAGE01-00116                                                    PATENT

| NO.   | PHRASE      | FREQUENCY |
|-------|-------------|-----------|
| 6067. | RENEE       | 3         |
| 6068. | RENTALS     | 3         |
| 6069. | REPLACING   | 3         |
| 6070. | REPORTARSE  | 3         |
| 6071. | REPTD       | 3         |
| 6072. | REQUESTS    | 3         |
| 6073. | RESERVATION | 3         |
| 6074. | RESERVED    | 3         |
| 6075. | RESP'D      | 3         |
| 6076. | RETPORT     | 3         |
| 6077. | RH          | 3         |
| 6078. | RICARDO     | 3         |
| 6079. | RICHARDS    | 3         |
| 6080. | RINSE       | 3         |
| 6081. | RIO         | 3         |
| 6082. | RISK        | 3         |
| 6083. | RIVIERA     | 3         |
| 6084. | RJ          | 3         |
| 6085. | RJCTD       | 3         |
| 6086. | RK          | 3         |
| 6087. | RMBCOM      | 3         |
| 6088. | RMBCS       | 3         |
| 6089. | RNS         | 3         |
| 6090. | ROBERTA     | 3         |
| 6091. | ROCHESTER   | 3         |
| 6092. | ROD         | 3         |
| 6093. | ROE         | 3         |
| 6094. | ROJAS       | 3         |
| 6095. | ROLLERS     | 3         |
| 6096. | ROLLOVER    | 3         |
| 6097. | RONALD      | 3         |
| 6098. | ROOFING     | 3         |
| 6099. | ROTH        | 3         |

-221-

DOCKET NO.: PAGE01-00116                                              PATENT

| NO.   | PHRASE         | FREQUENCY |
|-------|----------------|-----------|
| 6100. | ROUGH          | 3         |
| 6101. | ROUTINE        | 3         |
| 6102. | ROWENA         | 3         |
| 6103. | ROYALS         | 3         |
| 6104. | ROZ            | 3         |
| 6105. | RPCHASTIMEDOUT | 3         |
| 6106. | RPD            | 3         |
| 6107. | RRC            | 3         |
| 6108. | RSMTP          | 3         |
| 6109. | RSVP           | 3         |
| 6110. | RTG            | 3         |
| 6111. | RTR            | 3         |
| 6112. | RUBBED         | 3         |
| 6113. | RUBBER         | 3         |
| 6114. | RUIZ           | 3         |
| 6115. | RUTHANN        | 3         |
| 6116. | RW             | 3         |
| 6117. | RYA            | 3         |
| 6118. | RYEBRO         | 3         |
| 6119. | SABI           | 3         |
| 6120. | SACHS          | 3         |
| 6121. | SACRAMENTO     | 3         |
| 6122. | SAFE           | 3         |
| 6123. | SAFELY         | 3         |
| 6124. | SAG            | 3         |
| 6125. | SAGINAW        | 3         |
| 6126. | SALAD          | 3         |
| 6127. | SALT           | 3         |
| 6128. | SANDOSTATIN    | 3         |
| 6129. | SANDOVAL       | 3         |
| 6130. | SANTOS         | 3         |
| 6131. | SAVEDLY        | 3         |
| 6132. | SAVINGS        | 3         |

DOCKET NO.: PAGE01-00116                                         PATENT

| NO.   | PHRASE    | FREQUENCY |
|-------|-----------|-----------|
| 6133. | SBIN      | 3         |
| 6134. | SCADAT    | 3         |
| 6135. | SCHEDULES | 3         |
| 6136. | SCHULTZ   | 3         |
| 6137. | SCO       | 3         |
| 6138. | SCRIPT    | 3         |
| 6139. | SCRUBBER  | 3         |
| 6140. | SDI       | 3         |
| 6141. | SEARCY    | 3         |
| 6142. | SEATS     | 3         |
| 6143. | SECFS     | 3         |
| 6144. | SECURE    | 3         |
| 6145. | SEEM      | 3         |
| 6146. | SELEMA    | 3         |
| 6147. | SEMINAR   | 3         |
| 6148. | SERGIO    | 3         |
| 6149. | SERIES    | 3         |
| 6150. | SERRANCE  | 3         |
| 6151. | SERVIC    | 3         |
| 6152. | SESSION   | 3         |
| 6153. | SETLLED   | 3         |
| 6154. | SEVERE    | 3         |
| 6155. | SGT       | 3         |
| 6156. | SHALL     | 3         |
| 6157. | SHARED    | 3         |
| 6158. | SHARI     | 3         |
| 6159. | SHARP     | 3         |
| 6160. | SHAW      | 3         |
| 6161. | SHELBY    | 3         |
| 6162. | SHELDON   | 3         |
| 6163. | SHEPARD   | 3         |
| 6164. | SHEPHERD  | 3         |
| 6165. | SHERLOW   | 3         |

DOCKET NO.: PAGE01-00116                                           PATENT

| NO.   | PHRASE          | FREQUENCY |
|-------|-----------------|-----------|
| 6166. | SHLD            | 3         |
| 6167. | SHOES           | 3         |
| 6168. | SHOULDN'T       | 3         |
| 6169. | SHULSIMGER      | 3         |
| 6170. | SIGH            | 3         |
| 6171. | SIL             | 3         |
| 6172. | SILINA          | 3         |
| 6173. | SILVIA          | 3         |
| 6174. | SIMON           | 3         |
| 6175. | SINGH           | 3         |
| 6176. | SINTSINK        | 3         |
| 6177. | SIR             | 3         |
| 6178. | SIX             | 3         |
| 6179. | SKDS            | 3         |
| 6180. | SKK             | 3         |
| 6181. | SKORR           | 3         |
| 6182. | SLABY           | 3         |
| 6183. | SLABY           | 3         |
| 6184. | SLC             | 3         |
| 6185. | SMEARING        | 3         |
| 6186. | SMH             | 3         |
| 6187. | SMITH'S         | 3         |
| 6188. | SMOKES          | 3         |
| 6189. | SMUCKER         | 3         |
| 6190. | SNR             | 3         |
| 6191. | SODISWAITINGPA  | 3         |
| 6192. | SODUPWITHABORT  | 3         |
| 6193. | SOLT            | 3         |
| 6194. | SOLUTIONS       | 3         |
| 6195. | SOMEHOW         | 3         |
| 6196. | SOMEWHERE       | 3         |
| 6197. | SORCES          | 3         |
| 6198. | SORRELL         | 3         |

-224-

DOCKET NO.: PAGE01-00116								PATENT

| NO. | PHRASE | FREQUENCY |
|---|---|---|
| 6199. | SOUNDS | 3 |
| 6200. | SOUTHGATE | 3 |
| 6201. | SPIDERS | 3 |
| 6202. | SPLENDOR | 3 |
| 6203. | SPRAYBERRY | 3 |
| 6204. | SQUE | 3 |
| 6205. | SRVPRF | 3 |
| 6206. | SSA | 3 |
| 6207. | SSI | 3 |
| 6208. | STAG | 3 |
| 6209. | STAMPS | 3 |
| 6210. | STARVING | 3 |
| 6211. | STATED | 3 |
| 6212. | STEPS | 3 |
| 6213. | STERN | 3 |
| 6214. | STEVENSON | 3 |
| 6215. | STORES | 3 |
| 6216. | STEAK'N | 3 |
| 6217. | STREAKING | 3 |
| 6218. | STRUBLE | 3 |
| 6219. | STUDENT | 3 |
| 6220. | SUBSCRIBE | 3 |
| 6221. | SUGGESTIONS | 3 |
| 6222. | SUM | 3 |
| 6223. | SUNGLASSES | 3 |
| 6224. | SUNOCO | 3 |
| 6225. | SUPERMA | 3 |
| 6226. | SUPERVISOR | 3 |
| 6227. | SUPPLIED | 3 |
| 6228. | SUPPT | 3 |
| 6229. | SURVIVE | 3 |
| 6230. | SUSPOSE | 3 |
| 6231. | SUWANEE | 3 |

DOCKET NO.: PAGE01-00116                                          PATENT

| NO.   | PHRASE       | FREQUENCY |
|-------|--------------|-----------|
| 6232. | SWEET        | 3 |
| 6233. | SX           | 3 |
| 6234. | SYED         | 3 |
| 6235. | TABLES       | 3 |
| 6236. | TAG          | 3 |
| 6237. | TALCOTT      | 3 |
| 6238. | TAM          | 3 |
| 6239. | TANA         | 3 |
| 6240. | TANDEM       | 3 |
| 6241. | TANNEN'S     | 3 |
| 6242. | TAUBMAN      | 3 |
| 6243. | TAVITAS      | 3 |
| 6244. | TEACHER      | 3 |
| 6245. | TEE          | 3 |
| 6246. | TELEMED      | 3 |
| 6247. | TEMPLE       | 3 |
| 6248. | TENAYA       | 3 |
| 6249. | TERMITES     | 3 |
| 6250. | TESTS        | 3 |
| 6251. | TEX          | 3 |
| 6252. | TEXARKANA    | 3 |
| 6253. | THAKS        | 3 |
| 6254. | THANKLS      | 3 |
| 6255. | THANSK       | 3 |
| 6256. | THEOPHYLLINE | 3 |
| 6257. | THEPILOT     | 3 |
| 6258. | THERESE      | 3 |
| 6259. | THETOOL      | 3 |
| 6260. | THIRD        | 3 |
| 6261. | THOMA        | 3 |
| 6262. | TI           | 3 |
| 6263. | TIC          | 3 |
| 6264. | TIE          | 3 |

DOCKET NO.: PAGE01-00116 PATENT

| NO. | PHRASE | FREQUENCY |
|---|---|---|
| 6265. | TIMED | 3 |
| 6266. | TIMESHEET | 3 |
| 6267. | TIX | 3 |
| 6268. | TM | 3 |
| 6269. | TN | 3 |
| 6270. | TNGUYEN | 3 |
| 6271. | TOCALL | 3 |
| 6272. | TOMMY | 3 |
| 6273. | TOOLS | 3 |
| 6274. | TOOR | 3 |
| 6275. | TOREN | 3 |
| 6276. | TOSHIBA | 3 |
| 6277. | TOUR | 3 |
| 6278. | TPT | 3 |
| 6279. | TPX | 3 |
| 6280. | TRAN | 3 |
| 6281. | TRANE | 3 |
| 6282. | TRANSACTIONS | 3 |
| 6283. | TRANSFERS | 3 |
| 6284. | TRANSPARE | 3 |
| 6285. | TRAVIS | 3 |
| 6286. | TRIM | 3 |
| 6287. | TRL | 3 |
| 6288. | TRUDY | 3 |
| 6289. | TSUMMERS | 3 |
| 6290. | TTS | 3 |
| 6291. | TTY | 3 |
| 6292. | TUNE | 3 |
| 6293. | TURELLI | 3 |
| 6294. | TURKEY | 3 |
| 6295. | TURNPI | 3 |
| 6296. | TURNS | 3 |
| 6297. | TWOPREV | 3 |

-227-

DOCKET NO.: PAGE01-00116                                      PATENT

| NO.   | PHRASE         | FREQUENCY |
|-------|----------------|-----------|
| 6298. | TXIRVHQE       | 3         |
| 6299. | TY             | 3         |
| 6300. | TYX            | 3         |
| 6301. | UCINSKI        | 3         |
| 6302. | UHC            | 3         |
| 6303. | UMPIRES        | 3         |
| 6304. | UNIDEN         | 3         |
| 6305. | UNIXFILESYSTEM | 3         |
| 6306. | UNR            | 3         |
| 6307. | UNTILL         | 3         |
| 6308. | UPAT           | 3         |
| 6309. | UPRIGHT        | 3         |
| 6310. | URGENTLY       | 3         |
| 6311. | URGT           | 3         |
| 6312. | URINE          | 3         |
| 6313. | UROLOGY        | 3         |
| 6314. | UTAH           | 3         |
| 6315. | UTILITIES      | 3         |
| 6316. | VACUUM         | 3         |
| 6317. | VALDEMOR       | 3         |
| 6318. | VALDEZ         | 3         |
| 6319. | VECTRAQS       | 3         |
| 6320. | VEMOS          | 3         |
| 6321. | VENIR          | 3         |
| 6322. | VERB           | 3         |
| 6323. | VERDI          | 3         |
| 6324. | VERN           | 3         |
| 6325. | VICIOUS        | 3         |
| 6326. | VICTIMS        | 3         |
| 6327. | VID            | 3         |
| 6328. | VIKING         | 3         |
| 6329. | VIRGIN         | 3         |
| 6330. | VISA           | 3         |

-228-

DOCKET NO.: PAGE01-00116 PATENT

| NO.   | PHRASE      | FREQUENCY |
|-------|-------------|-----------|
| 6331. | VISIO       | 3         |
| 6332. | VISION      | 3         |
| 6333. | VISTARIL    | 3         |
| 6334. | VJO         | 3         |
| 6335. | VOID        | 3         |
| 6336. | VON         | 3         |
| 6337. | VP          | 3         |
| 6338. | VS          | 3         |
| 6339. | WA          | 3         |
| 6340. | WALGREEN'S  | 3         |
| 6341. | WALLS       | 3         |
| 6342. | WALTERS     | 3         |
| 6343. | WAR         | 3         |
| 6344. | WARDER      | 3         |
| 6345. | WEATHERFORD | 3         |
| 6346. | WEBB        | 3         |
| 6347. | WEBBER      | 3         |
| 6348. | WELDING     | 3         |
| 6349. | WESTCHESTER | 3         |
| 6350. | WESTERN     | 3         |
| 6351. | WHEELER     | 3         |
| 6352. | WHEELI      | 3         |
| 6353. | WHENYOU     | 3         |
| 6354. | WHERES      | 3         |
| 6355. | WHITFORD    | 3         |
| 6356. | WHITNEY     | 3         |
| 6357. | WHOLE       | 3         |
| 6358. | WILD        | 3         |
| 6359. | WINDSHIELD  | 3         |
| 6360. | WINE        | 3         |
| 6361. | WINNIE      | 3         |
| 6362. | WIRING      | 3         |
| 6363. | WISHING     | 3         |

DOCKET NO.: PAGE01-00116 PATENT

| NO. | PHRASE | FREQUENCY |
|---|---|---|
| 6364. | WKS | 3 |
| 6365. | WLH | 3 |
| 6366. | WN | 3 |
| 6367. | WOMANS | 3 |
| 6368. | WONDER | 3 |
| 6369. | WONG | 3 |
| 6370. | WORKBOOK | 3 |
| 6371. | WRECKER | 3 |
| 6372. | WRK | 3 |
| 6373. | WYATT | 3 |
| 6374. | XZBZZOZJYZJZJL | 3 |
| 6375. | Y'ALL | 3 |
| 6376. | YA' | 3 |
| 6377. | YAK | 3 |
| 6378. | YEARS | 3 |
| 6379. | YOUGET | 3 |
| 6380. | YOURQUOTE | 3 |
| 6381. | YOURSELF | 3 |
| 6382. | YU | 3 |
| 6383. | YUK | 3 |
| 6384. | YVONNE | 3 |
| 6385. | AZ | 3 |
| 6386. | ZEEMAN | 3 |
| 6387. | ZENAS | 3 |
| 6388. | ZO | 3 |
| 6389. | ZP | 3 |
| 6390. | AAAAAAAAHHHHH | 2 |
| 6391. | AAH | 2 |
| 6392. | AAM | 2 |
| 6393. | ABANDONED | 2 |
| 6394. | ABBEY | 2 |
| 6395. | ABE | 2 |
| 6396. | ABOARD | 2 |

-230-

DOCKET NO.: PAGE01-00116                                              PATENT

| NO.   | PHRASE      | FREQUENCY |
|-------|-------------|-----------|
| 6397. | ABOU        | 2         |
| 6398. | ABRAHAM     | 2         |
| 6399. | ABRAMS      | 2         |
| 6400. | ABUELITA    | 2         |
| 6401. | ABY         | 2         |
| 6402. | ACCESSORIES | 2         |
| 6403. | ACCIDENTS   | 2         |
| 6404. | ACCORDINO   | 2         |
| 6405. | ACCURATE    | 2         |
| 6406. | ACID        | 2         |
| 6407. | ACKERMAN    | 2         |
| 6408. | ACT         | 2         |
| 6409. | ACTINGFUNNY | 2         |
| 6410. | ACTIVATING  | 2         |
| 6411. | ACTIVITIES  | 2         |
| 6412. | ACTUAL      | 2         |
| 6413. | ACWORTH     | 2         |
| 6414. | ADAMT       | 2         |
| 6415. | ADDENDUM    | 2         |
| 6416. | ADDRESSED   | 2         |
| 6417. | ADDRESSES   | 2         |
| 6418. | ADELANTO    | 2         |
| 6419. | ADELPHI     | 2         |
| 6420. | ADMIT       | 2         |
| 6421. | ADMITTED    | 2         |
| 6422. | ADOBE       | 2         |
| 6423. | ADOPTION    | 2         |
| 6424. | ADRIANA     | 2         |
| 6425. | ADU         | 2         |
| 6426. | ADVENT      | 2         |
| 6427. | ADVISOR     | 2         |
| 6428. | ADVOCATE    | 2         |
| 6429. | AEROBID     | 2         |

-231-

DOCKET NO.: PAGE01-00116                                                         PATENT

| NO.   | PHRASE      | FREQUENCY |
|-------|-------------|-----------|
| 6430. | AEROCHAMBER | 2 |
| 6431. | AFFECTIVE   | 2 |
| 6432. | AFFORDABLE  | 2 |
| 6433. | AFTERALL    | 2 |
| 6434. | AGGANIS     | 2 |
| 6435. | AGNES       | 2 |
| 6436. | AGREED      | 2 |
| 6437. | AGUINAGA'S  | 2 |
| 6438. | AGUNA       | 2 |
| 6439. | AHMED       | 2 |
| 6440. | AHORITA     | 2 |
| 6441. | AI          | 2 |
| 6442. | AIDA        | 2 |
| 6443. | AIRLINE     | 2 |
| 6444. | AIRLINK     | 2 |
| 6445. | AKERS       | 2 |
| 6446. | ALA         | 2 |
| 6447. | ALARMS      | 2 |
| 6448. | ALDEN       | 2 |
| 6449. | ALEJANDRO   | 2 |
| 6450. | ALERTED     | 2 |
| 6451. | ALERTPAGE   | 2 |
| 6452. | ALEXANDRIA  | 2 |
| 6453. | ALFA        | 2 |
| 6454. | ALFREDO     | 2 |
| 6455. | ALIENELLO   | 2 |
| 6456. | ALISON      | 2 |
| 6457. | ALLIE       | 2 |
| 6458. | ALLOCATIONS | 2 |
| 6459. | ALLOW       | 2 |
| 6460. | ALLRIGHT    | 2 |
| 6461. | ALLYN       | 2 |
| 6462. | ALPHONSE    | 2 |

DOCKET NO.: PAGE01-00116                                            PATENT

| NO.   | PHRASE     | FREQUENCY |
|-------|------------|-----------|
| 6463. | ALPINE     | 2         |
| 6464. | ALTA       | 2         |
| 6465. | ALTHOUGH   | 2         |
| 6466. | ALTO       | 2         |
| 6467. | ALTON      | 2         |
| 6468. | ALVIN      | 2         |
| 6469. | AM'S       | 2         |
| 6470. | AMA        | 2         |
| 6471. | AMADOR     | 2         |
| 6472. | AMBULANCE  | 2         |
| 6473. | AMD        | 2         |
| 6474. | AMJ        | 2         |
| 6475. | AMM        | 2         |
| 6476. | AMO        | 2         |
| 6477. | AMP        | 2         |
| 6478. | AMPRO      | 2         |
| 6479. | AMT        | 2         |
| 6480. | AMWORKING  | 2         |
| 6481. | ANAHEIMP   | 2         |
| 6482. | ANAL       | 2         |
| 6483. | ANALYZE    | 2         |
| 6484. | ANALYZER   | 2         |
| 6485. | ANAWACK    | 2         |
| 6486. | ANDKISSES  | 2         |
| 6487. | ANDLATRICE | 2         |
| 6488. | ANDRES     | 2         |
| 6489. | ANG        | 2         |
| 6490. | ANGIE'S    | 2         |
| 6491. | ANHEUSER   | 2         |
| 6492. | ANLT       | 2         |
| 6493. | ANNABELLA  | 2         |
| 6494. | ANO        | 2         |
| 6495. | ANSWERED   | 2         |

-233-

DOCKET NO.: PAGE01-00116								PATENT

| NO. | PHRASE | FREQUENCY |
|---|---|---|
| 6496. | ANTES | 2 |
| 6497. | ANTHONYHODGES | 2 |
| 6498. | ANTI | 2 |
| 6499. | ANTICIPATED | 2 |
| 6500. | ANYBODY | 2 |
| 6501. | ANYHOW | 2 |
| 6502. | ANYMORE | 2 |
| 6503. | ANYWHERE | 2 |
| 6504. | AON | 2 |
| 6505. | APARTMENT | 2 |
| 6506. | APARTMENTS | 2 |
| 6507. | APPLIANCE | 2 |
| 6508. | APPLWI | 2 |
| 6509. | AQUISITIONS | 2 |
| 6510. | AR | 2 |
| 6511. | ARAPAHO | 2 |
| 6512. | ARBORS | 2 |
| 6513. | ARC | 2 |
| 6514. | ARD | 2 |
| 6515. | AREWAITING | 2 |
| 6516. | AREYOU | 2 |
| 6517. | ARIEL | 2 |
| 6518. | ARISTOCATS | 2 |
| 6519. | ARKANSAS | 2 |
| 6520. | ARMANDO | 2 |
| 6521. | ARMCO | 2 |
| 6522. | ARMONDO | 2 |
| 6523. | ARMS | 2 |
| 6524. | ARMSTRONG | 2 |
| 6525. | ARON | 2 |
| 6526. | ARRANGE | 2 |

DOCKET NO.: PAGE01-00116                                    PATENT

| NO.   | PHRASE        | FREQUENCY |
|-------|---------------|-----------|
| 6527. | ARTICLE       | 2         |
| 6528. | ARYA          | 2         |
| 6529. | ASAPPPPPPPPP  | 2         |
| 6530. | ASI           | 2         |
| 6531. | ASLEEP        | 2         |
| 6532. | ASPEN         | 2         |
| 6533. | ASSAULT       | 2         |
| 6534. | ASSIST        | 2         |
| 6535. | ASSOCIA       | 2         |
| 6536. | ASSORTED      | 2         |
| 6537. | ASSUME        | 2         |
| 6538. | ATCHA         | 2         |
| 6539. | ATCO          | 2         |
| 6540. | ATE           | 2         |
| 6541. | ATHENS        | 2         |
| 6542. | ATHERTON      | 2         |
| 6543. | ATKVAERNER    | 2         |
| 6544. | ATM           | 2         |
| 6545. | ATS           | 2         |
| 6546. | ATTIRE        | 2         |
| 6547. | ATTITUDES     | 2         |
| 6548. | AUCUN         | 2         |
| 6549. | AUDIT         | 2         |
| 6550. | AUINAGA       | 2         |
| 6551. | AUSTELL       | 2         |
| 6552. | AUTH          | 2         |
| 6553. | AUTHORITATIVE | 2         |
| 6554. | AUTOMATIC     | 2         |
| 6555. | AUTOMATICALLY | 2         |
| 6556. | AUTOMOTIVE    | 2         |
| 6557. | AWA           | 2         |
| 6558. | AWARD         | 2         |
| 6559. | AWZ           | 2         |

-235-

DOCKET NO.: PAGE01-00116                                         PATENT

| NO.   | PHRASE     | FREQUENCY |
|-------|------------|-----------|
| 6560. | AXIS       | 2         |
| 6561. | B'DAY      | 2         |
| 6562. | BA         | 2         |
| 6563. | BABAL      | 2         |
| 6564. | BACHRODT   | 2         |
| 6565. | BACKFILL   | 2         |
| 6566. | BACKTO     | 2         |
| 6567. | BAGLY      | 2         |
| 6568. | BAGS       | 2         |
| 6569. | BAKERS     | 2         |
| 6570. | BALANCE    | 2         |
| 6571. | BALBOA     | 2         |
| 6572. | BALDWIN    | 2         |
| 6573. | BALLON     | 2         |
| 6574. | BALLOONS   | 2         |
| 6575. | BAM        | 2         |
| 6576. | BANG       | 2         |
| 6577. | BANKER     | 2         |
| 6578. | BANKERS    | 2         |
| 6579. | BANNERS    | 2         |
| 6580. | BANYAN     | 2         |
| 6581. | BARBARIAN  | 2         |
| 6582. | BARCODE    | 2         |
| 6583. | BARFIEL    | 2         |
| 6584. | BARGEWAY   | 2         |
| 6585. | BARNSTAPLE | 2         |
| 6586. | BARON      | 2         |
| 6587. | BAROUDI    | 2         |
| 6588. | BARRETTE   | 2         |
| 6589. | BARRICADE  | 2         |
| 6590. | BARS       | 2         |
| 6591. | BARTFIELD  | 2         |
| 6592. | BARTLET    | 2         |

-236-

DOCKET NO.: PAGE01-00116                                              PATENT

| NO.   | PHRASE    | FREQUENCY |
|-------|-----------|-----------|
| 6593. | BASES     | 2         |
| 6594. | BASIMAH   | 2         |
| 6595. | BASONE    | 2         |
| 6596. | BASS      | 2         |
| 6597. | BASTONR   | 2         |
| 6598. | BAT       | 2         |
| 6599. | BATH      | 2         |
| 6600. | BATHRM    | 2         |
| 6601. | BAUSTIAN  | 2         |
| 6602. | BAXTOR    | 2         |
| 6603. | BAYANI    | 2         |
| 6604. | BAYLOR    | 2         |
| 6605. | BAYTOWN   | 2         |
| 6606. | BBT       | 2         |
| 6607. | BCBS      | 2         |
| 6608. | BCH       | 2         |
| 6609. | BCTEL     | 2         |
| 6610. | BDD       | 2         |
| 6611. | BDF       | 2         |
| 6612. | BEADY     | 2         |
| 6613. | BEANS     | 2         |
| 6614. | BEAR      | 2         |
| 6615. | BEARD     | 2         |
| 6616. | BEATRICE  | 2         |
| 6617. | BEAU      | 2         |
| 6618. | BEAVERTON | 2         |
| 6619. | BEC       | 2         |
| 6620. | BECCA     | 2         |
| 6621. | BECHTEL   | 2         |
| 6622. | BECK      | 2         |
| 6623. | BEE'S     | 2         |
| 6624. | BEECHWOOD | 2         |
| 6625. | BEEPERS   | 2         |

-237-

DOCKET NO.: PAGE01-00116                              PATENT

| NO.   | PHRASE     | FREQUENCY |
|-------|------------|-----------|
| 6626. | BELEIVE    | 2 |
| 6627. | BELLAIRE   | 2 |
| 6628. | BELLEVILLES| 2 |
| 6629. | BELLS      | 2 |
| 6630. | BELONGS    | 2 |
| 6631. | BENFIELD   | 2 |
| 6632. | BENGE      | 2 |
| 6633. | BENZ       | 2 |
| 6634. | BERG       | 2 |
| 6635. | BERGEN     | 2 |
| 6636. | BERKSHIRE  | 2 |
| 6637. | BERNARD    | 2 |
| 6638. | BERNARDY   | 2 |
| 6639. | BERNEM     | 2 |
| 6640. | BERNSTEIN  | 2 |
| 6641. | BETHANN    | 2 |
| 6642. | BETS       | 2 |
| 6643. | BETSY      | 2 |
| 6644. | BETTE      | 2 |
| 6645. | BEVERAGES  | 2 |
| 6646. | BILLIE     | 2 |
| 6647. | BILLONI    | 2 |
| 6648. | BILYEW     | 2 |
| 6649. | BIM        | 2 |
| 6650. | BINARS     | 2 |
| 6651. | BIO        | 2 |
| 6652. | BIRMINGHAM | 2 |
| 6653. | BISER      | 2 |
| 6654. | BISHOP     | 2 |
| 6655. | BIZ        | 2 |
| 6656. | BKF        | 2 |
| 6657. | BKK        | 2 |
| 6658. | BKMSSF     | 2 |

-238-

DOCKET NO.: PAGE01-00116                                    PATENT

| NO.   | PHRASE     | FREQUENCY |
|-------|------------|-----------|
| 6659. | BLACKOUT   | 2         |
| 6660. | BLACKWELL  | 2         |
| 6661. | BLAIR      | 2         |
| 6662. | BLANKS     | 2         |
| 6663. | BLANTON    | 2         |
| 6664. | BLAST      | 2         |
| 6665. | BLATZ      | 2         |
| 6666. | BLINKING   | 2         |
| 6667. | BLISS      | 2         |
| 6668. | BLITZ      | 2         |
| 6669. | BLN        | 2         |
| 6670. | BLOTCHES   | 2         |
| 6671. | BLOWING    | 2         |
| 6672. | BM         | 2         |
| 6673. | BNIGHOST   | 2         |
| 6674. | BOBK       | 2         |
| 6675. | BOISE      | 2         |
| 6676. | BOLT       | 2         |
| 6677. | BOLTON     | 2         |
| 6678. | BONDS      | 2         |
| 6679. | BONEY      | 2         |
| 6680. | BONG       | 2         |
| 6681. | BORG       | 2         |
| 6682. | BORING     | 2         |
| 6683. | BOSCH      | 2         |
| 6684. | BOUDIOR    | 2         |
| 6685. | BOUNCE     | 2         |
| 6686. | BOUND      | 2         |
| 6687. | BOW        | 2         |
| 6688. | BPANAGULIS | 2         |
| 6689. | BPR        | 2         |
| 6690. | BRAIN      | 2         |
| 6691. | BRAND      | 2         |

-239-

DOCKET NO.: PAGE01-00116  PATENT

| NO. | PHRASE | FREQUENCY |
|---|---|---|
| 6692. | BRANDI | 2 |
| 6693. | BRANDY | 2 |
| 6694. | BRAUN | 2 |
| 6695. | BRAVES | 2 |
| 6696. | BRAZIL | 2 |
| 6697. | BREAKDOWN | 2 |
| 6698. | BREAKDOWNS | 2 |
| 6699. | BRECKSVILLE | 2 |
| 6700. | BRENNER | 2 |
| 6701. | BRESSON | 2 |
| 6702. | BREW | 2 |
| 6703. | BRIAN'S | 2 |
| 6704. | BRIDGIT | 2 |
| 6705. | BRIEFCASE | 2 |
| 6706. | BRIGGS | 2 |
| 6707. | BRILLIANT | 2 |
| 6708. | BRITT | 2 |
| 6709. | BRO | 2 |
| 6710. | BROADCAST | 2 |
| 6711. | BROOKFIELD | 2 |
| 6712. | BROOKSHIRE | 2 |
| 6713. | BROWNLEY | 2 |
| 6714. | BROWNSVILLE | 2 |
| 6715. | BROWSING | 2 |
| 6716. | BRSH | 2 |
| 6717. | BRUCE'S | 2 |
| 6718. | BRUNER | 2 |
| 6719. | BRUNS | 2 |
| 6720. | BRYANT | 2 |
| 6721. | BTH | 2 |
| 6722. | BTMTUA | 2 |
| 6723. | BTWN | 2 |
| 6724. | BUCK | 2 |

DOCKET NO.: PAGE01-00116                                    PATENT

| NO.   | PHRASE         | FREQUENCY |
|-------|----------------|-----------|
| 6725. | BUCKET         | 2         |
| 6726. | BUFF           | 2         |
| 6727. | BUILDER        | 2         |
| 6728. | BUILDERS       | 2         |
| 6729. | BUILT          | 2         |
| 6730. | BUKOSKY        | 2         |
| 6731. | BULBS          | 2         |
| 6732. | BULDGE         | 2         |
| 6733. | BULKED         | 2         |
| 6734. | BULKING        | 2         |
| 6735. | BULTMAN        | 2         |
| 6736. | BUMPERS        | 2         |
| 6737. | BURBANK        | 2         |
| 6738. | BURCHILL       | 2         |
| 6739. | BUREND         | 2         |
| 6740. | BURGLARLY      | 2         |
| 6741. | BURGLARY       | 2         |
| 6742. | BURLINGTON     | 2         |
| 6743. | BURN           | 2         |
| 6744. | BURROW         | 2         |
| 6745. | BURT           | 2         |
| 6746. | BUSTED         | 2         |
| 6747. | BUTCHER        | 2         |
| 6748. | BUTTBOY        | 2         |
| 6749. | BUYING         | 2         |
| 6750. | BUZZ           | 2         |
| 6751. | BWJ            | 2         |
| 6752. | BWJ2CW         | 2         |
| 6753. | BYPASS         | 2         |
| 6754. | CAKE           | 2         |
| 6755. | CALABASH       | 2         |
| 6756. | CALGON         | 2         |
| 6757. | CALIFORNIAARTI | 2         |

-241-

DOCKET NO.: PAGE01-00116                                   PATENT

| NO.   | PHRASE     | FREQUENCY |
|-------|------------|-----------|
| 6758. | CALLASAP   | 2         |
| 6759. | CAMBIO     | 2         |
| 6760. | CAMDEN     | 2         |
| 6761. | CAMP       | 2         |
| 6762. | CAMPERS    | 2         |
| 6763. | CANAL      | 2         |
| 6764. | CANDIDATE  | 2         |
| 6765. | CANON      | 2         |
| 6766. | CANTSTART  | 2         |
| 6767. | CANYOU     | 2         |
| 6768. | CAPRI      | 2         |
| 6769. | CARDINALS  | 2         |
| 6770. | CARDIO     | 2         |
| 6771. | CARGAR     | 2         |
| 6772. | CARLEEN    | 2         |
| 6773. | CARMEL     | 2         |
| 6774. | CARNATION  | 2         |
| 6775. | CARNEGIE   | 2         |
| 6776. | CAROLL     | 2         |
| 6777. | CAROPS     | 2         |
| 6778. | CARR       | 2         |
| 6779. | CARREY     | 2         |
| 6780. | CARRIER    | 2         |
| 6781. | CARRILLO   | 2         |
| 6782. | CARS       | 2         |
| 6783. | CARY       | 2         |
| 6784. | CASABA     | 2         |
| 6785. | CASHIERS   | 2         |
| 6786. | CASHMAN    | 2         |
| 6787. | CASINO     | 2         |
| 6788. | CASSANDRA  | 2         |
| 6789. | CASSIE     | 2         |
| 6790. | CASTELLANO | 2         |

DOCKET NO.: PAGE01-00116                                    PATENT

| NO.   | PHRASE      | FREQUENCY |
|-------|-------------|-----------|
| 6791. | CASTENEDA   | 2         |
| 6792. | CATERPILLAR | 2         |
| 6793. | CATRINA     | 2         |
| 6794. | CAULEY      | 2         |
| 6795. | CAUSE       | 2         |
| 6796. | CAW         | 2         |
| 6797. | CAWGHOST    | 2         |
| 6798. | CBH         | 2         |
| 6799. | CCP         | 2         |
| 6800. | CCSWKZYN    | 2         |
| 6801. | CCU         | 2         |
| 6802. | CDCA        | 2         |
| 6803. | CDE         | 2         |
| 6804. | CDONT       | 2         |
| 6805. | CDW         | 2         |
| 6806. | CECE        | 2         |
| 6807. | CEDARS      | 2         |
| 6808. | CELEBRATE   | 2         |
| 6809. | CEN         | 2         |
| 6810. | CENTRO      | 2         |
| 6811. | CERTIFICADO | 2         |
| 6812. | CERVEZAS    | 2         |
| 6813. | CFG         | 2         |
| 6814. | CFOY        | 2         |
| 6815. | CHACON      | 2         |
| 6816. | CHAIN       | 2         |
| 6817. | CHAIR       | 2         |
| 6818. | CHAMPION    | 2         |
| 6819. | CHANGEOUT   | 2         |
| 6820. | CHARGES     | 2         |
| 6821. | CHARLTON    | 2         |
| 6822. | CHAT        | 2         |
| 6823. | CHATEAU     | 2         |

-243-

DOCKET NO.: PAGE01-00116                                    PATENT

| NO.   | PHRASE    | FREQUENCY |
|-------|-----------|-----------|
| 6824. | CHATHAM   | 2 |
| 6825. | CHATMAN   | 2 |
| 6826. | CHAUNCI   | 2 |
| 6827. | CHAVEZ    | 2 |
| 6828. | CHEAP     | 2 |
| 6829. | CHEMICALS | 2 |
| 6830. | CHER      | 2 |
| 6831. | CHEVRON   | 2 |
| 6832. | CHEVY     | 2 |
| 6833. | CHEYENNE  | 2 |
| 6834. | CHICK     | 2 |
| 6835. | CHILAM    | 2 |
| 6836. | CHILDERS  | 2 |
| 6837. | CHILLER   | 2 |
| 6838. | CHLORINE  | 2 |
| 6839. | CHOC      | 2 |
| 6840. | CHOCOLATE | 2 |
| 6841. | CHOICE    | 2 |
| 6842. | CHOSE     | 2 |
| 6843. | CHOW      | 2 |
| 6844. | CHRONICLE | 2 |
| 6845. | CHS       | 2 |
| 6846. | CI        | 2 |
| 6847. | CIC       | 2 |
| 6848. | CICS      | 2 |
| 6849. | CINDI     | 2 |
| 6850. | CINNAMON  | 2 |
| 6851. | CIPATED   | 2 |
| 6852. | CITIES    | 2 |
| 6853. | CIVILIAN  | 2 |
| 6854. | CJ        | 2 |
| 6855. | CKT       | 2 |
| 6856. | CLAL      | 2 |

DOCKET NO.: PAGE01-00116                                    PATENT

| NO.   | PHRASE     | FREQUENCY |
|-------|------------|-----------|
| 6857. | CLANKING   | 2         |
| 6858. | CLARIS     | 2         |
| 6859. | CLARISSA   | 2         |
| 6860. | CLC        | 2         |
| 6861. | CLEARWATER | 2         |
| 6862. | CLEM       | 2         |
| 6863. | CLI        | 2         |
| 6864. | CLICK      | 2         |
| 6865. | CLICKING   | 2         |
| 6866. | CLIENTE    | 2         |
| 6867. | CLIFTON    | 2         |
| 6868. | CLINICA    | 2         |
| 6869. | CLK        | 2         |
| 6870. | CLLR       | 2         |
| 6871. | CLOSONG    | 2         |
| 6872. | CLOUDINESS | 2         |
| 6873. | CLOUSER    | 2         |
| 6874. | CLUE       | 2         |
| 6875. | CME        | 2         |
| 6876. | CMI        | 2         |
| 6877. | CNN        | 2         |
| 6878. | CNTR       | 2         |
| 6879. | COCK       | 2         |
| 6880. | COGEN      | 2         |
| 6881. | COLIN      | 2         |
| 6882. | COLLECTED  | 2         |
| 6883. | COLONY     | 2         |
| 6884. | COLORS     | 2         |
| 6885. | COLVIN     | 2         |
| 6886. | COMBO      | 2         |
| 6887. | COMFORT    | 2         |
| 6888. | COMMA      | 2         |
| 6889. | COMME      | 2         |

DOCKET NO.: PAGE01-00116                                              PATENT

| NO.   | PHRASE       | FREQUENCY |
|-------|--------------|-----------|
| 6890. | COMMISSIONS  | 2 |
| 6891. | COMMNTY      | 2 |
| 6892. | COMPACT      | 2 |
| 6893. | COMPASS      | 2 |
| 6894. | COMPENSATION | 2 |
| 6895. | COMPLAINTS   | 2 |
| 6896. | COMPUTEL     | 2 |
| 6897. | COMPUTERLAND | 2 |
| 6898. | CONAN        | 2 |
| 6899. | CONCERT      | 2 |
| 6900. | CONDO        | 2 |
| 6901. | CONDUCTIVITY | 2 |
| 6902. | CONFERENC    | 2 |
| 6903. | CONFIRMING   | 2 |
| 6904. | CONLEY       | 2 |
| 6905. | CONNECTIVITY | 2 |
| 6906. | CONNEL       | 2 |
| 6907. | CONS         | 2 |
| 6908. | CONSIDER     | 2 |
| 6909. | CONSOLIDATED | 2 |
| 6910. | CONSULATE    | 2 |
| 6911. | CONSULTING   | 2 |
| 6912. | CONTABILIDAD | 2 |
| 6913. | CONTESTA     | 2 |
| 6914. | CONTINENTIAL | 2 |
| 6915. | CONTRACTOR   | 2 |
| 6916. | CONTRACTORS  | 2 |
| 6917. | CONTROLER    | 2 |
| 6918. | CONTROLLERS  | 2 |
| 6919. | CONTROVERSIAL| 2 |
| 6920. | CONVENIE     | 2 |
| 6921. | CONVERY      | 2 |
| 6922. | CONWAY       | 2 |

-246-

DOCKET NO.: PAGE01-00116 PATENT

| NO. | PHRASE | FREQUENCY |
|---|---|---|
| 6923. | COOLNESS | 2 |
| 6924. | COPELAND | 2 |
| 6925. | COPES | 2 |
| 6926. | COPIED | 2 |
| 6927. | COPIERS | 2 |
| 6928. | COPYS | 2 |
| 6929. | CORD | 2 |
| 6930. | CORDOVA | 2 |
| 6931. | CORGARD | 2 |
| 6932. | CORION | 2 |
| 6933. | CORNEAL | 2 |
| 6934. | CORNERS | 2 |
| 6935. | CORON | 2 |
| 6936. | CORSHE | 2 |
| 6937. | CORTEZ | 2 |
| 6938. | CORY | 2 |
| 6939. | COSMA | 2 |
| 6940. | COSTS | 2 |
| 6941. | COTTRILL | 2 |
| 6942. | COUNSELOR | 2 |
| 6943. | COVENTRY | 2 |
| 6944. | COY | 2 |
| 6945. | CPF | 2 |
| 6946. | CPMCSYS | 2 |
| 6947. | CPUUTIL | 2 |
| 6948. | CRACCHIO | 2 |
| 6949. | CRACKED | 2 |
| 6950. | CRANBE | 2 |
| 6951. | CRANBERRY | 2 |
| 6952. | CRANE | 2 |
| 6953. | CRAP | 2 |
| 6954. | CRAWL | 2 |
| 6955. | CREEKSIDE | 2 |

-247-

DOCKET NO.: PAGE01-00116                                          PATENT

| NO.   | PHRASE      | FREQUENCY |
|-------|-------------|-----------|
| 6956. | CRESTLINE   | 2         |
| 6957. | CRIPT       | 2         |
| 6958. | CRITERIO    | 2         |
| 6959. | CRITICALLY  | 2         |
| 6960. | CRL         | 2         |
| 6961. | CROWCHECK   | 2         |
| 6962. | CROWD       | 2         |
| 6963. | CROWE       | 2         |
| 6964. | CRUCES      | 2         |
| 6965. | CRUZ        | 2         |
| 6966. | CRY         | 2         |
| 6967. | CSA         | 2         |
| 6968. | CSR         | 2         |
| 6969. | CSX         | 2         |
| 6970. | CTCPHK      | 2         |
| 6971. | CTRL        | 2         |
| 6972. | CU          | 2         |
| 6973. | CULPEPPER   | 2         |
| 6974. | CUM         | 2         |
| 6975. | CUNADO      | 2         |
| 6976. | CURSOR      | 2         |
| 6977. | CUZ         | 2         |
| 6978. | CVA         | 2         |
| 6979. | CVS         | 2         |
| 6980. | CXR         | 2         |
| 6981. | CYA         | 2         |
| 6982. | CYCLE       | 2         |
| 6983. | CYCLOSPORIN | 2         |
| 6984. | CYZ         | 2         |
| 6985. | DADS        | 2         |
| 6986. | DAILEY      | 2         |
| 6987. | DALY        | 2         |
| 6988. | DAMIR       | 2         |

-248-

DOCKET NO.: PAGE01-00116                    PATENT

| NO.   | PHRASE     | FREQUENCY |
|-------|------------|-----------|
| 6989. | DAMMAN     | 2         |
| 6990. | DAMN       | 2         |
| 6991. | DANE       | 2         |
| 6992. | DAO        | 2         |
| 6993. | DAP        | 2         |
| 6994. | DAPHNE     | 2         |
| 6995. | DARCY      | 2         |
| 6996. | DARLINGTON | 2         |
| 6997. | DARNELL    | 2         |
| 6998. | DARTMOUTH  | 2         |
| 6999. | DAVID'S    | 2         |
| 7000. | DAVIDSON   | 2         |
| 7001. | DAVIE      | 2         |
| 7002. | DBA        | 2         |
| 7003. | DBN        | 2         |
| 7004. | DEANNA     | 2         |
| 7005. | DEARBORN   | 2         |
| 7006. | DEAREST    | 2         |
| 7007. | DEATH      | 2         |
| 7008. | DEBELLO    | 2         |
| 7009. | DECISION   | 2         |
| 7010. | DECKER     | 2         |
| 7011. | DEERE      | 2         |
| 7012. | DEFENDER   | 2         |
| 7013. | DEFINITELY | 2         |
| 7014. | DEITRICH   | 2         |
| 7015. | DELLA      | 2         |
| 7016. | DELLWOOD   | 2         |
| 7017. | DELORES    | 2         |
| 7018. | DELTAPH    | 2         |
| 7019. | DENI       | 2         |
| 7020. | DENICE     | 2         |
| 7021. | DENITA     | 2         |

-249-

DOCKET NO.: PAGE01-00116                                    PATENT

| NO.   | PHRASE       | FREQUENCY |
|-------|--------------|-----------|
| 7022. | DENNNIS      | 2         |
| 7023. | DENONDA      | 2         |
| 7024. | DENTRISTRY   | 2         |
| 7025. | DEPTO        | 2         |
| 7026. | DEREK        | 2         |
| 7027. | DES          | 2         |
| 7028. | DESENDORF    | 2         |
| 7029. | DESSERT      | 2         |
| 7030. | DESTROY      | 2         |
| 7031. | DESTRUCT     | 2         |
| 7032. | DEWITT       | 2         |
| 7033. | DGRAM        | 2         |
| 7034. | DIALING      | 2         |
| 7035. | DIAMANTE     | 2         |
| 7036. | DIAPER       | 2         |
| 7037. | DIAZ         | 2         |
| 7038. | DICK'S       | 2         |
| 7039. | DICKSON      | 2         |
| 7040. | DIDYOU       | 2         |
| 7041. | DIETEKER     | 2         |
| 7042. | DIETER       | 2         |
| 7043. | DIFF         | 2         |
| 7044. | DIFFERENTIAL | 2         |
| 7045. | DIFFERENTLY  | 2         |
| 7046. | DIGTESS      | 2         |
| 7047. | DILLON       | 2         |
| 7048. | DIMBATH      | 2         |
| 7049. | DIMMING      | 2         |
| 7050. | DINOS        | 2         |
| 7051. | DIOS         | 2         |
| 7052. | DIPLOMAT     | 2         |
| 7053. | DIR          | 2         |
| 7054. | DIRECTION    | 2         |

DOCKET NO.:  PAGE01-00116                                              PATENT

| NO.   | PHRASE        | FREQUENCY |
|-------|---------------|-----------|
| 7055. | DISCOS        | 2         |
| 7056. | DISCUSSION    | 2         |
| 7057. | DISHES        | 2         |
| 7058. | DISKQUOTA'S   | 2         |
| 7059. | DISKS         | 2         |
| 7060. | DISPENSE      | 2         |
| 7061. | DISREGARDTHE  | 2         |
| 7062. | DISTRIBUTE    | 2         |
| 7063. | DISTRIBUTING  | 2         |
| 7064. | DISTRICT      | 2         |
| 7065. | DIVIDED       | 2         |
| 7066. | DIVORCE       | 2         |
| 7067. | DIXON         | 2         |
| 7068. | DJR           | 2         |
| 7069. | DKATHY        | 2         |
| 7070. | DMEREMOTE     | 2         |
| 7071. | DNS           | 2         |
| 7072. | DOCUMENTATION | 2         |
| 7073. | DOEDEN        | 2         |
| 7074. | DOHERTY       | 2         |
| 7075. | DOLAN         | 2         |
| 7076. | DOMIN         | 2         |
| 7077. | DOMINION      | 2         |
| 7078. | DOMINO'S      | 2         |
| 7079. | DONDE         | 2         |
| 7080. | DONNELY       | 2         |
| 7081. | DOO           | 2         |
| 7082. | DOORNINK      | 2         |
| 7083. | DOPPLER       | 2         |
| 7084. | DORA          | 2         |
| 7085. | DORAN         | 2         |
| 7086. | DORAVILLE     | 2         |
| 7087. | DORCHESTER    | 2         |

-251-

DOCKET NO.: PAGE01-00116                                    PATENT

| NO.   | PHRASE    | FREQUENCY |
|-------|-----------|-----------|
| 7088. | DOREEN    | 2         |
| 7089. | DORK      | 2         |
| 7090. | DORTHEA   | 2         |
| 7091. | DOUG'S    | 2         |
| 7092. | DOWNSTAIRS| 2         |
| 7093. | DPI       | 2         |
| 7094. | DPOOLBCK  | 2         |
| 7095. | DRA       | 2         |
| 7096. | DRAWER    | 2         |
| 7097. | DRB       | 2         |
| 7098. | DREAMSI   | 2         |
| 7099. | DRIER     | 2         |
| 7100. | DRIFLO    | 2         |
| 7101. | DRINKS    | 2         |
| 7102. | DRK       | 2         |
| 7103. | DRN       | 2         |
| 7104. | DROPS     | 2         |
| 7105. | DROVE     | 2         |
| 7106. | DSM       | 2         |
| 7107. | DSMC      | 2         |
| 7108. | DSO       | 2         |
| 7109. | DSPRENGER | 2         |
| 7110. | DTLL      | 2         |
| 7111. | DTRBUS    | 2         |
| 7112. | DTY       | 2         |
| 7113. | DUB       | 2         |
| 7114. | DUCT      | 2         |
| 7115. | DUECKER   | 2         |
| 7116. | DUKE      | 2         |
| 7117. | DULCE     | 2         |
| 7118. | DUMMY     | 2         |
| 7119. | DUNFORD   | 2         |
| 7120. | DUNN      | 2         |

-252-

DOCKET NO.: PAGE01-00116  PATENT

| NO. | PHRASE | FREQUENCY |
|---|---|---|
| 7121. | DUNNEWIN | 2 |
| 7122. | DUPLEXSTE | 2 |
| 7123. | DURKEE | 2 |
| 7124. | DURST | 2 |
| 7125. | DUST | 2 |
| 7126. | DUVAL | 2 |
| 7127. | DXE | 2 |
| 7128. | DYNAMIC | 2 |
| 7129. | EABWJZG | 2 |
| 7130. | EAC | 2 |
| 7131. | EAKIN | 2 |
| 7132. | EAR | 2 |
| 7133. | EAREKA | 2 |
| 7134. | EARLEY | 2 |
| 7135. | EARNINGS | 2 |
| 7136. | EASIEST | 2 |
| 7137. | EASLEY | 2 |
| 7138. | EBRADY | 2 |
| 7139. | EBS | 2 |
| 7140. | ECH | 2 |
| 7141. | ECMD | 2 |
| 7142. | ECPECTS | 2 |
| 7143. | ECT | 2 |
| 7144. | ED'S | 2 |
| 7145. | EDGE | 2 |
| 7146. | EDIE | 2 |
| 7147. | EDMONDS | 2 |
| 7148. | EDS | 2 |
| 7149. | EEK | 2 |
| 7150. | EFF | 2 |
| 7151. | EFFECTIVELY | 2 |
| 7152. | EFFICIENTLY | 2 |
| 7153. | EFX | 2 |

-253-

DOCKET NO.: PAGE01-00116  PATENT

| NO. | PHRASE | FREQUENCY |
|---|---|---|
| 7154. | EGEE | 2 |
| 7155. | EHLERS | 2 |
| 7156. | EICHENBLACH | 2 |
| 7157. | EIGHT | 2 |
| 7158. | ELAINA | 2 |
| 7159. | ELECTRONIC | 2 |
| 7160. | ELECTRONICS | 2 |
| 7161. | ELEKTRA | 2 |
| 7162. | ELIAS | 2 |
| 7163. | ELISE | 2 |
| 7164. | ELLA | 2 |
| 7165. | ELLIE | 2 |
| 7166. | ELLY | 2 |
| 7167. | ELMSFO | 2 |
| 7168. | ELROY | 2 |
| 7169. | EMAILER | 2 |
| 7170. | EMBARRASING | 2 |
| 7171. | EMH | 2 |
| 7172. | EMMANUEL | 2 |
| 7173. | EMP | 2 |
| 7174. | EMPL | 2 |
| 7175. | EMPLY | 2 |
| 7176. | ENCOURAGE | 2 |
| 7177. | ENDING | 2 |
| 7178. | ENGAGED | 2 |
| 7179. | ENGE | 2 |
| 7180. | ENJOYED | 2 |
| 7181. | ENTERPRI | 2 |
| 7182. | ENTERTA | 2 |
| 7183. | ENTRIES | 2 |
| 7184. | ENVELOPE | 2 |
| 7185. | EPE | 2 |
| 7186. | EPHRATA | 2 |

-254-

DOCKET NO.: PAGE01-00116                                          PATENT

| NO.   | PHRASE       | FREQUENCY |
|-------|--------------|-----------|
| 7187. | EPISCOPAL    | 2         |
| 7188. | EPSON        | 2         |
| 7189. | ERASING      | 2         |
| 7190. | ERMINATED    | 2         |
| 7191. | ERNIE        | 2         |
| 7192. | ERNIE'S      | 2         |
| 7193. | ERRANDS      | 2         |
| 7194. | ESCALATED    | 2         |
| 7195. | ESKALITH     | 2         |
| 7196. | ESN          | 2         |
| 7197. | ESP          | 2         |
| 7198. | ESPLANDE     | 2         |
| 7199. | ESPN         | 2         |
| 7200. | ESTAMOS      | 2         |
| 7201. | ESTAN        | 2         |
| 7202. | ESTATES      | 2         |
| 7203. | ESTEN        | 2         |
| 7204. | ETHERNET     | 2         |
| 7205. | ETL          | 2         |
| 7206. | EV           | 2         |
| 7207. | EVA          | 2         |
| 7208. | EVANSTON     | 2         |
| 7209. | EVELYN       | 2         |
| 7210. | EVENT        | 2         |
| 7211. | EVERGREEN    | 2         |
| 7212. | EVERYBODY    | 2         |
| 7213. | EVERYTHING'S | 2         |
| 7214. | EVERYWHERE   | 2         |
| 7215. | EVIDENCE     | 2         |
| 7216. | EXCALIBER    | 2         |
| 7217. | EXCEED       | 2         |
| 7218. | EXFWSY       | 2         |
| 7219. | EXPAT        | 2         |

-255-

DOCKET NO.: PAGE01-00116  PATENT

| NO. | PHRASE | FREQUENCY |
|---|---|---|
| 7220. | EXPENSES | 2 |
| 7221. | EXPERIENCE | 2 |
| 7222. | EXPIRED | 2 |
| 7223. | EXPLAINED | 2 |
| 7224. | EXPLOADED | 2 |
| 7225. | EXPRESSIONS | 2 |
| 7226. | EXTREMELY | 2 |
| 7227. | EY | 2 |
| 7228. | EYE | 2 |
| 7229. | EYWC | 2 |
| 7230. | EYWJ | 2 |
| 7231. | FABRI | 2 |
| 7232. | FABRICS | 2 |
| 7233. | FAIT | 2 |
| 7234. | FAKE | 2 |
| 7235. | FALCON | 2 |
| 7236. | FALLEN | 2 |
| 7237. | FALTA | 2 |
| 7238. | FANTASY | 2 |
| 7239. | FARA | 2 |
| 7240. | FARBER | 2 |
| 7241. | FARHNER | 2 |
| 7242. | FAUCETTE | 2 |
| 7243. | FAULTS | 2 |
| 7244. | FAVORITE | 2 |
| 7245. | FAVORS | 2 |
| 7246. | FAX'D | 2 |
| 7247. | FDNY | 2 |
| 7248. | FECTS | 2 |
| 7249. | FEDERICO | 2 |
| 7250. | FEEDS | 2 |
| 7251. | FEELS | 2 |
| 7252. | FEINBERG | 2 |

DOCKET NO.: PAGE01-00116                                          PATENT

| NO.   | PHRASE     | FREQUENCY |
|-------|------------|-----------|
| 7253. | FEIT       | 2         |
| 7254. | FELECIA    | 2         |
| 7255. | FELIPE     | 2         |
| 7256. | FELT       | 2         |
| 7257. | FEMALE     | 2         |
| 7258. | FENWOOD    | 2         |
| 7259. | FERRARA    | 2         |
| 7260. | FERRY      | 2         |
| 7261. | FESTIVAL   | 2         |
| 7262. | FETES      | 2         |
| 7263. | FIB        | 2         |
| 7264. | FIEBRE     | 2         |
| 7265. | FIELDER    | 2         |
| 7266. | FIELDS     | 2         |
| 7267. | FIGUEROA   | 2         |
| 7268. | FILBERT    | 2         |
| 7269. | FILINSTSR  | 2         |
| 7270. | FILM       | 2         |
| 7271. | FINDING    | 2         |
| 7272. | FIRING     | 2         |
| 7273. | FIRPLS     | 2         |
| 7274. | FISHING    | 2         |
| 7275. | FIVE       | 2         |
| 7276. | FIXTURES   | 2         |
| 7277. | FLA        | 2         |
| 7278. | FLACO      | 2         |
| 7279. | FLANDREAU  | 2         |
| 7280. | FLEISCHER  | 2         |
| 7281. | FLESCH     | 2         |
| 7282. | FLICKERING | 2         |
| 7283. | FLIGHTS    | 2         |
| 7284. | FLINT      | 2         |
| 7285. | FLOPPY     | 2         |

-257-

DOCKET NO.: PAGE01-00116                                          PATENT

| NO.   | PHRASE       | FREQUENCY |
|-------|--------------|-----------|
| 7286. | FLOREZ       | 2         |
| 7287. | FLOWER       | 2         |
| 7288. | FLYNNE       | 2         |
| 7289. | FMXI         | 2         |
| 7290. | FOCK         | 2         |
| 7291. | FOGET        | 2         |
| 7292. | FOLDER       | 2         |
| 7293. | FOLDERS      | 2         |
| 7294. | FOLOOWING    | 2         |
| 7295. | FONTS        | 2         |
| 7296. | FOOTHILLS    | 2         |
| 7297. | FORGIONJ     | 2         |
| 7298. | FORMAN       | 2         |
| 7299. | FORMAT       | 2         |
| 7300. | FORSOUTHEAST | 2         |
| 7301. | FORUM        | 2         |
| 7302. | FORWEAR      | 2         |
| 7303. | FOUT         | 2         |
| 7304. | FP           | 2         |
| 7305. | FRACTURE     | 2         |
| 7306. | FRANCESCHINI | 2         |
| 7307. | FRANCHISE    | 2         |
| 7308. | FRANCISCO    | 2         |
| 7309. | FRANCOIS     | 2         |
| 7310. | FRANKEL      | 2         |
| 7311. | FRANKL       | 2         |
| 7312. | FREEDMAN     | 2         |
| 7313. | FREEDOM      | 2         |
| 7314. | FREELANCE    | 2         |
| 7315. | FREEMN       | 2         |
| 7316. | FREIGHT      | 2         |
| 7317. | FRIENDLY     | 2         |
| 7318. | FRK          | 2         |

-258-

DOCKET NO.: PAGE01-00116                                          PATENT

| NO.   | PHRASE    | FREQUENCY |
|-------|-----------|-----------|
| 7319. | FRO       | 2         |
| 7320. | FROST     | 2         |
| 7321. | FROZEN    | 2         |
| 7322. | FRUIT     | 2         |
| 7323. | FRUTKIN   | 2         |
| 7324. | FRYE      | 2         |
| 7325. | FSICMKT   | 2         |
| 7326. | FTPTO     | 2         |
| 7327. | FTS       | 2         |
| 7328. | FUCP      | 2         |
| 7329. | FULLERTON | 2         |
| 7330. | FURNITURE | 2         |
| 7331. | FUSER     | 2         |
| 7332. | FWD       | 2         |
| 7333. | FYYJG     | 2         |
| 7334. | GABINO    | 2         |
| 7335. | GADDY     | 2         |
| 7336. | GALARZA   | 2         |
| 7337. | GALLA     | 2         |
| 7338. | GAMING    | 2         |
| 7339. | GANADERA  | 2         |
| 7340. | GARAFANO  | 2         |
| 7341. | GARBLED   | 2         |
| 7342. | GARLIC    | 2         |
| 7343. | GASOLINE  | 2         |
| 7344. | GASTON    | 2         |
| 7345. | GATX      | 2         |
| 7346. | GAY       | 2         |
| 7347. | GE        | 2         |
| 7348. | GEMCO     | 2         |
| 7349. | GEMINI    | 2         |
| 7350. | GENEVA    | 2         |
| 7351. | GENOA     | 2         |

-259-

DOCKET NO.: PAGE01-00116 PATENT

| NO. | PHRASE | FREQUENCY |
|---|---|---|
| 7352. | GENTILE | 2 |
| 7353. | GENTLE | 2 |
| 7354. | GEO | 2 |
| 7355. | GERALDINE | 2 |
| 7356. | GERARD | 2 |
| 7357. | GES | 2 |
| 7358. | GESTURE | 2 |
| 7359. | GETHOSTBYNAME | 2 |
| 7360. | GIACOMINI | 2 |
| 7361. | GIBBS | 2 |
| 7362. | GIBSON | 2 |
| 7363. | GILBERT | 2 |
| 7364. | GINASIO | 2 |
| 7365. | GITA | 2 |
| 7366. | GK | 2 |
| 7367. | GKLWZZYV | 2 |
| 7368. | GKZAZ | 2 |
| 7369. | GLASSES | 2 |
| 7370. | GLENNA | 2 |
| 7371. | GLOAT | 2 |
| 7372. | GLOATING | 2 |
| 7373. | GM | 2 |
| 7374. | CMUNSON | 2 |
| 7375. | GOA | 2 |
| 7376. | GOESNATIONWIDE | 2 |
| 7377. | GOETZE | 2 |
| 7378. | GOINGTO | 2 |
| 7379. | GOLDBERG | 2 |
| 7380. | GOLDMAN | 2 |
| 7381. | GOLDSTEIN | 2 |
| 7382. | GOLDY | 2 |
| 7383. | GONZ | 2 |
| 7384. | GOODWIN | 2 |

-260-

DOCKET NO.: PAGE01-00116 PATENT

| NO. | PHRASE | FREQUENCY |
|---|---|---|
| 7385. | GOODYEAR | 2 |
| 7386. | GOOSE | 2 |
| 7387. | GOPHER | 2 |
| 7388. | GORSKI | 2 |
| 7389. | GOTO | 2 |
| 7390. | GOUGER | 2 |
| 7391. | GOVERNMENT | 2 |
| 7392. | GPF | 2 |
| 7393. | GQUINN | 2 |
| 7394. | GRABOWSKI | 2 |
| 7395. | GRACIE | 2 |
| 7396. | GRAINGER | 2 |
| 7397. | GRAM | 2 |
| 7398. | GRAN | 2 |
| 7399. | GRANDMA | 2 |
| 7400. | GRANTS | 2 |
| 7401. | GRATEFUL | 2 |
| 7402. | GREETING | 2 |
| 7403. | GRIFFEY | 2 |
| 7404. | GRILLS | 2 |
| 7405. | GRIM | 2 |
| 7406. | GRO | 2 |
| 7407. | GROCE | 2 |
| 7408. | GROUNDS | 2 |
| 7409. | GROUPWISE | 2 |
| 7410. | GROWERS | 2 |
| 7411. | GROWTH | 2 |
| 7412. | GRUNT | 2 |
| 7413. | GS | 2 |
| 7414. | GSD | 2 |
| 7415. | GSK | 2 |
| 7416. | GSSG | 2 |
| 7417. | GTLD | 2 |

DOCKET NO.: PAGE01-00116                                         PATENT

| NO.   | PHRASE     | FREQUENCY |
|-------|------------|-----------|
| 7418. | GTOB       | 2         |
| 7419. | GUAR       | 2         |
| 7420. | GUERRERO   | 2         |
| 7421. | GUEVARA    | 2         |
| 7422. | GUIDANCE   | 2         |
| 7423. | GUILTY     | 2         |
| 7424. | GUITIERREZ | 2         |
| 7425. | GUTMAN     | 2         |
| 7426. | GY         | 2         |
| 7427. | HADDAD     | 2         |
| 7428. | HAGEMAN    | 2         |
| 7429. | HALCO      | 2         |
| 7430. | HALEY      | 2         |
| 7431. | HALLELUJAH | 2         |
| 7432. | HALLM      | 2         |
| 7433. | HAM        | 2         |
| 7434. | HAMMER     | 2         |
| 7435. | HAMS       | 2         |
| 7436. | HANDLING   | 2         |
| 7437. | HANDSOME   | 2         |
| 7438. | HANGTIME   | 2         |
| 7439. | HANLE      | 2         |
| 7440. | HANLEY     | 2         |
| 7441. | HANNAH     | 2         |
| 7442. | HANOVER    | 2         |
| 7443. | HANS       | 2         |
| 7444. | HANTZ      | 2         |
| 7445. | HARDEE     | 2         |
| 7446. | HARDY      | 2         |
| 7447. | HARKER     | 2         |
| 7448. | HARNESS    | 2         |
| 7449. | HARPER     | 2         |
| 7450. | HARRINGTON | 2         |

DOCKET NO.: PAGE01-00116　　　　　　　　　　　　　　　　　　　　　　　　　　PATENT

| NO. | PHRASE | FREQUENCY |
|---|---|---|
| 7451. | HARRISONBURG | 2 |
| 7452. | HASSAN | 2 |
| 7453. | HAUT | 2 |
| 7454. | HAVIN | 2 |
| 7455. | HAWLEY | 2 |
| 7456. | HAYDEN | 2 |
| 7457. | HAYESN | 2 |
| 7458. | HAYSE | 2 |
| 7459. | HAYWOOD | 2 |
| 7460. | HAZELW | 2 |
| 7461. | HDA | 2 |
| 7462. | HDWR | 2 |
| 7463. | HEAELTHWAYS | 2 |
| 7464. | HEATING | 2 |
| 7465. | HEAVY | 2 |
| 7466. | HECK | 2 |
| 7467. | HECKETT | 2 |
| 7468. | HEE | 2 |
| 7469. | HEFF | 2 |
| 7470. | HEFFLINGER | 2 |
| 7471. | HELPS | 2 |
| 7472. | HEMA | 2 |
| 7473. | HEP | 2 |
| 7474. | HERCULES | 2 |
| 7475. | HERK | 2 |
| 7476. | HERMANO | 2 |
| 7477. | HEROES | 2 |
| 7478. | HERRARA | 2 |
| 7479. | HERSHEY | 2 |
| 7480. | HESS | 2 |
| 7481. | HEWITT | 2 |
| 7482. | HEWLETT | 2 |
| 7483. | HEX | 2 |

DOCKET NO.: PAGE01-00116                                    PATENT

| NO.   | PHRASE    | FREQUENCY |
|-------|-----------|-----------|
| 7484. | HH        | 2         |
| 7485. | HIAL      | 2         |
| 7486. | HIALE     | 2         |
| 7487. | HICKEY    | 2         |
| 7488. | HICKORY   | 2         |
| 7489. | HIDE      | 2         |
| 7490. | HIDING    | 2         |
| 7491. | HIGHALERT | 2         |
| 7492. | HIJO      | 2         |
| 7493. | HILLARY   | 2         |
| 7494. | HILLCREST | 2         |
| 7495. | HILLMAN   | 2         |
| 7496. | HILTI     | 2         |
| 7497. | HIMSELF   | 2         |
| 7498. | HIRAM     | 2         |
| 7499. | HITS      | 2         |
| 7500. | HJI       | 2         |
| 7501. | HMMM      | 2         |
| 7502. | HOBBS     | 2         |
| 7503. | HOLCOMB   | 2         |
| 7504. | HOLDER    | 2         |
| 7505. | HOLER     | 2         |
| 7506. | HOLIDAYS  | 2         |
| 7507. | HOLLYWOOD | 2         |
| 7508. | HOLTZE    | 2         |
| 7509. | HOLY      | 2         |
| 7510. | HOMER     | 2         |
| 7511. | HOMEWORK  | 2         |
| 7512. | HONDA     | 2         |
| 7513. | HONEYS    | 2         |
| 7514. | HOO       | 2         |
| 7515. | HORA      | 2         |
| 7516. | HORN      | 2         |

DOCKET NO.: PAGE01-00116																											PATENT

| NO. | PHRASE | FREQUENCY |
|---|---|---|
| 7517. | HORSE | 2 |
| 7518. | HORTON | 2 |
| 7519. | HOURLY | 2 |
| 7520. | HOURLYTABLE | 2 |
| 7521. | HOUSEKEEPING | 2 |
| 7522. | HOVEY | 2 |
| 7523. | HOWDY | 2 |
| 7524. | HOWE | 2 |
| 7525. | HOY | 2 |
| 7526. | HPC | 2 |
| 7527. | HQCB | 2 |
| 7528. | HQEFSA | 2 |
| 7529. | HRB | 2 |
| 7530. | HRD | 2 |
| 7531. | HRL | 2 |
| 7532. | HUD | 2 |
| 7533. | HUGO | 2 |
| 7534. | HUGULEY | 2 |
| 7535. | HUMAN | 2 |
| 7536. | HUMBERC | 2 |
| 7537. | HUMMING | 2 |
| 7538. | HUMOR | 2 |
| 7539. | HUNKA | 2 |
| 7540. | HUNTINGTON | 2 |
| 7541. | HUSSAIN | 2 |
| 7542. | HUTCHISON | 2 |
| 7543. | HYDRATION | 2 |
| 7544. | HYW | 2 |
| 7545. | I"L | 2 |
| 7546. | I'MNOT | 2 |
| 7547. | IA | 2 |
| 7548. | IAB | 2 |
| 7549. | ICA | 2 |

-265-

DOCKET NO.: PAGE01-00116　　　　　　　　　　　　　　　　　　　PATENT

| NO. | PHRASE | FREQUENCY |
|---|---|---|
| 7550. | ICBM | 2 |
| 7551. | ICED | 2 |
| 7552. | ICFKAISER | 2 |
| 7553. | ICG | 2 |
| 7554. | ICSTRATEGIES | 2 |
| 7555. | IDAY | 2 |
| 7556. | IGHT | 2 |
| 7557. | IGNORING | 2 |
| 7558. | IHAVE | 2 |
| 7559. | IIS | 2 |
| 7560. | IME | 2 |
| 7561. | IMPORTANTE | 2 |
| 7562. | IMPRENTA | 2 |
| 7563. | IMURAN | 2 |
| 7564. | IMY | 2 |
| 7565. | INCH | 2 |
| 7566. | INCHES | 2 |
| 7567. | INCLUDE | 2 |
| 7568. | INCLUDED | 2 |
| 7569. | INCOMPLETE | 2 |
| 7570. | INCORPORAT | 2 |
| 7571. | INCREASING | 2 |
| 7572. | INDEPENDENCE | 2 |
| 7573. | INDERAL | 2 |
| 7574. | INDICATES | 2 |
| 7575. | INDS | 2 |
| 7576. | INDUS | 2 |
| 7577. | INEED | 2 |
| 7578. | INFIRMARY | 2 |
| 7579. | INFOMARTUSA | 2 |
| 7580. | INFORMED | 2 |
| 7581. | INFUSION | 2 |
| 7582. | INGRAHAM | 2 |

DOCKET NO.: PAGE01-00116                                              PATENT

| NO.   | PHRASE        | FREQUENCY |
|-------|---------------|-----------|
| 7583. | INI           | 2         |
| 7584. | INITIAL       | 2         |
| 7585. | INITIALS      | 2         |
| 7586. | INKY          | 2         |
| 7587. | INMEDIATAMENTE| 2         |
| 7588. | INNER         | 2         |
| 7589. | INP           | 2         |
| 7590. | INQUIRIES     | 2         |
| 7591. | INSERT        | 2         |
| 7592. | INSERTS       | 2         |
| 7593. | INSPECTED     | 2         |
| 7594. | INSTITUTE     | 2         |
| 7595. | INSTRUCTION   | 2         |
| 7596. | INSTRUMENTS   | 2         |
| 7597. | INTENSIVE     | 2         |
| 7598. | IINTERACTION  | 2         |
| 7599. | INTERACTIVE   | 2         |
| 7600. | INTERBRAKE    | 2         |
| 7601. | INTERNA       | 2         |
| 7602. | INTERNETS     | 2         |
| 7603. | INTERRUPTE    | 2         |
| 7604. | INTL          | 2         |
| 7605. | INTSERV       | 2         |
| 7606. | INTTEMNT      | 2         |
| 7607. | INVGHOST      | 2         |
| 7608. | INVITE        | 2         |
| 7609. | INVOLVEMENT   | 2         |
| 7610. | IOCT          | 2         |
| 7611. | IPCP          | 2         |
| 7612. | IRA           | 2         |
| 7613. | IRATE         | 2         |
| 7614. | IRISH         | 2         |
| 7615. | IRWIN         | 2         |

-267-

DOCKET NO.: PAGE01-00116											PATENT

| NO. | PHRASE | FREQUENCY |
|---|---|---|
| 7616. | ISAAC | 2 |
| 7617. | ISIT | 2 |
| 7618. | ISLANDS | 2 |
| 7619. | ISP | 2 |
| 7620. | ISREAL | 2 |
| 7621. | ISSUED | 2 |
| 7622. | IT'SGOT | 2 |
| 7623. | ITI | 2 |
| 7624. | ITMSGERROR | 2 |
| 7625. | ITWILL | 2 |
| 7626. | IVE | 2 |
| 7627. | IVERSON | 2 |
| 7628. | IWCC | 2 |
| 7629. | IZEN | 2 |
| 7630. | IZZPVHXYJZDGNJ | 2 |
| 7631. | JA | 2 |
| 7632. | JACKS | 2 |
| 7633. | JACKSONVILLE | 2 |
| 7634. | JACOB | 2 |
| 7635. | JACQUE | 2 |
| 7636. | JAKE | 2 |
| 7637. | JAMEY | 2 |
| 7638. | JANCE | 2 |
| 7639. | JANIE | 2 |
| 7640. | JARAMILLO | 2 |
| 7641. | JAY'S | 2 |
| 7642. | JBB | 2 |
| 7643. | JCCS | 2 |
| 7644. | JCP | 2 |
| 7645. | JE | 2 |
| 7646. | JEANIE | 2 |
| 7647. | JEC | 2 |
| 7648. | JED | 2 |

DOCKET NO.: PAGE01-00116                                              PATENT

| NO.   | PHRASE       | FREQUENCY |
|-------|--------------|-----------|
| 7649. | JEFFERY      | 2         |
| 7650. | JEFFREY      | 2         |
| 7651. | JENKINS      | 2         |
| 7652. | JENN         | 2         |
| 7653. | JENNETT      | 2         |
| 7654. | JENNINGS     | 2         |
| 7655. | JENSEN       | 2         |
| 7656. | JERK         | 2         |
| 7657. | JERMANOVICH'S| 2         |
| 7658. | JERRYK       | 2         |
| 7659. | JERSEY       | 2         |
| 7660. | JET          | 2         |
| 7661. | JEWELL       | 2         |
| 7662. | JEWLERY      | 2         |
| 7663. | JF           | 2         |
| 7664. | JGVJHV       | 2         |
| 7665. | JGZBD        | 2         |
| 7666. | JILLHAM      | 2         |
| 7667. | JILLIAN      | 2         |
| 7668. | JIMENEZ      | 2         |
| 7669. | JIMMIE       | 2         |
| 7670. | JJB          | 2         |
| 7671. | JJEHF        | 2         |
| 7672. | JJI          | 2         |
| 7673. | JJIHWZXWZ    | 2         |
| 7674. | JJJDAYJ      | 2         |
| 7675. | JJJGAYJ      | 2         |
| 7676. | JJJGJWSZ     | 2         |
| 7677. | JJJGJWZZ     | 2         |
| 7678. | JJYMG        | 2         |
| 7679. | JLW          | 2         |
| 7680. | JNB          | 2         |
| 7681. | JOAQ         | 2         |

*-269-*

DOCKET NO.: PAGE01-00116 PATENT

| NO. | PHRASE | FREQUENCY |
|---|---|---|
| 7682. | JOAQUIN | 2 |
| 7683. | JOBSITE | 2 |
| 7684. | JOBSWAITING | 2 |
| 7685. | JOECREDIT | 2 |
| 7686. | JOHNNIE | 2 |
| 7687. | JOHNSTON | 2 |
| 7688. | JOINT | 2 |
| 7689. | JOKE | 2 |
| 7690. | JONH | 2 |
| 7691. | JONNA | 2 |
| 7692. | JORDI | 2 |
| 7693. | JOSEFINA | 2 |
| 7694. | JOSEPH'S | 2 |
| 7695. | JOSIE | 2 |
| 7696. | JPL | 2 |
| 7697. | JUDGE | 2 |
| 7698. | JUMPER | 2 |
| 7699. | JUPITER | 2 |
| 7700. | JUS | 2 |
| 7701. | JUSTOF | 2 |
| 7702. | JYHFNAZWNKEVA | 2 |
| 7703. | KAHULUI | 2 |
| 7704. | KAI | 2 |
| 7705. | KAILUA | 2 |
| 7706. | KAPILA | 2 |
| 7707. | KARI | 2 |
| 7708. | KARINA | 2 |
| 7709. | KATEY | 2 |
| 7710. | KATZ | 2 |
| 7711. | KBW | 2 |
| 7712. | KDCNY | 2 |
| 7713. | KDSC | 2 |
| 7714. | KEDING | 2 |

-270-

DOCKET NO.: PAGE01-00116                              PATENT

| NO.   | PHRASE   | FREQUENCY |
|-------|----------|-----------|
| 7715. | KEEN     | 2         |
| 7716. | KELLIE   | 2         |
| 7717. | KELLOGGS | 2         |
| 7718. | KEMP     | 2         |
| 7719. | KENDALL  | 2         |
| 7720. | KEROTEST | 2         |
| 7721. | KEV      | 2         |
| 7722. | KEVEN    | 2         |
| 7723. | KEYSTONE | 2         |
| 7724. | KIDDING  | 2         |
| 7725. | KIEFE    | 2         |
| 7726. | KILLING  | 2         |
| 7727. | KILOBYTE | 2         |
| 7728. | KIMMEL   | 2         |
| 7729. | KINGS    | 2         |
| 7730. | KIRBY    | 2         |
| 7731. | KITANO   | 2         |
| 7732. | KJCC     | 2         |
| 7733. | KJGW     | 2         |
| 7734. | KKB      | 2         |
| 7735. | KKBBJC   | 2         |
| 7736. | KKJBJG   | 2         |
| 7737. | KKKKK    | 2         |
| 7738. | KLAR     | 2         |
| 7739. | KLB      | 2         |
| 7740. | KLBBJ    | 2         |
| 7741. | KLINGER  | 2         |
| 7742. | KNEEPADS | 2         |
| 7743. | KNEES    | 2         |
| 7744. | KNEW     | 2         |
| 7745. | KNITS    | 2         |
| 7746. | KNOCKING | 2         |
| 7747. | KNOWSHOW | 2         |

DOCKET NO.: PAGE01-00116                                           PATENT

| NO.   | PHRASE      | FREQUENCY |
|-------|-------------|-----------|
| 7748. | KOCH        | 2         |
| 7749. | KOLAKOWSKI  | 2         |
| 7750. | KOOL        | 2         |
| 7751. | KIPPEL      | 2         |
| 7752. | KOUNTR      | 2         |
| 7753. | KP          | 2         |
| 7754. | KR          | 2         |
| 7755. | KRAUS       | 2         |
| 7756. | KRISTEN     | 2         |
| 7757. | KRISTINA    | 2         |
| 7758. | KROH        | 2         |
| 7759. | KRSLC       | 2         |
| 7760. | KULIKOFF    | 2         |
| 7761. | KVDH        | 2         |
| 7762. | KZIZ        | 2         |
| 7763. | KZXJK       | 2         |
| 7764. | KZYKZYN     | 2         |
| 7765. | LACKAWANNA  | 2         |
| 7766. | LADIES      | 2         |
| 7767. | LAGAYLA     | 2         |
| 7768. | LAINDRY     | 2         |
| 7769. | LAKEFRONT   | 2         |
| 7770. | LAMBERT     | 2         |
| 7771. | LAMONG      | 2         |
| 7772. | LANA        | 2         |
| 7773. | LANDAIR     | 2         |
| 7774. | LANDIS      | 2         |
| 7775. | LANDSCAPE   | 2         |
| 7776. | LANETT      | 2         |
| 7777. | LANGE       | 2         |
| 7778. | LANNY       | 2         |
| 7779. | LANSING     | 2         |
| 7780. | LARA        | 2         |

DOCKET NO.: PAGE01-00116　　　　　　　　　　　　　　　　　　　　PATENT

| NO. | PHRASE | FREQUENCY |
|---|---|---|
| 7781. | LARRY'S | 2 |
| 7782. | LASER | 2 |
| 7783. | LASHBROOK | 2 |
| 7784. | LATIFA | 2 |
| 7785. | LATROBE | 2 |
| 7786. | LAU | 2 |
| 7787. | LAUBACH | 2 |
| 7788. | LAURAYNE'S | 2 |
| 7789. | LAURIE | 2 |
| 7790. | LAWN | 2 |
| 7791. | LAWSON | 2 |
| 7792. | LAX | 2 |
| 7793. | LAZED | 2 |
| 7794. | LBHOT | 2 |
| 7795. | LCJZZFWYJXOJDV | 2 |
| 7796. | LD | 2 |
| 7797. | LEADERS | 2 |
| 7798. | LEAF | 2 |
| 7799. | LEAH | 2 |
| 7800. | LEARY | 2 |
| 7801. | LEASURE | 2 |
| 7802. | LEATH | 2 |
| 7803. | LEECHB | 2 |
| 7804. | LEEDS | 2 |
| 7805. | LEG | 2 |
| 7806. | LEIF | 2 |
| 7807. | LEMAIRE | 2 |
| 7808. | LENDMAN | 2 |
| 7809. | LENNON | 2 |
| 7810. | LENOX | 2 |
| 7811. | LETICIA'S | 2 |
| 7812. | LETME | 2 |
| 7813. | LETTY | 2 |

-273-

DOCKET NO.: PAGE01-00116                                     PATENT

| NO.   | PHRASE      | FREQUENCY |
|-------|-------------|-----------|
| 7814. | LEVENTHAL   | 2         |
| 7815. | LEVSINEX    | 2         |
| 7816. | LEVY        | 2         |
| 7817. | LEWISON     | 2         |
| 7818. | LHERNANDEZ  | 2         |
| 7819. | LIAR        | 2         |
| 7820. | LIB         | 2         |
| 7821. | LIBBYF      | 2         |
| 7822. | LICENSING   | 2         |
| 7823. | LIFTS       | 2         |
| 7824. | LIGHTFOOT   | 2         |
| 7825. | LILI        | 2         |
| 7826. | LILLO       | 2         |
| 7827. | LILY        | 2         |
| 7828. | LIMBURGER   | 2         |
| 7829. | LIMO        | 2         |
| 7830. | LIN         | 2         |
| 7831. | LINA        | 2         |
| 7832. | LINCHETA    | 2         |
| 7833. | LINCO       | 2         |
| 7834. | LINDHOLM    | 2         |
| 7835. | LINKS       | 2         |
| 7836. | LIQUORS     | 2         |
| 7837. | LISTING     | 2         |
| 7838. | LITS        | 2         |
| 7839. | LITTLEJOHN  | 2         |
| 7840. | LITZOW      | 2         |
| 7841. | LIVERPOOL   | 2         |
| 7842. | LIVINGSTON  | 2         |
| 7843. | LIYE        | 2         |
| 7844. | LIZETH      | 2         |
| 7845. | LLAMADA     | 2         |
| 7846. | LLAME       | 2         |

-274-

DOCKET NO.: PAGE01-00116                                    PATENT

| NO.   | PHRASE     | FREQUENCY |
|-------|------------|-----------|
| 7847. | LLAMO      | 2         |
| 7848. | LLANTA     | 2         |
| 7849. | LLAVES     | 2         |
| 7850. | LLC        | 2         |
| 7851. | LLM        | 2         |
| 7852. | LLOYD      | 2         |
| 7853. | LLOYD'S    | 2         |
| 7854. | LNIPBS     | 2         |
| 7855. | LOCATIONS  | 2         |
| 7856. | LOCKSMITH  | 2         |
| 7857. | LODGES     | 2         |
| 7858. | LOESEL     | 2         |
| 7859. | LOFTON     | 2         |
| 7860. | LOGAN      | 2         |
| 7861. | LOGMONITOR | 2         |
| 7862. | LOMA       | 2         |
| 7863. | LONDRE     | 2         |
| 7864. | LONE       | 2         |
| 7865. | LONELY     | 2         |
| 7866. | LORNA      | 2         |
| 7867. | LORY       | 2         |
| 7868. | LOUDON     | 2         |
| 7869. | LOUISVILLE | 2         |
| 7870. | LOVELESS   | 2         |
| 7871. | LOVES      | 2         |
| 7872. | LOWRY      | 2         |
| 7873. | LOXAHATCHEE| 2         |
| 7874. | LOYALTY    | 2         |
| 7875. | LPC        | 2         |
| 7876. | LSAFS      | 2         |
| 7877. | LTHRAN     | 2         |
| 7878. | LTIS       | 2         |
| 7879. | LUBBOCK    | 2         |

-275-

DOCKET NO.: PAGE01-00116                                      PATENT

| NO.   | PHRASE    | FREQUENCY |
|-------|-----------|-----------|
| 7880. | LUBES     | 2 |
| 7881. | LUCIA     | 2 |
| 7882. | LULLY     | 2 |
| 7883. | LUM       | 2 |
| 7884. | LUMBER    | 2 |
| 7885. | LUNA      | 2 |
| 7886. | LW        | 2 |
| 7887. | LWR       | 2 |
| 7888. | LYING     | 2 |
| 7889. | LZ        | 2 |
| 7890. | MACINTOSH | 2 |
| 7891. | MACK      | 2 |
| 7892. | MACKIE    | 2 |
| 7893. | MAGGIE    | 2 |
| 7894. | MAGNO     | 2 |
| 7895. | MAHMOOD   | 2 |
| 7896. | MAID      | 2 |
| 7897. | MAILER    | 2 |
| 7898. | MAILVA    | 2 |
| 7899. | MAISONET  | 2 |
| 7900. | MALDONADO | 2 |
| 7901. | MALLOY    | 2 |
| 7902. | MANDE     | 2 |
| 7903. | MANDO     | 2 |
| 7904. | MANDY     | 2 |
| 7905. | MANH      | 2 |
| 7906. | MANNER    | 2 |
| 7907. | MANNINO   | 2 |
| 7908. | MANONI    | 2 |
| 7909. | MANS      | 2 |
| 7910. | MANSFI    | 2 |
| 7911. | MAPA      | 2 |
| 7912. | MAR'S     | 2 |

-276-

DOCKET NO.: PAGE01-00116                                    PATENT

| NO.   | PHRASE    | FREQUENCY |
|-------|-----------|-----------|
| 7913. | MARA      | 2         |
| 7914. | MARDI     | 2         |
| 7915. | MARE      | 2         |
| 7916. | MARICE    | 2         |
| 7917. | MARKM     | 2         |
| 7918. | MARKWELL  | 2         |
| 7919. | MARLA     | 2         |
| 7920. | MARLIN    | 2         |
| 7921. | MARLON    | 2         |
| 7922. | MARTIE    | 2         |
| 7923. | MARTIEC   | 2         |
| 7924. | MARTINS   | 2         |
| 7925. | MARYANNE  | 2         |
| 7926. | MARYLYN   | 2         |
| 7927. | MASTROINE | 2         |
| 7928. | MAT       | 2         |
| 7929. | MATH      | 2         |
| 7930. | MATHEWS   | 2         |
| 7931. | MATHIS    | 2         |
| 7932. | MATILDE   | 2         |
| 7933. | MATT'S    | 2         |
| 7934. | MATTS     | 2         |
| 7935. | MAW       | 2         |
| 7936. | MAYOR     | 2         |
| 7937. | MBNARJE   | 2         |
| 7938. | MCARDY    | 2         |
| 7939. | MCCLURE   | 2         |
| 7940. | MCDERMOTT | 2         |
| 7941. | MCGOWAN   | 2         |
| 7942. | MCGREGOR  | 2         |
| 7943. | MCGRORY   | 2         |
| 7944. | MCGUIRE   | 2         |
| 7945. | MCHONE    | 2         |

-277-

DOCKET NO.: PAGE01-00116                                          PATENT

| NO.   | PHRASE        | FREQUENCY |
|-------|---------------|-----------|
| 7946. | MCMANIGAL     | 2         |
| 7947. | MCO           | 2         |
| 7948. | MEADOW        | 2         |
| 7949. | MEASUREMENTS  | 2         |
| 7950. | MEDE          | 2         |
| 7951. | MEDNET        | 2         |
| 7952. | MEDPROVIDERS  | 2         |
| 7953. | MEDRAD        | 2         |
| 7954. | MEDTRONIC     | 2         |
| 7955. | MEEKS         | 2         |
| 7956. | MEETI         | 2         |
| 7957. | MEHTA         | 2         |
| 7958. | MEKNOW        | 2         |
| 7959. | MELENDEZ      | 2         |
| 7960. | MELISSA'S     | 2         |
| 7961. | MEMBERSHIP    | 2         |
| 7962. | MENINGALL     | 2         |
| 7963. | MENS          | 2         |
| 7964. | MEPS          | 2         |
| 7965. | MERCEDES      | 2         |
| 7966. | MERCER        | 2         |
| 7967. | MERIT         | 2         |
| 7968. | MERRILL       | 2         |
| 7969. | MESH          | 2         |
| 7970. | MESPO         | 2         |
| 7971. | MESSINA       | 2         |
| 7972. | METHOD        | 2         |
| 7973. | MEXICO        | 2         |
| 7974. | MFO           | 2         |
| 7975. | MFRPCHEARTBEAT| 2         |
| 7976. | MGM           | 2         |
| 7977. | MIA           | 2         |
| 7978. | MICKEY        | 2         |

DOCKET NO.: PAGE01-00116                                    PATENT

| NO.   | PHRASE          | FREQUENCY |
|-------|-----------------|-----------|
| 7979. | MICRO           | 2         |
| 7980. | MIDNIGHT        | 2         |
| 7981. | MIDRANGE        | 2         |
| 7982. | MIGADC          | 2         |
| 7983. | MIGUEL          | 2         |
| 7984. | MIKES           | 2         |
| 7985. | MIKEY           | 2         |
| 7986. | MILEDC          | 2         |
| 7987. | MILLERR         | 2         |
| 7988. | MILLION         | 2         |
| 7989. | MILLK           | 2         |
| 7990. | MINER           | 2         |
| 7991. | MINERAL         | 2         |
| 7992. | MINICOM         | 2         |
| 7993. | MINNEAPOLISREN  | 2         |
| 7994. | MINUS           | 2         |
| 7995. | MINYARD         | 2         |
| 7996. | MIRA            | 2         |
| 7997. | MIRAMAR         | 2         |
| 7998. | MIS             | 2         |
| 7999. | MISSPELLED      | 2         |
| 8000. | MISSY           | 2         |
| 8001. | MIST            | 2         |
| 8002. | MITSY           | 2         |
| 8003. | MJYJNZYYBYIDYY  | 2         |
| 8004. | MKT             | 2         |
| 8005. | ML              | 2         |
| 8006. | MLK             | 2         |
| 8007. | MNIE            | 2         |
| 8008. | MNPA            | 2         |
| 8009. | MOBI            | 2         |
| 8010. | MODESTO         | 2         |
| 8011. | MOHAMED         | 2         |

DOCKET NO.: PAGE01-00116                                           PATENT

| NO.   | PHRASE       | FREQUENCY |
|-------|--------------|-----------|
| 8012. | MOHAWK       | 2         |
| 8013. | MONA         | 2         |
| 8014. | MONIQUE      | 2         |
| 8015. | MONIZ        | 2         |
| 8016. | MONROE       | 2         |
| 8017. | MONTE        | 2         |
| 8018. | MONTH'S      | 2         |
| 8019. | MOOOOOOOOOW  | 2         |
| 8020. | MOR          | 2         |
| 8021. | MORENO       | 2         |
| 8022. | MORNIN       | 2         |
| 8023. | MORTO        | 2         |
| 8024. | MOSES        | 2         |
| 8025. | MOUTH        | 2         |
| 8026. | MOV          | 2         |
| 8027. | MOVES        | 2         |
| 8028. | MOW          | 2         |
| 8029. | MPATTEN      | 2         |
| 8030. | MPLS         | 2         |
| 8031. | MPWX         | 2         |
| 8032. | MRK          | 2         |
| 8033. | MSC          | 2         |
| 8034. | MSCD         | 2         |
| 8035. | MSMAIL       | 2         |
| 8036. | MSMP         | 2         |
| 8037. | MSP          | 2         |
| 8038. | MSTLY        | 2         |
| 8039. | MSU          | 2         |
| 8040. | MTCE         | 2         |
| 8041. | MTD          | 2         |
| 8042. | MTV          | 2         |
| 8043. | MUCHOS       | 2         |
| 8044. | MUD          | 2         |

-280-

DOCKET NO.: PAGE01-00116  PATENT

| NO. | PHRASE | FREQUENCY |
|---|---|---|
| 8045. | MUFFINS | 2 |
| 8046. | MULKERNE'S | 2 |
| 8047. | MULL | 2 |
| 8048. | MUM | 2 |
| 8049. | MUNICIPLE | 2 |
| 8050. | MURRYS | 2 |
| 8051. | MUY | 2 |
| 8052. | MYER | 2 |
| 8053. | NAIL | 2 |
| 8054. | NAKED | 2 |
| 8055. | NAPA | 2 |
| 8056. | NATION | 2 |
| 8057. | NAZARETH | 2 |
| 8058. | NC | 2 |
| 8059. | NEAL | 2 |
| 8060. | NECK | 2 |
| 8061. | NEE | 2 |
| 8062. | NEECE | 2 |
| 8063. | NEEDSBATTERYS | 2 |
| 8064. | NEEDSREPAIR | 2 |
| 8065. | NEER | 2 |
| 8066. | NEGATIVE | 2 |
| 8067. | NEGRO | 2 |
| 8068. | NELLIE | 2 |
| 8069. | NEPPERHAN | 2 |
| 8070. | NESECITA | 2 |
| 8071. | NETTA | 2 |
| 8072. | NETVIEW | 2 |
| 8073. | NETWORKS | 2 |
| 8074. | NEWBERG | 2 |
| 8075. | NEWMAN | 2 |
| 8076. | NEWNAN | 2 |
| 8077. | NICHOLAS | 2 |

DOCKET NO.: PAGE01-00116                                              PATENT

| NO.   | PHRASE       | FREQUENCY |
|-------|--------------|-----------|
| 8078. | NICHOLS      | 2         |
| 8079. | NICHOLSON'S  | 2         |
| 8080. | NIETZSCHE    | 2         |
| 8081. | NIGHTSTAND   | 2         |
| 8082. | NIMBUS       | 2         |
| 8083. | NINO         | 2         |
| 8084. | NIRVANA      | 2         |
| 8085. | NITRO        | 2         |
| 8086. | NIXON        | 2         |
| 8087. | NL           | 2         |
| 8088. | NOAH         | 2         |
| 8089. | NOE          | 2         |
| 8090. | NOKIA        | 2         |
| 8091. | NOLTE        | 2         |
| 8092. | NORFOLK      | 2         |
| 8093. | NORMALLY     | 2         |
| 8094. | NORRIS       | 2         |
| 8095. | NORTE        | 2         |
| 8096. | NORTON       | 2         |
| 8097. | NORWALK      | 2         |
| 8098. | NOSE         | 2         |
| 8099. | NOTIFICATION | 2         |
| 8100. | NOVELTY      | 2         |
| 8101. | NOVEMBER     | 2         |
| 8102. | NPA          | 2         |
| 8103. | NSA          | 2         |
| 8104. | NTCE         | 2         |
| 8105. | NU           | 2         |
| 8106. | NULL         | 2         |
| 8107. | NUT          | 2         |
| 8108. | NYCITF       | 2         |
| 8109. | NYDEVF       | 2         |
| 8110. | NYEQRM       | 2         |

-282-

DOCKET NO.: PAGE01-00116 PATENT

| NO.   | PHRASE         | FREQUENCY |
|-------|----------------|-----------|
| 8111. | NYNDSF         | 2         |
| 8112. | NYNEX          | 2         |
| 8113. | NYPCIS         | 2         |
| 8114. | NYSCO          | 2         |
| 8115. | NZZYJYZFVZFWYZ | 2         |
| 8116. | O'BRIEN        | 2         |
| 8117. | O'CONNER       | 2         |
| 8118. | O'DELL         | 2         |
| 8119. | O'LEARY        | 2         |
| 8120. | OAKBROOK       | 2         |
| 8121. | OAKMONT        | 2         |
| 8122. | OBE            | 2         |
| 8123. | OBLEM          | 2         |
| 8124. | OBRIAN         | 2         |
| 8125. | OBRIEN         | 2         |
| 8126. | OCCUPATIONAL   | 2         |
| 8127. | OCM            | 2         |
| 8128. | OCTEL          | 2         |
| 8129. | ODISP          | 2         |
| 8130. | OE             | 2         |
| 8131. | OEHME          | 2         |
| 8132. | OFFC           | 2         |
| 8133. | OFFCASCADE     | 2         |
| 8134. | OFFENSE        | 2         |
| 8135. | OFFIC          | 2         |
| 8136. | OFFICES        | 2         |
| 8137. | OFFICIAL       | 2         |
| 8138. | OFFS           | 2         |
| 8139. | OHH            | 2         |
| 8140. | OILY           | 2         |
| 8141. | OKI            | 2         |
| 8142. | OLATHE         | 2         |
| 8143. | OLDENBURG      | 2         |

-283-

DOCKET NO.: PAGE01-00116                                              PATENT

| NO.   | PHRASE        | FREQUENCY |
|-------|---------------|-----------|
| 8144. | OLIVE         | 2         |
| 8145. | OLIVERO       | 2         |
| 8146. | OLVIDE        | 2         |
| 8147. | OM            | 2         |
| 8148. | OMEGA         | 2         |
| 8149. | OMORROW       | 2         |
| 8150. | ONATE         | 2         |
| 8151. | ONEAC         | 2         |
| 8152. | ONEIL         | 2         |
| 8153. | ONTARIO       | 2         |
| 8154. | ONTHE         | 2         |
| 8155. | ONYOUR        | 2         |
| 8156. | ONYX          | 2         |
| 8157. | OO            | 2         |
| 8158. | OOL           | 2         |
| 8159. | OOO           | 2         |
| 8160. | OOOOOOOHHHHHH | 2         |
| 8161. | OPENER        | 2         |
| 8162. | OPER          | 2         |
| 8163. | OPERATING     | 2         |
| 8164. | OPT           | 2         |
| 8165. | OPTIC         | 2         |
| 8166. | ORACLEOMESP   | 2         |
| 8167. | ORF           | 2         |
| 8168. | ORG           | 2         |
| 8169. | ORIENTATION   | 2         |
| 8170. | ORLAND        | 2         |
| 8171. | ORTEGA        | 2         |
| 8172. | ORTH          | 2         |
| 8173. | ORTHOMERICA   | 2         |
| 8174. | OSAC          | 2         |
| 8175. | OSBORN        | 2         |
| 8176. | OSTLIE        | 2         |

-284-

DOCKET NO.: PAGE01-00116                                              PATENT

| NO.   | PHRASE     | FREQUENCY |
|-------|------------|-----------|
| 8177. | OSWEGO     | 2         |
| 8178. | OTC        | 2         |
| 8179. | OTERO      | 2         |
| 8180. | OTNR       | 2         |
| 8181. | OTTEY      | 2         |
| 8182. | OTTO       | 2         |
| 8183. | OUTCOME    | 2         |
| 8184. | OUTLETS    | 2         |
| 8185. | OVERNIGHT  | 2         |
| 8186. | OXYGEN     | 2         |
| 8187. | P'TREE     | 2         |
| 8188. | PACKAGES   | 2         |
| 8189. | PACKETS    | 2         |
| 8190. | PACKING    | 2         |
| 8191. | PACMAN     | 2         |
| 8192. | PADGETT    | 2         |
| 8193. | PAK        | 2         |
| 8194. | PALESTINE  | 2         |
| 8195. | PALMER     | 2         |
| 8196. | PALMS      | 2         |
| 8197. | PALOMA     | 2         |
| 8198. | PANELS     | 2         |
| 8199. | PANG       | 2         |
| 8200. | PANTHER    | 2         |
| 8201. | PAPA       | 2         |
| 8202. | PAPI       | 2         |
| 8203. | PAR        | 2         |
| 8204. | PARAMOUNT  | 2         |
| 8205. | PARCEL     | 2         |
| 8206. | PARDNER    | 2         |
| 8207. | PARDUHN    | 2         |
| 8208. | PARENT     | 2         |
| 8209. | PARENTHOOD | 2         |

-285-

DOCKET NO.: PAGE01-00116                                    PATENT

| NO.   | PHRASE      | FREQUENCY |
|-------|-------------|-----------|
| 8210. | PARTIALLY   | 2         |
| 8211. | PARTNERS    | 2         |
| 8212. | PAS         | 2         |
| 8213. | PASAR       | 2         |
| 8214. | PASCUAL     | 2         |
| 8215. | PATCH       | 2         |
| 8216. | PATER       | 2         |
| 8217. | PATH        | 2         |
| 8218. | PATIAL      | 2         |
| 8219. | PAULI       | 2         |
| 8220. | PAYCHECKS   | 2         |
| 8221. | PAYDAY      | 2         |
| 8222. | PAYING      | 2         |
| 8223. | PBG         | 2         |
| 8224. | PCASAP      | 2         |
| 8225. | PCO         | 2         |
| 8226. | PD          | 2         |
| 8227. | PDARLING    | 2         |
| 8228. | PEAK        | 2         |
| 8229. | PEAVINE     | 2         |
| 8230. | PECO        | 2         |
| 8231. | PELICAN     | 2         |
| 8232. | PELVIS      | 2         |
| 8233. | PEMBROKE    | 2         |
| 8234. | PENA        | 2         |
| 8235. | PEORIA      | 2         |
| 8236. | PEPPERS     | 2         |
| 8237. | PEREGOFF    | 2         |
| 8238. | PERFORMANCE | 2         |
| 8239. | PERIA       | 2         |
| 8240. | PERIODS     | 2         |
| 8241. | PERKINS     | 2         |
| 8242. | PERMISO     | 2         |

-286-

DOCKET NO.: PAGE01-00116                                             PATENT

| NO.   | PHRASE    | FREQUENCY |
|-------|-----------|-----------|
| 8243. | PERTONY   | 2         |
| 8244. | PES       | 2         |
| 8245. | PEST      | 2         |
| 8246. | PET       | 2         |
| 8247. | PETRINO   | 2         |
| 8248. | PEWEE     | 2         |
| 8249. | PFIFFER   | 2         |
| 8250. | PHASE     | 2         |
| 8251. | PHILLIES  | 2         |
| 8252. | PHOTOS    | 2         |
| 8253. | PHX       | 2         |
| 8254. | PI        | 2         |
| 8255. | PICC      | 2         |
| 8256. | PICKS     | 2         |
| 8257. | PICTURE   | 2         |
| 8258. | PILL      | 2         |
| 8259. | PIMENTE   | 2         |
| 8260. | PINEVILLE | 2         |
| 8261. | PINO      | 2         |
| 8262. | PINSEL    | 2         |
| 8263. | PIONEER   | 2         |
| 8264. | PISSED    | 2         |
| 8265. | PITTINOS  | 2         |
| 8266. | PKY       | 2         |
| 8267. | PLAGUE    | 2         |
| 8268. | PLANE     | 2         |
| 8269. | PLANET    | 2         |
| 8270. | PLASTICS  | 2         |
| 8271. | PLAYOFFS  | 2         |
| 8272. | PLEAS     | 2         |
| 8273. | PLOWING   | 2         |
| 8274. | PLUMB     | 2         |
| 8275. | PMDONE    | 2         |

*-287-*

DOCKET NO.: PAGE01-00116                                    PATENT

| NO.   | PHRASE    | FREQUENCY |
|-------|-----------|-----------|
| 8276. | PMHS      | 2         |
| 8277. | PNL       | 2         |
| 8278. | POB       | 2         |
| 8279. | POCKET    | 2         |
| 8280. | POE       | 2         |
| 8281. | POETHELP  | 2         |
| 8282. | POI       | 2         |
| 8283. | POINTER   | 2         |
| 8284. | POINTERS  | 2         |
| 8285. | POLLY     | 2         |
| 8286. | POND      | 2         |
| 8287. | POPAT     | 2         |
| 8288. | POPE      | 2         |
| 8289. | PORTA     | 2         |
| 8290. | POSITIONS | 2         |
| 8291. | POSTAL    | 2         |
| 8292. | POTATO    | 2         |
| 8293. | POTATOES  | 2         |
| 8294. | POVICH    | 2         |
| 8295. | POWELL    | 2         |
| 8296. | POWERING  | 2         |
| 8297. | POWERLINE | 2         |
| 8298. | POWERMAC  | 2         |
| 8299. | POYDRAS   | 2         |
| 8300. | PPID      | 2         |
| 8301. | PPT       | 2         |
| 8302. | PRBLM     | 2         |
| 8303. | PREATO'S  | 2         |
| 8304. | PRENOT    | 2         |
| 8305. | PREPAID   | 2         |
| 8306. | PREPARATE | 2         |
| 8307. | PREPARED  | 2         |
| 8308. | PREPARES  | 2         |

DOCKET NO.:  PAGE01-00116                                      PATENT

| NO.   | PHRASE       | FREQUENCY |
|-------|--------------|-----------|
| 8309. | PREPARING    | 2 |
| 8310. | PREPAY       | 2 |
| 8311. | PRIMATE      | 2 |
| 8312. | PRINCIPAL    | 2 |
| 8313. | PRINTERS     | 2 |
| 8314. | PRISCILLA    | 2 |
| 8315. | PRIVATIZE    | 2 |
| 8316. | PROCARDIA    | 2 |
| 8317. | PROCS        | 2 |
| 8318. | PRODTS       | 2 |
| 8319. | PRODUC       | 2 |
| 8320. | PRODUCE      | 2 |
| 8321. | PROF         | 2 |
| 8322. | PROFESSOR    | 2 |
| 8323. | PROG         | 2 |
| 8324. | PROGESTERONE | 2 |
| 8325. | PROJE        | 2 |
| 8326. | PROMPT       | 2 |
| 8327. | PRONTO       | 2 |
| 8328. | PROOFS       | 2 |
| 8329. | PROP         | 2 |
| 8330. | PROPER       | 2 |
| 8331. | PROPOSALS    | 2 |
| 8332. | PROTAS       | 2 |
| 8333. | PROVIDER     | 2 |
| 8334. | PROVING      | 2 |
| 8335. | PRUD         | 2 |
| 8336. | PSWD         | 2 |
| 8337. | PSYCH        | 2 |
| 8338. | PTEL         | 2 |
| 8339. | PTLD         | 2 |
| 8340. | PUBLIX       | 2 |
| 8341. | PULMICORT    | 2 |

DOCKET NO.: PAGE01-00116                                    PATENT

| NO.   | PHRASE     | FREQUENCY |
|-------|------------|-----------|
| 8342. | PULMOAIDE  | 2         |
| 8343. | PUPPY      | 2         |
| 8344. | PURPLE     | 2         |
| 8345. | PUSH       | 2         |
| 8346. | PUTNAM     | 2         |
| 8347. | PWOLF      | 2         |
| 8348. | QPOPPER    | 2         |
| 8349. | QTY        | 2         |
| 8350. | QUALIFIED  | 2         |
| 8351. | QUANTITY   | 2         |
| 8352. | QUARRY     | 2         |
| 8353. | QUEEN      | 2         |
| 8354. | QUEST      | 2         |
| 8355. | QUICKFALSH | 2         |
| 8356. | QUICKIE    | 2         |
| 8357. | QUIET      | 2         |
| 8358. | QUINROO    | 2         |
| 8359. | QUOTED     | 2         |
| 8360. | RACAL      | 2         |
| 8361. | RACCA      | 2         |
| 8362. | RACHAL     | 2         |
| 8363. | RACINE     | 2         |
| 8364. | RACKY      | 2         |
| 8365. | RADICE     | 2         |
| 8366. | RAIKEN     | 2         |
| 8367. | RAINED     | 2         |
| 8368. | RALLON     | 2         |
| 8369. | RALP       | 2         |
| 8370. | RAM        | 2         |
| 8371. | RAMIREZ    | 2         |
| 8372. | RANCH      | 2         |
| 8373. | RANDOL     | 2         |
| 8374. | RANG       | 2         |

-290-

DOCKET NO.: PAGE01-00116 PATENT

| NO. | PHRASE | FREQUENCY |
|---|---|---|
| 8375. | RANIA | 2 |
| 8376. | RAPIDS | 2 |
| 8377. | RATHER | 2 |
| 8378. | RATLIFF | 2 |
| 8379. | RATON | 2 |
| 8380. | RB | 2 |
| 8381. | RCLGCOND | 2 |
| 8382. | RCOB | 2 |
| 8383. | REALAUDIO | 2 |
| 8384. | REALITY | 2 |
| 8385. | REALTY | 2 |
| 8386. | REAPPLY | 2 |
| 8387. | REBUILDING | 2 |
| 8388. | RECENTLY | 2 |
| 8389. | RECEPTION | 2 |
| 8390. | RECIE | 2 |
| 8391. | RECIEVER | 2 |
| 8392. | RECO | 2 |
| 8393. | RECOMMEND | 2 |
| 8394. | RECONFIG | 2 |
| 8395. | RECREATIONAL | 2 |
| 8396. | RECTIFY | 2 |
| 8397. | RECVG | 2 |
| 8398. | REDDEN | 2 |
| 8399. | REDDICK | 2 |
| 8400. | REDEEMER | 2 |
| 8401. | REDWINE | 2 |
| 8402. | REE | 2 |
| 8403. | REEDER | 2 |
| 8404. | REFER | 2 |
| 8405. | REFINING | 2 |
| 8406. | REFRENSE | 2 |
| 8407. | REFRIGERATOR | 2 |

-291-

DOCKET NO.: PAGE01-00116                                    PATENT

| NO.   | PHRASE       | FREQUENCY |
|-------|--------------|-----------|
| 8408. | REFUND       | 2         |
| 8409. | REGENNED     | 2         |
| 8410. | REGISTRY     | 2         |
| 8411. | REID         | 2         |
| 8412. | REINSTALL    | 2         |
| 8413. | REISTERTOWN  | 2         |
| 8414. | RELAXING     | 2         |
| 8415. | RELIABLE     | 2         |
| 8416. | REMAX        | 2         |
| 8417. | REMODELING   | 2         |
| 8418. | RENATE       | 2         |
| 8419. | RENAY        | 2         |
| 8420. | REPEATED     | 2         |
| 8421. | REPLACES     | 2         |
| 8422. | REPUBLIC     | 2         |
| 8423. | REQS         | 2         |
| 8424. | REQUIRED     | 2         |
| 8425. | REQUIREMENTS | 2         |
| 8426. | RESCHED      | 2         |
| 8427. | RESERVATIONS | 2         |
| 8428. | RESLWAM      | 2         |
| 8429. | RESOURCES    | 2         |
| 8430. | RESUMES      | 2         |
| 8431. | REUBEN       | 2         |
| 8432. | REUTERS      | 2         |
| 8433. | REVERSE      | 2         |
| 8434. | REYES        | 2         |
| 8435. | RFSD         | 2         |
| 8436. | RHOMA        | 2         |
| 8437. | RIBBON       | 2         |
| 8438. | RIBEIRO      | 2         |
| 8439. | RICCI        | 2         |
| 8440. | RICKA        | 2         |

DOCKET NO.: PAGE01-00116  PATENT

| NO. | PHRASE | FREQUENCY |
|---|---|---|
| 8441. | RICKJOHNSON | 2 |
| 8442. | RIDER | 2 |
| 8443. | RIDGEVIEW | 2 |
| 8444. | RIKER | 2 |
| 8445. | RINGING | 2 |
| 8446. | RITTENBURG | 2 |
| 8447. | RIVERS | 2 |
| 8448. | RIVERWOOD | 2 |
| 8449. | RIVMN | 2 |
| 8450. | RLA | 2 |
| 8451. | RMBFRA | 2 |
| 8452. | ROANOKE | 2 |
| 8453. | ROBBERY | 2 |
| 8454. | ROBERT'S | 2 |
| 8455. | ROCHELLE | 2 |
| 8456. | ROCKET | 2 |
| 8457. | RODRIGO | 2 |
| 8458. | ROFSKY | 2 |
| 8459. | ROLLOUT | 2 |
| 8460. | ROMA | 2 |
| 8461. | ROME | 2 |
| 8462. | ROMONA | 2 |
| 8463. | ROOMMATE | 2 |
| 8464. | ROSANN | 2 |
| 8465. | ROSEDALE | 2 |
| 8466. | ROSEMARY | 2 |
| 8467. | ROSENTHAL | 2 |
| 8468. | ROSY | 2 |
| 8469. | ROTATION | 2 |
| 8470. | ROTORS | 2 |
| 8471. | ROUNDTRIP | 2 |
| 8472. | ROWE | 2 |
| 8473. | RRSMITH | 2 |

DOCKET NO.: PAGE01-00116                                           PATENT

| NO. | PHRASE | FREQUENCY |
|---|---|---|
| 8474. | RTT | 2 |
| 8475. | RU | 2 |
| 8476. | RUDE | 2 |
| 8477. | RUFENER | 2 |
| 8478. | RUMBA | 2 |
| 8479. | RUMORS | 2 |
| 8480. | RUNS | 2 |
| 8481. | RUSS | 2 |
| 8482. | RX | 2 |
| 8483. | S'Z | 2 |
| 8484. | SACRAMENTO | 2 |
| 8485. | SADEH | 2 |
| 8486. | SAENZ | 2 |
| 8487. | SAIT | 2 |
| 8488. | SAL | 2 |
| 8489. | SALAGE | 2 |
| 8490. | SALESPERSON | 2 |
| 8491. | SALGO | 2 |
| 8492. | SALIR | 2 |
| 8493. | SALISBURY | 2 |
| 8494. | SALVAGE | 2 |
| 8495. | SAMANTHA | 2 |
| 8496. | SAMI | 2 |
| 8497. | SAMPLES | 2 |
| 8498. | SAMS | 2 |
| 8499. | SANCHO | 2 |
| 8500. | SANFORD | 2 |
| 8501. | SANGALLI | 2 |
| 8502. | SARATOGA | 2 |
| 8503. | SARGE | 2 |
| 8504. | SAVILLE | 2 |
| 8505. | SCANNER | 2 |
| 8506. | SCATTERED | 2 |

DOCKET NO.: PAGE01-00116                                              PATENT

| NO.   | PHRASE       | FREQUENCY |
|-------|--------------|-----------|
| 8507. | SCHAUB       | 2         |
| 8508. | SCHD         | 2         |
| 8509. | SCHEDULING   | 2         |
| 8510. | SCHENDEL     | 2         |
| 8511. | SCHMIDT      | 2         |
| 8512. | SCHOLL       | 2         |
| 8513. | SCHOOLS      | 2         |
| 8514. | SCHROCK      | 2         |
| 8515. | SCHULMAN     | 2         |
| 8516. | SCIENTIFIC   | 2         |
| 8517. | SCIFI        | 2         |
| 8518. | SCOTTWHARTON | 2         |
| 8519. | SCREENS      | 2         |
| 8520. | SCRIBNER     | 2         |
| 8521. | SCRIPTURE    | 2         |
| 8522. | SCU          | 2         |
| 8523. | SCUSSELL     | 2         |
| 8524. | SEABURY      | 2         |
| 8525. | SEAGLE       | 2         |
| 8526. | SEARCH       | 2         |
| 8527. | SEARS        | 2         |
| 8528. | SEAT         | 2         |
| 8529. | SECURITIES   | 2         |
| 8530. | SED          | 2         |
| 8531. | SEEGER       | 2         |
| 8532. | SEEMED       | 2         |
| 8533. | SEEYA        | 2         |
| 8534. | SEEYOU       | 2         |
| 8535. | SEHAM        | 2         |
| 8536. | SEIGLES      | 2         |
| 8537. | SELLING      | 2         |
| 8538. | SEMESTER     | 2         |
| 8539. | SENDALERT    | 2         |

-295-

DOCKET NO.: PAGE01-00116                                   PATENT

| NO.   | PHRASE        | FREQUENCY |
|-------|---------------|-----------|
| 8540. | SEPTE         | 2         |
| 8541. | SEPTIC        | 2         |
| 8542. | SEPULVEDA     | 2         |
| 8543. | SERREP        | 2         |
| 8544. | SERVCE        | 2         |
| 8545. | SERVE         | 2         |
| 8546. | SERVI         | 2         |
| 8547. | SERVICEMASTER | 2         |
| 8548. | SERZONE       | 2         |
| 8549. | SESSIOINS     | 2         |
| 8550. | SETTLE        | 2         |
| 8551. | SETTLES       | 2         |
| 8552. | SEXUAL        | 2         |
| 8553. | SFX           | 2         |
| 8554. | SG            | 2         |
| 8555. | SHAH          | 2         |
| 8556. | SHAMROCK      | 2         |
| 8557. | SHANE         | 2         |
| 8558. | SHARONSUITE   | 2         |
| 8559. | SHARPE        | 2         |
| 8560. | SHASTA        | 2         |
| 8561. | SHEEPSHEAD    | 2         |
| 8562. | SHEFT         | 2         |
| 8563. | SHEFTFOR      | 2         |
| 8564. | SHELF         | 2         |
| 8565. | SHELIA        | 2         |
| 8566. | SHELLEY       | 2         |
| 8567. | SHELLIE       | 2         |
| 8568. | SHERIDAN      | 2         |
| 8569. | SHERIDAP      | 2         |
| 8570. | SHERMAN       | 2         |
| 8571. | SHERRILL      | 2         |
| 8572. | SHES          | 2         |

-296-

DOCKET NO.: PAGE01-00116                                    PATENT

| NO.   | PHRASE      | FREQUENCY |
|-------|-------------|-----------|
| 8573. | SHIPS       | 2         |
| 8574. | SHOPPER     | 2         |
| 8575. | SHOPPI      | 2         |
| 8576. | SHORES      | 2         |
| 8577. | SHOWROOM    | 2         |
| 8578. | SHRAY       | 2         |
| 8579. | SHREDNG     | 2         |
| 8580. | SHREE       | 2         |
| 8581. | SHREVEPORT  | 2         |
| 8582. | SIEMENS     | 2         |
| 8583. | SIESTA      | 2         |
| 8584. | SIGHT       | 2         |
| 8585. | SIGNS       | 2         |
| 8586. | SIGNUP      | 2         |
| 8587. | SILO        | 2         |
| 8588. | SILO'S      | 2         |
| 8589. | SIMM        | 2         |
| 8590. | SIT         | 2         |
| 8591. | SITTING     | 2         |
| 8592. | SIXTH       | 2         |
| 8593. | SJC         | 2         |
| 8594. | SJOSTROM    | 2         |
| 8595. | SKILLS      | 2         |
| 8596. | SKOE        | 2         |
| 8597. | SKYNET      | 2         |
| 8598. | SLALLY      | 2         |
| 8599. | SLIGO       | 2         |
| 8600. | SLIM        | 2         |
| 8601. | SLO         | 2         |
| 8602. | SLOAN       | 2         |
| 8603. | SLOMCENSKI  | 2         |
| 8604. | SLURP       | 2         |
| 8605. | SMALLFIRE   | 2         |

-297-

DOCKET NO.: PAGE01-00116                                           PATENT

| NO.   | PHRASE     | FREQUENCY |
|-------|------------|-----------|
| 8606. | SMARTEST   | 2         |
| 8607. | SMEARED    | 2         |
| 8608. | SMELLS     | 2         |
| 8609. | SMILING    | 2         |
| 8610. | SMITHRIDGE | 2         |
| 8611. | SMOOTHLY   | 2         |
| 8612. | SMUDGES    | 2         |
| 8613. | SNACK      | 2         |
| 8614. | SNI        | 2         |
| 8615. | SNJAF      | 2         |
| 8616. | SNJSZJ     | 2         |
| 8617. | SNY        | 2         |
| 8618. | SOAKED     | 2         |
| 8619. | SOBRE      | 2         |
| 8620. | SOC'S      | 2         |
| 8621. | SOCIAL     | 2         |
| 8622. | SOCKETMAN  | 2         |
| 8623. | SOCRUM     | 2         |
| 8624. | SOD        | 2         |
| 8625. | SODA       | 2         |
| 8626. | SOES       | 2         |
| 8627. | SOFO       | 2         |
| 8628. | SOLAR      | 2         |
| 8629. | SOLUTION   | 2         |
| 8630. | SONIA      | 2         |
| 8631. | SOO        | 2         |
| 8632. | SORANNO    | 2         |
| 8633. | SOROLLA    | 2         |
| 8634. | SOUNDED    | 2         |
| 8635. | SOURCE     | 2         |
| 8636. | SOUTHLAND  | 2         |
| 8637. | SOUTHPORT  | 2         |
| 8638. | SPA        | 2         |

DOCKET NO.: PAGE01-00116                                              PATENT

| NO.   | PHRASE      | FREQUENCY |
|-------|-------------|-----------|
| 8639. | SPANISH     | 2         |
| 8640. | SPANK       | 2         |
| 8641. | SPARE       | 2         |
| 8642. | SPARKING    | 2         |
| 8643. | SPAULDING   | 2         |
| 8644. | SPE         | 2         |
| 8645. | SPEARK      | 2         |
| 8646. | SPECIALISTS | 2         |
| 8647. | SPECIALIZED | 2         |
| 8648. | SPECIFIC    | 2         |
| 8649. | SPECIMENS   | 2         |
| 8650. | SPECTRA     | 2         |
| 8651. | SPENCER     | 2         |
| 8652. | SPIDERM     | 2         |
| 8653. | SPILLING    | 2         |
| 8654. | SPIN        | 2         |
| 8655. | SPONSOR     | 2         |
| 8656. | SPRAYING    | 2         |
| 8657. | SPRAYS      | 2         |
| 8658. | SPREAD      | 2         |
| 8659. | SPREADING   | 2         |
| 8660. | SPRI        | 2         |
| 8661. | SPRINGER    | 2         |
| 8662. | SPRITE      | 2         |
| 8663. | SQL         | 2         |
| 8664. | SQUARE      | 2         |
| 8665. | SQUEALING   | 2         |
| 8666. | SQUEEZE     | 2         |
| 8667. | SQUICHY     | 2         |
| 8668. | SRO         | 2         |
| 8669. | SRV         | 2         |
| 8670. | STACK       | 2         |
| 8671. | STADIUM     | 2         |

-299-

DOCKET NO.: PAGE01-00116                                           PATENT

| NO.   | PHRASE    | FREQUENCY |
|-------|-----------|-----------|
| 8672. | STAFFING  | 2         |
| 8673. | STAFFORD  | 2         |
| 8674. | STANDBY   | 2         |
| 8675. | STANDS    | 2         |
| 8676. | STANFORD  | 2         |
| 8677. | STANLEY   | 2         |
| 8678. | STAPLER   | 2         |
| 8679. | STARBUCKS | 2         |
| 8680. | STARKEY   | 2         |
| 8681. | STARLA    | 2         |
| 8682. | STARTER   | 2         |
| 8683. | STATIONS  | 2         |
| 8684. | STAYS     | 2         |
| 8685. | STD'      | 2         |
| 8686. | STEAK     | 2         |
| 8687. | STEERING  | 2         |
| 8688. | STEINESS  | 2         |
| 8689. | STELLA    | 2         |
| 8690. | STEPHAN   | 2         |
| 8691. | STERLING  | 2         |
| 8692. | STERR     | 2         |
| 8693. | STERREC   | 2         |
| 8694. | STI       | 2         |
| 8695. | STICKER   | 2         |
| 8696. | STICKING  | 2         |
| 8697. | STILE     | 2         |
| 8698. | STILLS    | 2         |
| 8699. | STIM      | 2         |
| 8700. | STITT     | 2         |
| 8701. | STJEAN    | 2         |
| 8702. | STOCKING  | 2         |
| 8703. | STOLTZ    | 2         |
| 8704. | STOOL     | 2         |

-300-

DOCKET NO.: PAGE01-00116  PATENT

| NO. | PHRASE | FREQUENCY |
|---|---|---|
| 8705. | STOPLIGHT | 2 |
| 8706. | STORMS | 2 |
| 8707. | STRANGE | 2 |
| 8708. | STRATFORD | 2 |
| 8709. | STRATUS | 2 |
| 8710. | STRAUB | 2 |
| 8711. | STRAUSS | 2 |
| 8712. | STREAM | 2 |
| 8713. | STRESS | 2 |
| 8714. | STRESSED | 2 |
| 8715. | STRIPING | 2 |
| 8716. | STRIPPER | 2 |
| 8717. | STRONGER | 2 |
| 8718. | STROUD | 2 |
| 8719. | STUDIO | 2 |
| 8720. | STUDIO | 2 |
| 8721. | STUDY | 2 |
| 8722. | STUDYING | 2 |
| 8723. | STULTZ | 2 |
| 8724. | STY | 2 |
| 8725. | SUBDOMAIN | 2 |
| 8726. | SUBSTANTIAL | 2 |
| 8727. | SUCCESSFULLY | 2 |
| 8728. | SUCTION | 2 |
| 8729. | SUFFERN | 2 |
| 8730. | SUMMER | 2 |
| 8731. | SUNBELT | 2 |
| 8732. | SUNHILL | 2 |
| 8733. | SUNNYVALE | 2 |
| 8734. | SUNSET | 2 |
| 8735. | SUPERMAN | 2 |
| 8736. | SUPPER | 2 |
| 8737. | SUPTW | 2 |

-301-

DOCKET NO.: PAGE01-00116                                            PATENT

| NO. | PHRASE | FREQUENCY |
|---|---|---|
| 8738. | SUR | 2 |
| 8739. | SURFING | 2 |
| 8740. | SURGICAL | 2 |
| 8741. | SURVIVED | 2 |
| 8742. | SUSAN'S | 2 |
| 8743. | SUSPENTION | 2 |
| 8744. | SUTHERLAND | 2 |
| 8745. | SUZ | 2 |
| 8746. | SWAIN | 2 |
| 8747. | SWARTZ | 2 |
| 8748. | SWEENEY'S | 2 |
| 8749. | SWEETWATER | 2 |
| 8750. | SWER | 2 |
| 8751. | SWING | 2 |
| 8752. | SWITCHBOARD | 2 |
| 8753. | SXS | 2 |
| 8754. | SYBASE | 2 |
| 8755. | SYBS | 2 |
| 8756. | SYCAMORE | 2 |
| 8757. | SYMPOSIUM | 2 |
| 8758. | SYNDESK | 2 |
| 8759. | SYRINGE | 2 |
| 8760. | SYSAS | 2 |
| 8761. | SYSOP | 2 |
| 8762. | SYVA | 2 |
| 8763. | SZJ | 2 |
| 8764. | TAB | 2 |
| 8765. | TACO | 2 |
| 8766. | TACOMA | 2 |
| 8767. | TAF | 2 |
| 8768. | TAKENAKA | 2 |
| 8769. | TALIS | 2 |
| 8770. | TALLER | 2 |

DOCKET NO.: PAGE01-00116                    PATENT

| NO.   | PHRASE      | FREQUENCY |
|-------|-------------|-----------|
| 8771. | TAMI        | 2         |
| 8772. | TAN         | 2         |
| 8773. | TAPES       | 2         |
| 8774. | TATUM       | 2         |
| 8775. | TAU         | 2         |
| 8776. | TAUREEN     | 2         |
| 8777. | TAZ         | 2         |
| 8778. | TCIALL      | 2         |
| 8779. | TCO         | 2         |
| 8780. | TCP         | 2         |
| 8781. | TDAY        | 2         |
| 8782. | TDHS        | 2         |
| 8783. | TEAKWOOD    | 2         |
| 8784. | TEARS       | 2         |
| 8785. | TEBOGO      | 2         |
| 8786. | TECHNICOLOR | 2         |
| 8787. | TECHS       | 2         |
| 8788. | TELALERT    | 2         |
| 8789. | TELECOM     | 2         |
| 8790. | TELEMESSAGE | 2         |
| 8791. | TELEPHO     | 2         |
| 8792. | TELFORD     | 2         |
| 8793. | TELGHOST    | 2         |
| 8794. | TEMPLETON   | 2         |
| 8795. | TEMPORARY   | 2         |
| 8796. | TENNANT     | 2         |
| 8797. | TERMITE     | 2         |
| 8798. | TERRACE     | 2         |
| 8799. | TERRACES    | 2         |
| 8800. | TERRENCE    | 2         |
| 8801. | TERRITORY   | 2         |
| 8802. | TESIN       | 2         |
| 8803. | TET         | 2         |

-303-

DOCKET NO.: PAGE01-00116                                              PATENT

| NO.   | PHRASE      | FREQUENCY |
|-------|-------------|-----------|
| 8804. | TEXPACK     | 2         |
| 8805. | THC         | 2         |
| 8806. | THEATER     | 2         |
| 8807. | THELMA      | 2         |
| 8808. | THEO        | 2         |
| 8809. | THEODORE    | 2         |
| 8810. | THERIGHT    | 2         |
| 8811. | THEV'S      | 2         |
| 8812. | THEY'LL     | 2         |
| 8813. | THEY'VE     | 2         |
| 8814. | THI         | 2         |
| 8815. | THIELS      | 2         |
| 8816. | THISMESSAGE | 2         |
| 8817. | THORN       | 2         |
| 8818. | THORNHILL   | 2         |
| 8819. | THORNTON    | 2         |
| 8820. | THREAT      | 2         |
| 8821. | THREATENED  | 2         |
| 8822. | THYROID     | 2         |
| 8823. | TI'S        | 2         |
| 8824. | TIB         | 2         |
| 8825. | TIBERIO     | 2         |
| 8826. | TIENES      | 2         |
| 8827. | TILLITT     | 2         |
| 8828. | TIM'S       | 2         |
| 8829. | TIMECAST    | 2         |
| 8830. | TIMING      | 2         |
| 8831. | TING        | 2         |
| 8832. | TIOLET      | 2         |
| 8833. | TIP         | 2         |
| 8834. | TISH        | 2         |
| 8835. | TISSUE      | 2         |
| 8836. | TKT         | 2         |

-304-

DOCKET NO.: PAGE01-00116                                                      PATENT

| NO.   | PHRASE     | FREQUENCY |
|-------|------------|-----------|
| 8837. | TKTS       | 2         |
| 8838. | TOAD       | 2         |
| 8839. | TOCAYO     | 2         |
| 8840. | TODAYS     | 2         |
| 8841. | TOF        | 2         |
| 8842. | TOGBE      | 2         |
| 8843. | TOLUNCH    | 2         |
| 8844. | TOM'S      | 2         |
| 8845. | TOMAKE     | 2         |
| 8846. | TOMM       | 2         |
| 8847. | TOMOROW    | 2         |
| 8848. | TON        | 2         |
| 8849. | TONE       | 2         |
| 8850. | TONIT      | 2         |
| 8851. | TONS       | 2         |
| 8852. | SOPIC      | 2         |
| 8853. | TOQUINTO   | 2         |
| 8854. | TORB       | 2         |
| 8855. | TORESCH    | 2         |
| 8856. | TORI       | 2         |
| 8857. | TORRESDALE | 2         |
| 8858. | TORTS      | 2         |
| 8859. | TOTALS     | 2         |
| 8860. | TOUCHING   | 2         |
| 8861. | TOUPGRADE  | 2         |
| 8862. | TOY        | 2         |
| 8863. | TOYOTA     | 2         |
| 8864. | TOYOU      | 2         |
| 8865. | TP         | 2         |
| 8866. | TPA        | 2         |
| 8867. | TPPDUNS    | 2         |
| 8868. | TPR        | 2         |
| 8869. | TRABAJO    | 2         |

-305-

DOCKET NO.: PAGE01-00116  PATENT

| NO. | PHRASE | FREQUENCY |
|---|---|---|
| 8870. | TRAC | 2 |
| 8871. | TRACE | 2 |
| 8872. | TRACEY | 2 |
| 8873. | TRACT | 2 |
| 8874. | TRADING | 2 |
| 8875. | TRAIGAS | 2 |
| 8876. | TRAINER | 2 |
| 8877. | TRANSACT | 2 |
| 8878. | TRANSITION | 2 |
| 8879. | TRANSMISSIONS | 2 |
| 8880. | TRANSOCEAN | 2 |
| 8881. | TRANSPORTATION | 2 |
| 8882. | TREAT | 2 |
| 8883. | TREES | 2 |
| 8884. | TREITLER | 2 |
| 8885. | TREVINO | 2 |
| 8886. | TRIADE | 2 |
| 8887. | TRIAL | 2 |
| 8888. | TRIANGLE | 2 |
| 8889. | TRIMMING | 2 |
| 8890. | TRIPPING | 2 |
| 8891. | TRK | 2 |
| 8892. | TRMB | 2 |
| 8893. | TRONO | 2 |
| 8894. | TRROUGH | 2 |
| 8895. | TRSE | 2 |
| 8896. | TRU | 2 |
| 8897. | TRUCKS | 2 |
| 8898. | TRUK | 2 |
| 8899. | TUBE | 2 |
| 8900. | TUCOWS | 2 |
| 8901. | TURKIN | 2 |
| 8902. | TURMAN | 2 |

-306-

DOCKET NO.: PAGE01-00116                                                        PATENT

| NO.   | PHRASE       | FREQUENCY |
|-------|--------------|-----------|
| 8903. | TURNEY       | 2         |
| 8904. | TURNP        | 2         |
| 8905. | TWD          | 2         |
| 8906. | TWELVE       | 2         |
| 8907. | TXN          | 2         |
| 8908. | TYNOA        | 2         |
| 8909. | TYRONE       | 2         |
| 8910. | UCSD         | 2         |
| 8911. | UL           | 2         |
| 8912. | UMBRELLAS    | 2         |
| 8913. | UND          | 2         |
| 8914. | UNDELIVERABLE| 2         |
| 8915. | UNELL        | 2         |
| 8916. | UNEVEN       | 2         |
| 8917. | UNFORWARDED  | 2         |
| 8918. | UNILOCK      | 2         |
| 8919. | UNL          | 2         |
| 8920. | UNLOCK       | 2         |
| 8921. | UNOS         | 2         |
| 8922. | UNREADABLE   | 2         |
| 8923. | UNSURE       | 2         |
| 8924. | UPGRADES     | 2         |
| 8925. | UPLOAD       | 2         |
| 8926. | URGNT        | 2         |
| 8927. | USERNAME     | 2         |
| 8928. | USL          | 2         |
| 8929. | UTILITY      | 2         |
| 8930. | UU           | 2         |
| 8931. | UUNET        | 2         |
| 8932. | UX           | 2         |
| 8933. | VACA         | 2         |
| 8934. | VACAION      | 2         |
| 8935. | VAGINAL      | 2         |

-307-

DOCKET NO.: PAGE01-00116 PATENT

| NO. | PHRASE | FREQUENCY |
|---|---|---|
| 8936. | VALVES | 2 |
| 8937. | VANTAGE | 2 |
| 8938. | VARGAS | 2 |
| 8939. | VARGASM | 2 |
| 8940. | VARI | 2 |
| 8941. | VARIET | 2 |
| 8942. | VASTAR | 2 |
| 8943. | VAUGHT | 2 |
| 8944. | VECTOR | 2 |
| 8945. | VEGETABLE | 2 |
| 8946. | VENDOR | 2 |
| 8947. | VENEGAS | 2 |
| 8948. | VENERE | 2 |
| 8949. | VENGA | 2 |
| 8950. | VENT | 2 |
| 8951. | VENTOLIN | 2 |
| 8952. | VERA | 2 |
| 8953. | VERGIE | 2 |
| 8954. | VERNON | 2 |
| 8955. | VET | 2 |
| 8956. | VI | 2 |
| 8957. | VIBE | 2 |
| 8958. | VIBRATES | 2 |
| 8959. | VICE | 2 |
| 8960. | VICEPH | 2 |
| 8961. | VICK | 2 |
| 8962. | VICTIM | 2 |
| 8963. | VICTORERO | 2 |
| 8964. | VIDAL | 2 |
| 8965. | VIKKI | 2 |
| 8966. | VILLAS | 2 |
| 8967. | VINA | 2 |
| 8968. | VINCENT | 2 |

-308-

DOCKET NO.: PAGE01-00116                                                        PATENT

| NO.   | PHRASE        | FREQUENCY |
|-------|---------------|-----------|
| 8969. | VIOLATIONTEST | 2         |
| 8970. | VIRGIL        | 2         |
| 8971. | VISITORS      | 2         |
| 8972. | VITO          | 2         |
| 8973. | VIVIAN        | 2         |
| 8974. | VMAIL         | 2         |
| 8975. | VO            | 2         |
| 8976. | VOICES        | 2         |
| 8977. | VOLOFDISKSPACE| 2         |
| 8978. | VOLTS         | 2         |
| 8979. | VPOON         | 2         |
| 8980. | VTORCH        | 2         |
| 8981. | VTV           | 2         |
| 8982. | VW            | 2         |
| 8983. | WAITED        | 2         |
| 8984. | WAITINGFOR    | 2         |
| 8985. | WAIVE         | 2         |
| 8986. | WALDEN        | 2         |
| 8987. | WALKED        | 2         |
| 8988. | WALKING       | 2         |
| 8989. | WALLET        | 2         |
| 8990. | WALTHER       | 2         |
| 8991. | WAN           | 2         |
| 8992. | WANSTATUS     | 2         |
| 8993. | WARDEN        | 2         |
| 8994. | WASHIN        | 2         |
| 8995. | WASHING       | 2         |
| 8996. | WASHOEMED     | 2         |
| 8997. | WASSHAUSEN    | 2         |
| 8998. | WASSUP        | 2         |
| 8999. | WATCHED       | 2         |
| 9000. | WATKINS       | 2         |
| 9001. | WAVE          | 2         |

DOCKET NO.: PAGE01-00116                                                         PATENT

| NO.   | PHRASE       | FREQUENCY |
|-------|--------------|-----------|
| 9002. | WAVELINKS    | 2         |
| 9003. | WBS          | 2         |
| 9004. | WBZCW        | 2         |
| 9005. | WBZGK        | 2         |
| 9006. | WBZI         | 2         |
| 9007. | WCC          | 2         |
| 9008. | WEBER        | 2         |
| 9009. | WEBSTOR      | 2         |
| 9010. | WECU         | 2         |
| 9011. | WEIRD        | 2         |
| 9012. | WEISSINGER   | 2         |
| 9013. | WESTCLIFF    | 2         |
| 9014. | WESTINGHOUSE | 2         |
| 9015. | WESTSHORE    | 2         |
| 9016. | WF           | 2         |
| 9017. | WFSTUL       | 2         |
| 9018. | WFSTULSA     | 2         |
| 9019. | WHALEY       | 2         |
| 9020. | WHATCHA      | 2         |
| 9021. | WHEATY       | 2         |
| 9022. | WHEEL        | 2         |
| 9023. | WHIETP       | 2         |
| 9024. | WHIP         | 2         |
| 9025. | WHITTEY      | 2         |
| 9026. | WHOLESALE    | 2         |
| 9027. | WICK         | 2         |
| 9028. | WIGGLY       | 2         |
| 9029. | WIGLEY       | 2         |
| 9030. | WILKINSON    | 2         |
| 9031. | WILLARRIVE   | 2         |
| 9032. | WILLBE       | 2         |
| 9033. | WILLFOLLOW   | 2         |
| 9034. | WILLY        | 2         |

*-310-*

DOCKET NO.: PAGE01-00116                                              PATENT

| NO.   | PHRASE      | FREQUENCY |
|-------|-------------|-----------|
| 9035. | WILSONVILLE | 2         |
| 9036. | WILTZ       | 2         |
| 9037. | WINDWARD    | 2         |
| 9038. | WINES       | 2         |
| 9039. | WINGTIP     | 2         |
| 9040. | WINN        | 2         |
| 9041. | WINPAGE     | 2         |
| 9042. | WISCONSIN   | 2         |
| 9043. | WIT         | 2         |
| 9044. | WITHACER    | 2         |
| 9045. | WITHDRAWL   | 2         |
| 9046. | WHTHJERRY   | 2         |
| 9047. | WITHYOU     | 2         |
| 9048. | WIZ         | 2         |
| 9049. | WJLJ        | 2         |
| 9050. | WJVJ        | 2         |
| 9051. | WJZI        | 2         |
| 9052. | WKZY        | 2         |
| 9053. | WLK         | 2         |
| 9054. | WMS         | 2         |
| 9055. | WO          | 2         |
| 9056. | WOLFGANG    | 2         |
| 9057. | WOMEN       | 2         |
| 9058. | WOMENS      | 2         |
| 9059. | WON'        | 2         |
| 9060. | WOND        | 2         |
| 9061. | WOODALL     | 2         |
| 9062. | WOODSON     | 2         |
| 9063. | WOOTEN      | 2         |
| 9064. | WOR         | 2         |
| 9065. | WORCHESTER  | 2         |
| 9066. | WORLDS      | 2         |
| 9067. | WORMER      | 2         |

-311-

DOCKET NO.: PAGE01-00116                                          PATENT

| NO.   | PHRASE     | FREQUENCY |
|-------|------------|-----------|
| 9068. | WORRIED    | 2         |
| 9069. | WORSE      | 2         |
| 9070. | WOULDLIKE  | 2         |
| 9071. | WOULDN'T   | 2         |
| 9072. | WOUND      | 2         |
| 9073. | WPG        | 2         |
| 9074. | WRECK      | 2         |
| 9075. | WRESTLER   | 2         |
| 9076. | WRINKLING  | 2         |
| 9077. | WRITER     | 2         |
| 9078. | WS         | 2         |
| 9079. | WSC        | 2         |
| 9080. | WTL        | 2         |
| 9081. | WVL        | 2         |
| 9082. | WWLK       | 2         |
| 9083. | WWTL       | 2         |
| 9084. | WWXZZZ     | 2         |
| 9085. | WWXZZZEC   | 2         |
| 9086. | WYGAB      | 2         |
| 9087. | WYNN       | 2         |
| 9088. | XA         | 2         |
| 9089. | XAVIER     | 2         |
| 9090. | XCLUSION   | 2         |
| 9091. | XEROX      | 2         |
| 9092. | XING       | 2         |
| 9093. | XNS        | 2         |
| 9094. | XOXOXOXOX  | 2         |
| 9095. | XPEDITE    | 2         |
| 9096. | XZZ        | 2         |
| 9097. | YAGER      | 2         |
| 9098. | YAGERS     | 2         |
| 9099. | YAIR       | 2         |
| 9100. | YALE       | 2         |

-312-

DOCKET NO.: PAGE01-00116 PATENT

| NO. | PHRASE | FREQUENCY |
|---|---|---|
| 9101. | YDS | 2 |
| 9102. | YESTERDAY | 2 |
| 9103. | YJGZBFGZTCZKJU | 2 |
| 9104. | YJZG | 2 |
| 9105. | YKZ | 2 |
| 9106. | YOON | 2 |
| 9107. | YOR | 2 |
| 9108. | YOULOTS | 2 |
| 9109. | YOUNEED | 2 |
| 9110. | YOUNEY | 2 |
| 9111. | YOURANTICIPATE | 2 |
| 9112. | YPUR | 2 |
| 9113. | YURI | 2 |
| 9114. | ZACH | 2 |
| 9115. | ZACK | 2 |
| 9116. | ZB | 2 |
| 9117. | ZCCWZ | 2 |
| 9118. | ZGC | 2 |
| 9119. | ZGS | 2 |
| 9120. | ZH | 2 |
| 9121. | ZKJW | 2 |
| 9122. | ZM | 2 |
| 9123. | ZNZRNZJY | 2 |
| 9124. | ZOOMER | 2 |
| 9125. | ZRTZVRJMTRUZY | 2 |
| 9126. | ZSJ | 2 |
| 9127. | ZT | 2 |
| 9128. | ZWJ | 2 |
| 9129. | ZZJ | 2 |
| 9130. | ZZJK | 2 |
| 9131. | ZZJZI | 2 |

-313-

What is claimed is:

1. A non-realtime messaging system comprising:
   a messaging controller that is operable to receive oral messages from callers into said non-realtime messaging system and operable to transmit text messages to communications devices associated with subscribers of said non-realtime messaging system;
   a data repository that is operable to store data patterns that represent oral phrases specific to said non-realtime messaging system; and
   a translating controller, associated with said messaging controller and said data repository, that is operable to process said received oral messages using said stored data patterns and to generate said text messages in response thereto.

2. The non-realtime messaging system set forth in claim 1 wherein said translating controller assigns at least one confidence factor to said generated text messages.

3. The non-realtime messaging system set forth in claim 1 wherein said translating controller separates said received oral messages into sub-parts.

4. The non-realtime messaging system set forth in claim 1 wherein said translating controller is further operable to verify said generated text messages.

5. The non-realtime messaging system set forth in claim 1 wherein said stored data patterns represent oral phrases currently specific to said non-realtime messaging system.

6. The non-realtime messaging system set forth in claim 1 further comprising data records specific to said subscribers of said non-realtime messaging system.

7. The non-realtime messaging system set forth in claim 6 wherein said data records are associated with ones of said stored data patterns that represent oral phrases specific to said subscribers of said non-realtime messaging system.

8. A method of operating a non-realtime messaging system that is operable to receive oral messages from callers into said non-realtime messaging system and operable to transmit text messages to communications devices associated with subscribers of said non-realtime messaging system, said method of operation comprising the steps of:
   storing data patterns that represent oral phrases specific to said non-realtime messaging system in a data repository; and
   controlling a translating controller, associated with said data repository, that is operable to process said received oral messages using said stored data patterns and generating said text messages in response thereto.

9. The method of operating said non-realtime messaging system set forth in claim 8 further comprising the step of assigning at least one confidence factor to said generated text messages.

10. The method of operating said non-realtime messaging system set forth in claim 8 further comprising the step of separating said received oral messages into sub-parts.

11. The method of operating said non-realtime messaging system set forth in claim 8 further comprising the step of verifying said generated text messages.

12. The method of operating said non-realtime messaging system set forth in claim 8 further includes the step of dynamically modifying said stored data patterns.

13. The method of operating said non-realtime messaging system set forth in claim 8 further comprising the step of storing data records specific to said subscribers of said non-realtime messaging system.

14. The method of operating said non-realtime messaging system set forth in claim 13 wherein said data records are associated with ones of said stored data patterns that represent oral phrases specific to said subscribers of said non-realtime messaging system.

15. For use in a messaging paging system that includes a paging controller that is operable to receive oral messages from callers into said message paging system and operable to transmit text messages to message paging devices associated with subscribers of said message paging system, a translating controller that is associated with a data repository that stores data patterns that represent oral phrases specific to said message paging system and is operable to process said received oral messages using said stored data patterns and to generate said text messages in response thereto.

16. The translation controller set forth in claim 15 wherein said translating controller is further operable to assign at least one confidence factor to said generated text messages.

17. The translation controller set forth in claim 15 wherein said translating controller separates said received oral messages into sub-parts.

18. The translation controller set forth in claim 15 wherein said translating controller is further operable to verify said generated text messages.

19. The translation controller set forth in claim 15 wherein said stored data patterns represent oral phrases currently specific to said message paging system.

20. The translation controller set forth in claim 15 further comprising data records specific to said subscribers of said message paging system.

21. The translation controller set forth in claim 20 wherein said data records are associated with ones of said stored data patterns that represent oral phrases specific to said subscribers of said message paging system.

* * * * *